US007886269B2

(12) United States Patent
Williams et al.

(10) Patent No.: US 7,886,269 B2
(45) Date of Patent: *Feb. 8, 2011

(54) XML APPLICATION FRAMEWORK

(75) Inventors: Antony S. Williams, Mercer Island, WA (US); Clemens A. Szyperski, Redmond, WA (US); Craig Wittenberg, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

This patent is subject to a terminal disclaimer.

(21) Appl. No.: 11/360,448

(22) Filed: Feb. 23, 2006

(65) Prior Publication Data

US 2006/0248448 A1  Nov. 2, 2006

Related U.S. Application Data

(60) Provisional application No. 60/703,220, filed on Jul. 28, 2005, provisional application No. 60/676,137, filed on Apr. 29, 2005.

(51) Int. Cl.
G06F 9/44 (2006.01)

(52) U.S. Cl. ............... 717/121; 717/106; 717/107; 717/110; 717/111; 717/113; 719/313; 719/315

(58) Field of Classification Search ............... 717/101, 717/107, 108, 110, 111; 707/8; 719/313, 719/315, 332; 706/60
See application file for complete search history.

(56) References Cited

U.S. PATENT DOCUMENTS

| 4,943,932 | A | * | 7/1990 | Lark et al. | 706/60 |
|---|---|---|---|---|---|
| 5,018,097 | A | * | 5/1991 | Kuhlmann et al. | 719/313 |
| 5,392,430 | A | | 2/1995 | Chen et al. | 718/106 |
| 5,446,895 | A | * | 8/1995 | White et al. | 717/101 |
| 5,491,813 | A | | 2/1996 | Bondy et al. | |
| 5,519,866 | A | * | 5/1996 | Lawrence et al. | 717/162 |
| 5,659,701 | A | | 8/1997 | Amit et al. | 719/317 |
| 5,790,855 | A | * | 8/1998 | Faustini | 717/100 |
| 5,842,020 | A | * | 11/1998 | Faustini | 717/111 |
| 5,940,828 | A | | 8/1999 | Anaya et al. | 707/8 |
| 6,083,276 | A | | 7/2000 | Davidson et al. | 717/107 |

(Continued)

OTHER PUBLICATIONS

Title: Optimized one-to-one personalization of Web applications using a graph based model, author: Sonneck et al, source: IEEE, dated: Apr. 22, 2003.*

(Continued)

Primary Examiner—Chameli C Das
(74) Attorney, Agent, or Firm—Merchant & Gould

(57) ABSTRACT

An extensible markup language (XML) application framework (XAF) may be provided. XAF applications are data driven such that all operations with a computer system are data focused. In addition, the components used in the XAF application are instantiated and connected according to how data is displayed and what data type is used. Applications within XAF comprise a user interface (UI) connector, an action module, and a data connector. UI connectors receive UI events and connect the UI event to an action module. The action module generates a standard format action from the UI event and sends it to the data connector. The data connector translates the standard format action into a data-specific action that changes data in a data store. A data connector then sends a standard format data representation corresponding to the changed data back to the UI connector to provide the changed data to the UI.

20 Claims, 33 Drawing Sheets

U.S. PATENT DOCUMENTS

| | | | |
|---|---|---|---|
| 6,205,465 B1 | 3/2001 | Schoening et al. | 718/102 |
| 6,208,336 B1 | 3/2001 | Carter | |
| 6,256,780 B1 | 7/2001 | Williams et al. | 717/5 |
| 6,339,775 B1 | 1/2002 | Zamanian et al. | 707/101 |
| 7,287,259 B2 | 6/2002 | Wall et al. | 717/109 |
| 6,415,434 B1* | 7/2002 | Kind | 717/107 |
| 6,670,969 B1 | 12/2003 | Halstead et al. | 715/762 |
| 6,721,941 B1 | 4/2004 | Morshed et al. | |
| 6,721,951 B1 | 4/2004 | Williams et al. | 719/329 |
| 6,760,903 B1 | 7/2004 | Morshed et al. | |
| 6,820,135 B1 | 11/2004 | Dingman et al. | 709/246 |
| 6,823,518 B1 | 11/2004 | Bliss et al. | 719/310 |
| 7,031,968 B2 | 4/2006 | Kremer et al. | |
| 7,032,210 B2 | 4/2006 | Alloing et al. | 717/106 |
| 7,043,481 B2 | 5/2006 | Mullins et al. | 707/10 |
| 7,131,107 B2 | 10/2006 | Wall et al. | 717/105 |
| 7,206,827 B2* | 4/2007 | Viswanath et al. | 709/220 |
| 7,233,982 B2 | 6/2007 | Shenefiel | 709/219 |
| 7,240,327 B2* | 7/2007 | Singh et al. | 717/108 |
| 7,280,996 B2 | 10/2007 | Hayakawa et al. | 707/1 |
| 7,287,112 B1 | 10/2007 | Pleis et al. | |
| 7,383,285 B1 | 6/2008 | Pal et al. | 707/104.1 |
| 7,412,497 B2* | 8/2008 | Viswanath et al. | 709/220 |
| 7,570,267 B2 | 8/2009 | Patel et al. | |
| 7,581,225 B2 | 8/2009 | Ahmad et al. | 719/314 |
| 7,631,295 B2* | 12/2009 | Makowski et al. | 717/113 |
| 2002/0065950 A1 | 5/2002 | Katz et al. | 709/318 |
| 2002/0069401 A1 | 6/2002 | Wall et al. | 717/109 |
| 2003/0034998 A1* | 2/2003 | Kodosky et al. | 345/736 |
| 2003/0135825 A1 | 7/2003 | Gertner et al. | 715/513 |
| 2003/0192031 A1 | 10/2003 | Srinivasan et al. | 717/120 |
| 2004/0031018 A1 | 2/2004 | Marty | 717/120 |
| 2004/0083238 A1 | 4/2004 | Louis et al. | 707/200 |
| 2004/0083455 A1 | 4/2004 | Gschwind et al. | 717/120 |
| 2004/0162985 A1 | 8/2004 | Freeman et al. | |
| 2004/0181779 A1 | 9/2004 | Gorti | 717/120 |
| 2004/0230666 A1 | 11/2004 | Taboada et al. | 709/217 |
| 2004/0230945 A1* | 11/2004 | Bryant et al. | 717/106 |
| 2004/0250238 A1* | 12/2004 | Singh et al. | 717/108 |
| 2005/0044235 A1 | 2/2005 | Balahura et al. | 709/227 |
| 2005/0120275 A1 | 6/2005 | Fletcher et al. | 714/38 |
| 2005/0135383 A1 | 6/2005 | Shenefiel | 370/395.52 |
| 2006/0156294 A1* | 7/2006 | Fuller et al. | 717/154 |
| 2006/0168183 A1* | 7/2006 | Fuller et al. | 709/223 |
| 2006/0190105 A1* | 8/2006 | Hsu et al. | 700/86 |
| 2006/0225034 A1* | 10/2006 | Peck et al. | 717/106 |
| 2006/0245096 A1 | 11/2006 | Ahmad et al. | |
| 2006/0248104 A1 | 11/2006 | Ahmad et al. | |
| 2006/0248112 A1 | 11/2006 | Williams et al. | |
| 2006/0248449 A1 | 11/2006 | Williams et al. | |
| 2006/0248450 A1 | 11/2006 | Wittenberg et al. | |
| 2006/0248451 A1 | 11/2006 | Szyperski et al. | |
| 2006/0248467 A1 | 11/2006 | Elvanoglu et al. | |
| 2006/0248530 A1 | 11/2006 | Ahmad et al. | |
| 2006/0277201 A1 | 12/2006 | Dorsett | 707/10 |
| 2007/0150859 A1* | 6/2007 | Kodosky et al. | 717/106 |
| 2008/0046885 A1 | 2/2008 | Shultz et al. | 718/1 |
| 2008/0263549 A1 | 10/2008 | Walker | 718/100 |

OTHER PUBLICATIONS

U.S. Office Action dated May 22, 2009 cited in U.S. Appl. No. 11/360,456.
U.S. Office Action dated Sep. 20, 2007 cited in U.S. Appl. No. 11/360,454.
International Search Report dated Apr. 26, 2007 cited in International Application No. PCT/US06/15184.
U.S. Office Action dated Jun. 23, 2008 cited in U.S. Appl. No. 11/360,856.
U.S. Final Office Action dated Nov. 7, 2008 cited in U.S. Appl. No. 11/360,456.
Chinese Office Action dated Oct. 10, 2008 in Application No. 200680014637.X.
U.S. Office Action dated Feb. 4, 2008 cited in U.S. Appl. No. 11/360,456.
U.S. Office Action dated Mar. 27, 2008 cited in U.S. Appl. No. 11/360,454.
Chamberlain et al., "Quilt: An XML Query Language for Heterogeneous Data Sources," 2001, Springer Verlag Berlin Heidelberg, pp. 1-25.
U.S. Final Office Action dated Jan. 6, 2010 cited in U.S. Appl. No. 11/360,456 (14917.0258usu5).
Chinese First Office Action dated Aug. 21, 2009 cited in Application No. 200680014618.7.
Russian Official Action dated Jan. 15, 2010 cited in Application No. 2007139779/09(043557) (14917.0258ruw2).
U.S. Office Action dated Mar. 8, 2010 cited in U.S. Appl. No. 11/360,457 (14917.0258usu3).
U.S. Office Action dated Mar. 16, 2010 cited in U.S. Appl. No. 11/360,851 (14917.0258usu7).
U.S. Office Action dated Mar. 24, 2010 cited in U.S. Appl. No. 11/360,857 (14917.0258usu6).
U.S. Office Action dated Mar. 30, 2010 cited in U.S. Appl. No. 11/360,455 (14917.0258usu2).
Chinese Second Office Action dated Apr. 13, 2010 cited in Application No. 200680014637.X (14917.0258ccw2).
Russian Office Action dated Jun. 29, 2010 cited in Application No. 2007139779 (14917.0258ruw2).
U.S. Final Office Action dated Aug. 16, 2010 cited in U.S. Appl. No. 11/360,851 (14917.0258usu7).
U.S. Final Office Action dated Aug. 20, 2010 cited in U.S. Appl. No. 11/360,857 (14917.0258usu6).
U.S. Final Office Action dated Aug. 23, 2010 cited in U.S. Appl. No. 11/360,455 (14917.0258usu2).
U.S. Final Office Action dated Aug. 30, 2010 cited in U.S. Appl. No. 11/360,457 (14917.0258usu3).
U.S. Final Office Action dated Oct. 1, 2010 cited in U.S. Appl. No. 11/360,856.
Chinese First Office Action dated Sep. 14, 2010 cited in Appl. No. 200680014092.2.
U.S. Office Action dated Nov. 9, 2010 cited in U.S. Appl. No. 11/360,456.

* cited by examiner

XML APPLICATION FRAMEWORK

CROSS-REFERENCE TO RELATED APPLICATIONS

This patent application claims priority to U.S. Patent Application Ser. No. 60/676,137 filed Apr. 29, 2005 and entitled "Application Description Language," and U.S. Patent Application Ser. No. 60/703,220 filed Jul. 28, 2005 and entitled "Markup Language Based Application Framework with Application Description Language, Concurrency Domains, Application Framework Phasing Models, and Application Framework Transaction Transforms", the disclosures of which are expressly incorporated herein, in their entirety, by reference.

COPYRIGHT NOTICE

A portion of the disclosure of this patent document contains material that is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

This patent application is also related to and filed concurrently with U.S. patent application Ser. No. 11/360,454, entitled "Multithreading with Concurrency Domains," now U.S. Pat. No. 7,581,225 issued on Aug. 25, 2009; U.S. patent application Ser. No. 11/360,455, entitled "Application Framework Phasing Model;" U.S. patent application Ser. No. 11/360,457, entitled "XML Application Framework;" U.S. patent application Ser. No. 11/360,856, entitled "Application Description Language;" U.S. patent application Ser. No. 11/360,456, entitled "Transaction Transforms;" U.S. patent application Ser. No. 11/360,857, entitled "XML Application Framework"; and U.S. patent application Ser. No. 11/360,851, entitled "XML Application Framework"; which are assigned to the same assignee as the present application and expressly incorporated herein, in their entirety, by reference.

BACKGROUND

Generally, software systems provide software architectures that organize and interconnect software components within a computer system. The software components perform operations that give a software application its function. Generally, an application operates with several features, each having one or more components. The components and hence, the features may be formed from one or more underlying software components that parse the operation into smaller and simpler tasks.

When constructing a software application, a software developer must create the software components using a development language, such as C#. In creating the imperative code, the software code that gives the software component its function, the developer must create links between all the components through calls or other constructs. For any functionality provided by an application, the software developer generally creates the code for all the different software components that perform the application specific functions and manually codes the interconnections between the software components that rely on each other to complete tasks. The software developer creates user interfaces (UI), data constructs, and all the required operations for the interactions between the user and the application.

In many applications, the UI, operations, and data constructs are application-specific. Thus, to create an application, a software developer typically creates enormous amounts of code. In addition, the software developer generally organizes and creates all the interrelationships between the different pieces of software. To create any application, a software developer must be very skilled because the underlying languages used to create applications are complicated.

Due to the complexity of the current methods for generating applications and due to the specificity of the code for a given application and its inevitable interconnectedness, software developers cannot easily modify or expand on current applications without great effort and without risking damage to existing applications.

It is with respect to these considerations and others that the present invention has been made.

SUMMARY

This summary is provided to introduce a selection of concepts in a simplified form that are further described below in the Detailed Description. This summary is not intended to identify key features or essential features of the claimed subject matter.

Embodiments of the present invention solve the above and other problems by providing a software application framework for generating a runtime structure for a given software application and for managing execution of the software application. An application generated by the application framework of the present invention is comprised of a collection or graph of connected application components. Functionalities of an application configured according to the application framework are enabled by dynamically configuring groups of application components into component domains where each domain is configured to enable a given functionality of the application, for example, displaying a picture in a word processing document.

In order to generate a runtime structure for the application, the application passes an application description for each required application functionality to an application description engine. The application description provides declarative rules for structuring and composing the component domains, and the application description engine is operative to interpret the declarative rules for creating and reconfiguring the component domains as required based on data events received by the application. Data events received by the application may be generated by user action, for example, in response to a user selection of a functionality button or control or data object in a user interface. Data events also may be generated by external changes, for example, data received by the application as a result of the running of an external process or from another application or third party source. According to one embodiment, the application description and the application description engine are structured and/or operate according to the Extensible Markup Language (XML). While XML may be used within the application framework to provide a standard and simple means of stating actions or other occurrences within the framework, the application framework is not limited to the use of only XML.

The application description engine interprets the application description for each required functionality and then obtains application components needed to construct a component domain for each required functionality. According to one embodiment, the application description engine obtains application components from a component library maintained in association with the application. For example, the application description engine may construct one domain for displaying text in a document, a second domain for displaying a picture object in a document, a third domain for formatting functionality of the application, and so on.

According to embodiments, the application framework further includes an execution management model for managing execution of the application and the domains comprising the application. When a data event, for example, the deletion of a data item in a table of data, occurs during execution of the application that requires invocation of a given application functionality, and thus requires invocation of a particular component domain that enables the functionality, a single processing thread is dispatched by the application to the subject domain for executing the components of the domain according to the data-driven event.

Once the single processing thread enters the subject domain, components of the domain are executed by the thread according to an execution phase model. In a first phase, a read/request phase, a reading of required data, for example, a value to be deleted from a table object, is performed, followed by a request for required changes, for example, deletion of a requested value from the example table object. During a second phase, a revalidation/reconfiguration phase, the subject domain is revalidated or reconfigured by the application description engine according to the requested changes. That is, the application description engine reconfigures the domain, if necessary, according to a new configuration applicable to the change in data.

During the reconfiguration phase, the application description engine may discard some components of the domain, obtain new components for the domain, or destroy the domain altogether. Thus, a given domain is a collection of components that have a lifetime cycle equal to the time between initial configuration and a subsequent reconfiguration, which in turn, starts a lifetime cycle for the next configuration, if any, of the given domain. Accordingly, each component domain generated by the application description engine serves as a collection of components needed for performing a given data-driven functionality of the application, and the domain has a lifetime determined by the need of the application for the services of the domain.

A more complete appreciation of the present invention and its improvements can be obtained by reference to the accompanying drawings, which are briefly summarized below, to the following detailed description of exemplary embodiments of the invention, and to the appended claims.

DETAILED DESCRIPTION

Figure 1A:
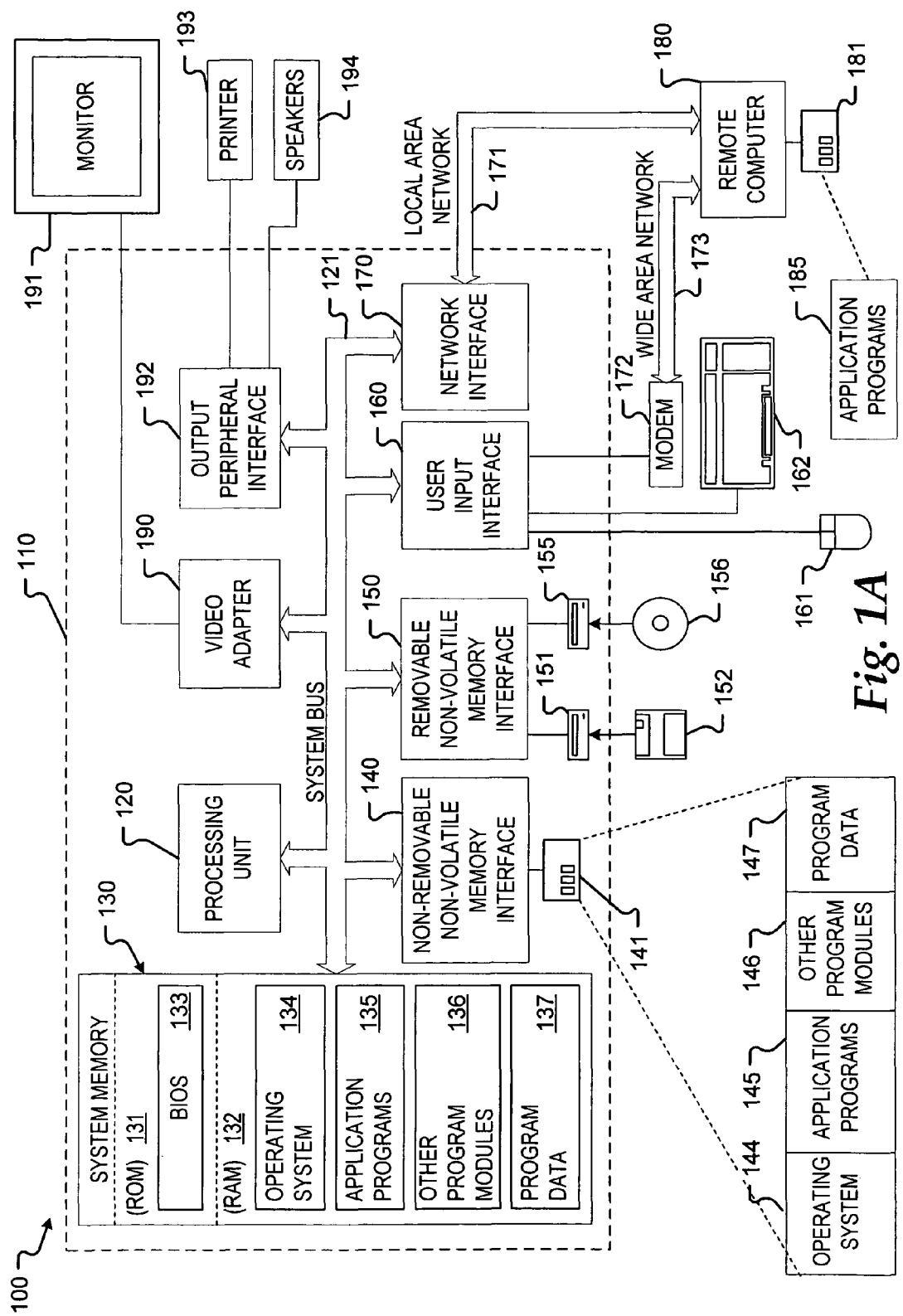
FIG. 1A is a functional diagram illustrating a computing environment and a basic computing device that can construct applications with and execute applications under the application framework according to the present invention.

The present invention will now be described more fully with reference to the accompanying drawings in which embodiments of the invention are shown. The invention may, however, be embodied in many different forms and should not be construed as limited to the embodiments set forth herein. Rather, these embodiments are provided in an effort to make the disclosure thorough and complete and such that it will fully convey the scope of the invention to those skilled in the art.

As briefly described above, embodiments of the present invention provide a software application framework for generating a runtime structure for a given software application and for managing execution of a software application. The runtime structure of a given software application is composed of one or more domains of application components required for performing one or more respective functionalities of the software application. The component domains are generated by an application description engine in response to an application description received from the application for each domain. During execution of the application, each component domain serves as a unit of application execution management where each domain is utilized to execute a respective functionality of the application. As data changes are received by the application associated with a given component domain, the component domain is reconfigured by the application description engine as required to respond to the associated data. Data changes or events received by the application may be generated by user action, for example, in response to a user selection of a functionality button or control or data object in a user interface. Data events also may be generated by external changes, for example, data received by the application as a result of the running of an external process or from another application or third party source. Thus, the application is a collection or graph of connected components that are organized and dynamically reconfigured based on data received by and/or processed by the application.

An example of a suitable computing system environment 100 on which the invention may be implemented is illustrated in FIG. 1. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary computer system 100 for implementing the invention includes a general purpose-computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnect (PCI) bus, also known as the Mezzanine bus.

Computer 110 typically includes a variety of computer readable media. Computer readable media can be any available media that can be accessed by the computer 110 and includes both volatile and nonvolatile media and removable and non-removable media. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer readable media.

The system memory 130 includes computer storage media in the form of volatile and/or nonvolatile memory, such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules, such as those modules constructed or executed under the XML application framework, that are immediately accessible to and/or presently being operated on by processing unit 120. By way of example, and not limitation, FIG. 1A illustrates operating system 134, application programs 135, 204, 304 (illustrated in FIGS. 2B, 3), other program modules 136, and program data 137; the XML application framework can operate to construct and execute applications for all software stored or executed from RAM 132.

The computer 110 may also include other removable/non-removable, volatile/nonvolatile computer storage media. By way of example only, FIG. 1A illustrates a computer 110 with a non-removable, non-volatile memory interface 140 that reads from or writes to non-removable, nonvolatile magnetic media 141, such as a hard drive. Computer 110 may also include a non-volatile memory interface 150 that reads from or writes to a device 151, such as a disk drive, that reads from or writes to a removable, non-volatile media 152, such as a magnetic disk. In addition, the computer 110 may include an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface, such as interface 140, and magnetic disk drive 151 and optical disk drive 155 are typically connected to the system bus 121 by a removable memory interface, such as interface 150.

The drives and their associated computer storage media discussed above and illustrated in FIG. 1A, provide storage of computer readable instructions, data structures, program modules, and other data for the computer 110. For example, hard disk drive 141 is illustrated as storing operating system 144, application programs 145, other program modules 146, and program data 147, which can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through a user input interface 160 connected to user input devices, such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interfaces and bus structures, such as a parallel port, game port, or a universal serial bus (USB).

A monitor 191 or other type of display device is also connected to the system bus 121 via an interface, such as a video interface 190. In addition to the monitor 191, the computer 110 may also include other peripheral output devices such as speakers 194 and printer 193, which may be connected through an output peripheral interface 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks, such as wireless networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device 181. By way of example, and not limitation, the remote application programs 185 reside on memory device 181. It will be appreciated that the network connections shown are exemplary and other means of establishing a communications link between the computers may be used.

Figure 1B:
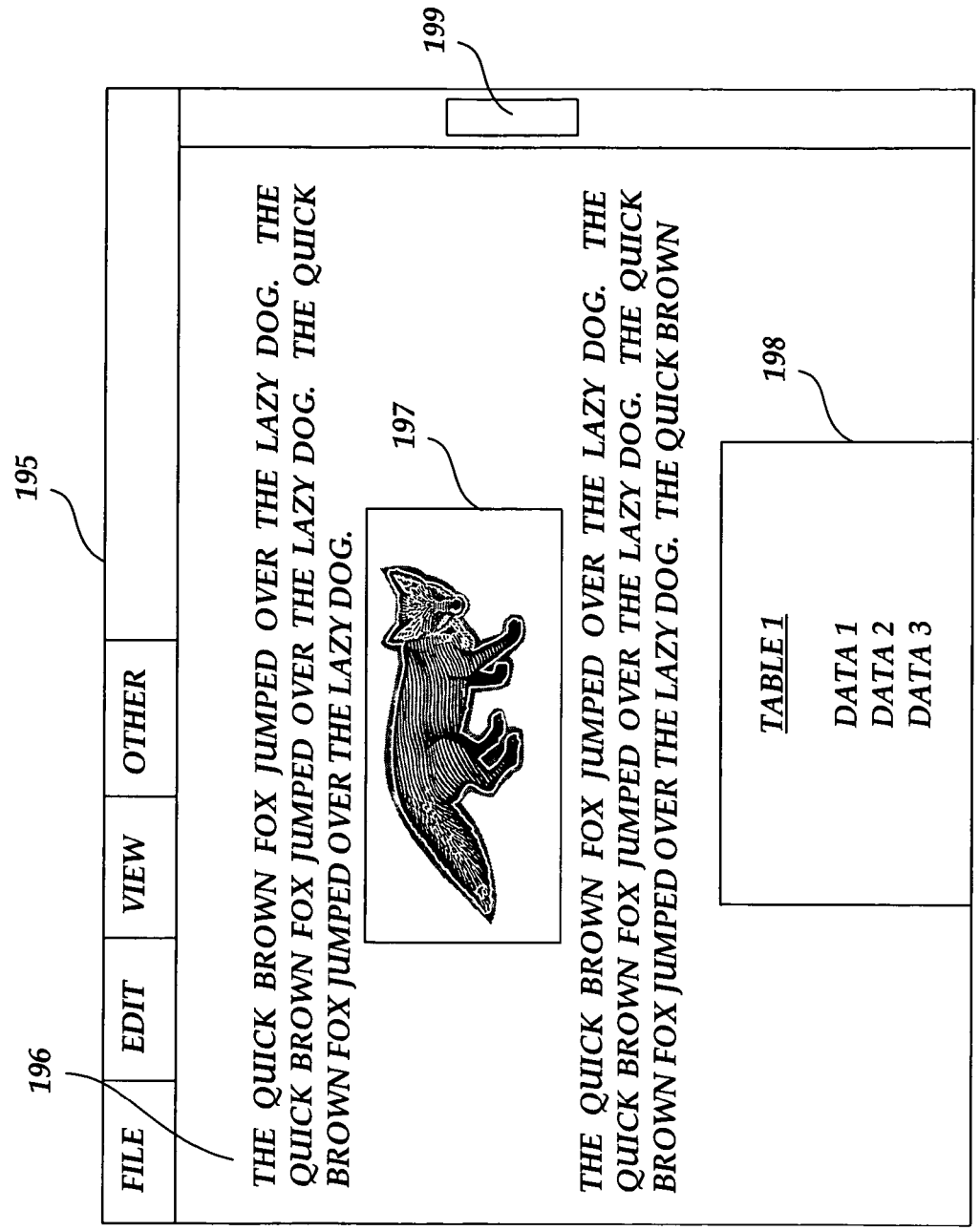
FIG. 1B illustrates a computer screen display showing an example word processing document being displayed by an example word processing application showing one or more displayed data objects.

For purposes of understanding and illustration, it is advantageous to describe embodiments of the present invention in terms of an example application user interface in which is displayed example data objects. FIG. 1B illustrates a computer screen display showing an example word processing document being displayed by an example word processing application showing one or more displayed data objects. The example user interface 195 is illustrative of a typical software application user interface with which a user may enter, edit or otherwise manipulate one or more data objects according to the functionality of the associated software application. For example, the user interface 195 illustrates an example word processing application having one or more functionality controls at the top including a "File" control, an "Edit" control, a "View" control and an "Other" control. As should be appreciated, the functionality controls illustrated in FIG. 1B are for purposes of example only and are not limiting of the vast number of user interface types, layouts and associated functionalities available in software applications applicable to the present invention.

The user interface 195 includes a scrollbar 199 for scrolling data contained in the user interface work area up or down as desired by a user. An example word processing document is illustrated in the work area of the user interface 195. The example document, for example, a letter, memorandum, report, and the like, includes a text object 196, an embedded picture object 197, and an embedded table object 198. Referring still to FIG. 1B, the document displayed in the user interface 195 has been scrolled by the user such that the text object 196 is at the top of the page, the embedded picture object 197 is displayed between two text objects, and the table object 198 is partially in view at the bottom of the page. That is, the table object 198 is coming into view, but is not completely displayed in the work area of the user interface 195.

As will be described in detail below, according to embodiments of the present invention, the software application responsible for displaying the example user interface 195 and the example data objects 196, 197, 198 is a collection or graph of related components that are grouped together in logical groupings or domains for providing the functionalities required by the application. At any given instance, the application includes a runtime structure comprised of those logical groupings of related components, referred to herein as domains, which are required for providing the functionality of the application at that instance. As the application is executed, the component domains are dynamically reconfigured based on changes in data received by the application, and associated functionality required by the application for dealing with the changes in data. For example, referring still to FIG. 1B, an illustrative runtime structure for the document presently displayed in the user interface 195 would include a text domain comprising application components required for displaying and processing the text object 196. A picture domain comprising application components required for displaying and processing the picture object 197 would be included, a second text domain comprising application components required for displaying and processing the second text object displayed beneath the picture object 197 would be included, and a table domain comprising application components required for displaying the incoming table object 198 would be included. Other component domains associated with the present runtime structure would include application components for other functionality, including the position and movement of the scrollbar 199, the positions and display properties of the functionality controls in the user interface, and any other aspect of the application required for providing presently needed functionality.

As described in detail below, during execution of the application where data events are received by the application, the runtime structure of component domains are dynamically revalidated and/or reconfigured as required in response to data-driven events. For example, if a user selects the picture object 197 for deletion or other modification, the application will pass the change in data to an application description engine, which will dynamically reconfigure the component domain responsible for displaying the picture object 197 so that the component domain will include the appropriate application components for displaying the picture object 197 based on the data event received, for example, deletion or other modification of the picture object 197. In the case of a new function required by the application, for example, the entry of a new data object, such as the table object 198, into view in the user interface 195, the application will call on the application description engine to generate a new component domain comprised of one or more application components required for displaying the incoming data object.

Figure 2A:
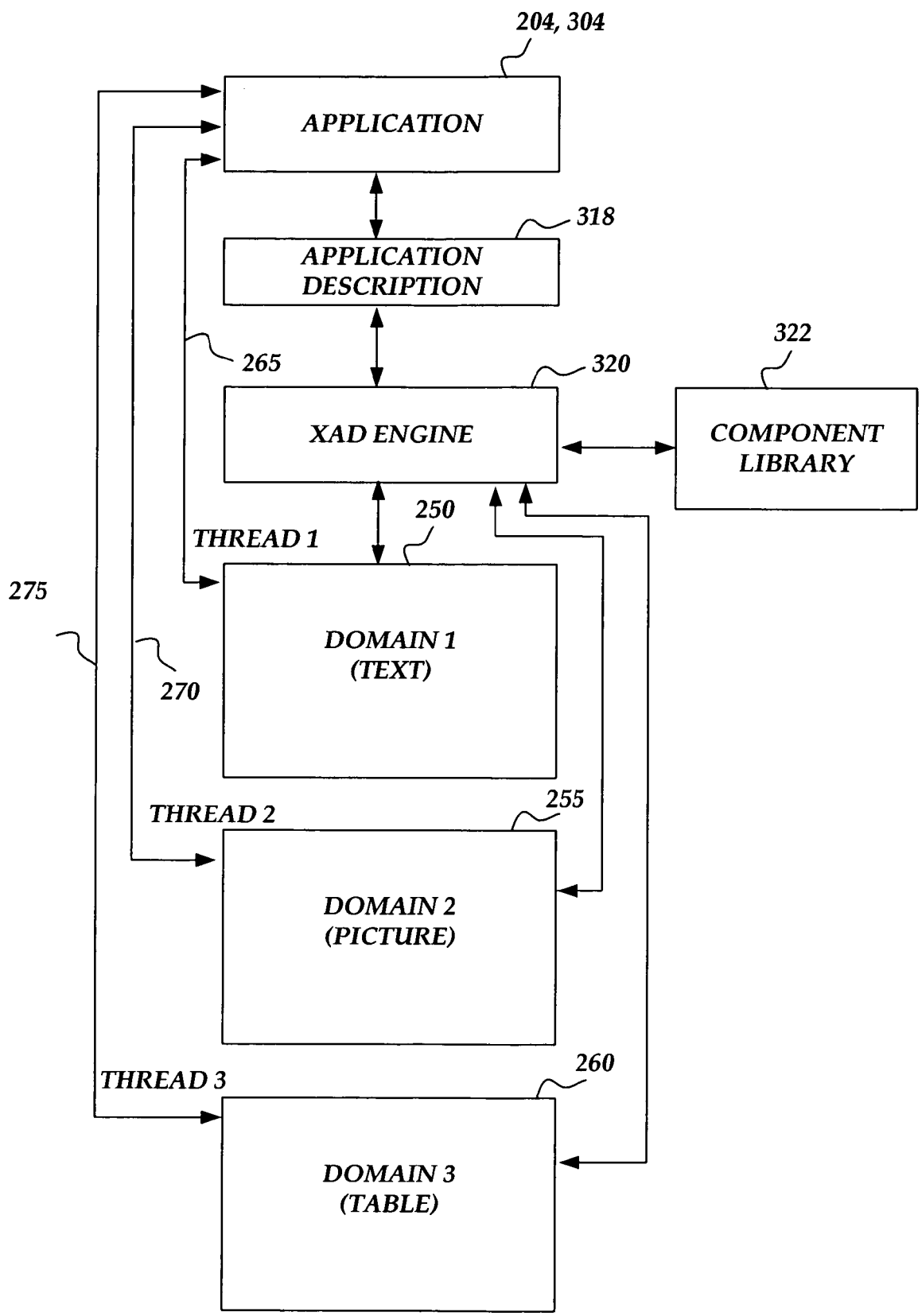
FIG. 2A is a functional diagram illustrating interaction between an application, an application description engine and one or more component domains according to embodiments of the present invention.

FIG. 2A is a functional diagram illustrating interaction between an application, an application description engine and one or more component domains. According to embodiments of the invention, an application framework is provided for configuring an application as a graph of connected components for performing one or more functions of the application. Referring to FIG. 2A, the application 204, 304 is illustrative of any software application, for example, a word processing application, spreadsheet application, slide presentation application, database application, desktop publishing application, electronic mail and calendaring application, and the like, for providing one or more useful functionalities according to the programming of the respective applications. Indeed, embodiments of the present invention are not restricted to any particular software application as will be appreciated from the following description.

According to embodiments of the present invention, the application 204, 304 is comprised of a number of application components, each of which have been created by a software developer for providing a given functionality independently of other components or in association with other components. For example, a given application component may be included in the application 204, 304 for providing a print function of the associated application. Another application component may be included in the application for providing a particular formatting function of the associated application. Typically, a given function of an application 204, 304, for example, formatting, printing, editing, data display, and the like, is enabled by a collection of application components which when operating together enable and provide the desired functionality. For example, the functionality of a given software application for displaying a text object 196 or picture object 197, illustrated above in FIG. 1B, may include a number of application components which must be executed according to a particular sequence for providing the required functionality. As set out above, the application 204, 304 is at any time, either at a given instance of runtime structure or during a given execution, a collection or graph of connected application components. A detailed description of different application components and interactions between different application components is described below with reference to FIGS. 2B, 3, 4, 5.

As briefly described above, at any given time, the application 204, 304 comprises a runtime structure, which is an instantiation of connected application components required by the application at that time. As described below, during execution of the application, the instantiation of application components is dynamically reconfigured as the needs of the application change based on data received by the application. In order to generate a given runtime structure of application components, the application 204, 304 passes an application description for each required functionality from an application description 318 to an application description engine 320. A detailed description of the application description 318 an the operation of the application description engine are provided below. For example, referring back to FIG. 1B, an instantiation of the runtime structure for the user interface 195 and the associated data will require application components for displaying the user interface 195 and its associated functionality controls, the text object 196, the picture object 197, the incoming table object 198, and for displaying the current position of the scrollbar 199.

The application 204, 304 passes an application description for the functions currently required by the application to the application configuration or description engine 320 for generating and configuring groupings of application components required for providing each of those functions. According to one embodiment of the present invention, the application description passed from the application to the application description engine includes declarative rules structured and formatted according to the Extensible Markup Language (XML), as described below with reference to FIGS. 2B and 3. The application description engine 320 is a software module containing sufficient computer executable instructions for interpreting the application descriptions for each required function received from the application 204, 304 and for building and configuring groupings of application components, referred to herein as component domains or concurrency domains, for providing the required functionality to the application 204, 304. According to one embodiment, the application description engine 320 operates according to the Extensible Markup Language, as described below with reference to FIGS. 2B, 3, 4, 5. Functionality and operation of the application description engine is described in detail below with reference to FIG. 3 and below under the heading "Application Description Language."

Once the application description engine 320 receives application descriptions from the application 204, 304 associated with functions required by the application, the application description engine interprets the application descriptions in terms of application components that are required to fulfill each described function, for example, displaying a picture object 197, as illustrated in FIG. 1B. Once the application description engine determines the required components and the relationship between required components, the application description engine 320 obtains the required application components, including required component interfaces, from a component library 322. According to embodiments of the present invention, the component library 322 may be a collection or library of application components associated with a particular application, for example, a word processing application, or the component library may be a collection of components from which the application description engine 320 may obtain components for providing functionality to a number of different types of applications, for example, word processing applications, spreadsheet applications, slide presentation applications, database applications, and the like.

Once the application description engine obtains the required application components (for example, individual modules of software programming), the application description engine creates component domains for each of the functionalities presently required by the application 204, 304. As illustrated in FIG. 2A, in response to the current data display needs of the application 204, 304 for the data illustrated in FIG. 1B, the application description engine 320 creates a first component domain 250 for the text object 196, a second component domain 255 for the picture object 197, and a third component domain 260 for the table object 198. That is, each of these component domains is created by the application description engine 320 such that each domain includes those application components required for providing the presently needed functionality of the application. For example, the picture domain 255 is generated by the application description engine 320 to include those application components required by the application 204, 304 for displaying the picture object 197 with its current display characteristics and properties. As should be appreciated, the domains illustrated in FIG. 2A are illustrative of domains that may be generated for the data objects illustrated in FIG. 1B, but for any other instance of runtime structure for the application 204, 304 where different data objects are displayed and where different user interface functionalities are displayed or positioned or otherwise configured, a different set of domains 250, 255, 260 will be generated by the application description engine 320 as required.

According to embodiments, an execution management model is provided where each component domain serves as a unit of execution management for the application 204, 304. As data events are received by the application 204, 304, as described in detail below with reference to FIGS. 2B, 3, 4, 5, the application 204, 304 passes application descriptions 318 to the application description engine 320 for dynamically reconfiguring one or more presently configured domains 250, 255, 260, or for creating new domains as required. For example, referring back to FIG. 1B, as the document is scrolled upward, new data is displayed at the bottom of the page. As new data is displayed, the application 204, 304 requires a component domain from the application description engine 320 for displaying the new data object. For example, before the table object 198 is scrolled into view, the application 204, 304 does not need the table object domain 260, illustrated in FIG. 2A, because the function of displaying the table object 198 is not presently needed by the application 204, 304. However, once the operating system 134 operating the application 204, 304 detects that the table object is being scrolled into view, the application 204, 304 is notified by the operating system that it must now display the table object 198 and its associated data. In response, the application 204, 304 passes an application description 318 for the incoming table object 198 to the application description engine 320 as described above. The application description engine 320 interprets the application description, obtains the required application components, and dynamically creates a table object domain 260 in which is included those application components required for displaying the incoming table object 198.

Similarly, if the document illustrated in FIG. 1B is scrolled upward so that the table object 198 scrolls off the bottom of the page, the application 204, 304 will be notified by the operating system that a display of the table object 198 is no longer required. The application description engine in response to an application description 318 received from the application 204, 304 will discard the table object domain 260 that was created for displaying the table object 198 by the application 204, 304 because the component domain previously required for displaying the table object is no longer required. Thus, the application description engine may dynamically create or destroy a given component domain based on the requirements of the application 204, 304 during execution.

During execution of the application 204, 304, execution management is accomplished by managing the operation and component structure of each component domain. Referring still to FIG. 2A, during execution of the application 204, 304, as data events are received by the application 204, 304 that invoke the functionality of a given domain 250, 255, 260, the application 204 processes the data events via the respective domains. For example, if a user selects a data item in the table object 198 followed by selecting a delete control of the application 204, 304 for deleting the selected data item, a data event associated with the selected data item and the selected delete control is received by the application 204, 304. As appreciated by those skilled in the art, the selection of the data item and the selection of the delete control are detected by the operating system responsible for operating the application 204, 304 and an appropriate notification is made to the application 204, 304 of the data event.

In response to the data event, the application 204, 304 dispatches a single processing thread 275 to the appropriate domain 260 responsible for processing data events associated with the table object 198. At the subject domain, also referred to herein as a concurrency domain, the single processing thread 275 enters the domain of components and processes the data event in a series of phases. For a detailed description of the dispatch of the single processing thread to the subject domain for processing a data-driven event via the components of the domain, see the description set out below under the heading "Multithreading with Concurrency Domains."

Following from the present example, once the delete control is selected for deleting the selected data item from the table object 198, the single processing thread is dispatched to the domain 260 in response to the action data of deleting the table item. Once the processing thread enters the domain, a first processing phase, a read data/request data phase is initiated. For example, during the first phase, the data event is read by the component domain 260 to determine the data item or data value in the table object 198 that is to be affected by the data-driven event. Next, as part of the first operating phase, changes to the data are requested, for example, a request that the selected data item be deleted from the table object 198. In response, a data connector component in the table object domain sets up a request that the selected data item be deleted from the table object 198. A detailed description of components of the application 204, 205 including data connector components is provided below with respect to FIGS. 2B, 3, 4, 5. Once the read data/request data phase is complete, the processing thread will notify a dispatcher object (described in detail below) that the next processing phase may begin.

The next processing phase includes a revalidate/reconfigure phase in which changes to the component domain responsive to the data event are made by the application description engine. During the revalidate/reconfigure phase, all data connector components associated with data that will be affected, for example, a data connector component associated with the data item to be deleted from the table object 198, are notified to mark those data items for revalidation/reconfiguration. According to one embodiment, the marking of affected data occurs during a sub-phase of the read data/request data phase.

Once all affected data items are marked, the revalidate/reconfigure phase proceeds, and each marked data item is processed, as required. For example, the data item to be deleted from the table object 198 is deleted, and any associated domain components are deleted or added, as required. For example, if as a result of the deletion of the selected data item one or more application components comprising the affected domain 260 need to be removed, the application description engine will reconfigure the domain to remove those components in response to an application description 318 passed to the application description engine during the revalidate phase in response to the data event. On the other hand, if new application components are required for the affected domain, the application description engine will likewise obtain new application components for integration into and reconfiguration of the affected domain. Thus, the affected component domain is dynamically reconfigured during the execution of the application based on a data event associated with the domain. A detailed description of the execution phase model described herein for processing data events in the component domains 250, 255, 260 is provided below under the heading "Application Framework Phasing Model."

As described above, each component domain is configured by the application description engine 320 based on the present need for the component domain by the application 204, 304. And, as described above, as the needs of the application 204, 304 change in response to a data event, for example, the deletion of a data object, the addition of a data object, or the modification of a data object, new component domains are created or existing component domains are reconfigured as required. Each new component in a given component domain has a lifetime equal to other components in the component domain because a given component domain lifetime begins at its instantiation by the application description engine or its reconfiguration by the application description engine and ends when the component domain is discarded or is subsequently reconfigured by the application description engine. Thus, a given component domain is a unit of application functionality and management that lives during the time of a particular configuration of the component domain and terminates or dies upon a subsequent reconfiguration of the component domain where a subsequently reconfigured version of the component domain is considered a new component domain for purposes of application execution management.

Having described above an application framework for configuring a software application as a collection or graph of connected components and for managing the structure and execution of an application via one or more component domains, a detailed description of the components comprising a given application and of communications between the components is provided below with reference to FIGS. 2B, 3, 4, 5. In addition, the following discussion of FIGS. 2B, 3, 4, and 5, provides a description of an exemplary embodiment of the application framework described above in which the application framework is based on the Extensible Markup Language (XML). The XML application framework (XAF) provides methods and systems for executing and creating a software application, as described above. XAF is built upon a standard language that represents data changes, data events, UI events, or all other occurrences within the software systems in a standard format.

In an exemplary embodiment, XAF employs XML (Extensible Markup Language) to represent data, as XML data, and applications, as XML applications. Hereinafter, XML will be used in the description to represent the standard language. However, one skilled in the art will recognize that the present invention is not limited to the use of XML.

The XAF software system is data focused, data driven, and offers powerful data transformation capabilities including, but not limited to, interacting with heterogeneous data from mutually unaware sources. All parts of XAF can be described as events directed at or involving data, including the behavior of the application and the application's user interface. XAF abandons the paradigm that the application is the data creator and data is the creation. Rather, XAF builds the application based upon the data. In embodiments of the present invention, the XAF application components are actually instantiated and interconnected based on how the data is displayed, on what the data is, and how the data is stored. Thus, XAF can create and stitch together the "right" components, at runtime, to process the specific data in the correct fashion.

In building the applications, XAF allows an application "author" to provide rules one how components are created and connected together based on the data type and the user interface (UI). These rules and the components may be written in XML. XML allows for rich and composable UIs that are sensitive to the current context and allows software developers to build applications in a compositional approach. The software author can build features or applications end-to-end in a declarative model that reduces the need for hard-coded application logic. For example, the software author simply declares that a certain UI connector goes with a certain UI and a certain action. XAF then connects the UI connector together with the UI and the action.

Additionally, the XML application framework provides a rich library of pre-built components, application features, and example applications. While some imperative code is still required, XAF places the components in a library. The library allows other software authors to use or employ those components in the declarative model. Thus, a software developer may create their own components by generating new imperative code for the component, but the software author can also employ pre-built components to compose new or modified applications without generating any new imperative code.

Figure 2B:
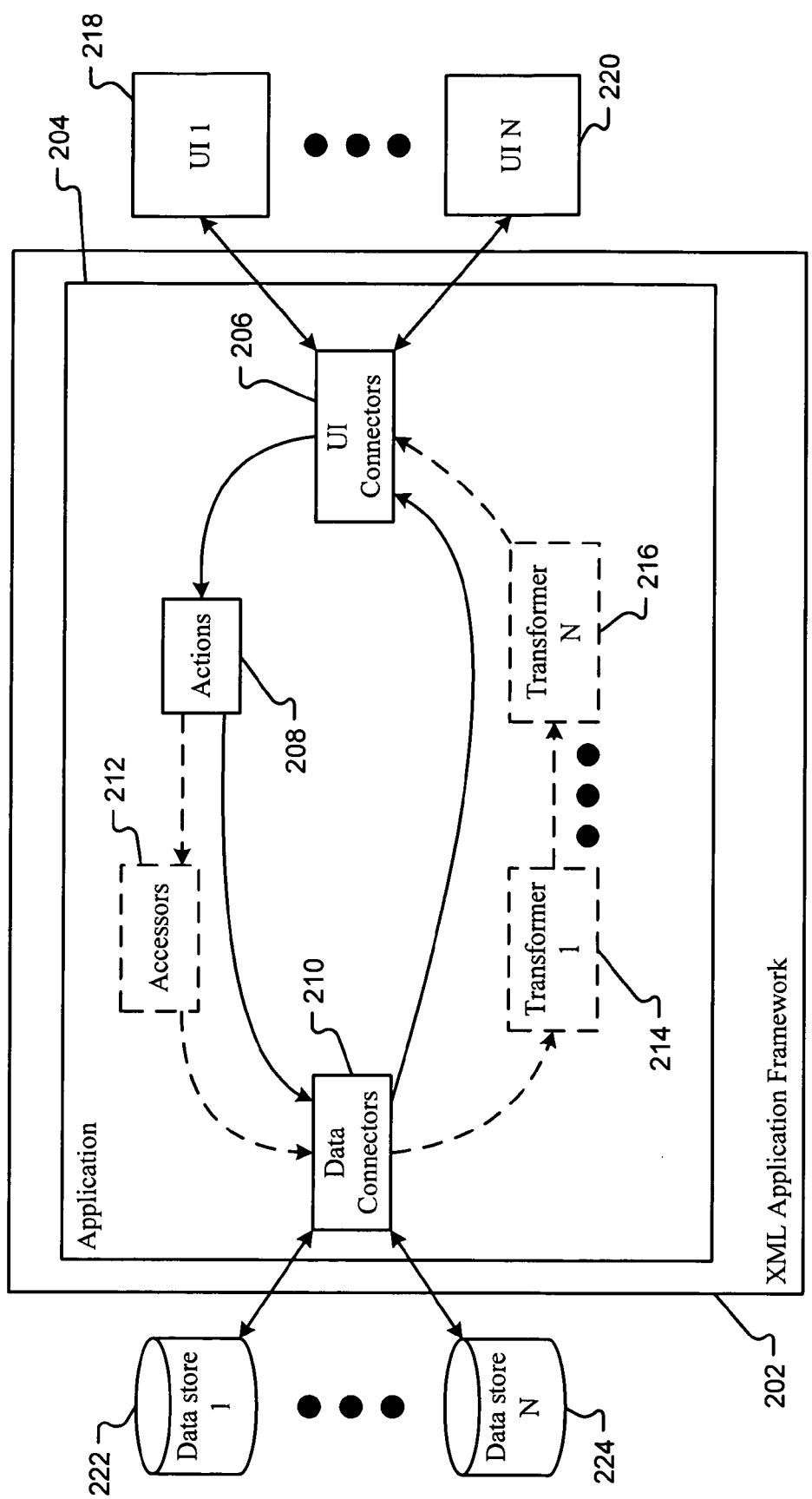
FIG. 2B is a functional diagram illustrating an exemplary embodiment of an application framework application with application components connected to one or more UIs and one or more data stores according to the present invention.

An exemplary XML application framework 202 is shown in FIG. 2B. The XAF 202 operates to construct and manage the execution of applications, such as application 204. An application 204 executed within the XAF 202 comprises one or more UI connectors 206, one or more actions 208, and one or more data connectors 210. In some embodiments, the application 204 also comprises one or more accessors 212 or one or more transformers 214 and/or 216. The components within the application 204 operate to transform UI events into data changes and data changes into UI events. As such, the UI connectors 206 are coupled to one or more UIs 218 and/or 220. In addition, the data connectors 210 are coupled to one or more data stores 222 and/or 224. Within XAF 202, the data events or data representations in the application 204 are in a standard format. For example, the data events and data representations are in XML.

UI connectors 206 provide the connection between the application 204 and the one or more UIs 218 and/or 220. In one embodiment, the UIs 218 and/or 220 are graphical user interfaces that display information to the user. The UI connectors 206 present and support the ability for the application user to edit data within the XAF 202. A UI connector 206 maps data between the XAF data layer (represented by the data connectors 210 and the data stores 222 and/or 224) and the specific UI 218 and/or 220. In addition, the UI connectors 206 map UI events from the UIs 218 and/or 220 into data editing operations within the data stores 222 and/or 224.

The UI connector 206 is specific to the type of UI element in the UI 218 and/or 220. Thus, for every UI representation of an item of data within a UI 218 and/or 220, there is a corresponding UI connector 206. In one example, a data element, such as a cell value within a spreadsheet, displayed in the UI 218 and/or 220 will have a specific UI connector 206, coupled to the data element, which translates a user modification to the data element into a UI event to connect to an action 208 on the XAF data. Thus, the UI connectors 206 translate specific UI events into XAF actions 208 that are generically represented within the XAF application 204. In one embodiment, all data changes within the application 204 are represented as XML data changes. In another example, a user may operate a user interface control, such as a scroll bar. The change in the scroll bar creates a change in the state of the UI 218 and/or 220. The UI state change may also be represented as a change in data. Thus, a UI connector 206 can receive the UI event, e.g. the scroll bar operation, translate the UI event into an XML data change event for the XAF data layer.

The UI connector 206 connects the UI event to an action 208. An action 208 is a declarative statement for a data change in the XAF data layer. For example, a user operation of the scroll bar can create a "click on the scroll bar" event. The UI connector 206 connects this UI event to an action 208, such as "increment scroll bar down one position." In one embodiment, the data change action is represented in XML. For example, a data change may appear as the XML statement:

```
<Dropdown data = $taskpanelist>
        <copy Deltaaction   perform = "on selected
change"
            data = "selected value"
            target = "current taskPane" />
```

Data connectors 210 marshal data to and from external data stores 222 and/or 224. Similar to the UI connectors 206, data connectors 210 translate between the internal XAF data representations and external data types in the different data stores 222 and/or 224. Thus, there are data-specific data connectors 210 for each type of external data. The data connectors 210 receive the actions 208 and translate the standard format XAF data action 208 into a data-specific action to affect the data within the data stores 222 and/or 224. In one embodiment, the data connector 210 translates the XML data action into a data-specific action. For example, the scroll bar operation represented by a standard format XML statement is translated into an interface state-specific data change and sent to the data store 222 or 224 storing the specific interface state data.

In addition, the data connectors 210 translate changes in the data stores 222 and/or 224 into standard format XAF data representations that are sent to the UI connectors 206. The UI connectors 206 translate the standard format XAF data representations into UI events that are sent to the UIs 218 and/or 220. Thus, for any change within a UI 218 and/or 220, the UI connector 206 connects the user interface event into an action 208. The action 208 is sent to a data connector 210 that translates the action 208 into a data-specific change in a data store 222 and/or 224. Once the data is changed, the data connector 210 translates the changed data in the data store 222 and/or 224 into a standard format XAF data representation. The data connector 210 sends the XAF data representation back to the UI connector 206, which translates the XAF data representation into a UI-specific display event. The UI connector 206 sends the UI-specific display event to the UI 218 and/or 220 for display, where the UI 218 and/or 220 displays the changed data created from the UI event.

The application 204 can continue to process these cyclical changes between data and UI events for all actions occurring within the application 204. In some embodiments, changes in data at the data store 222 and/or 224 also force changes in the UIs 218 and/or 220 without a user event occurring, such as a data changed forced from another operation outside of the user's control.

Some optional components within the application 204 include accessors 212 and transformers 214 and/or 216. Accessors 212 mediate between actions 208 and data connectors 210. To access data of a certain type in a certain data store 222 and/or 224, the action 208 can specify an accessor 212 or "access model" to use for the data. The accessor 212 allows the application 204 to access specific types of data that are not homogenous, such as JPEG, MPEG, etc. Thus, regardless of the type of data within the data store 222 and/or 224, the application 204 interfaces and changes that data. The accessors 212 ensure that the data connectors 210 manage any type of data including data types that are not yet devised or developed. The accessor 212 transforms the standard format action into a standard format, data-customized action.

In other embodiments, one or more transformers 214 and/or 216 mediate between data connectors 210 and UI connectors 206. A transformer 214 and/or 216 changes the data output from the data connector 210 into a UI-customized format required by the UI connector 206 for display. For example, if the UI connector 206 requires data in a list, the transformer 214 and/or 216 may modify tabular data through one or more simple changes, each simple change performed by a single transformer 214 and/or 216, into a list of data. Thus, any form of data output by the data connector 210 can be transformed through one or more canonical transformers 214 and/or 216 into a form acceptable and usable by the UI connector 206. For a detailed discussion of the operation of transaction transforms, such as the transformers 214, 216, see the description below under the heading "Transaction Transforms."

Other types of transforms may be utilized in accordance with embodiments of the present invention. For example functional transforms may be described using a functional language such as XQuery. A proxy transform takes a list of locations and proxies the data found at those locations in the form of a sequence of aliased data. A solver transform embodies dedicated solver technology and supports caching for efficiency. For example, one solver transform solves algebraic equation systems numerically, and another solves those systems symbolically. A caching and indexing transform is a pass-through transform at data level (i.e., the output data is equal to the input data), and the caching and index transform adds caching and indexing in specified dimensions to accelerate downstream indexed access.

According to embodiments of the present invention, the application framework employs common interfaces between components of an application, described herein. Because the framework relies on data communication between the various components described herein, a uniform data structure, for example, XML, and common interfaces between the components allow for efficient data exchange for application configuration and management.

Figure 3:
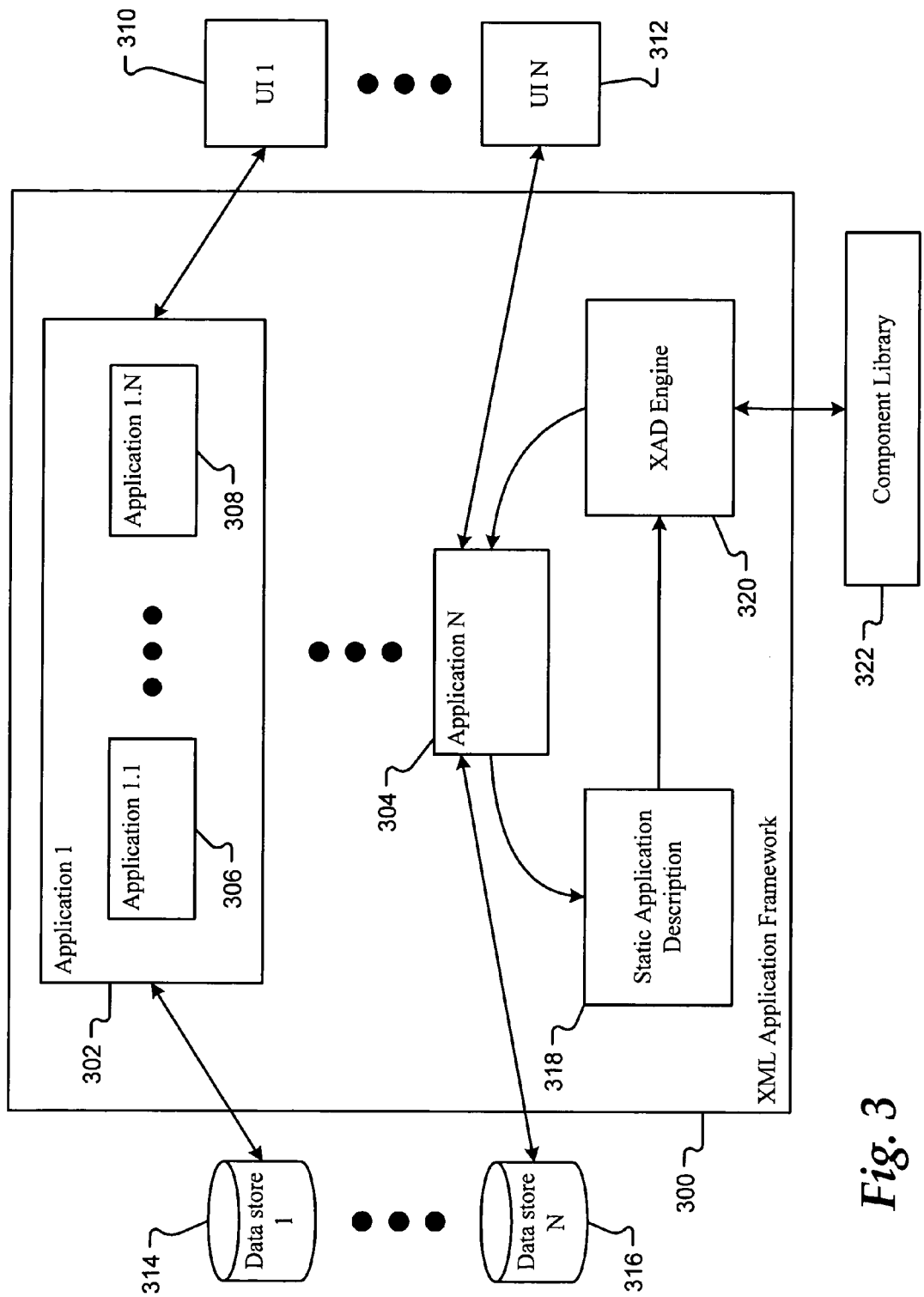
FIG. 3 is a functional diagram illustrating another exemplary embodiment of an XML application framework having a plurality of applications connected between UIs and data stores and configured or reconfigured by an exemplary Application Description and an exemplary XAD engine according to the present invention.

Referring now to FIG. 3, in embodiments of the present invention, the XAF 300 comprises two or more applications 302 and/or 304, as shown in FIG. 3. A larger application 302 can comprise one or more applications 306 and/or 308 that function as sub-modules or sub-components. All applications 302 and/or 304, whether a larger application or sub-component, have a UI connector, such as UI connector 206, an action, such as action 208, and a data connector, such as data connector 210. Thus, an application 306 and/or 308 is a software module that operates between certain data elements 314 and/or 316 and certain UI elements 310 and/or 312. The applications 302 and/or 304 can be multi-threaded in that they can operate in conjunction with several other applications 302 and/or 304. In addition, the applications 302 and/or 304 or the applications components 306 and/or 308 may be constrained to certain phases or domains, as explained in detail below.

In embodiments of the present invention, the XAF 300 includes an XML application description (XAD) 318 and a XML application description (XAD) engine 320. The XAD 318 includes the declarative rules and descriptions of all applications included within XAF 300, such as application 304. A software author authors the XAD 318 for the application desired by the software author. The XAD 318 comprises schemas and tags for pulling or instantiating certain software components and binding those components together. In embodiments of the invention, the schemas and tags pertain to how the components interact. A component may be a UI connector, an action, an accessor, a data connector, a transformer, or other software component. In some embodiments, the components are written in imperative code and provide the point-wise functionality to the application. Thus, the component may be the underlying software that provides the operability to the XAF components, such as the UI connector, action, data connector, etc.

While the application description 318 can be represented using other formats, in one embodiment, the XAD 318 is represented in XML. The tags are XML tags. The schemas and tags provide a syntactic and semantic framework for declaring rules. XAD allows the application author to declare application wide resources and commands. Commands are the bits of code that are executed based on events, such as mouse clicks, keyboard selections, voice commands, etc. In embodiments, the user creates the events in a user interface, but, in other embodiments, another action by some process may create the event. The commands may be in the form of named actions, for example, a change selection action, an edit view action, a retrieve data action and an edit entry action, as described below with respect to FIG. 17. As should be appreciated these named actions are for purposes of illustration and are not limiting of the commands and/or named actions applicable to embodiments of the present invention.

The XAD 318 is parsed by the XAD engine 320. Initially, the XAD engine 320 parses the XAD 318 when the application is launched. Thereafter, the XAD engine 320 parses the XAD 318 when needed. For example, according to one embodiment, the XAD 318 is parsed in runtime by the XAD engine 320 to reconfigure an application, such as when instantiating and connecting a plug-in component. According to another embodiment, a compilation model is provided where the XAD is parsed at compile time and is converted to a sequence of tokens, which are interpreted by the XAD engine at runtime. When not compiling, the textual parsing is done when the XAD is loaded into memory, and it is stored as a data structure.

The XAD engine 320 processes the rules, identifies the resources, instantiates the components, and connects the components, composite, and commands. The components and resources may be imperative code, such as executable code written in C#. The imperative code characterizes the actual software components and software classes that underlie the UI connectors, actions, data connectors, and other XAF components. The components are pulled from a component library, such as component library 322. The component library 322 holds all components used in any application with XAF 300.

The entire collection of components within the library 322 is available to any application. Thus, XAF 300 allows for prolific sharing of application components and the code that creates those components. In addition, XAF is very extensible because new components can be created by software developers and stored into the component library 322. The XAD engine 320 can then be call, instantiate, and connect the new components by reading new rules a software author authors in the XAD 318. The new rules and new components may then form new XAF components, new data types, new data stores, new UIs, or even new applications. The XAD and the XAD engine are described in further detail below.

Figure 4:
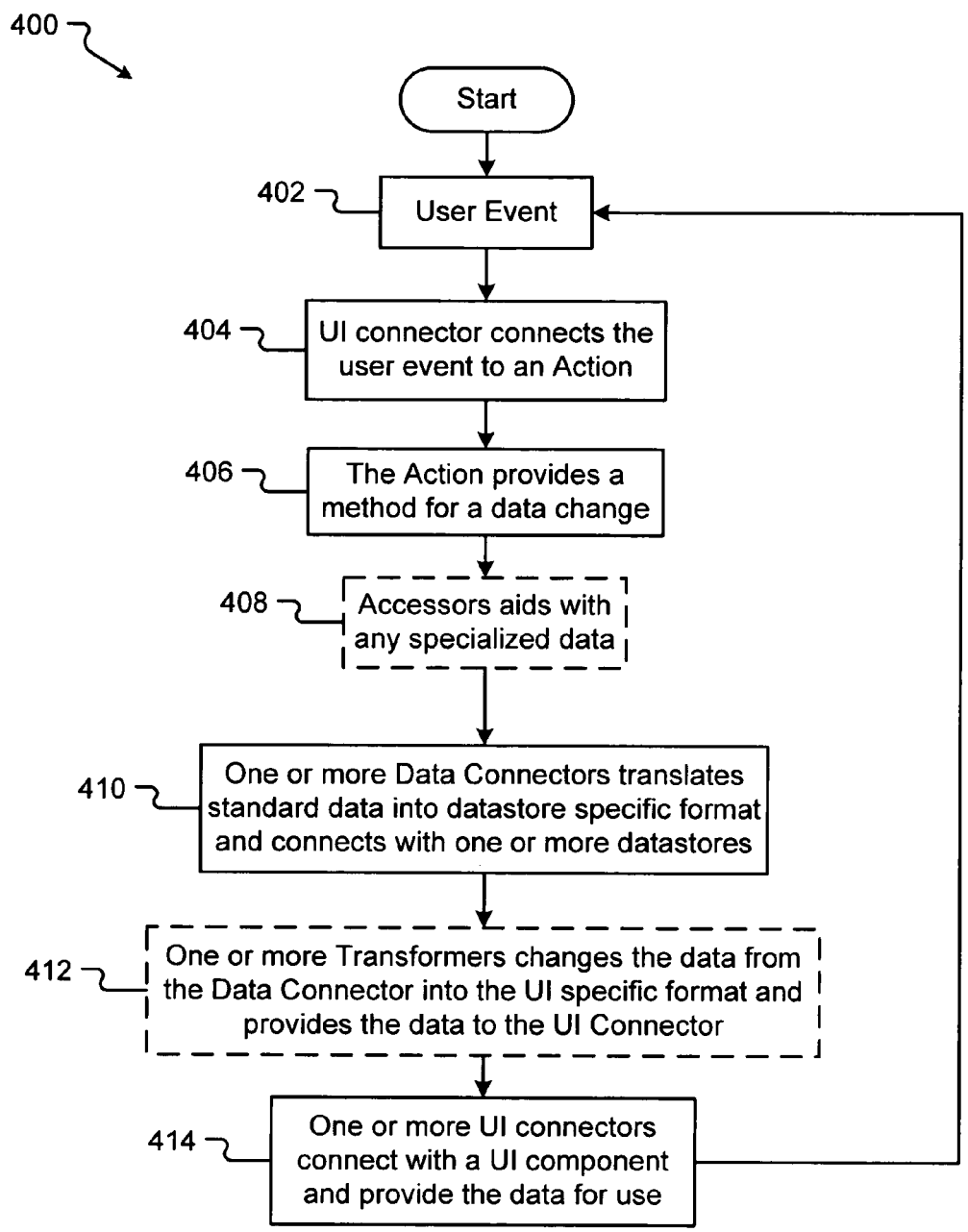
FIG. 4 is a flow diagram illustrating an embodiment of a method for executing an event within a XAF application according to the present invention.

An embodiment of a method 400 for executing a user event is shown in FIG. 4. In this embodiment, user event operation 402 occurs first. However, one skilled in the art will recognize that the method 400 can be used to execute a data change not corresponding to a user event. As described, data changes or events received by the application may be generated by user action, for example, in response to a user selection of a functionality button or control or data object in a user interface. Data events also may be generated by external changes, for example, data received by the application as a result of the running of an external process or from another application or third party source. In addition, as explained above in conjunction with FIG. 2B, a user event can be any change or interaction the user performs within a UI, such as UI 218. Connect operation 404 receives the user event at a UI connector, such as UI connector 206, and connects the user event to a corresponding action, such as action 208.

Provide operation 406 provides a standard format action for a data change represented in the action. In one embodiment, an XML statement represents the action for the data change. In one embodiment, optional aid operation 408 connects the action to an accessor, such as accessor 212, to help configure the action for the specific data being changed. The accessor sends the data-specific action to a data connector, such as data connector 210. Translate operation 410 receives the data-specific action and translates this standard format action, which may be an XML statement, into a code and data-specific operation for a specific data store, such as data store 222.

A data change is made in the data store. The data connector then reads the changed data from the data store. The changed data is translated into a standard format data representation, such as a XML data representation. Optionally, the standard format data representation is then sent to a transformer, such as transformer 214. Optional change operation 412 changes the data record received by the transformer into a UI-specific data statement. For example, the data change may require the data to be displayed in a sorted list. One or more transformers may sort the data retrieved and create a final data statement that has the data presented in a sorted list. The transformer then provides the changed and transformed data to a UI connector, such as UI connector 206.

Connect operation 414 then receives the changed data and connects with a UI component to display and provide the changed data. Thus, the UI now provides a view of the changed data. In one embodiment, the data change may be a user interface state and the display of the changed data is a display of the changed user interface. As represented by the flow continuing back to the user event operation 402, the process 400 of receiving events, affecting a change in data, and displaying the changed data is iterative and can be accomplished repeatedly for each user event or data change. If data changes or events cause or require the reconfiguration of the application, new components may be created and connected and/or reconfigured as described below with respect to FIG. 5.

Figure 5:
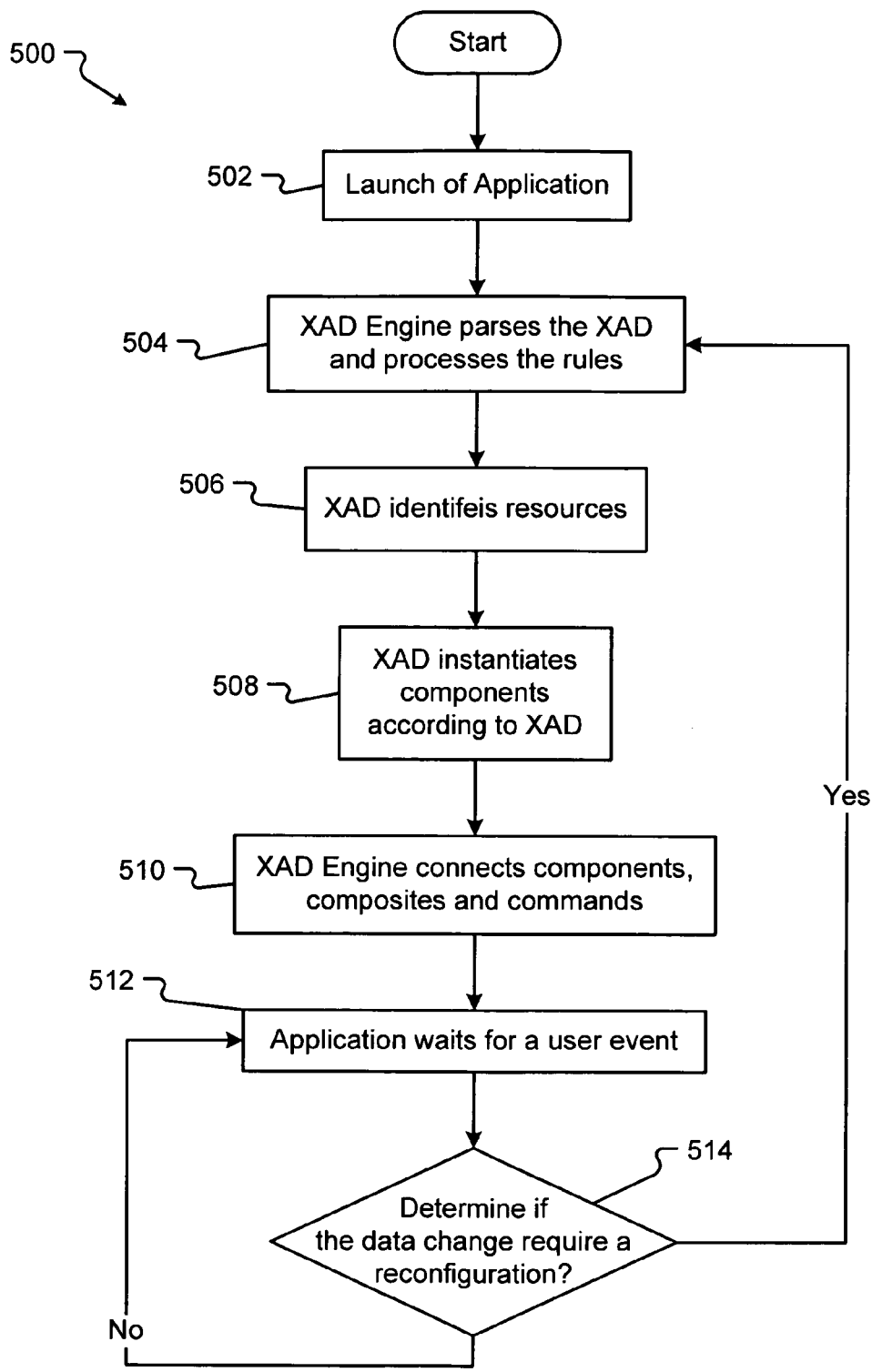
FIG. 5 is a flow diagram illustrating an embodiment of a method for creating and configuring or reconfiguring an XAF application according to the present invention.

An embodiment of a method 500 for creating and configuring an application is shown in FIG. 5. Launch operation 502 launches an application, such as application 204. In one embodiment, a user launches the application through a user event, such as by clicking on an application icon. Parsing operation 504 parses the XAD, such as XAD 318. In one embodiment, the parsing identifies and processes the schema and/or rules within the XAD.

Identify operation 506 identifies the resources and/or components necessary for the application. In one embodiment, the components and resources are found within a component library, such as component library 322. Instantiate operation 508 instantiates the components. In one embodiment, helper code in a XAD engine, such as XAD engine 320, formally instantiates the components identified in the component library. In a further embodiment, a temporary set of creator components is instantiated. The creator components then instantiate the processing components with regard to the input data and rules associated with the tags in the XAD.

Connect operation 510 connects the instantiated components. In one embodiment, the XAD engine connects the components according to data used or the user event processed. Once the application components are instantiated and connected, wait operation 512 waits for a user event. Thus, the XAD engine maintains a passive presence with the application. The XAD engine continually monitors the data changes and is responsive to changes in data provided by a data connector, such as data connector 210. At a data change, determine operation 514 determines if the data change requires a reconfiguration of the application, such as inserting a plug-in component. If a reconfiguration is required, flow continues Yes to parse operation 504. If a reconfiguration is not required, flow continues No to wait operation 512.

As described herein, an application framework is provided for generating a runtime structure for a given software application and for managing execution of a software application. The following are detailed descriptions of various aspects of embodiments of the invention described above, including the operation and functionality of transaction transforms, component domain processing via phase modeling and threading, and operation of the application description engine for generating and reconfiguring application components.

Transaction Transforms

Figure 6:
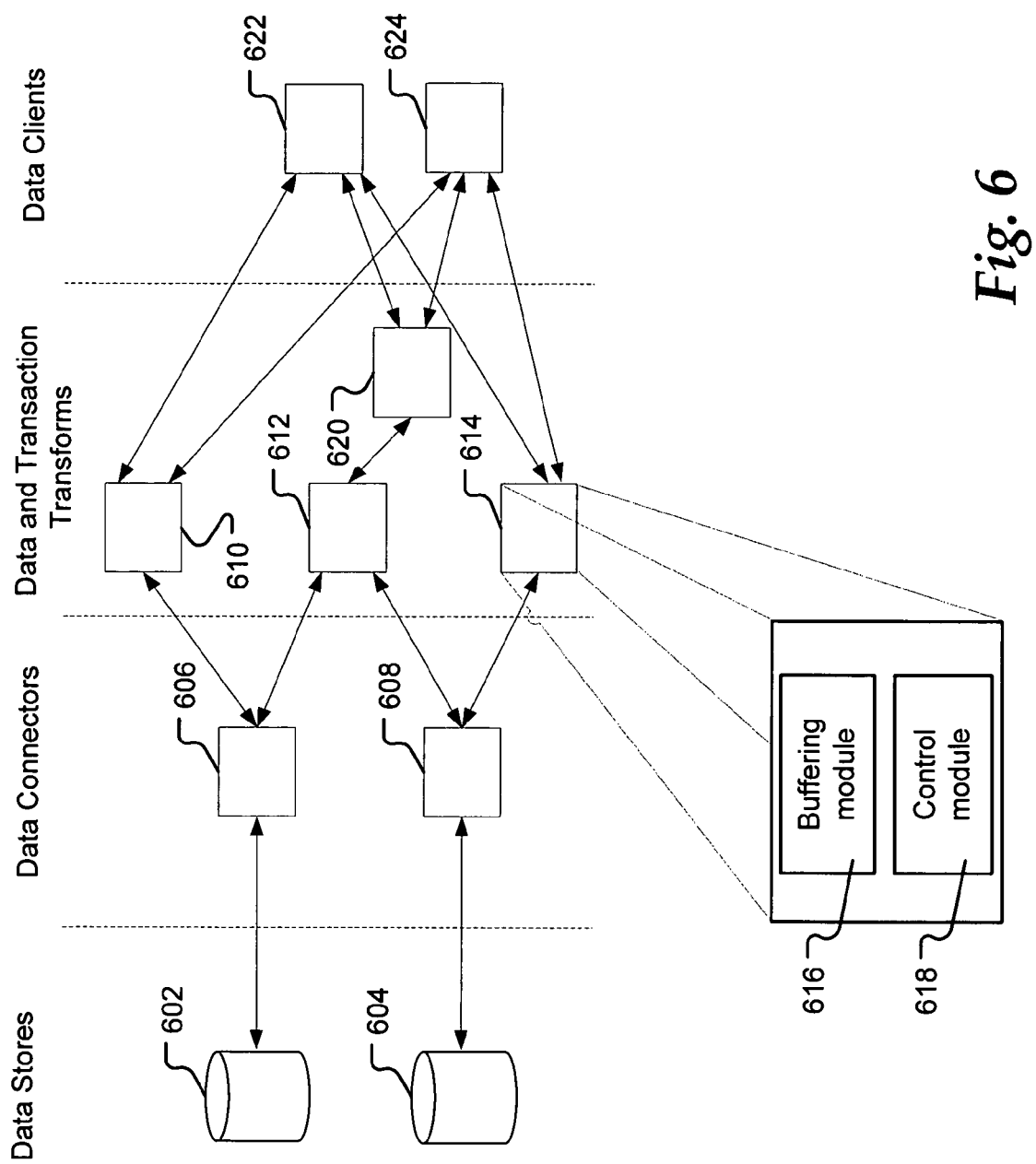
FIG. 6 illustrates organization of a data layer and shows connections between the data layer and other components including data stores and data clients.

As described above, one or more data stores are provided for receiving and storing data via one or more connectors. According to embodiments of the present invention, data may be selectively isolated from data stores through the use of one or more "transaction transforms." FIG. 6 illustrates organization of a data layer and shows connections between the data layer and other components including data stores and data clients. Transaction transform 614 includes a buffering module 616 to store isolated data and status information regarding the data and control module 618 which uses a two-phase commit protocol in conjunction with buffer module 616 such that a failed commit need not result in data loss. Buffering module 616 and control module 618 are discussed in more detail below.

Data stores 602 and 604 contain data on a database server or on a computer-readable medium. Data may be read from and written to a data store as described above. A check or some other request may be sent by an agent connected to a given data store to see if writing data to the data store is possible. If writing the data is possible, a positive indication is passed back to the agent. Likewise, if writing the data is not possible or not known to be possible, a negative indication is passed back to the agent.

Data connectors 606 and 608 connect data transforms 610, 612 and 614 to data stores 602 and 604. In an embodiment, protocols are implemented within data connectors 606 and 608 for dealing with one or more types of data stores. Each protocol handles one or more types of data store such as a database file encoded using a particular format. Data connector protocols atomically commit data modifications or changes received from data clients 622 and 624. The UI connectors 206, described above with reference to FIG. 2B, are examples of data clients 622, 624, In one embodiment, data connectors 606 and 608 achieve atomicity by way of pessimistic concurrency. Pessimistic concurrency involves locking subsets of data (e.g., one or more records) at a data store to prevent a client from modifying data in a way that affects other clients. In a pessimistic concurrency model, when a client performs an action that causes a lock to be applied, other clients cannot perform actions that would conflict with the lock until the client that owns the lock releases the lock. This model is useful in environments where there may be heavy contention for data, and/or where the cost of protecting data with locks is less than the cost of rolling back transactions if concurrency conflicts occur. Pessimistic concurrency is best used when lock times will be short, such as in programmatic processing of records.

In another embodiment, data connectors 606 and 608 achieve atomicity using optimistic concurrency with compensation actions. Optimistic concurrency does not make use of locks. When a first client needs to update a record, the protocol determines whether another client has changed the record since it was last read by the first client. Optimistic concurrency is useful in environments with little data contention. A compensating action is an action that compensates for the effects of a transaction. For example, the compensating effect for a bank transfer of funds from account A to account B is the transfer of the same amount of funds from account B back to account A. Similarly, the compensating action for reserving a hotel room would be the cancellation of the reservation. Compensating actions allow a transaction to be "rolled back," or backed out with no lingering side effects or other negative consequences. A compensating action may be used to roll back a transaction when a conflict between two clients arises (e.g., a first client reads a data value, and then a second client modifies the data value before the first client has attempted to modify the value). In an embodiment, data connectors 606 and 608 cache data from data stores 602 and 604, respectively. If data requested by a data client is cached by a data connector, the corresponding data store need not be queried for the requested data. Data connectors are discussed in more detail below.

Data transforms 610, 612, 614, and 620 encode and/or decode data according to predefined rules. Data transforms 610, 612, 614, and 620 implement functions that can perform arbitrarily complex processing. Data transforms 612 and 620 are in series with one another. Because of this, the results of the function implemented by data transform 612 are used as input to the function implemented by data transform 620 or vice versa. In an embodiment, data transforms may be serially connected to buffer the results of previous transforms, and allow complex functions to be implemented more easily and modularly. Likewise, subsets of data within a view can be committed or refreshed (see below) without affecting the remainder of the data in the view.

Data transform 614 is a special kind of data transform known as a transaction transform, and as such, contains a buffering module 616 and a control module 618. In an embodiment, a transaction transform allows isolated data to be committed atomically and in such a way that data is consistent between data stores. Buffering module 616 holds isolated data from data clients 622 and 624. In an example, data clients 622 and 624 are dialog boxes for editing data in data store 604. Edits made to the data may be stored in buffering module 616 substantially as the edits are made. In another embodiment, transaction transforms map edit requests against their output back to edit requests against their input(s). As a result, when edits are made, the input/requesting entity recognizes such an edit as complete. Further, these transaction transforms use their buffer 616 to enable delayed and controlled mapping of such edits, as discussed below.

Several types of control operations may be performed by a transaction transform. When a user wishes to commit the data in data client 622 or data client 624 (e.g., when an "Apply" button associated with a data client is activated), control module 618 receives a commit control operation from that data client and attempts to commit data using the two-phase concurrency protocol discussed below, in conjunction with FIG. 6. In an embodiment, buffered data in buffering module 616 may be deleted once it has been successfully committed. When a user wishes to refresh the data in the buffer (and thus, the data displayed in a corresponding data client), control module 618 receives a refresh control operation from that data client, and refreshes the data in buffering module 616. The refreshed data is propagated to the data client so that the user may access the updated data. The ability to refresh the isolated data may be used in place of aborting a commit in a traditional two-phase concurrency model, as discussed below in conjunction with FIG. 6.

In some situations, it is beneficial to update the data in a buffer without destroying uncommitted changes one or more users have made using one or more data clients. In such a case, a synchronize control operation may be issued by the data client. When control module 618 receives a synchronize control operation from a data client, the isolated data in buffering module 616 is updated based on the latest version in the data store(s), and the uncommitted changes to the isolated data are merged with the updated data. The process of synchronization of two or more sets of changes to data is well understood in the art, and synchronization may be used in a variety of circumstances. The details of how synchronization may be implemented in a given context are quite specific to that context. For example, in the context of a product database, it may be acceptable to merge a line of products in the database, but not acceptable to merge two versions of changes to a product's name. Other contexts may have other rules for synchronization, any and all of which may be used in conjunction with the present invention. Resolving conflicts is also known. Predetermined rules may be provided and followed as to which updates should govern in case of a conflict. Other embodiments may alert the user(s) to resolve such conflicts.

Buffering module 616 maintains status information that may vary based on the type of operation currently in progress. For example, if a commit is in progress, status information may include whether the commit is pending, was successful, or failed. Alternatively, if a refresh is in progress, status information may include whether the refresh is pending, or complete. If a synchronization operation is in progress, status information may include whether the synchronization is pending, was successful, or failed. The specific control operations are discussed in more detail below.

Some data accessible to a data client may not require isolation. For example, alterations to a financial database (such as that used to track bank accounts) are typically committed immediately. In an embodiment, a given data view may include both isolated and non-isolated data. In another embodiment, a given data client may include read-only data that may not be edited within the data client.

Figure 7:
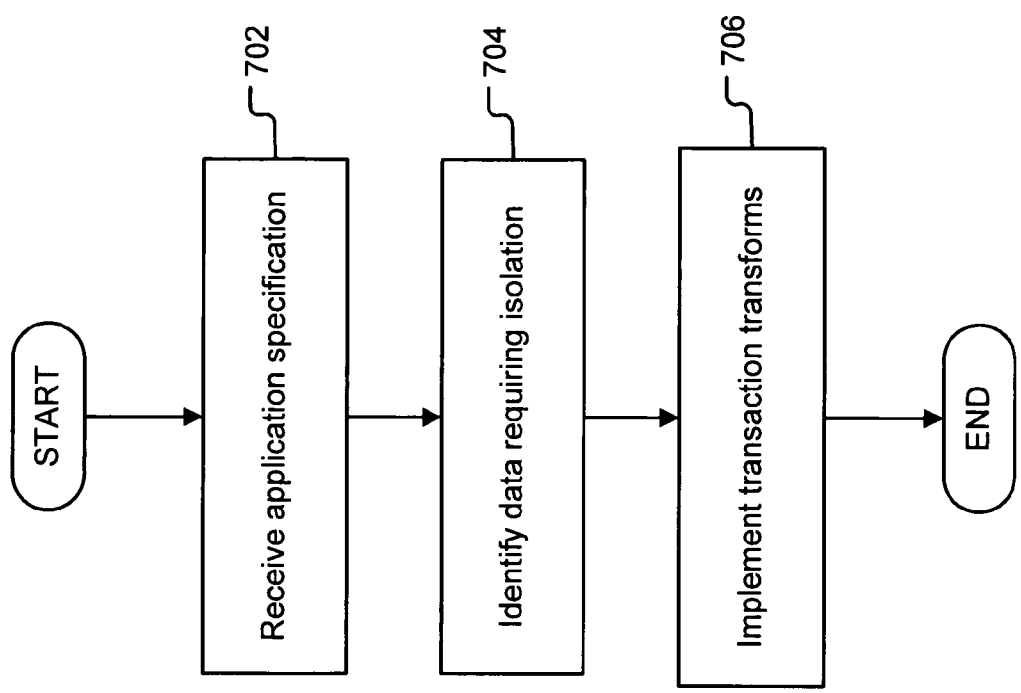
FIG. 7 illustrates the operational flow of a transaction transform operation.

In response to the receipt of an application specification from an application developer, an embodiment of the present invention identifies which parts of the application require isolated data and implements transaction transforms as required. FIG. 7 illustrates the operational flow of a transaction transform operation. Receive operation 702 receives an application specification. In one embodiment, the application specification specifies an XAF application, including which data should be isolated, and identify operation 704 identifies and marks the corresponding data entities within the application that will be isolated.

Implement operation 706 implements one or more transaction transforms corresponding to each data entity that is marked as a data entity to be isolated. Transaction transforms are then connected and activated in substantially the same way as a data transform.

Figure 8:
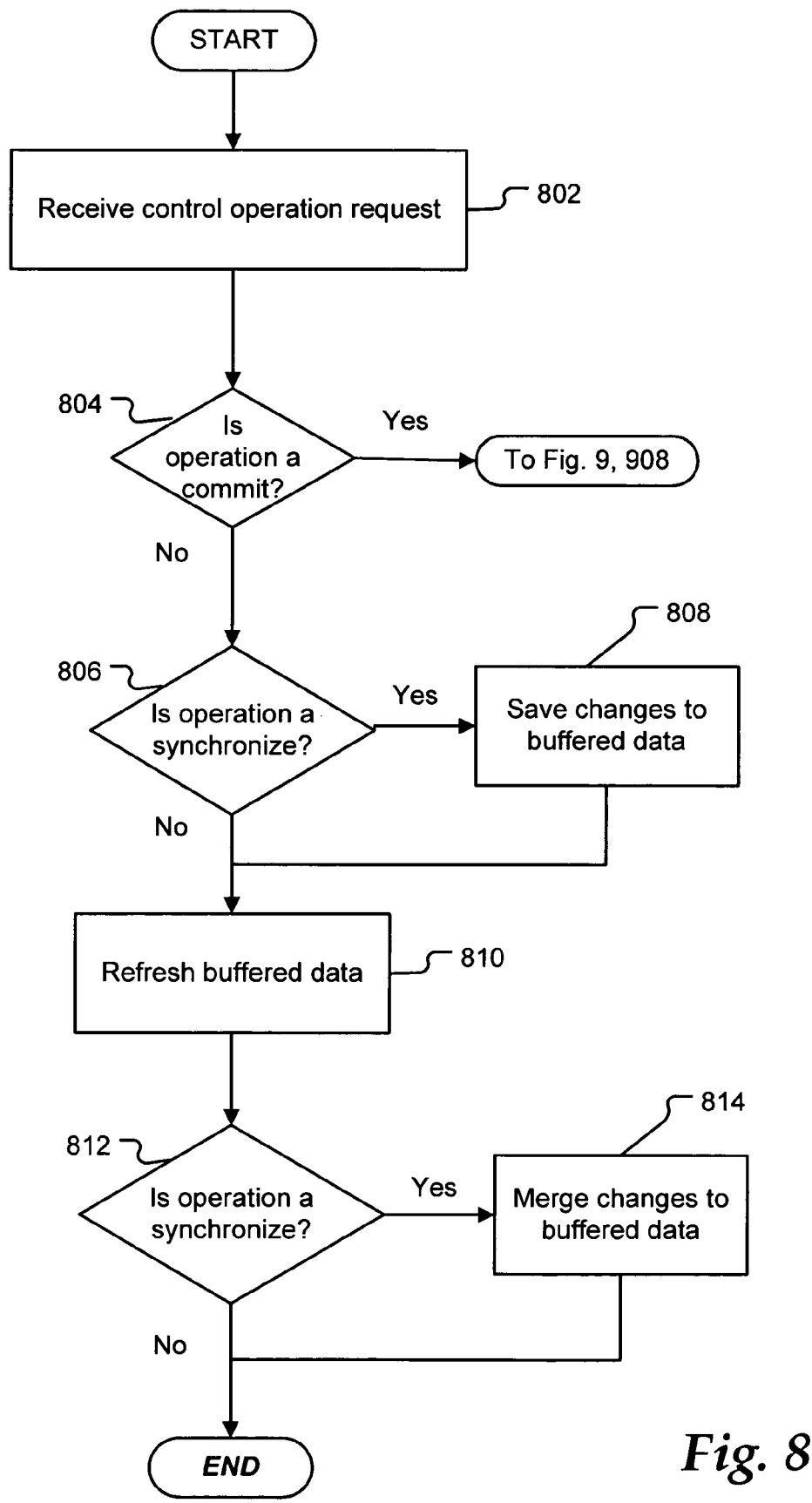
FIG. 8 illustrates control operations performed in accordance with a transaction transform operation.
Figure 9:
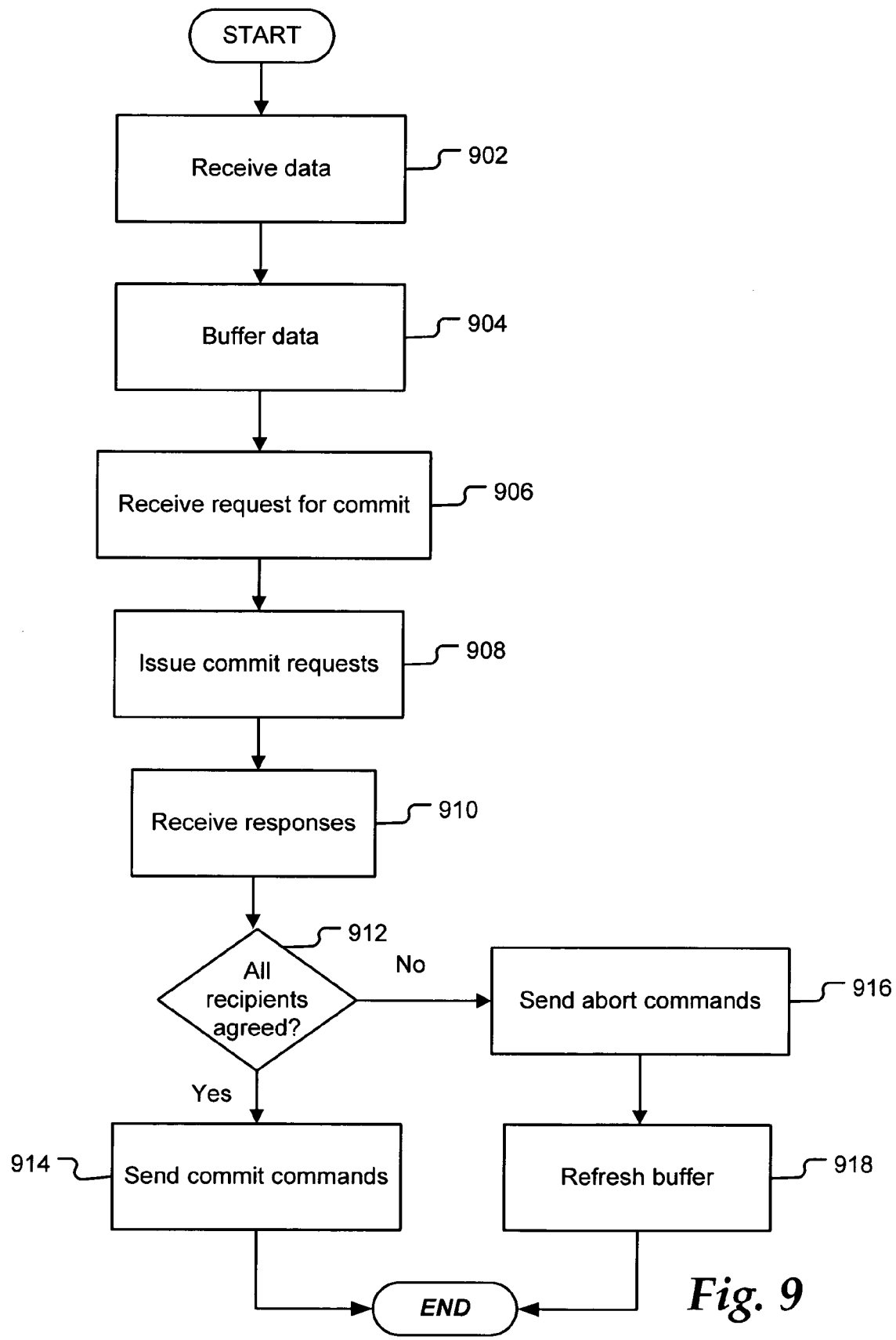
FIG. 9 illustrates the operational flow of the operations performed in one embodiment of the present invention.

FIG. 8 illustrates control operations performed in accordance with a transaction transform operation. Receive operation 802 receives a control operation request from a data client. In an embodiment, the request is triggered by a user clicking on a UI control associated with the data client. Determine operation 804 determines whether the control operation request is requesting a commit operation. If the control operation request is for a commit operation, flow branches YES to issue operation 908 (FIG. 9). If the control operation request is not for a commit operation, flow branches NO to determine operation 806.

Determine operation 806 determines whether the control operation request is requesting a synchronize operation. If the control operation request is for a synchronize operation, flow branches YES to save operation 808. If the control operation request is not for a synchronize operation, flow branches NO to refresh operation 810.

If a synchronize operation was requested, save operation 808 saves any uncommitted changes to the buffered data. The uncommitted changes may be saved to a file on a computer-readable medium, to volatile or non-volatile memory, or other form of computer storage, or committed to an external database or similar service. Flow then proceeds to refresh operation 810.

Refresh operation 810 retrieves the latest copy of the buffered data that exists in the data stores, and places it in the buffer associated with the transaction transform. Refresh operation 810 may need to query several data stores to determine which data store contains the most up-to-date copy of the data. In another embodiment, refresh operation 810 may alternatively or additionally check the data connector associated with each data store to see if the data connector contains a cached copy of the buffered data.

Determine operation 812 determines whether the control operation request is requesting a synchronize operation. In an embodiment, determine operation 812 simply checks the results of determine operation 806. If the control operation request is for a synchronize operation, flow branches YES to merge operation 814. If the control operation request is not for a synchronize operation, flow branches NO to the end of the operational flow.

If a synchronize operation was requested, merge operation 814 merges the changes to the buffered data that were saved by save operation 808 with the buffered data refreshed by refresh operation 810. The rules for merging two versions of a body of data vary based on the context of the application. Some exemplary rules are presented in conjunction with FIG. 6. In an embodiment, a plurality of changes from different data clients may be merged together to achieve synchronicity in each of the data clients.

FIG. 9 illustrates how commit requests are processed in accordance with one embodiment of the present invention. Receive operation 902 receives data from a data client. In one embodiment, the data client is a dialog box through which an application user entered data, and the data is transmitted when a UI control associated with the dialog box is activated. Buffer operation 904 then buffers the data within, or in memory associated with, one or more transaction transforms.

When receive operation 906 receives a request for a commit operation, a modified two-phase commit protocol is invoked. First, issue operation 908 issues commit requests to a plurality of data connectors associated with data stores. In an embodiment, a commit request includes the data to be committed. The commit requests are received by one or more data connectors that have cached the data, and/or one or more data stores that hold the data, and are treated as a request for assurance that the data can be atomically committed. Receive operation 910 receives responses from the data connectors and/or the data stores that hold the data. Once all the responses have been received, determine operation 912 determines whether all the recipients of the commit request agreed to the commit. If all the recipients agreed, flow branches YES to send operation 914. If not all the recipients agreed, flow branches NO to send operation 916.

If all the recipients agreed to commit the data, send operation 914 sends commit commands to the all the recipients of commit requests issued by issue operation 908. The recipients commit the data (that is, update their own data with the changes).

If not all of the recipients agreed to commit the data, send operation 916 sends abort commands to the recipients. The recipients are thus made aware that the proposed commit will not take place, and that any data associated with the commit may be discarded. In an embodiment, send operation 916 only sends abort commands to the recipients that agreed to commit the data, while the recipients that did not agree to commit the data automatically discard the data without being explicitly ordered to. Next, refresh operation 918 executes a refresh control operation to refresh the buffered data. In an embodiment, refresh operation 918 instead executes a synchronize control operation to synchronize the buffered data.

Other embodiments of the present invention are also envisioned. In one embodiment, each transaction transform may include a policy module that enforces synchronization rules. In another embodiment, the policy module sets the concurrency policy for refreshing and synchronization. Exemplary concurrency policies include conservative concurrency (wherein a complete copy of all buffered data is always made), and optimistic concurrency (wherein data is copied into the buffer only as needed). A policy module may also allow for modular addition of policy to handle other types of control operations not discussed herein.

In another embodiment, transaction transforms can be used to access and manipulate data in conjunction with a query language. SQL (Structured Query Language) is one such query language that is in wide use. XQuery is another such query language. The use of other query languages in conjunction with the present invention is also envisioned.

In yet another embodiment, the data connectors 610 may contribute and, to some extent, manage the parts of the buffer, e.g., buffer and logic 616 in FIG. 6. In such a case, the connector has logic to access and/or manipulate the buffered data to control refreshing and/or synchronization components of the data.

Application Framework Phasing Model

As briefly described above, applications and/or application components may be constrained to certain phases. Generally, phasing constrains the execution of software methods within a computer system by subjecting the software components to a multi-tiered phasing model. A software component can be a class, an object, a method, or other software code construct that is within a computer system. A phase is an operating state that is simultaneously and collectively shared by a set of software components. The computer system executes a top-level phasing model, also referred to as a master phasing model, with one or more sub-phases occurring during one or more of the phases of the master phasing model. The operations within the computer system are constrained to a set of phases or sub-phases.

Figure 10:
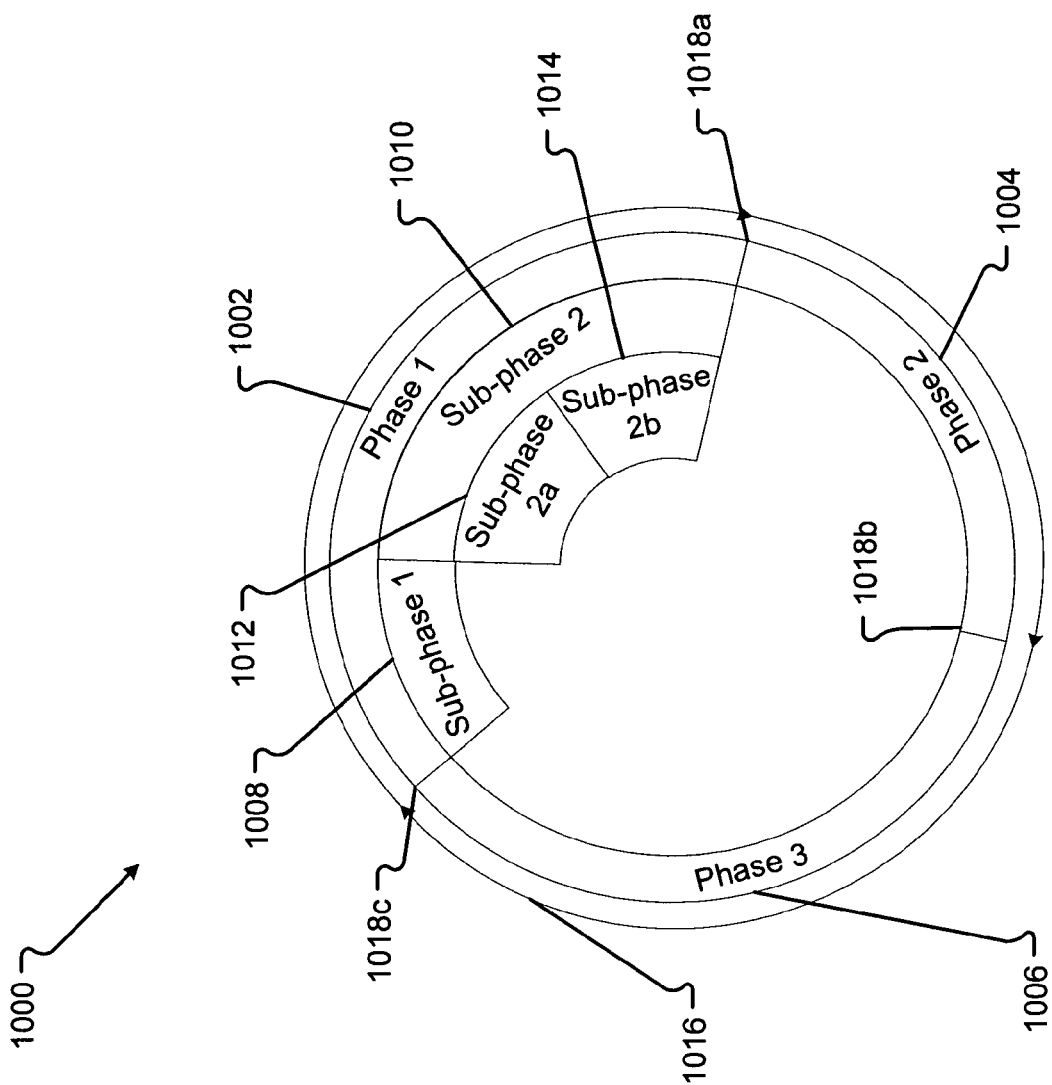
FIG. 10 is an embodiment of a multi-tiered phasing model operable in a computer environment to order the execution of software methods according to the present invention.

An exemplary embodiment of the multi-tiered phasing model 1000 is shown in FIG. 10. The multi-tiered phasing model has a first or a master phase model comprising three phases 1002, 1004, and 1006. The master phases occur in an order delineated by the arrows 1016. Two sub-phases, sub-phase 1 1008 and sub-phase 2 1010, occur during phase 1 1002. In addition, two further sub-phases, sub-phase 2*a* and sub-phase 2*b*, occur during sub-phase 2. Thus, the phasing model 1000 presents a multi-tiered set of phases with sub-phases occurring during other phases or sub-phases. Hereinafter, any discussion of a phase may also apply to a sub-phase.

Each software component is constrained to operate within a certain phase. A constraint is placed upon each of the software methods to execute or to be called only during the phases to which the software method is constrained. Software methods that can create conflicts or contradictory results are constrained to different phases, where the software methods cannot be legally called from the current phase. As such, each software method is executed in a known fashion without conflict between the methods that accomplish contradictory tasks. All methods execute under a particular phase constraint such that the software system is known to be in a state compatible with the present phase constraint.

Referring again to FIG. 10, Phase 1 1002 is a superphase to sub-phase 1 1008 and sub-phase 2 1010. Two further sub-phases, sub-phase 2*a* 1012 and sub-phase 2*b* 1014 occur during sub-phase 2 1010. Likewise, sub-phase 2 1010 is a superphase to sub-phase 2*a* 1012 and sub-phase 2*b* 1014. Any phase or sub-phase may have sub-phases. There is no limit to the number of levels of sub-phases within the multi-tiered phasing model. In addition, there must be at least two phases in any phase space, but there is no limit as to the number of phases above two phases. In addition, if there are sub-phases within a superphase, there must be at least two sub-phases but there is no limit to the number of sub-phases occurring during any superphase above two sub-phases. Any set of sub-phases may be cycled through one or more times during the superphase.

The phase model 1000 illustrates a phase space. A phase space is a finite directed graph determining valid phases (graph nodes) and valid phase transitions (graph edges). A phase space therefore determines valid sequences of phases. The phase space 1000 is defined over the phase set Phase 1 1002, Phase 2 1004, and Phase 3 1006. The phase space 1000 also has three phase transitions 1018*a*, 1018*b*, and 1018*c*. A phase transition represents when the simultaneous change of phase occurs by all software components that share the pre-transition phase.

When software components share a phase space, those software components are part of a phase domain. A phase domain is a set of software components agreeing on a common phasing model as defined by a particular phase space. For example, all software components that agree to be constrained by the master phase space having master phases 1002, 1004, and 1006 are part of the master phase domain. Thus, all software components associated with the software components in the master phase domain include a phase constraint associated with at least one of the master phases 1002, 1004, and 1006.

A phase constraint is a static constraint that limits the phases valid in a certain program context. In particular, constraints can be applied to a program section, asserting that the program section will only execute during a phase honoring the constraint. In one embodiment, phase constraints are written as an attribute in brackets, such as [Phase 1]. This data structure is explained in more detail below.

Figure 11:
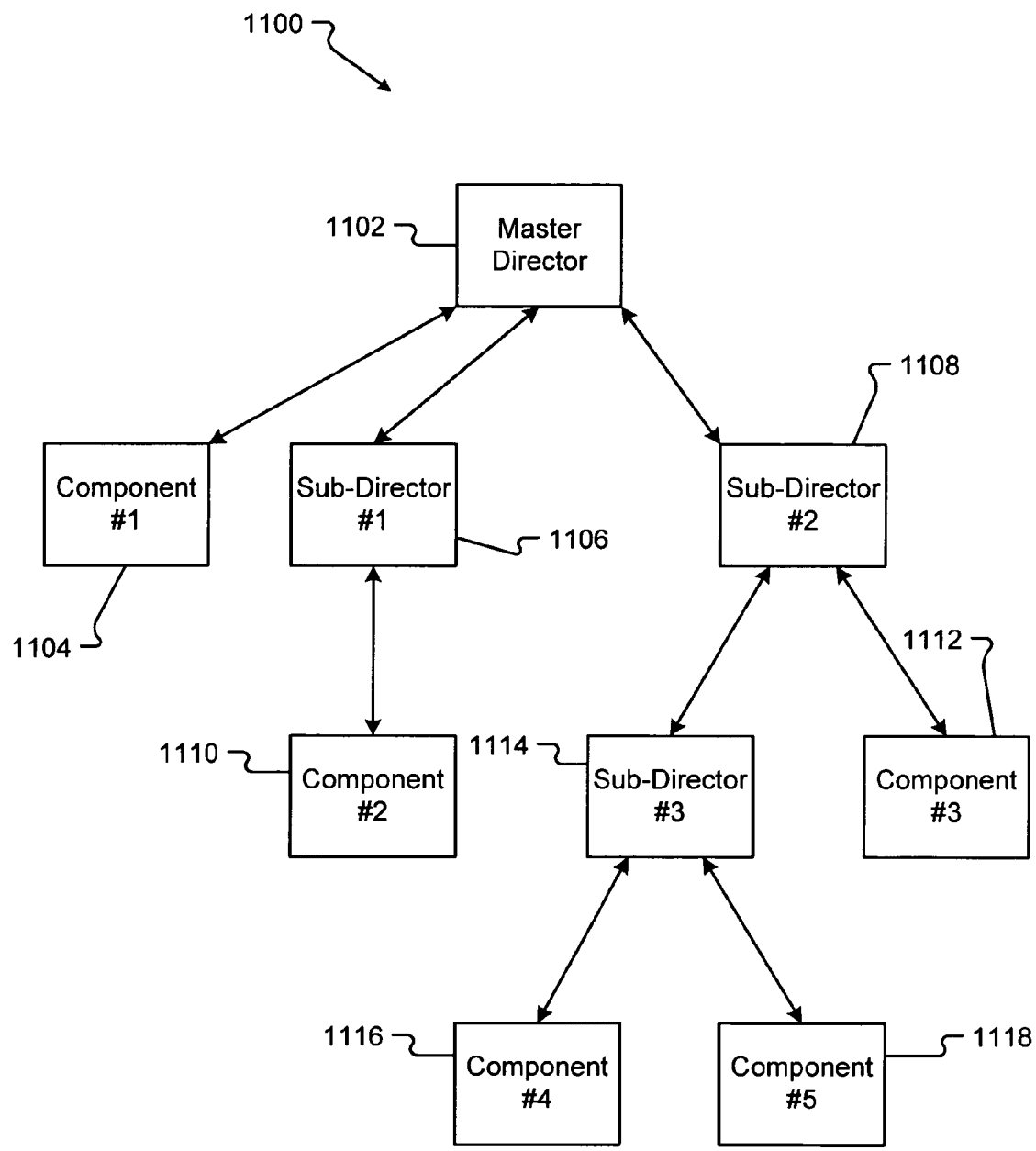
FIG. 11 is an embodiment of a modular software system having software components for ordering the execution of software methods in a phased model according to the present invention.

A computer environment 1100 having one or more components occupying one or more phase domains is shown in FIG. 11. A master director 1102 controls the transitioning and establishment of the master phase space. All components within the computer environment are part of the master phase domain 1100 but may occupy one or more sub-phase domains. To enable creation of the phase domain 1100, the program author needs to select a phase space, a policy to execute the phase transitions over the phase space, and a policy to handle messages crossing the boundary of the phase domain.

The phase domain 1100 can be characterized by a multi-tiered phase space. In embodiments of the present invention, one or more components, such as component 1 1104, register with the master director 1102. Component 1 1104 represents any type of software construct, including software components or methods. The software component 1104 is constrained to one of the phases in the master phase space.

In other embodiments, one or more sub-directors, such as sub-director 1 1106 and sub-director 2 1108, register with the master director 1102. The sub-directors control one or more other phase domains with one or more different phase spaces. Thus, the phase domain 1100 has one or more nested phase domains. All components, such as component 2 1110 registered with sub-director 1 1106, are constrained to one or more of the sub-phases within a sub-phase space and within one or more of the master phases of the master phase space. In one embodiment, the sub-phase domain controlled by the sub-director operates within a single master phase. The operations of the sub-phases can occur repeatedly during the single master phase.

In embodiments of the present invention, the sub-directors, such as sub-director 2, register other sub-directors, such as sub-director 3, to create further nested sub-phase domains. In some embodiments, the sub-director 2 1108 controls the operation of component 3 1112 and the sub-director 3 1114. In further embodiments, a director, such as sub-director 3 1114, controls more than one component, such as component 4 1116 and component 5 1118. Each sub-director may control a phase space having unique phases. Thus, sub-director 1 1106 operates a first sub-phase space while sub-director 3 1114 operates a second sub-phase space. If two-phase spaces do not interact, then the phase spaces are called orthogonal spaces. A combination of orthogonal phase spaces can form a Cartesian phase space, which can be used to form the phase domain for a single product. An underlying phase set is the Cartesian product of the orthogonal phase sets, wherein the valid phase transitions are also the Cartesian products of the valid transitions for the orthogonal phase sets.

A director, in embodiments of the present invention, is a logical clock. The director cycles through the phases similar to a clock in a hardware system. At each phase transition, the director simultaneously changes the phase for all software components within the phase domain. In one embodiment, any sub-directors may change the sub-phase in a sub-phase domain at the same time. The logical clock awaits the completion of an operation constrained to the phase or to an operation executing within a sub-phase constrained to the phase.

Figure 12:
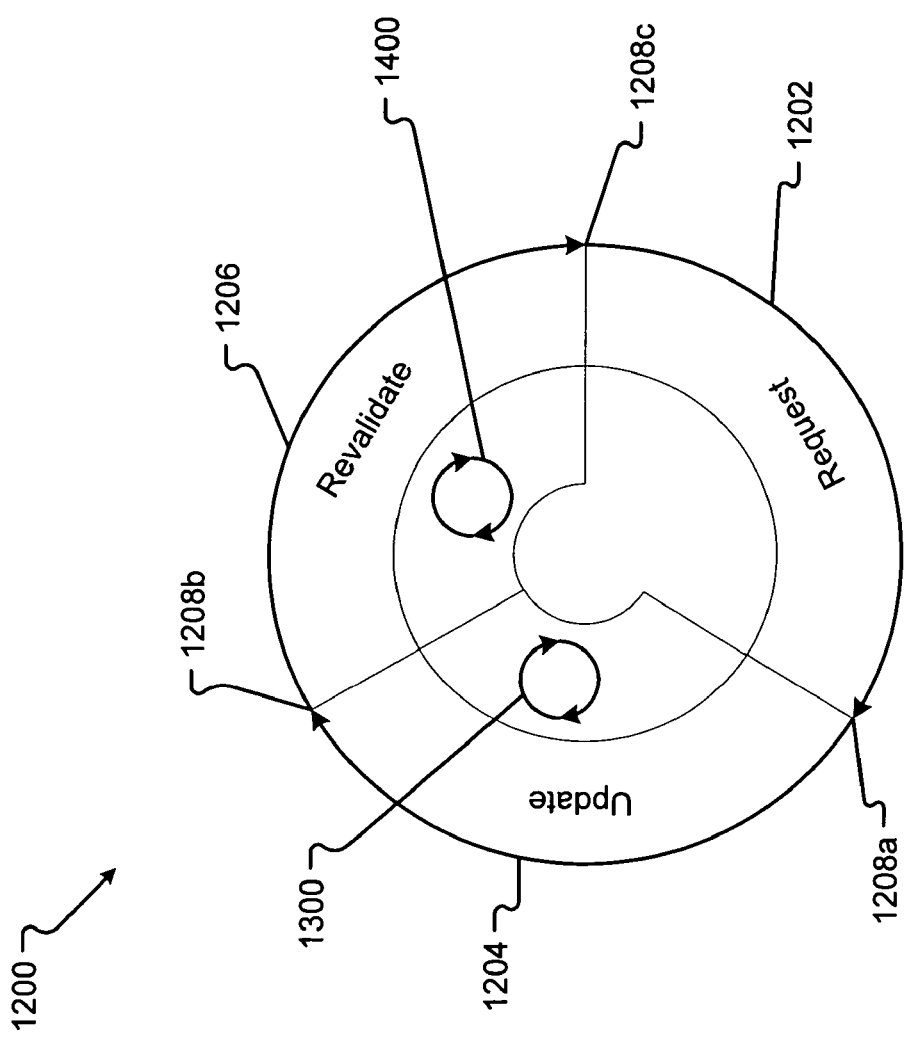
FIG. 12 is an embodiment of a first or top-level phase model or space operating over an entire computer system to order the execution of any software method within the system according to the present invention.

An exemplary embodiment of a phase space 1200 that may be used for a master phase domain is shown in FIG. 12. The phase space 1200 has three phases. During a read request phase 1202, requests for a read or write to data, or other software commands or requests in the software system, are queued until the next phase is entered. In one embodiment, only certain, non-conflicting methods, which are requested, are executed in the next phase, while other methods wait another phase or for the next cycle of the phases An Update phase 1204 directs the commands and requests to the appropriate software component. In embodiments of the present invention, during the Update phase 1204, the software components fulfill commands or requests. In one embodiment, the Update phase 1204 has a sub-phase space 500 occurring during the Update phase 1204. An exemplary sub-phase 500 is shown in FIG. 5 and explained below. In one embodiment, the Update phase 1204 triggers sub-phases for data layers. In other words, any requests to write to data are accomplished in the sub-phases of the Update phase 1204.

A third phase, the Revalidate phase 1206, directs and executes other methods not processed during the Update phase 1204. In one embodiment, all requests to retrieve data are completed during the Revalidate phase 1206. For example, after data is updated in the Update phase 1204, all software components are informed that data changes have occurred, and the informed software components retrieve the updated data. In one embodiment, the Revalidate phase 1206 operates a sub-phase space 600. An exemplary embodiment of the sub-phase space 1300 is shown in FIG. 13 and described below.

To change phases, the phase space 1200 proceeds through a phase transition. In the exemplary embodiment, there are three phase transition 1208*a*, 1208*b*, and 1208*c* representing the transitions between the three phases 1202, 1204, and 1206. As explained above, a phase transition is the point in time at which the director, such as director 1102, changes the phase clock, and the phase for all software components in the phase domain changes simultaneously.

Alerting or notifying software components, within the phase domain, of the current phase or the transition to a new phase may occur. In one embodiment, the director notifies all software components of the phase. In other embodiments, a requesting method asks the director for the phase. In embodiments of the present invention, a transition notification is sent to one or more software components within the phase domain. In one embodiment, transition notifications occur either during the current phase or at the beginning of the next phase. In other embodiments, separate phases are employed for the notification process. For example, phase space 1200 would have three notifying phases positioned at the transitions 1208a, 1208b, and 1208c that are for notifying software components within the phase domain.

Figure 13:
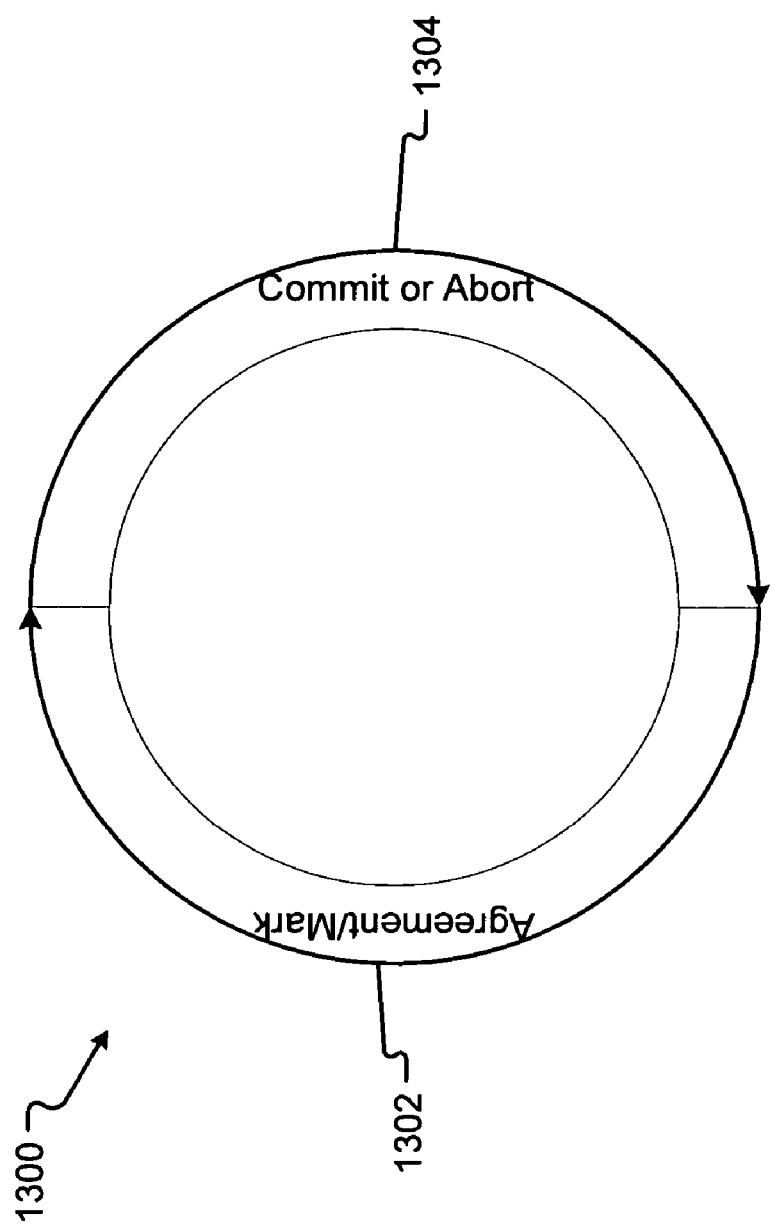
FIG. 13 is an embodiment of sub-phase spaces operable during one or more of the phases of a master phase space, which orders the retrieval and writing of data according to the present invention.

An exemplary sub-phase space 1300 of the Update phase 1204 is shown in FIG. 13. The sub-phase 1300 is, in some embodiments, used for a data layer. In other words, methods for writing data to a shared data structure are constrained to one of the sub-phases of the data sub-phase space 1300. In one embodiment, all software components sharing the data agree to either commit the change or abort the change in the Agreement phase 1302. The change is either committed or aborted in the Commit or Abort Phase 1304.

In another embodiment, both the Agreement phase and the Commit or Abort phase are sub-phases of the "Commit or Abort" sub-phase 1304 and sub-phase space 1300 has a Mark phase 1302 instead of an Agreement sub-phase 1302. Here, the data changes are made in the Commit or Abort phase 1304, and all software components using the data are marked for update in the Mark phase 1302. Marking a software component is setting a flag in the software component that signals the software component to retrieve the updated data in an appropriate later phase. In one embodiment, the marked software components retrieve the data in a Revalidate phase 1206. In another embodiment, the Mark phase 1302 has two sub-phases: a mark sub-phase and a final mark sub-phase. Here, the software components using the data are marked in the mark sub-phase and retrieve the data in the final mark sub-phase.

Figure 14A:
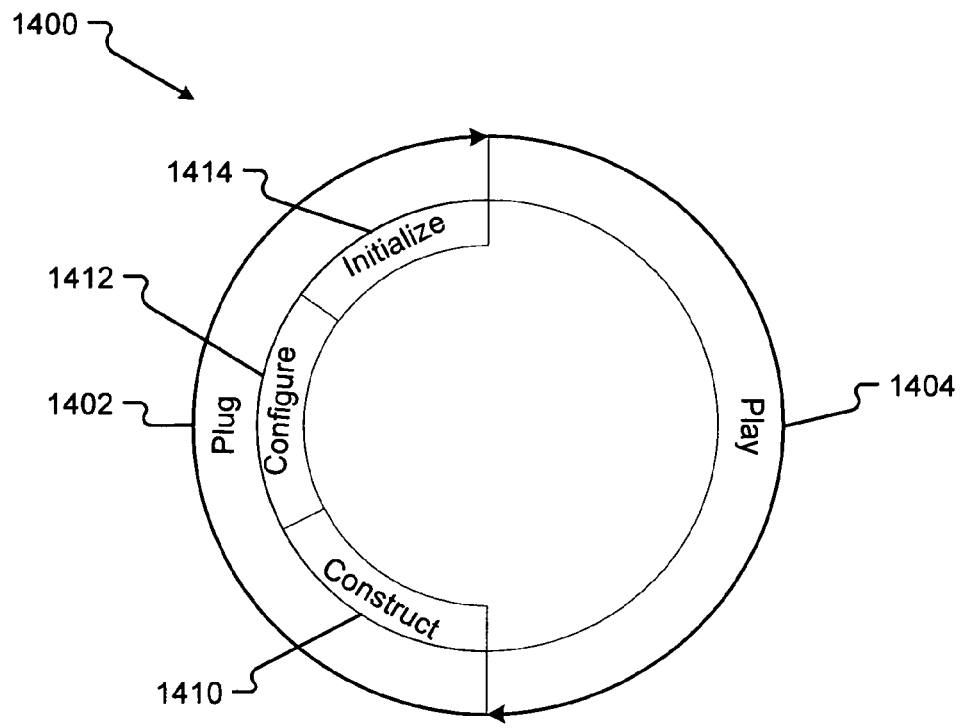
FIG. 14A and FIG. 14B are embodiments of sub-phase spaces operable during one or more of the phases of a master phase space, which order the configuration and operation of a plug and play system according to the present invention.
Figure 14B:
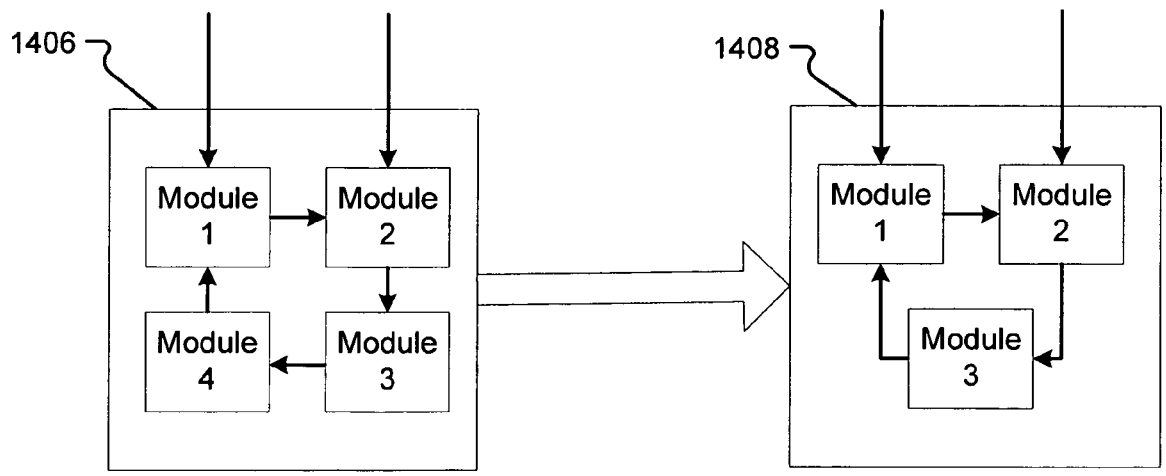

Another exemplary sub-phase space 1400, occurring during the Revalidate phase 1206, is shown in FIG. 14A. An exemplary change in software construction, which is constrained to the sub-phase space 1400, is shown in FIG. 14B. The sub-phase space 1400 provides sub-phases for plug and play operations. The Plug and Play sub-phase space 1400 has two phases: a Play sub-phase 1404 and a Plug sub-phase 1402. Generally, in a Plug sub-phase 1402, the composition and configuration of a software component is established, changed, or removed, but no playtime functionality is performed. Likewise, in a Play sub-phase 1404, the established composition or configuration of the software components is used for regular functionality, but no composition or configuration aspects are established, changed, or removed.

An exemplary embodiment of a module reconfiguration is shown in FIG. 14B. In this embodiment, a software module has a first configuration 1406. Upon some action, such as a user input request, the software module changes to a second configuration 1408. As one skilled in the art will recognize, the software module will operate differently in the first configuration 1406 compared to the second configuration 1408. Thus, the reconfiguration should occur without methods executed during the play phase interacting with the software module. In embodiments of the present invention, during the Plug sub-phase 1402, software instances are initialized, connected or disconnected, and properties set. In some embodiments, further sub-phases help order the operations performed in the Plug sub-phase 1402.

In one embodiment, the Plug sub-phase 1402 has further sub-phases. A Construct sub-phase 1410 creates new software instances by instantiating a known class, calling a software component, or using an interface on an existing instance to acquire a clone or specialized derived instance. A Configure sub-phase 1412 adds or removes connections between instances. Finally, an Initialize sub-phase 1414 sets properties and requires negotiation between properly connected instances. The sub-phases in the Plug sub-phase 1402 may deviate from those presented here. In addition, the Play sub-phase 1404 may also contain sub-phases.

Other phasing spaces are contemplated. For example, a sub-phase space for user interface changes is contemplated. In the user interface sub-phase space, an invalidate sub-phase can allow the execution of methods for building structures. A draw sub-phase then draws the built structures. Other phase spaces can be used for other types of operations, as one skilled in the art will recognize. In addition, one skilled in the art will recognize that the exemplary phase spaces presented above may be changed as to the number of phases or sub-phases, to the number of tiers or levels, and to the type of phases or sub-phases. As such, the present invention is extensible. In one embodiment, new superphases are overlaid on existing phase spaces. In another embodiment, new phases are added to existing phase spaces. In still other embodiments, more sub-phases or new tiers of sub-phase spaces are added to existing phase spaces.

Figure 15:
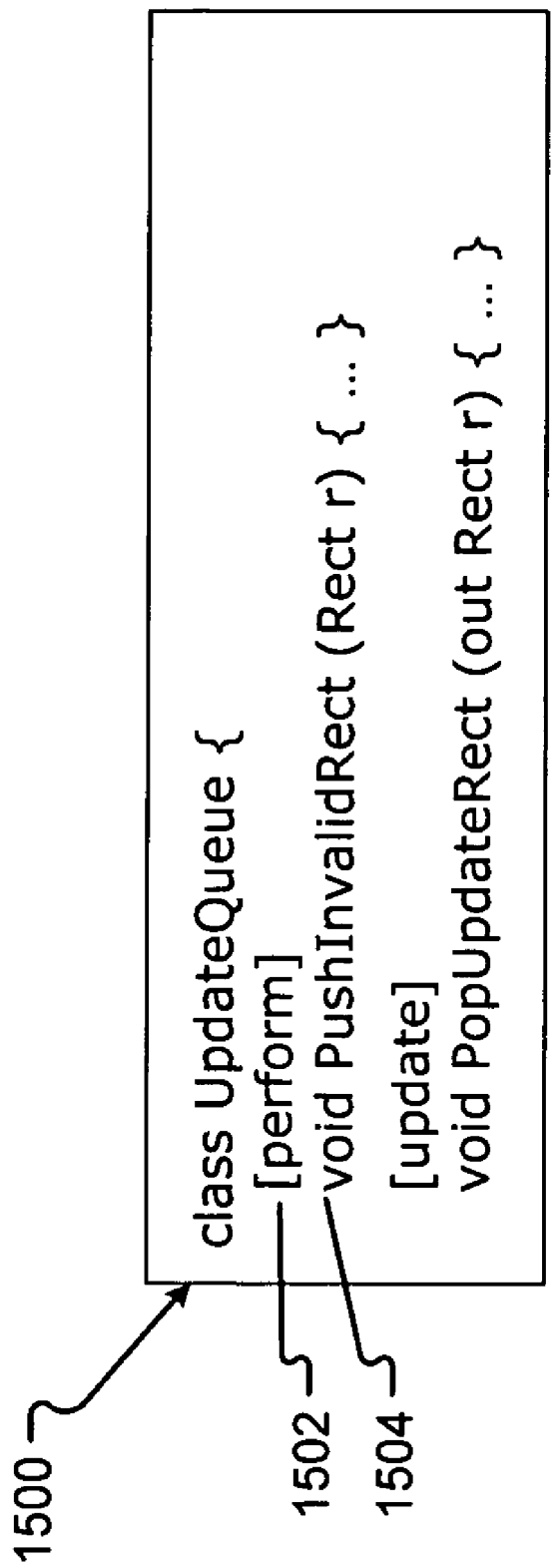
FIG. 15 shows an embodiment of a data structure or language attribution containing a phase constraint attribute that declares a constraint on the execution of a software method to a certain phase according to the present invention.

An exemplary embodiment of a data structure 1500 having a phase constraint constraining the execution of an item of the code is shown in FIG. 15. The data structure 1500 is a code element. Any type of code may have a phase constraint. The phase constraint 1502 is shown above a method 1504. The phase constraint 1502 constrains the operation of the method 1504 to the phase specified in the phase constraint, in this embodiment to the phase "Perform." Thus, the method 1504 is only executed during the "Perform" phase or the "Perform" sub-phase.

In embodiments of the present invention, a data structure contains a form of constraint that depends on the software component and the type of operation performed. In one embodiment, the constraint is a call constraint. The call constraint constrains the call of a method to a specified phase. Thus, the execution of methods in other software components or the same software components is constrained by limiting the initiation of those methods only during specified phases. In another embodiment, the constraint is a constructor constraint. A constructor is a special form of method that instantiates software components. Thus, the instantiation of software components is constrained to a specified phase, such as explained with the Construct sub-phase 1410 in FIG. 14A. In another embodiment, the constraint is a reference constraint. The reference constraint constrains an entire class of software components and all primitive operations of the class. For example, a reference constraint placed on an interface limits the connections between software modules, such explained with the Connect sub-phase 1412 in FIG. 14A.

The constraint is expressed by a phase constraint attribute in the software code that can be assigned to any target software component. In embodiments of the present invention, a phase constraint attribute is assigned to an entire class and is inheritable. Thus, child components inherit constraints from their parent components. In some embodiments, a phasing scheme places multiple phase constraint attributes on the same target. Thus, the software target is constrained by the conjunction of the multiple phase constraints.

Each constraint is a constraint on a "Type" associated with the level of the phase specified. As such, a constraint specifying a superphase is a constraint on "Superphase." A constraint specifying a sub-phase is a constraint on "Sub-phase." Constraints on types that are sub-phases are constraints on the union of the all the constraints on the "Super-Types." The relationships between constraints on types is used by compilers or used at runtime to check for the validity of the constraint relationships amongst different software components.

Enforcing the constraints may occur at runtime or at compile time. At compile time, the constraints on types can be checked. A compiler can check the constraints on Types and constraints on sub-Types against a set of soundness rules for methods with a constraint on a Type calling to methods with a constraint on a sub-Type. A constraint scheme is valid if the constraint on a sub-Type is the same or weaker than the constraint on a Type, for example, if the constraint on a Type specifies the Plug phase 1402 and the constraint on a sub-Type specifies the Initialize sub-phase 1414. In this embodiment, the Initialize sub-phase constraint 1414 executes within the Plug sub-phase 1402, and therefore, is a weaker constraint. A constraint scheme is invalid if the constraint on a sub-Type is mutually disjoint with the constraint on a Type, for example, if the constraint on a Type specifies a Play sub-phase 1404 and the constraint on a sub-Type specifies the opposed Plug sub-phase 1402. A constraint scheme is valid, but must undergo some dynamic checking, if the constraint on a sub-Type is stronger than or overlapping with the constraint on a Type, for example, if the constraint on a Type specifies the Plug sub-phase 1402 and the constraint on a sub-Type specifies the Initialize sub-phase 1414. In this embodiment, if the phase domain currently operates in both the Plug sub-phase 1402 and the Initialize sub-phase 1414, the call scheme is valid. However, if the domain is not within one of the two phases, the scheme is invalid. Other soundness rules are contemplated and incorporated into the present invention.

Figure 16A:
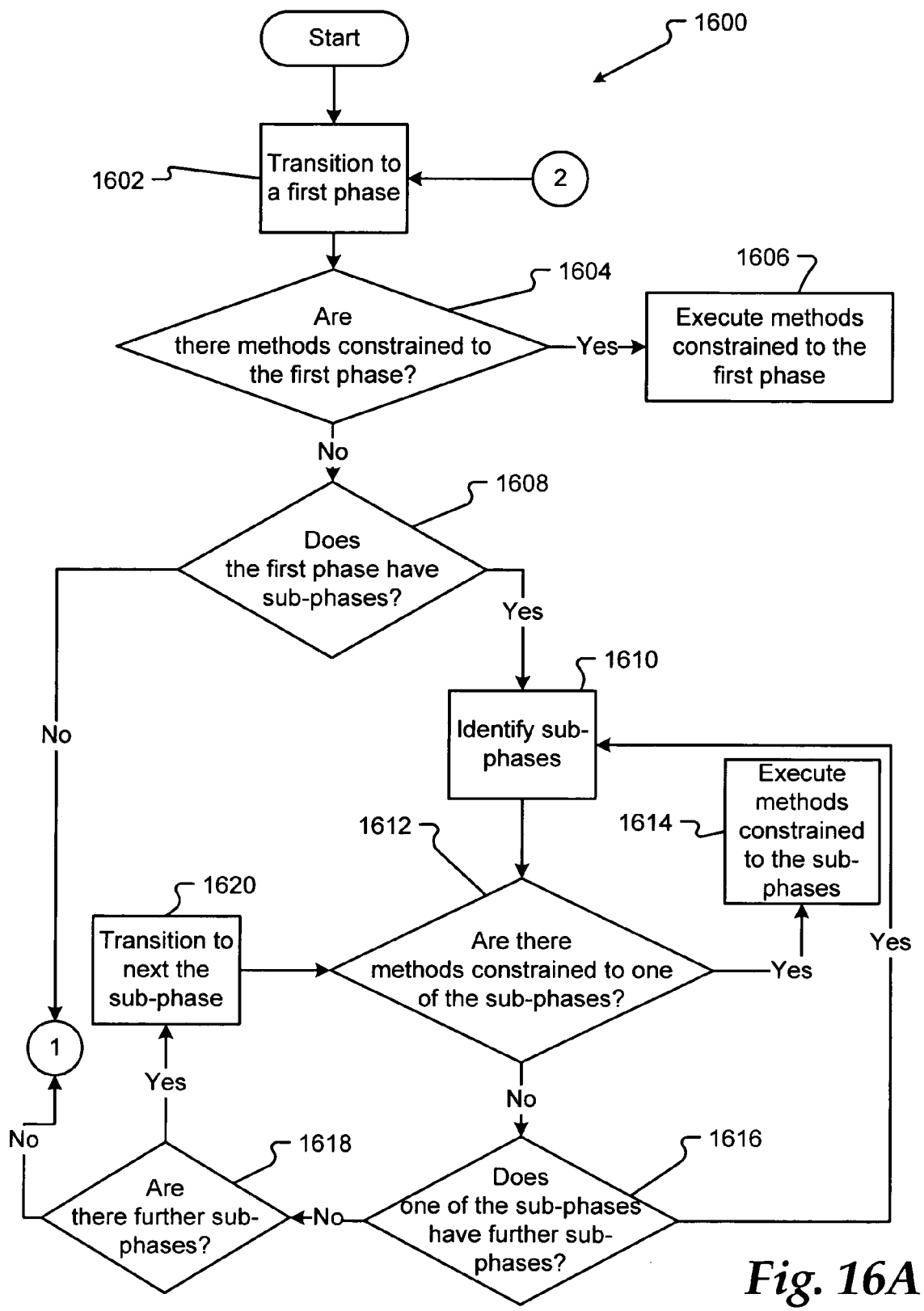
FIG. 16A and FIG. 16B shows an embodiment of a method for phasing the operations of a computer system according to the present invention.
Figure 16B:
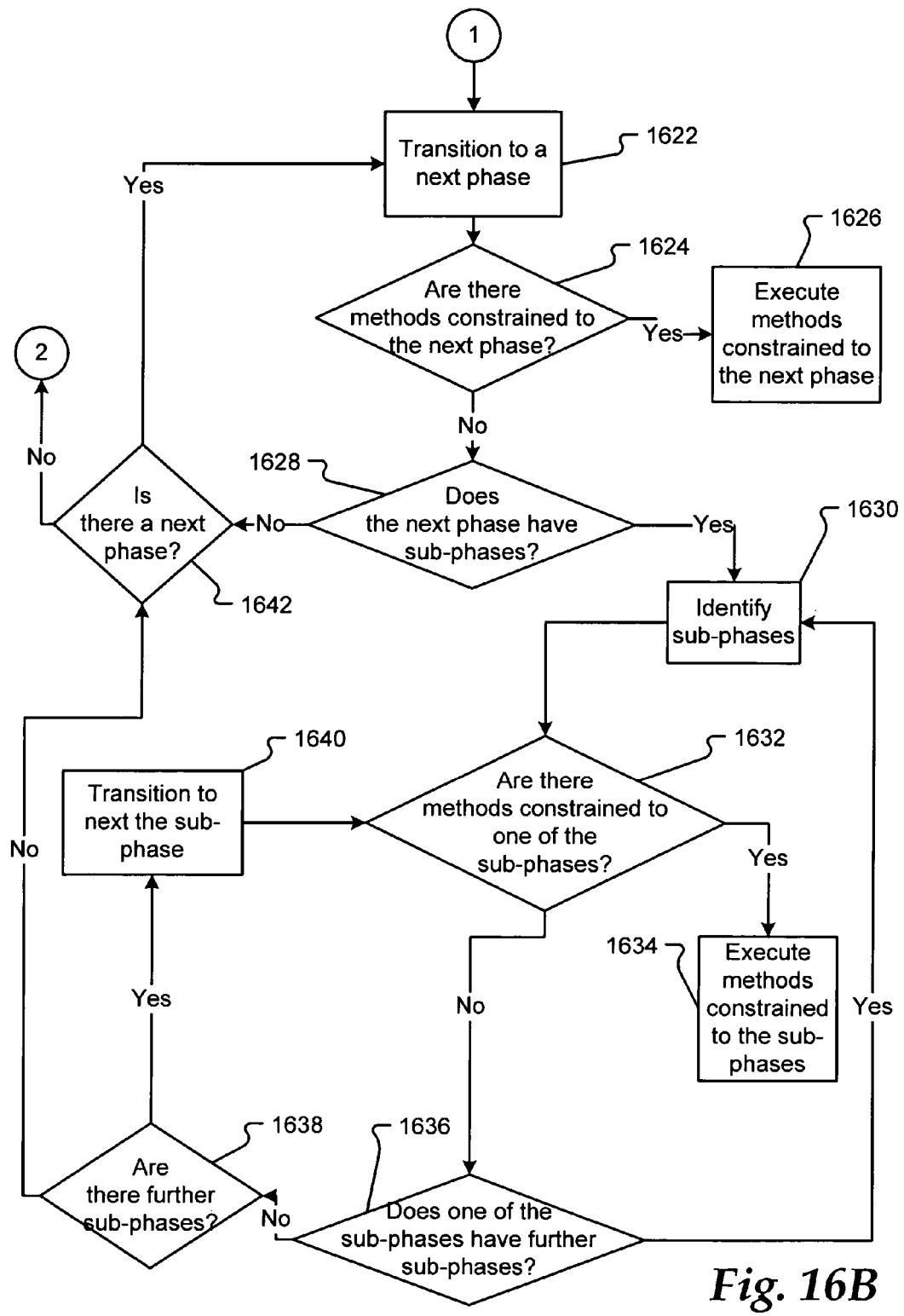

An exemplary embodiment of a method 1600 for operating a computer environment within a multi-tiered phasing domain is shown in FIG. 16A and FIG. 16B. After start-up, transition operation 1602 transitions into a first phase, such as the Request phase 1202. In one embodiment, a master director, such as master director 1102, is initiated. In one embodiment, the components, such as component 1104, constrained to one of the master phases registers with the master director. The master director begins a phase clock to cycle the logical time through the phases within the phase space, such as phase space 1200.

Determine operation 1604 determines if any software components, such as component 1104, are constrained to the first of the master phases. If a software component is constrained to the first phase, an execute operation 1606 executes the software component during the first phase. If there are no software components to execute or during the execution of the software components, determine operation 1608 determines if there is a sub-phase space, such as sub-phase space 1300, that occurs during the first phase. If there are no sub-phase spaces occurring during the first phase, the process proceeds through connector 1 to a transition operation 1622 shown in FIG. 16B.

If there is a sub-phase space that occurs during the first phase, an identify operation 1610 identifies the sub-phase space and the applicable sub-phases. In one embodiment, a sub-director, such as sub-director 1106, is initiated and registers with the master director controlling the master phase space. The sub-director begins a sub-phase logical clock to cycle through the sub-phases in the sub-phase space. Determine operation 1612 determines if there are any software components, such as component 1112, constrained to the current sub-phase. In one embodiment, the software components constrained to the sub-phase space register with the sub-director. Thus, a nested sub-phase domain is created under the master phase domain. If there are software components in the sub-phase domain constrained to the current sub-phase, execute operation 1614 executes those software components during the current sub-phase. Determine operation 1616 determines if there are further sub-phase spaces, such as sub-phases 1410, 1412, and 1414, that occur within the current sub-phase. If there are further sub-phases, the process returns to identify operation 1610 to identify the further sub-phases.

If there are no further sub-phase spaces to identify, determine operation 1618 determines if there are any other sub-phases left to occur in the current sub-phase space. If there is another sub-phase to occur in the current sub-phase space, transition operation 1620 transitions to the next sub-phase in the sub-phase space. In one embodiment, the sub-director waits until all threads in the current sub-phase are executed and then transitions to the next sub-phase. Then, the process proceeds to the determine operation 1612 again. If there are no sub-phases left in the current sub-phase space, then determine operation 1618 determines if there is another super-phase to transition to in any superphase space. If there is another superphase, transition operation 1620 transitions to the next superphase. The process (determining the sub-phases within a superphase; executing software components within the sub-phases; transitioning to the next sub-phase until all sub-phases are complete; and then transitioning to the next superphase) repeats until all sub-phase spaces are cycled through and a transition to a next master phase is required. Once the sub-phase loop ends for the first master phase, the process proceeds through connector 1 to transition operation 1622 shown in FIG. 16B.

Transition operation 1622 transitions to a next master phase, such as the Update phase 1204. In one embodiment, the master director waits for all threads executing in the first phase to end. Then, the master director changes the logical phase clock to the next phase. In some embodiments, the master director follows the transition rules outlined above with reference to FIG. 11. The process then follows a similar operation as the first phase for identifying sub-phases occurs. As such, some details with regard to the sub-phase process are not described again, but one skilled in the art will recognize how to implement the details described with the first phase into any subsequent processes constrained to a next phase.

Determine operation 1624 determines if any software components are constrained to the current master phase. If there are software components constrained to the next master phase, execute operation 1626 executes the software components. In embodiments, the software components have already registered with the master director. The software components continue to check with the master director for the current phase. When the phase transitions and the master director reports that the domain is now in the next master phase, the software components, constrained to the next master phase, begin to execute.

If there are no software components constrained to the next master phase or during the execution of the constrained software components, determine operation 1628 determines if there are any sub-phase spaces within the current master phase. If there are sub-phase spaces, identify operation 1630 identifies the sub-phase space and transitions to a first sub-phase. Determine operation 1632 determines if any software components are constrained to the current sub-phase. If there are software components constrained to the current sub-phase, execute operation 1634 executes the software components If there are no software components constrained to the current sub-phase or during the execution of those software components, a determine operation 1636 determines if there are further sub-phase spaces within the current sub-phase. If there are further sub-phase spaces, the process returns to identify operation 1630. If there are no further sub-phase spaces within the current sub-phase, determine operation 1638 determines if there is a next sub-phase in the current sub-phase space or a next superphase in the superphase space. If there is a next sub-phase or superphase, transition operation 1640 transitions to the next sub-phase or superphase. If there is not a next sub-phase or superphase under the current master phase, then determine operation 1642 determines if there is a next master phase, such as the Revalidate phase 1206. If there is a next master phase, the process returns to the transition operation 1622. If there is not another master phase in the master phase space, the process returns through connector 2 to the transition operation 1602 and starts the phase cycle over by transitioning to the first phase.

Figure 17:
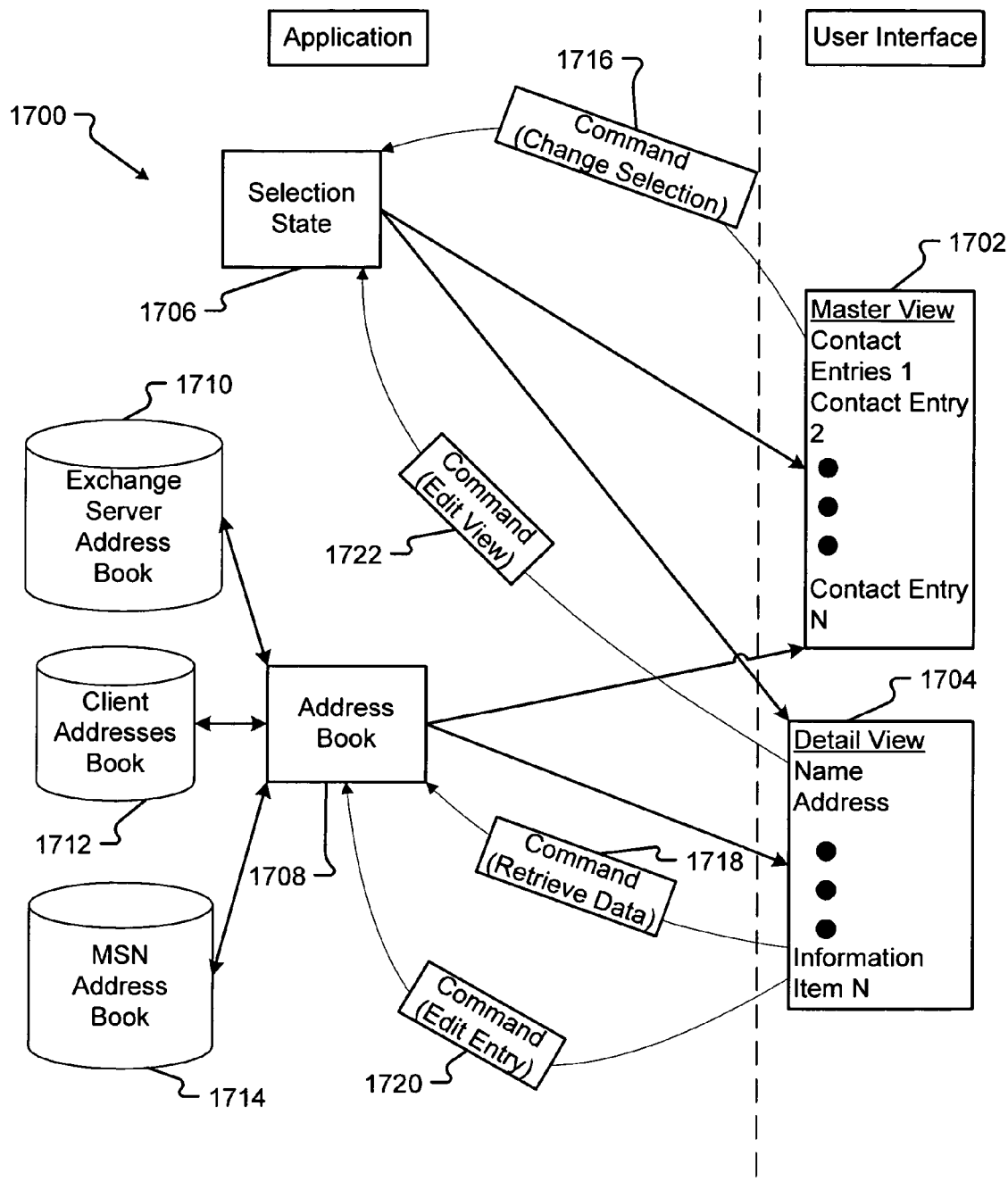
FIG. 17 is an exemplary computer system operating to provide and store user contact information operating in a phased domain according to the present invention.

To further explain the present invention, an exemplary computer system operating within a multi-tiered phasing domain is described below with reference to FIG. 17. The exemplary computer system operates a personal contacts application, such the Microsoft® Outlook® messaging and collaboration client program. Here, a user interface displays one or more contacts in an address book. The user interface has a master view window 1702. The master view 1702 shows all contacts and allows a user to select a contact to view more detailed information about the contact.

The computer environment 1700 operates under a phase space. For purposes of explanation and not limitation, the entire system 1700 operates under the phase space 1200 shown in FIG. 12. In addition, for explanation purposes, the computer system 1700 is currently in a Request phase 1202. As such, the computer system 1700 allows any operation where a request or command is received. Thus, a user command 1716 to view a detailed view 1704 of a contact is received and placed in a queue. In addition, a command 1718 is sent to the address book module 1708 to retrieve the detailed information requested. The data request 1718 is also queued.

A master director 1102 changes the phase in the computer system domain 1700 to an Update phase 1204. Here, the commands 1716 and 1718 are sent to the Selection State module 1706 and the Address book 1708, respectively. A user interface sub-phase space for changes to the user interface, as explained above with reference to FIG. 14, is transitioned into during the Update phase 1204. An invalidate sub-phase begins. The command 1716 for the detailed view 1704 begins processing. Views in the master view 1702 are invalidated. For example, the selection for the detailed view 1704 is set to inactive. In addition, the master view 1702 is set to the inactive window. A detailed view 1704 is created with the appropriate fields and user interface items. The user interface sub-director then transitions to a draw sub-phase. The selection in the master view 1702 for the contact is drawn to appear inactive, e.g., the highlighted selection changes color. The master view 1702 is drawn as inactive. For example, the master view 1702 windowpane changes color to signify that it is inactive. The detailed view 1704 is drawn with the user interface elements. Fields are left open to receive the data from the address book module 1708.

A master director 1102 transitions to the Revalidate phase 1206 after all the invalidating and drawing constrained operations have been completed in the user interface sub-phase space. A data retrieve operation is executed during the Revalidation phase 1206. The data retrieve operation, in one embodiment, is constrained to a data retrieve sub-phase space. The data retrieve sub-phase space has two sub-phases, mark and final mark, as explained with reference to FIG. 13. The mark sub-phase is initiated. The address book searches for software modules that require the update of data. The detailed view 1704 is marked. A sub-director for the data retrieves sub-phase space transitions to a final mark sub-phase. In the final mark sub-phase, the address book 1708 retrieves the required contact information from one of three data stores: an exchange server address book 1710, a client address book 1712, or an MSN address book. Upon retrieving the contact information, the address book 1708 writes the contact information into the detail view 1704.

Upon completing all operations constrained to the Revalidate phase 1206, the master director 1102 transitions back to the Request phase 1202. Here, the user interface again accepts commands and requests from the user input devices. A user inputs a change to the contact information within the detailed view 1704. For example, the user changes the address of a contact. A command 1720 is sent from the detailed view 1704 to the address book 1704 to change the data. In addition, a command 1722 is sent to the selection state 1706 to update the views of the master view 1702 and the detailed view 1704. In this embodiment, the commands would be queued, and the master director 1102 would transition to an Update phase 1204. The Update phase 1204 initiates a data write sub-phase space, such as the sub-phase space 1300.

In an Agreement sub-phase 1302, the address book sends a data change request to the several data stores 1710, 1712, and 1714. One or more of the data stores may contain a copy of the data changed in the detailed view 1704. Thus, each data store that has the data must agree to change the data. Thus, a voting procedure occurs during the Agreement sub-phase 1302. If all data stores agree to commit the change, the agreement is sent back to the address book 1708. The sub-director changes the phase to the Commit or Abort phase 1304. Here, the data change is sent to the data stores and is used to update the data.

Meanwhile, during the Update phase 1204, a user interface sub-phase space occurs. The selection state 1706 invalidates sections of the master view 1702 and the detailed view 1704 containing old data during an invalidate sub-phase. In a draw sub-phase, the master view 1702 and the detailed view 1704 are redrawn holding spaces for the changed data. Upon all sub-phases completing in the Update phase 1204, the phase domain 1700 transitions to a Revalidate phase 1206.

In the Revalidate phase 1206, further sub-phase spaces include sub-phases for Mark and Final Mark. Transitioning into the Mark phase, the address book 1708 marks the master view 1702 and the detailed view 1704 as requiring the changed data. In the Final Mark sub-phase, the changed data is written into the master view 1702 and the detailed view 1704. These changes can occur in a very short amount of time and in a fine granularity. For instance, the phases are cycled after every character entered by the user and in minute fractions of a second. Thus, the changes would appear to happen instantaneously.

The present example demonstrates how multi-tiered phasing constrains on the execution of methods within a system. If the commands and the changes happened without phasing, it is possible that the master view 1702 and the detailed view 1704 may be updated before all the data store have changed the data. Therefore, the user may view mixed results in the detailed view 1704 or the master view 1702 depending on the order of the methods attempting to change the data and to update the user interface views.

Multithreading with Concurrency Domains

Figure 18:
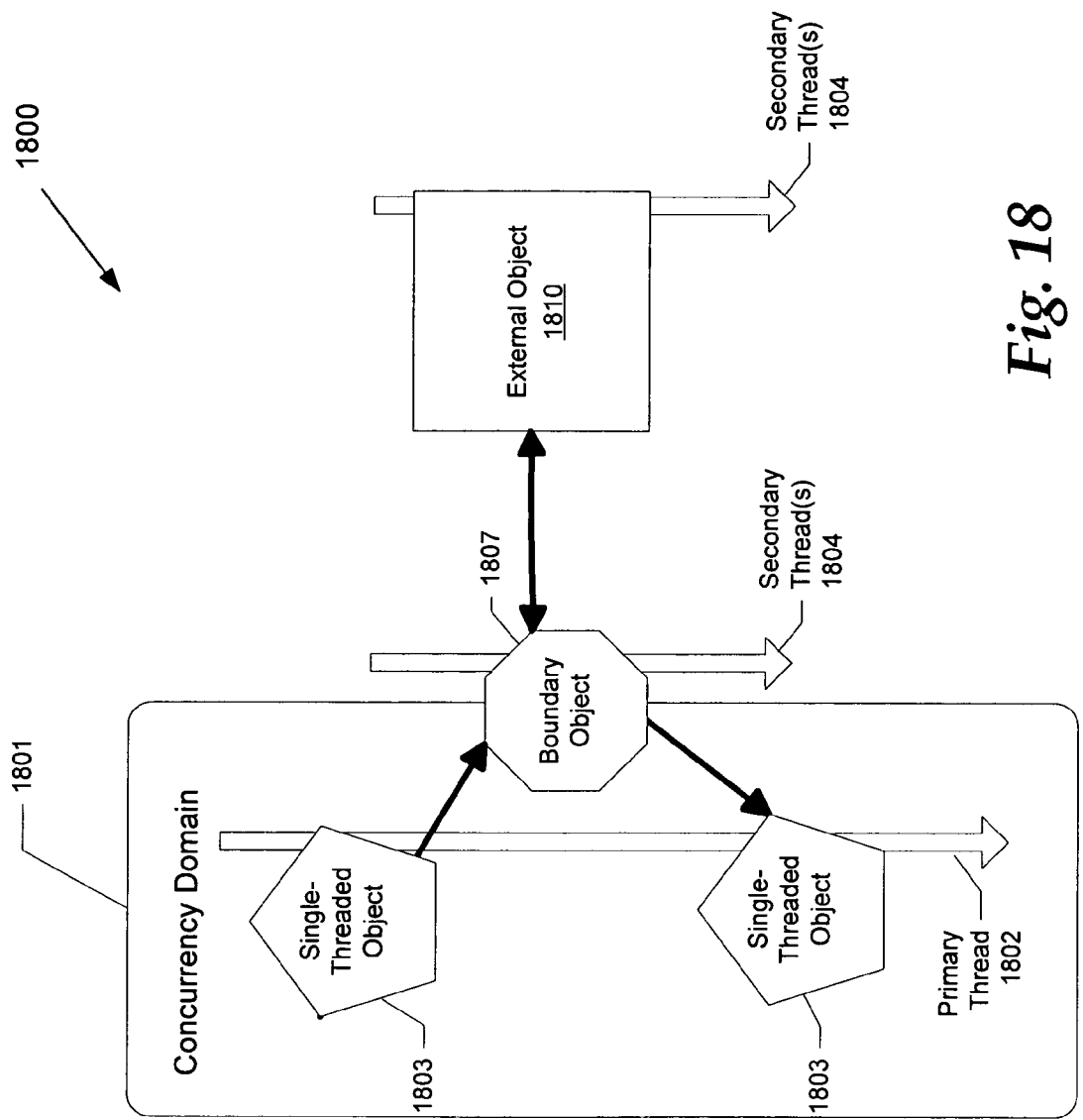
FIG. 18 illustrates an example system configured to concurrently execute multiple objects according to one embodiment of the present invention.

As briefly described above, applications and/or application components may be constrained to certain phases or certain phase domains. According to embodiments of the present invention components of a software application may be partitioned into separate domains for providing synchronization and thread isolation within partitions of components and for providing for improved concurrent operations between partitions of components. FIG. 18 illustrates an example system configured to concurrently execute multiple objects according to one embodiment of the present invention. The example system 1800 includes a concurrency domain 1801, which is a collection (or partition) of one or more single-threaded objects 1803 that all execute on a single thread 1802 and which do not directly (e.g., or synchronously) communicate with external objects 1810. The internal thread 1802 executes the objects 1803 according to logic imposed by the concurrency domain 1801. The internal thread 1802 executes only the single-threaded objects 1803 within the concurrency domain 1801. The internal thread 1802 does not execute any external objects 1810.

According to one embodiment, the same thread need not be used as the internal thread 1802 throughout the life of the concurrency domain 1801. Rather, when no objects need to execute on the internal thread 1802, the thread serving as the internal thread 1802 may return to a thread pool (not shown). When a thread is once again needed, a new thread may be pulled from the thread pool to act as the internal thread 1802. According to another embodiment, one of the single-threaded objects 1803 has thread affinity, meaning that the single-threaded object 1803 needs to execute on the same thread. In this embodiment, the same thread serves as the internal thread 1802 throughout the life of the concurrency domain 1801. According to one embodiment, secondary threads 1804, discussed in more detail herein, are also allocated from the thread pool.

Referring still to FIG. 18, the system 1800 further includes at least one secondary thread 1804 and at least one external object 1810. Embodiments of external objects 1810 include any object executing on one or more secondary threads 1804. Secondary threads 1804 include any thread other than the internal thread 1802 executing in the associated application. As described above, the example concurrency domain 1801 illustrated in FIG. 18 includes an internal thread 1802 and multiple single-threaded objects 1803. These single-threaded objects 1803 are executed using only the internal thread 1802.

The objects 1803 within a concurrency domain 1801 are isolated from the rest of the secondary threads 1804 and external objects 1810 in the program. Secondary threads 1804 do not execute any single-threaded object 1803 included within the concurrency domain 1801. Each external object 1810 is configured for execution on one or more of the secondary threads 1804. External objects 1810 asynchronously communicate with the single-threaded objects 1803 within a concurrency domain 1801. Communication includes the passing of data between objects or the invocation of one object's methods (e.g., or tasks) by another object.

Asynchronous communication across concurrency domain 1801 boundaries is achieved through the use of boundary objects 1807. Each concurrency domain 1801 is associated with one or more boundary objects 1807. These boundary objects 1807 can be viewed as a membrane or gated wall enclosing the concurrency domain 1801. Examples of boundary objects 1807 include data connectors and objects that implement custom protocols between concurrency domains 1801 or between a concurrency domain 1801 and an external object 1810.

Single-threaded objects 1803 within the concurrency domain 1801 use one or more boundary objects 1807 to asynchronously communicate with the external objects 1810. The single-threaded objects 1803 communicate with the boundary object 1807 using the internal thread 1802. The boundary object 1807 then communicates with the external object 1810 using one or more secondary threads 1804. The boundary object 1807 thereby passes information and invocations across the boundaries of the concurrency domain 1801. According to another embodiment, one boundary object 1807 communicates with another boundary object 1807 using the secondary thread 1804 before passing information to the external object 1810.

The boundary object 1807 acts as an interface between the internal thread 1802 of the concurrency domain 1801 and each of the secondary threads 1804. According to one embodiment, the boundary object 1807 receives an inbound communication from an external object 1810 using a secondary thread 1804 and filters the communication to the appropriate internal objects 1803. The filtering method will be described in more detail herein. According to another embodiment, the boundary object 1807 receives an outbound communication from an internal object 1803 using the internal thread 1802 and transmits the communication to the appropriate external objects 1810 using a secondary thread 1804. According to one embodiment, boundary objects may call out to external objects on an internal thread, but the boundary objects doing so are under constraints. That is, allowing boundary objects to call out to external objects must not cause unbounded delays or deadlocks by doing so. Another constraint prevents external objects from holding references to internal objects that prevents direct reentrancy of the concurrency domain under the control of external objects.

Synchronous communication occurs when the thread on which a first object is executing enters a second object to execute a method of the second object. External objects 1810 do not synchronously communicate with the single-threaded objects 1803 within the concurrency domain 1801. Accordingly, a secondary thread executing an external object 1810 does not directly call into or enter a single-threaded object 1803 within the concurrency domain 1801.

Figure 19:
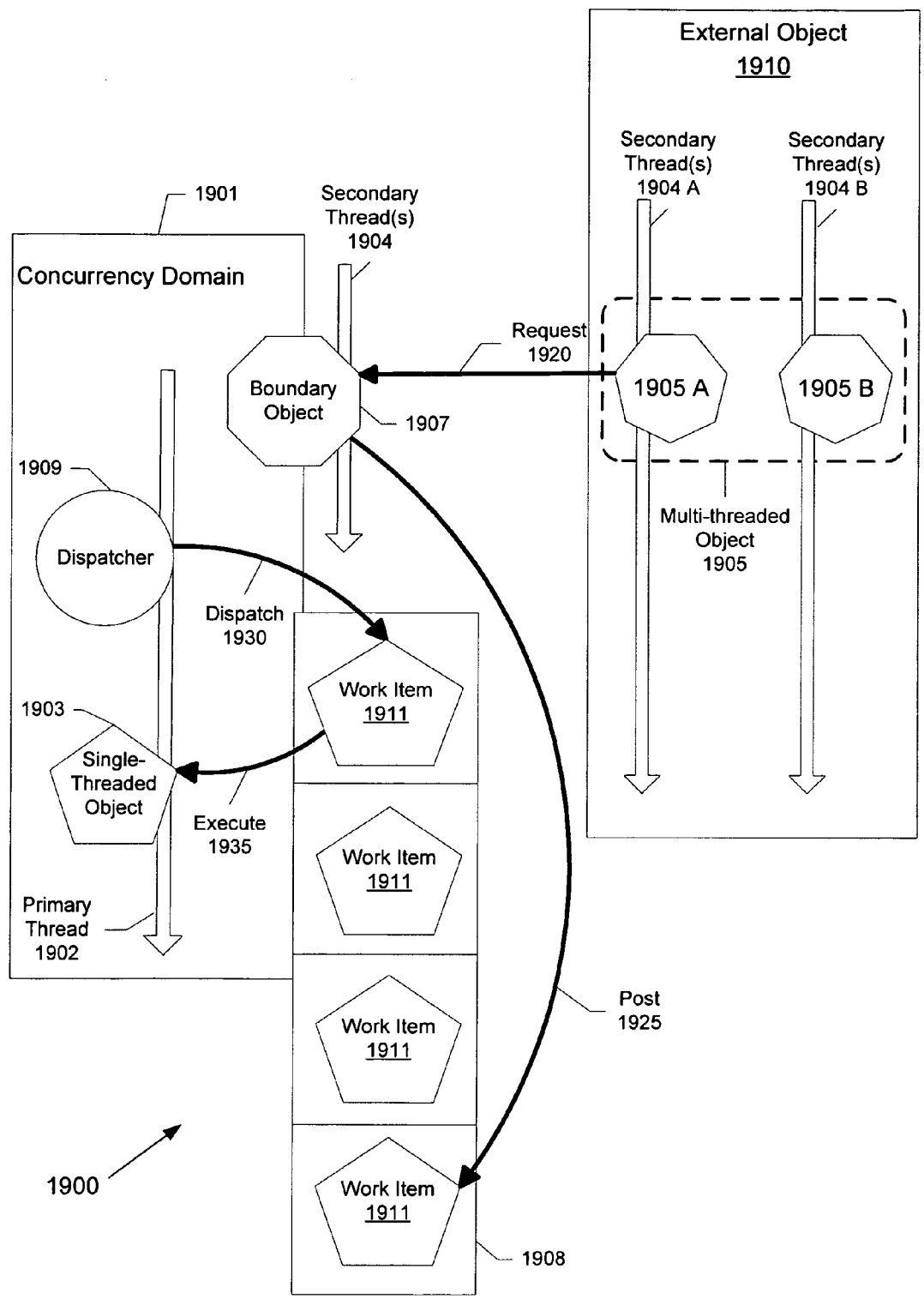
FIG. 19 illustrates another example system configured to concurrently execute multiple objects according to one embodiment of the present invention.

FIG. 19 illustrates another example system 1900 in which a concurrency domain 1901 interfaces with an external object 1910. One example of asynchronous communication is illustrated between an external object 1910 and an internal object 1903. The concurrency domain 1901 includes a internal thread 1902, a single-threaded object 1903 configured for execution on the internal thread 1902, and a boundary object 1907 for communicating with the external object 1910. Another embodiment of this system 1900 includes multiple boundary objects 1907 and multiple single-threaded objects 1903.

According to one embodiment, the external object 1910 includes a multithreaded object 1905 configured for execution on two or more secondary threads 1904. One portion 1905A of the multithreaded object 1905 is shown executing on one secondary thread 1904A and another portion 1905B of the multithreaded object 1905 is shown executing on another secondary thread 1904B. According to another embodiment, the external object 1910 includes a plurality of multithreaded objects 1905 or a single-threaded object (not shown) configured for execution on one secondary thread 1904.

The concurrency domain 1901 in the system 1900 maintains a work queue 1908. The work queue 1908 is a multi-element data structure on which tasks (e.g., invocations of methods of internal, single-threaded objects 1903, data updates, and other executable methods) are posted (e.g., inserted) and from which tasks are removed. According to one embodiment, tasks are removed from the work queue 1908 only in the same order in which they were posted; that is, according to a first in, first out constraint. According to another embodiment, tasks posted to the work queue 1908 are assigned a priority and each task is removed according to its priority.

Incoming communications are posted to the work queue 1908 by the boundary object 1907. These posted communications form work items 1911, which are requests (e.g., invocations or calls) for the execution of tasks of an internal, single-threaded object 1903 or a boundary object 1907 associated with the concurrency domain 1901. The request that forms the work item 1911 can be communicated to the boundary object 1907 by an external object 1910 or by another boundary object 1907. For example, in FIG. 19, the multi-threaded object 1905 of the external object 1910 requests the boundary object 1907 to perform a task as depicted by arrow 1920. The boundary object 1907 then posts a work item 1911, including the task, to the end of the work queue 1908 as depicted by arrow 1925. According to another embodiment, multiple boundary objects 1907 are associated with the concurrency domain 1901 and one or more of these boundary objects 1907 may post work items 1911 to the work queue 1908. According to yet another embodiment, an internal, single-threaded object 1903 requests a boundary object 1907 to post a work item 1911 to the work queue 1908 to defer execution of a task to a later time.

According to one embodiment, to conserve resources when preparing to post a new task to the work queue 1908, the boundary object 1907 checks the work queue 1908 and determines whether any of the queued work items 1911 include related tasks. If there are related tasks, the boundary object 1907 can selectively bundle the new task with a previously queued related task as a subtask rather than posting the new task as an entirely new work item 1911.

Referring still to FIG. 19, according to one embodiment, the concurrency domain 1901 includes a dispatcher 1909 for dispatching work items 1911 from the work queue 1908 to a single-threaded object 1903 for processing. The dispatcher 1909 uses the internal thread 1902 to remove work items 1911 from the work queue 1908 and dispatches each work item 1911 for execution on the internal thread 1902. The dispatcher 1909 invokes the task included in the work item 1911. For example, in FIG. 19, the dispatcher 1909 dispatches a work item 1911 from the work queue 1908 as depicted by arrow 1930. The work item 1911 then executes on the internal thread 1902 as depicted by arrow 1935.

According to one embodiment, posting a work item 1911 to the work queue 1908 does not force the dispatcher 1909 to act. Rather, execution of work items 1911 is deferred to a point in time dictated by a top-level cycle logic of the concurrency domain 1901. Once the work item 1911 is posted to the work queue 1908, the internal thread 1902 executes the requested task in the next appropriate cycle of the concurrency domain 1901 as determined by the dispatcher 1909. Accordingly, external objects 1910 do not determine when a work item 1911 is removed and hence when a task of an internal, single-threaded object 1903 is invoked and executed. External objects 1910 also do not determine when boundary objects 1907 execute tasks on the internal thread 1902 of the concurrency domain 1901.

Once a task is dispatched and completed, the out-bound result is passed to the boundary object 1907 as a callback. The boundary object 1907 then communicates the callback to the external object 1910 that originally posted the work item 1911 that invoked the task that achieved the result. Examples of callbacks include data flags indicating the task is complete, method calls, and the like.

Figure 20:
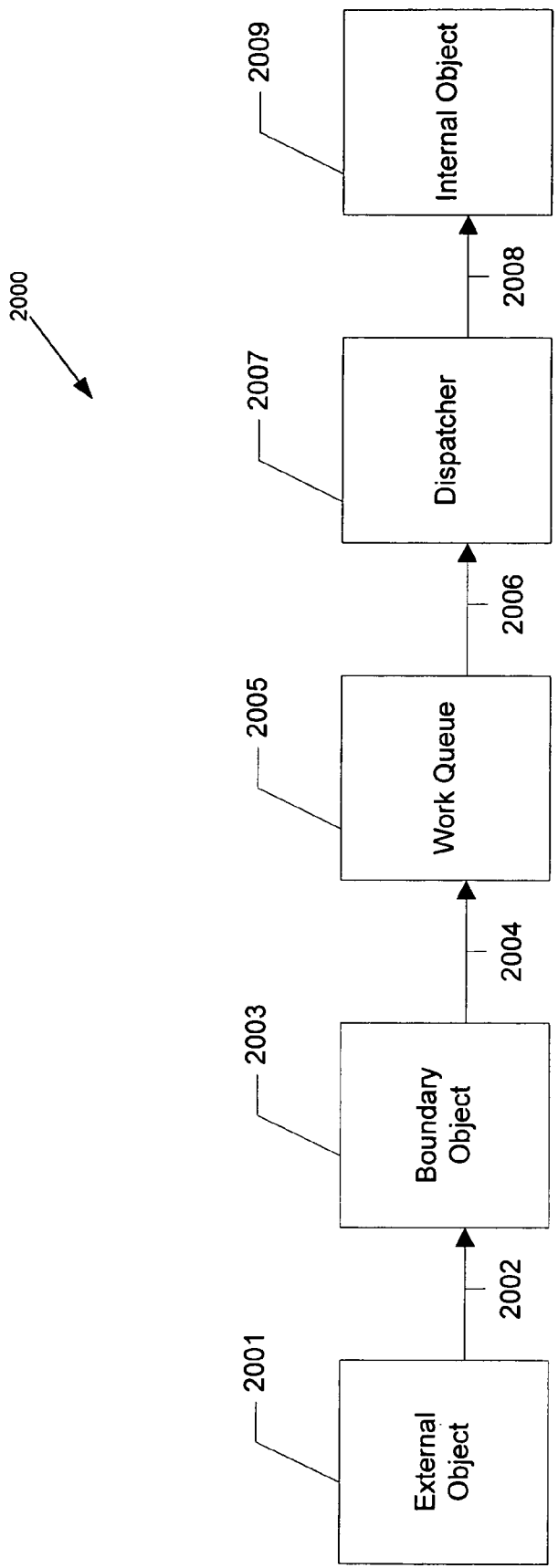
FIG. 20 depicts asynchronous communication between an internal, single-threaded object and an external object.

FIG. 20 depicts asynchronous communication between an internal, single-threaded object and an external object. According to an embodiment of the invention, a chain of communication 2000 occurring during asynchronous communication between an external object 2001 and an internal, single-threaded object 2009 is illustrated. The external object 2001 first communicates 2002 with a boundary object 2003. This communication 2002 is generally in the form of an invocation or a request to invoke one or more of the tasks associated with the concurrency domain (not shown). While the requested task is actually a task of the single-threaded object 2009, the external object 2001 only associates the task with the concurrency domain or the boundary object 2003.

The boundary object 2003 then communicates 2004 with a work queue 2005. This communication 2004 generally includes posting a work item (not shown) to the work queue 2005. The work queue 2005 then communicates 2006 with a dispatcher 2007. This communication 2006 generally includes the dispatcher 2007 sequentially dispatching each work item posted on the work queue 2005. Finally, the dispatcher 2007 communicates 2008 with the internal, single-threaded object 2009 whose task is being invoked. This communication 2008 generally includes the invocation of the task of the internal, single-threaded object 2009. In another embodiment, the external object 2001 is communicating with another boundary object (not shown) of the concurrency domain.

The asynchronous communication across concurrency domain boundaries, described above with reference to FIGS. 18-20, protects internal, single-threaded objects from reentrancy problems. As will be appreciated, internally controlled reentrancy results when an object under the control of the top-level logic of the concurrency domain (e.g., an internal, single-threaded object or a boundary object) directs the internal thread to reenter another object also under the control of the top-level logic. Externally controlled reentrancy results when an object not under the control of the top-level logic of the concurrency domain (e.g., an external object) directs the internal thread to reenter an object under the control of the top-level logic. Internally caused reentrancy results when an internal object reenters itself or another object in the same concurrency domain. Externally caused reentrancy results when events caused by external objects influence reentrancy, effectively removing control over reentrancy from the logic embodied collectively in the internal objects of a concurrency domain. The result is non-deterministic reentrancy.

Referring back to FIG. 19, allowing only asynchronous communications across the boundaries of a concurrency domain 1901 protects internal, single-threaded objects 1903 from externally controlled reentrancy. For example, if the execution of an internal, single-threaded object 1903 includes an invocation of a task of an external object 1910, then the internal thread 1902 will enter one of the boundary objects 1907 associated with the concurrency domain 1901 and will invoke the task responsible for requesting the execution of tasks of external objects 1910. The internal thread 1902 will then return to executing the task of the internal, single-threaded object 1903 or to executing dispatched work items 1911 from the work queue 1908. Because the internal thread 1902 does not leave the concurrency domain 1901 to enter the external object 1910, it does not fall under the control of the external object 1910.

Furthermore, if the internal thread 1902 is allowed to execute the task of the external object 1910 and if the execution of that task included an invocation of another task of the internal, single-threaded object 1903, the internal thread 1902 would not be allowed to reenter the concurrency domain 1901. Rather, the internal thread 1902 would enter a boundary object 1907 of the concurrency domain 1901 to invoke the task responsible for posting work items 1911. Alternatively, as described above, under certain constraints, boundary objects may call out to external objects on an internal thread for invocation of task. After invocation of the task, the internal thread 1902 would return to executing the task of the external object 1910 and subsequently return to executing the first, original task of the internal, single-threaded object 1903. In other words, the internal thread 1902 would not execute the invocation of the second task by the external object 1910 until execution of the first task is complete and until directed to do so by the dispatcher 1909 of the concurrency domain 1901.

Figure 21:
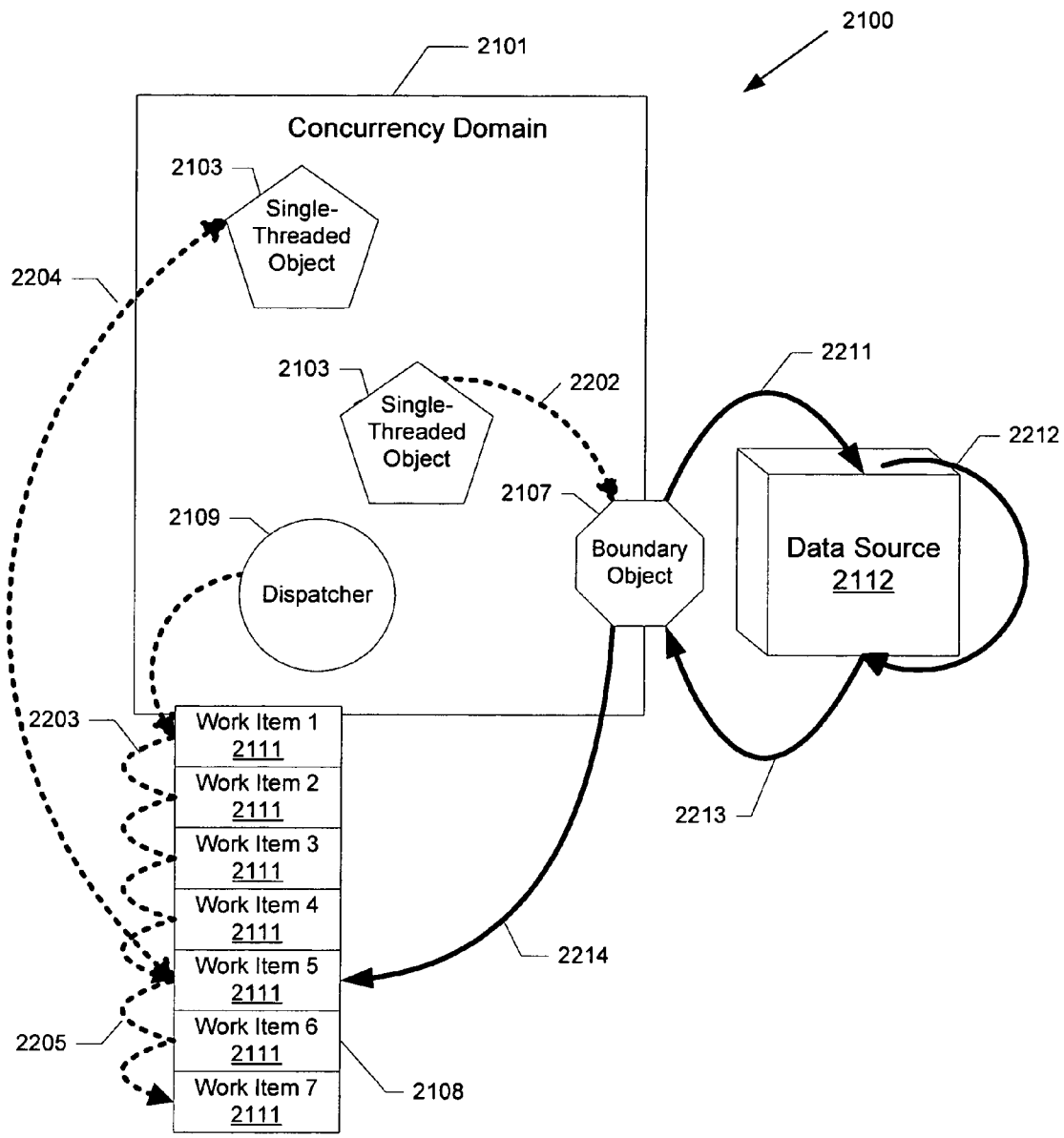
FIG. 21 illustrates an example path of execution when a concurrency domain interfaces with a database.
Figure 22:
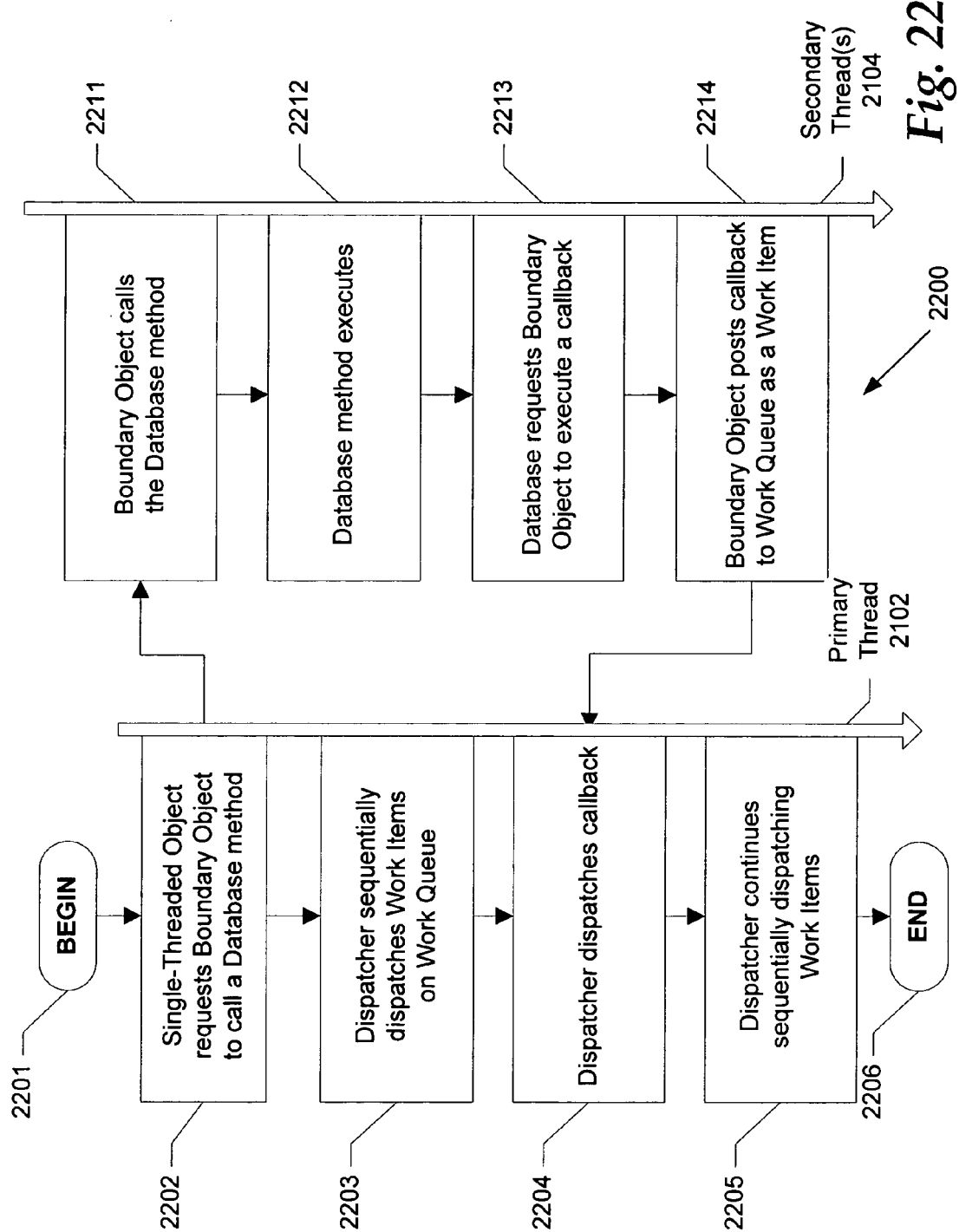
FIG. 22 illustrates an operational flow chart in which a first concurrency domain interfaces with a database.

Referring now to FIGS. 21 and 22, embodiments of the present invention in terms of an example external object that includes a data source are described. FIG. 21 illustrates a system 2100 including a concurrency domain 2101 and a data source 2112, and FIG. 22 illustrates an operational flow chart 2200 depicting the interface between an internal thread 2102 of the concurrency domain 2101 and a secondary thread 2104 of the data source 2112. In one embodiment, the secondary thread 2104 includes multiple secondary threads 2104. The concurrency domain 2101 includes a single-threaded object 2103 and a dispatcher 2109 and is associated with a boundary object 2107. The concurrency domain 2101 maintains a work queue 2108 representing pending tasks to be executed on the internal thread 2102 of the concurrency domain 2101. In one embodiment, the data source 2112 is a database. In another embodiment, the data source 2112 is a network.

The paths of execution of the internal thread 2102 and the secondary thread 2104 are shown in both figures. In FIG. 21, the dashed arrows depict the execution of a task occurring on the internal thread 2102, and the solid arrows depict the execution of a task occurring on one or more of the secondary threads 2104. The numbers referring to the dashed and solid arrows correspond to the operation or task being performed with respect to FIG. 22, which illustrates each task arranged along the thread on which it is executed.

Referring still to FIGS. 21 and 22, the method begins at start block 2201 and proceeds to operation 2202 in which the single-threaded object 2103 requests the boundary object 2107 to invoke a task associated with the data source 2112. This request is executed on the internal thread 2102 of the concurrency domain 2101. In operation 2203, the dispatcher 2109 sequences through the work queue 2108 and dispatches each work item 2111. According to one embodiment, the work items 2111 are dispatched, using the internal thread 2102, in the order they were posted to the work queue 2108. For example, the dispatcher 2109 begins sequencing with work item 1 and ends sequencing with work item 7, assuming that no new work items 2111 are added in the interim. Any new work items 2111 would be added after work item 7. According to another embodiment, the work items 2111 are dispatched according to an assigned priority value.

Method 2202 also leads to method 2211, which is executed simultaneously with operation 2202. In method 2211, the boundary object 2107 invokes a task associated with the data source 2112. The invocation is performed on one of the secondary threads 2104. Next, the method proceeds to operation 2212 in which the task of the data source 2112 is executed on one or more of the secondary threads 2104. Next, operation 2213 includes the database 2112 transmitting the result of the execution back to the boundary object 2107 as a callback. The transmission of the result occurs on one or more of the secondary threads 2104. Then, in operation 2214, the boundary object 2107 posts the callback to the work queue 2108 as a work item 2111. The post is executed on one or more of the secondary threads 2104.

From operation 2214, the method proceeds to operation 2204. Operation 2203 also leads into operation 2204. Operation 2204 occurs when the dispatcher 2109, which was sequentially executing the work items 2111 in the work queue 2108 in operation 2203, reaches the callback work item 2111 added by the boundary object 2107 in operation 2214. The dispatcher 2109 dispatches the callback using the internal thread 2102. Once the callback has been dispatched, the dispatcher 2109 continues to sequentially dispatch each work item 2111 in the work queue 2108 in operation 2205. The method ends at 2206.

Figure 23:
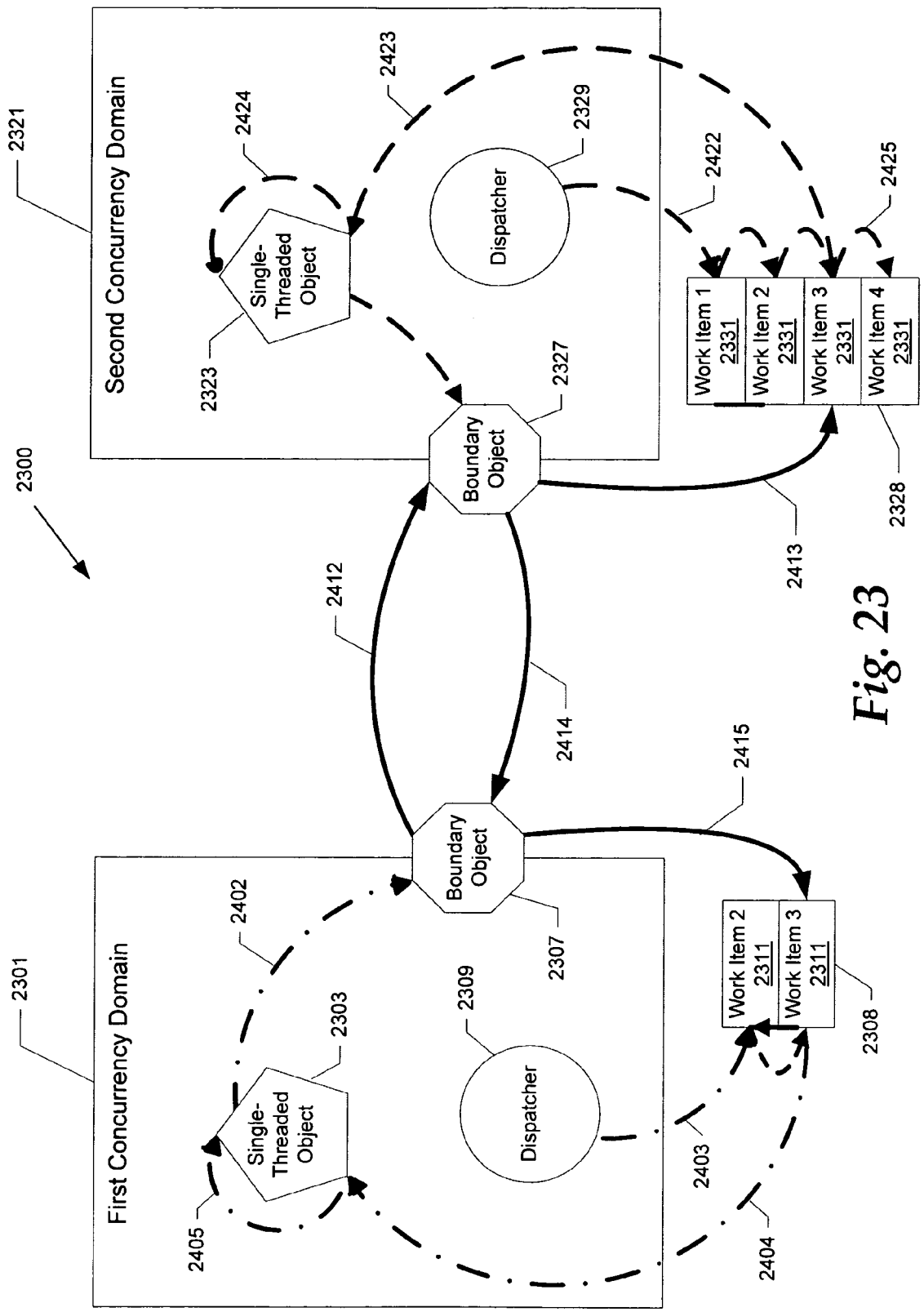
FIG. 23 illustrates an example path of execution when a first concurrency domain interfaces with a second concurrency domain.
Figure 24:
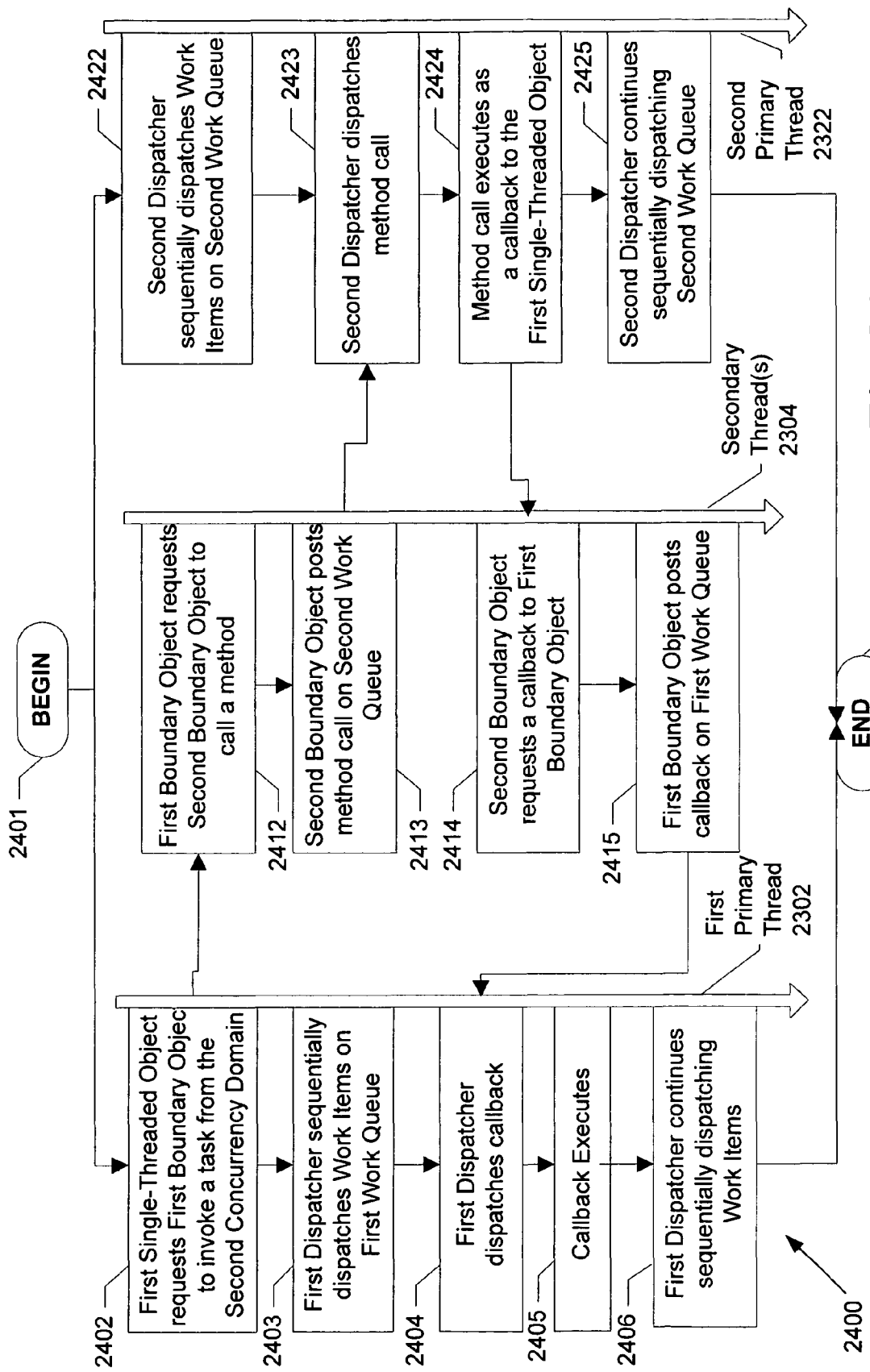
FIG. 24 illustrates an operational flow chart in which a first concurrency domain interfaces with a second concurrency domain.

Referring now to FIGS. 23 and 24, embodiments of the present invention in terms of an example external object that includes a second concurrency domain are described. FIG. 23 illustrates a system 2300 including a first and second concurrency domain 2301, 2321 respectively, and FIG. 24 illustrates an operational flow chart 2400 in which the first concurrency domain 2301 interfaces with the second concurrency domain 2321. Each concurrency domain 2301, 2321 includes an internal thread 2302, 2322, a single-threaded object 2303, 2323, and a dispatcher 2309, 2329, respectively. Each concurrency domain 2301, 2321 is associated with a boundary object 2307, 2327 and maintains a work queue 2308, 2328 representing pending work items 2311, 2331 to be executed on the internal thread 2302, 2322, respectively. In FIG. 23, a first set of dashed arrows depicts the execution of tasks occurring on the internal thread 2302, a set of solid arrows depicts the execution of tasks occurring on one or more of the secondary threads 2304, and a second set of dashed arrows depicts the execution of tasks occurring on the second internal thread 2322. These dashed and solid arrows are shown executing the various operations involved in communicating between the first concurrency domain 2301 and the second concurrency domain 2321. The reference numbers referring to these arrows correspond with the operation or task being performed with respect to FIG. 24.

Referring still to FIGS. 23 and 24, the method begins at start block 2401 and proceeds to both operations 2402 and 2422. Operation 2422 includes the dispatcher 2329 of the second concurrency domain 2321 using the internal thread 2322 to sequentially dispatch each work item 2331 on the work queue 2328. Operation 2402 is performed concurrently with operation 2422. In operation 2402, the single-threaded object 2303 of the first concurrency domain 2301 requests the boundary object 2307 to invoke a task from one of the objects of the second concurrency domain 2321. In one embodiment, the requested task is a task of one of the single-threaded objects 2323 of the second concurrency domain 2321. In another embodiment, the requested task is a task of one of the boundary objects 2327 associated with the second concurrency domain 2321.

From operation 2402, the method proceeds to both operations 2403 and 2412. In operation 2403, the dispatcher 2309 of the first concurrency domain 2301 sequentially dispatches each work item 2311 on the work queue 2308. In operation 2412, the boundary object 2307 of the first concurrency domain 2301 uses one or more of the secondary threads 2304 to communicate with the boundary object 2327 of the second concurrency domain 2321. The communication includes the request to invoke the task. Then, in operation 2413 the second boundary object 2327 posts the requested task to the work queue 2328 as a work item 2331. The post is executed using one or more of the secondary threads 2304.

Both operations 2413 and operations 2422 lead to operation 2423. In operation 2423, the dispatcher 2329 reaches and dispatches the work item 2331 including the requested task. The dispatch is executed on the internal thread 2322 of the second concurrency domain 2321. Then, the task is executed as a callback to the single-threaded object 2303 in the first concurrency domain 2301 in operation 2424. At this point, the method again splits, proceeding to both operations 2425 and 2414. In operation 2425, the dispatcher 2329 continues to sequentially dispatch each work item 2331 on the work queue 2328.

Operation 2414 occurs concurrently with operation 2425. In operation 2414, the boundary object 2327 of the second concurrency domain 2321 uses one or more secondary threads 2304 to request the boundary object 2307 of the first concurrency domain 2301 to post the callback to the work queue 2308 as a work item 2311. Next, in operation 2415, the boundary object 2307 posts the call back to the work queue 2308. The post is executed on one or more of the secondary threads 2304.

Operation 2404 occurs when the dispatcher 2309 of the first concurrency domain 2301 reaches the callback posted on the work queue 2308. The dispatcher 2309 uses the internal thread 2302 of the first concurrency domain 2301 to dispatch the callback. The callback executes in operation 2405. Next, the method proceeds to operation 2406 in which the dispatcher 2309 continues to sequence through the work queue 2308, dispatching each work item 2311 in order. The method ends at 2406.

Another example of a system (not shown) includes three or more concurrency domains interfacing with each other and with other external objects. Such a system would function substantially according to the same operations as described herein. Each concurrency domain in the system would include an internal thread, one or more single-threaded objects, and a dispatcher. Each concurrency domain would be associated with at least one boundary object and would maintain a work queue. All communications across the boundaries of the concurrency domains would be asynchronous (e.g., filtered through the respective boundary objects, work queues, and dispatchers).

Application Description Language

As briefly described above, embodiments of the present invention include an application description (XAD) and an application description (XAD) engine for providing declarative rules and descriptions of all applications and components included within an application framework, such as the application 304, described above with reference to FIG. 3. Aspects of certain embodiments relate to a declarative or descriptive language for authoring data flows, data bindings, and rules that characterize applications. Other aspects relate to a runtime engine, which, at runtime, processes or executes the declarative application, i.e., "application description" to create objects (via builders) which view and/or process data. Consequently, a developer need not write the actual code for the objects that do the data processing, but need only write the declarative application file that is ultimately compiled and executed. As will be discussed in detail below, such a system provides numerous benefits over prior art methods of programming applications.

The use of such a declarative language is different from the use of an imperative language by declaratively modeling an application's data, processing and conversion of the data, user interface (UI) and the way the UI interacts with the data. Embodiments of the present invention relate to a particular declarative language used to characterize XML application framework (XAF) applications. The declarative language is sometimes referred to herein as XAF Application Definition (XAD). Although much of the implementation details described herein refer to the use of XML, those skilled in the art will recognize that other syntaxes could be used to implement aspects of the present invention.

As may be appreciated, in order to provide such separation between the declarative application file and the configuration of instantiated objects that perform the data processing, in an embodiment, a platform may be used, such as a platform that builds and executes applications. In accordance with aspects of the present invention, the platform used is referred to herein as the XAF platform, which is a platform for building and executing such software applications. In particular, XAF also uses XML to uniformly represent data, and employs a highly componentized approach to building each application. In an embodiment, XAF leverages XML to provide powerful data transformation capabilities and rich data. Both external data and application state can be accessed and manipulated using XML's capabilities. User interfaces and complex data flows may be defined in XAD.

Figure 25:
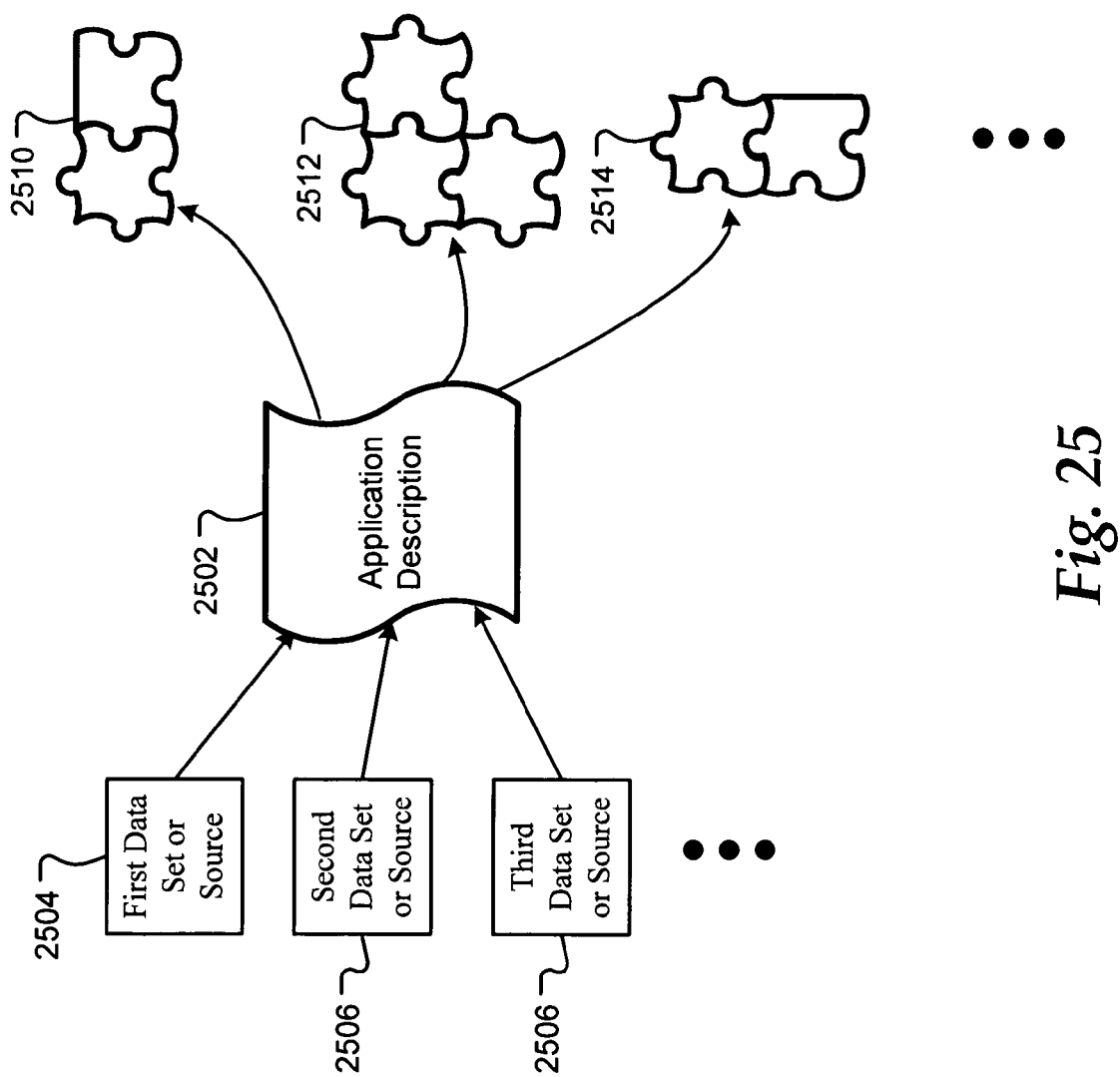
FIG. 25 is a high-level depiction of an application description in relationship with data and objects created to form an executable application.

As stated, XAD is a declarative language used to author XAF applications. FIG. 25 is a high-level depiction of an application description in relationship with data and objects created to form an executable application. XAD is used to create an application description 2502 that declares or describes data, such as data sets or stores 2504, 2506 and 2508, such that, at runtime, components 2510, 2512 and 2514 are created to process, view and/or edit the data, essentially constructing a configuration of objects that make up an executing application.

In the exemplary embodiments herein, the application description 2502 is expressed as a set of declarative constructs, such as well-formed XML. The application description 2502, therefore describes how one or more objects 2510, 2512 and 2514 should be configured within the executing application. In essence, the application description 2502 is used to compute the configuration of the application but not the results of the application, which is done by objects 2510, 2512 and 2514. Since the objects 2510, 2512 and 2514 may be used by other applications written in non-declarative languages, XAD improves application development by reuse of such objects. Further, XAD enables the dynamic creation and modification of applications in ways not possible using traditional, static declarative application definitions as discussed in more detail below.

With respect to the data 2504, 2506 and 2508 shown in FIG. 25, these sources may relate to text data stores, SQL database stores, XML sources, Web Service sources, etc. Indeed, the application description 2502 is considered to be centered around the data, such that it is data centric. Application state may be considered another source of "data" and treated in a similar manner as more conventional data on which the configuration of objects 2510, 2512 and 2514 is operating. The developer is thus primarily concerned with specifying the way that data flows through the application, and the rules that govern how the application responds to that data. XAD provides a simple and inexpensive way to build and alter applications, which enables the targeting of diverse software application niches and a low complexity bar for new developers. Applications built using the claimed invention have the ability not only to aggregate and transform data flowing into the application, but also to select one or more user interfaces most appropriate for the data type.

The objects 2510, 2512 and 2514 represent well-factored components, such as viewers, editors, transformers, etc. The application description can call "pre-programmed" components and/or add new components to the set.

Objects have well-defined types, so the corresponding XAD tags and parameters have corresponding types in the XAD language. XAD is strongly typed and the XAD compiler detects errors statically. Tags and parameters have return types and cardinality constraints. Additionally, data-types support several additional constraints: schema, conversion requirements, and accessor availability (accessors are strongly typed object facades for XML data).

XAD not only allows existing applications to be modified or augmented simply by altering one or more text files, but also allows developers to constrain modifications and add-ins (modules that may be added to existing applications, roughly analogous to browser plug-ins) to preserve security, and user model integrity as discussed in more detail below.

Sample XAD Application

In order to understand many of the nuances of XAD and in particular an XAD application description, such as application description 2502, a sample description will be discussed. Table 1 illustrates the source code of a sample XAD application in accordance with one embodiment of the invention. Sample XAD application in Table 1 is relatively simple and many other, complex XAD applications are contemplated. Indeed, the sample shown in Table 1 has a sole function to display a "Hello World" message.

TABLE 1

Sample XAD Application Description

```
1    <?xml version="1.0" encoding="UTF-8" ?>
2    <sys:Xad
3       xmlns:sys=
4    "http://schemas.microsoft.com/2005/xad/system"
5       xmlns              =
6    http://schemas.microsoft.com/2005/xad/framework
7    >
8       <sys:TagDefinition      Name="sys:Main"
9    Type="fwk:Application">
10         <sys:Body>
11            <Application>
12               <Window>
13                  <TextBlock Text="Hello
14    World" FontSize="25"/>
15               <Window>
              </Application>
           </sys:Body>
        </sys:TagDefinition>
     </sys:Xad>
```

As may be appreciated, the sample shown in Table 1 comprises several XML tags in order to describe the resulting objects that process data. Line 1 identifies the version of XML and Line 2 identifies the system tag for XAD application description, which is described in more detail below. Lines 3-4 identify some namespaces of tags available in XAF. The primary portion of the sample in Table 1 for the purpose of this discussion is the "Application" tag shown in Line 8. The application tag is an example of an entity tag that causes the creation of an application object at runtime that orchestrates the application, and controls the highest levels of application functionality. Similarly, the "Window" tag in line 9 (another example of an entity tag) causes the creation of a window object, i.e., a user interface entity that is responsible for the display of an application's frame. In this case "Window" is a parameter of "Application." Finally, a "TextBlock" entity, the resulting text object created as a result of the text tag in line 10, is a user interface entity created at runtime that is responsible for the display of text (in this case, "Hello World"). The use of tags to create objects (via builders) is described in much more detail below. The foregoing example is provided simply to show a more simple sample XAD application.

Figure 26:
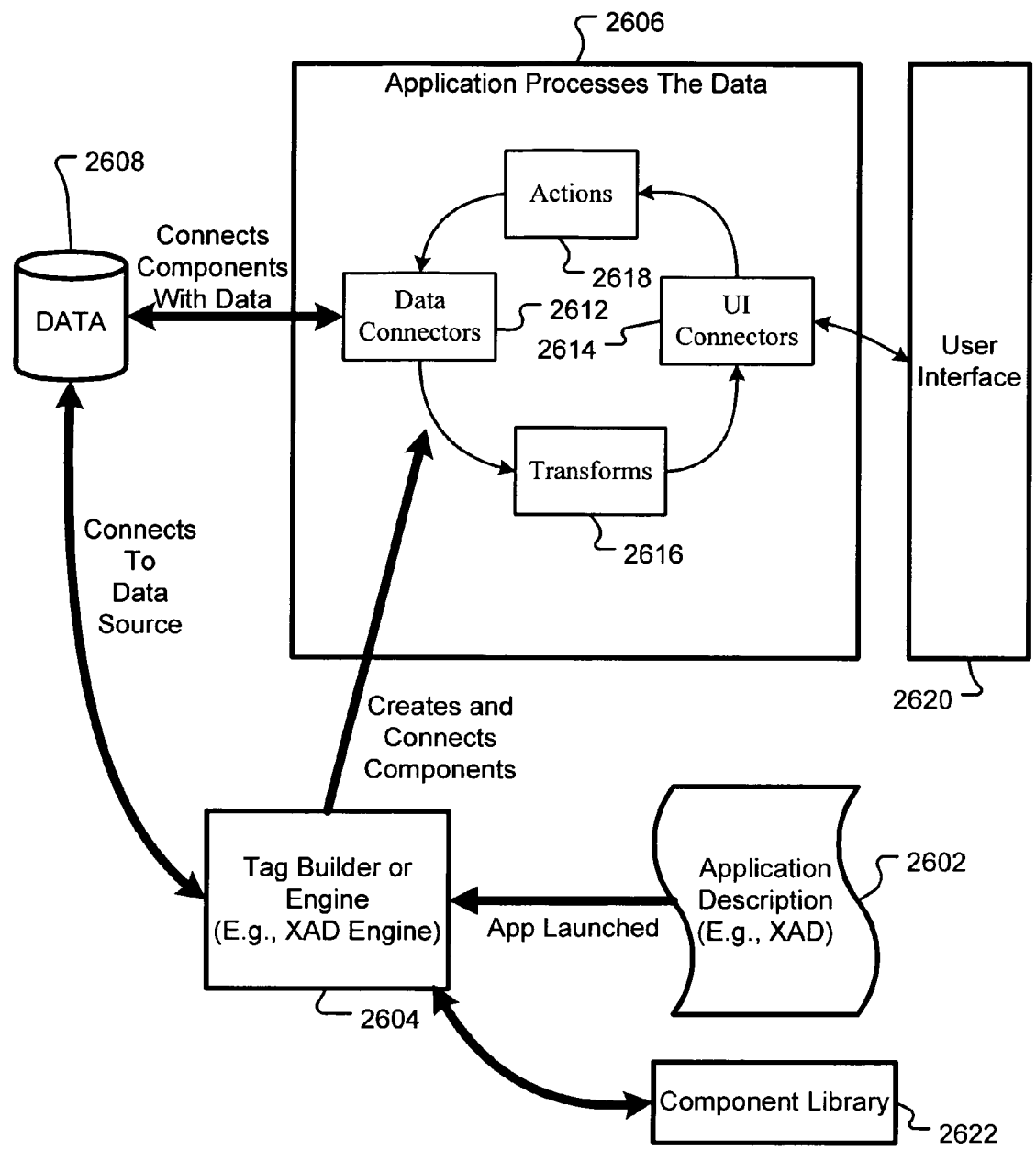
FIG. 26 illustrates the application description shown in FIG. 25 as it is executed to create and connect a graph of application components.

In operation, the XAD application shown in Table 1 is compiled and executed to create the application, window and text objects, as generally shown in FIG. 26. That is, FIG. 26 illustrates an application description 2602, which is similar to description 2502 shown in FIG. 25 and/or the XAD application shown in Table 1 as it is executed to process the data in accordance with a particular embodiment of the present invention.

Initially, a developer authors the application description 2602. In an embodiment, the first tag of the XAD file 2602 is "<sys:XAD>". Also, in order to operate correctly, the computer system can have access to XAF or any suitable equivalent, such as by installing the XAF SDK for example. Upon issuing an app launch command, the XAD 2602 is automatically verified and, in one embodiment, compiled to a more efficient form. A compiler or XAF engine 2604 parses the XAD 2602 and executes the compiled form which instantiates the necessary objects. Also, the engine 2604 creates and connects the graph of object components (also referred to as entities) 2612, 2614, 2616, 2618 together to create the application 2606 that ultimately processes the data. Meanwhile the engine 2604 connects, i.e., binds, the various objects with the necessary data 2608. Engine 2604 may also be considered a configuration service in that it instantiates the objects and connects the objects together to create the application 2606.

The application 2606 is a graph of connected components 2612, 2614, 2616, 2618. For instance, the application 2606 may have one or more data connector entities 2612. The data connector entities 2612 represent the objects that connect data to the system and communicate with the various data stores available. Another type of entity relates to the UI connectors 2614. The UI connectors 2614 represent the objects that actually process user interface features, and in fact, communicate with the user interface 2620. Also included in the application 2606 are transforms 2616 that typically provide some transformation of data prior to relaying information to the UI connectors, and actions 2618 that process data to perform some type of action such as modifying data. More details of the process that creates the necessary components and the process of binding objects to the data are described below.

As may be appreciated from this discussion, the tags used in the XAD 2602 are not used to refer to specific objects, but instead, XAD tags refer to object factories. An object factory is a description that XAD uses in conjunction with its tag builder class to build one or more entities using parameters specified in the tag. The engine 2604 provides the actual creation of such objects. In an embodiment, the engine has access to a component library 2622 that provides some details of existing and/or reusable tags and objects.

Figure 27:
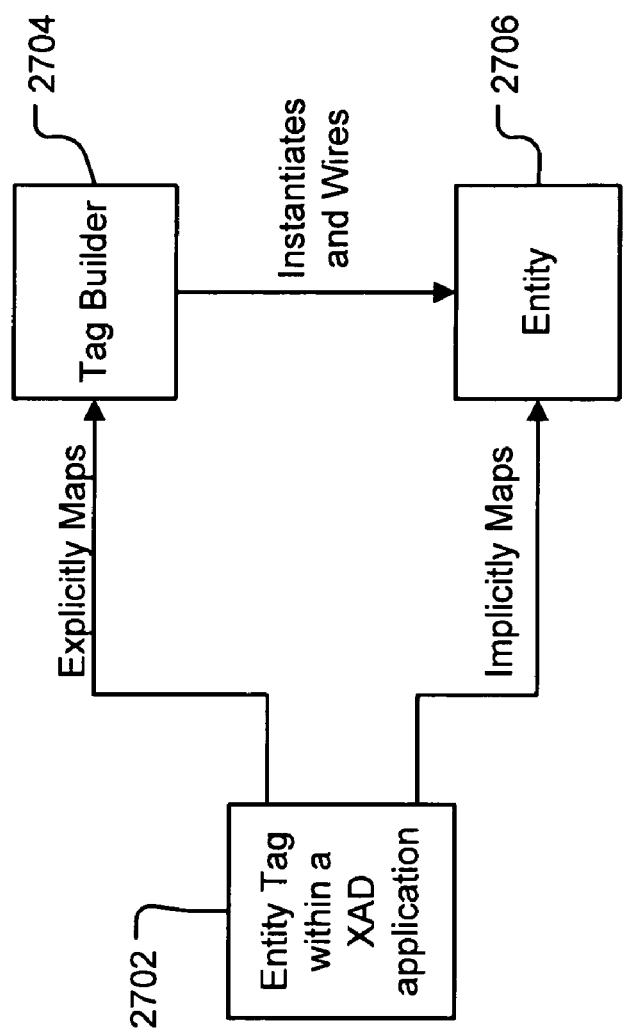
FIG. 27 illustrates the interrelationship between the internal components of the application description of FIGS. 25 and 26 and resulting objects used to process and/or view data.

Consequently, applications 2602 are defined using tags, allowing modular construction of applications. FIG. 27 illustrates the structural interrelationship between components in accordance with this concept. An entity tag 2702 (such as entity tags shown in lines 8, 9 and 10 of Table 1) is associated with an entity 2706. A builder 2704 reads an entity tag 2702, and maps it. Builder 2704 instantiates and connects one or more objects (not pictured) associated with an entity tag connects the entity tag 2702 with the entity 2706. To the developer, it appears that an entity tag 2702 is implicitly mapped to its associated entity 2706, since the mapping, instantiation, wiring or connecting, and initialization can take place behind the scenes.

With these general principles in mind, some of the specifics of XAD will be discussed. For more details of the language, a specification is attached as Appendix A which is expressly incorporated into this specification.

Objects and Factories

Objects are instantiated through factories, which may be builder components, or the XAD engine customized with fragments of XAD. Factories permit deferred instantiation for purposes such as lazy evaluation or virtualization (saving the cost of objects that need not be instantiated immediately). This is achieved through parameters that have the NewScope="True" attribute. Together with conditional instantiation through the sys:Switch construct, factories enable dynamic data-dependent application configuration. Use of dependency management and revalidation in the XAF platform enables the XAD engine to automatically reconfigure the application as needed when data changes. This eliminates the need for imperative reconfiguration code which is common in conventionally written applications, and which is costly and error-prone. The XAD engine enables factories to be defined in the XAD language, and constructs the corresponding factory implementation automatically.

A variety of object types may be instantiated using framework tags in XAD, such as objects 2510, 2512 and 2514 shown in FIG. 25. One such object relates to a "data provider" object, also referred to as a data connector, wherein data provider objects represent sources and manipulations of data that an application may use. Data provider objects connect to data sources (by which an application may receive external data) and data transformations (logical or arithmetic operations performed on incoming data).

Another type of object that may be instantiated using a framework tag in XAD is a user interface object. User interface objects provide functionality relating to control display, and to input handling. A user interface object can be used to trigger an action (see actions, discussed below).

Yet another type of object that may be instantiated using a framework tag in XAD is an action. Actions provide "hooks" (functions attached to a user interface element) to handle for user events. For example, clicking on a button on the user interface will activate an action object associated with the button.

When user event occurs, the corresponding action can be used to store and pass event details. Event details may be stored in main memory, on a hard drive, or other memory media. Event details are passed using "scope" variables, which are discussed below. For example, if the user event was a mouse click, it may make sense to store the x and y positions of the mouse at the time of the event. Other details that may be stored when a user event occurs include, but are not limited to, which key was pressed, which index of a list of data elements was selected at the time of the event, which row and/or column of a table were selected at the time of the event, which rows and/or columns of a table were visible to the user at the time of the event, etc. Through the use of these events, application functionality is realized.

Entity Tags

As may be appreciated from the example shown in Table 1 above, XAD applications comprise the use of tags. In an embodiment, the one kind of tag is the "entity tag." Other tags, such as grouping or selector tags are discussed in more detail below. Entity tags map to common language runtime (CLR) objects at runtime. The only restriction on the CLR object is that it must (in an embodiment) be a XAF entity. To be a XAF entity, a CLR object derives from one of two base classes, e.g., "Microsoft.Xaf.Core.BaseTypes.EntityElement" or "Microsoft.Xaf.Core.BaseTypes.EntityComposite", and adheres to certain protocols and contracts defined by XAF.

The builder 2704 (FIG. 27), is responsible for the actual instantiation of the entity, and is sometimes referred to as a "tag builder" or "entity builder." In an embodiment, entity builders are user-defined .NET classes for creating entities and/or connecting entities to each other. Entity builders are used to implement primitive XAD tags. Additionally, entity builders are the point of interaction between the engine 2604 and custom extensions of the language such that the XAD language, in an embodiment, specifically defines the requirements for writing entity builders. More details of the tag or entity builder are provided in Section 3.5 of the attached Appendix A which is expressly incorporated into this specification.

Exemplary entity tags are shown in Table 1 above, in lines 8, 9 and 10. For instance, in line 8, an application entity tag is shown. As stated above, this tag causes the instantiation of an entity that orchestrates the application, and controls the highest levels of application functionality. A window entity tag (line 9 of Table 1) causes the creation of a user interface entity that is responsible for the display of an application's frame. Finally, a text entity tag (line 10 of Table 1) causes the creation of a user interface entity responsible for the display of text (in this case, "Hello World"). As may be appreciated by those skilled in the art, many other entity types may be defined and used.

Before using an entity tag, such as the application entity tag, window entity tag or text entity tag shown in Table 1, each entity tag is defined, e.g., within the XAF platform. Indeed, every entity tag has a corresponding tag definition. Every tag definition contains enough information to eventually map every entity tag to an entity. Entity tags are defined by declarations of the form, for instance, the "Text" tag definition begins as follows "<sys:TagDefinition Name="Text" . . . > . . . " and ends with the following: "</sys:TagDefinition>".

Included in the definition is the "name" for the new tag, e.g., "Text" and the "type" for the particular entity tag. Entity tags may be classified into various types and all entity tags have a type. These types are an extensible set and really correspond to the CLR type of the entity associated with a tag. Some types used by the XAF framework include "sys:Data", "sys:EventHandler", "fwk:UIElement" and "sys:Selector". Whether the tag is added to the framework or the system typically depends on whether the tag draws on internal engine interfaces and/or versions at the same rate as the core language. If so, then the tag should be added to the system otherwise it is added to the framework. The type is declared in its definition. Continuing with the Text definition provided above, the tag definition can be expanded shown below in Table 2.

TABLE 2

Definition for Text Entity Tag including a Type

<sys:TagDefinition Name="Text" Type="fwk:UIElement" ... >
...
</sys:TagDefinition>

In Table 2, the tag definition indicates that a new entity tag named Text should be created of type fwk:UIElement (a framework tag indicating a UI Element type of entity). The Text tag may subsequently be used anywhere a fwk:UIElement entity may be invoked. An example of the Text entity tag can be seen in the HelloWorld.xad example appearing in Table 1.

Parameterization

Typically, each entity tag in a XAD application description has some parameters to describe how to create, connect, or configure the resulting object or entity. A parameter may be a reference to a piece of data, or a reference to a factory or object. For instance, a scope attribute may be associated with a parameter to indicate whether the parameter refers to a factory or an object. If a parameter requires a certain type of object to be applicable, the parameter may be marked with that type for type consistency checking. Such type checking ensures that execution of an application will not result in a type mismatch, which could cause an incorrect computation.

XAD allows many different ways of declaring the parameters for an entity. A common form is shown below in Table 3.

TABLE 3

Sample Tag Definition for a Text Entity with Parameters

<sys:Type Name="fwk:FontFamily" ManagedType="...FontFamily..." />
<sys:Type Name="fwk:FontFamilyData" DataConstraint="xsd:string" ConvertibleTo="fwk:FontFamily"
ConverterClass=" ...FontFamilyConverter..." />
  <sys:TagDefinition Name="fwk:Text" Type="fwk:UIElement">
    <sys:Param Name="FontFamily" Type="fwk:FontFamilyData"
... />
    ...
  </sys:TagDefinition>

Initially, "Param" is a reserved name within embodiments of XAD and is used to define parameters. Also, as indicated by the ellipses in Table 3, one or more other parameters may also be added to a Text tag definition. In this example, a new entity of type UI element named Text should be created. Further, a single parameter named "FontFamily" of type "Data" (and more specifically "String Data") should be created. The resulting Text tag can be used with a static content string, e.g., "<sys:Text FontFamily="Arial" . . . />" which will cause the text to be in Arial font. Importantly, tag definition parameters correspond to an attribute within the actual instance of the tag that has the same name as the parameter.

Alternatively, a tag may be defined to take parameters that are other entities, e.g., "<Text FontSize="25"> <foo:RandomWordGenerator Param="Text"/> </Text>". In an embodiment, the above definition will cause the Text tag's Text attribute to use the value returned by the foo:RandomWordGenerator function object, and render the resulting value on the screen in a twenty-five-point font. In another embodiment, this definition could have been written as: "<Text FontSize="25"> <Text.Text> <foo:RandomWordGenerator/> </Text.Text> </Text>". The latter definition will instantiate a Text entity and define its Text attribute as the value of foo:RandomWordGenerator.

In an embodiment, parameters themselves may contain a plurality of its own entities. Table 4 illustrates example code portions setting parameters.

TABLE 4

Example XAD Snippet Setting Parameters

1    <sys:TagDefinition Name="FlowPanel" Type="fwk:UIElement">
      sys:Param Name="Children" Type="fwk:UIElement"
      Max="Unbounded" />
    </sys:TagDefinition>

TABLE 4-continued

Example XAD Snippet Setting Parameters

2    <FlowPanel FlowOrientation="Vertical">
      <FlowPanel.Children>
        <TextBlock Text="John Smith"/>
        <TextBlock Text="Jane Doe"/>
        <TextBlock Text="Amanda Jones"/>
      </FlowPanel.Children>
    </FlowPanel>

The code shown in Table 4 (Row 1) defines the UI Element named FlowPanel and has several parameters, thus causing the display of a flow of UI elements. The set of UI elements to be displayed can be specified via a single parameter named "Children" which are defined in Table 4 (Row 2). That is, Row 2 illustrates the application description calling/describing the flow panel defined in Row 1.

One default parameter may be specified for each entity in XAD. Table 5 illustrates an example line of code defining a default parameter, whose name is "Children". If no parameter name is specified on a child tag, the child will be associated with the parameter whose DefaultParam attribute is set to "true".

TABLE 5

Default Parameter Example

<sys:Param  Name="Children"  Type="fwk:UIElement"
Max="Unbounded" Min="0" DefaultParam="true" ... />

Data Binding

In an embodiment, XAD leverages data binding (the binding of XML data to an object designed especially for the data). The name of an object may therefore be used to reference data more specifically when specifying parameters. Unlike static values (which, by definition, remain constant for the lifetime of an application), a data bound value can be updated through modification of the data bound value's associated data. In one embodiment, this modification may be performed by an application. In another embodiment, this modification may be performed by a user or an external process. In an exemplary embodiment, the line "<Text Text="$TextValue" FontSize="25"/>" causes the Text parameter to be assigned a value of "$TextValue". In this embodiment, "$" is a reserved character and use of this character in this manner invokes data binding during the creation and connecting of the components. Such data binding causes the indirect pointing or associating of data from another source or object to be bound to this entity tag.

Data binding may be used to refer to literal data. That is, literal data may be specified using the sys:InlineData tag. For example, "<sys:InlineData Name="TextValue">Hello World</sys:InlineData>" defines a piece of inline data, namely the string "Hello World." This exemplary literal data tag is given the name TextValue. Consequently, by using the name $TextValue in a XAD description, the XAD code can bind to the data within the literal data tag, and use it for the value of any parameter of type sys:Data.

Data binding may also be used to refer to a relative data location. For example, <Text    Text"$SomeLocation/myd:Employees/myd:Employee/myd:Name"/> uses a dynamic prefix, i.e., "$SomeLocation" followed by relative data references, i.e., "myd:Employees", "myd:Employee", and "myd:Name" without using the "$" character. The result is a data binding to the absolute location formed from the value of $SomeLocation appended with the given relative location.

Additionally, data binding may be used in conjunction with grouping tags. For example, the sample code in Table 6 (Row 1) binds the MergeTreesTransform entity to the set of entities under the Resources grouping tag.

TABLE 6

Data Binding To Grouping Tags or Actions

| | |
|---|---|
| 1 | `<Resources Name="MyDataSources">`<br>  `<XmlFileDataSource ... />`<br>  `<SQLDataSource ... />`<br>`</Resources>`<br>...<br>`MergeTreesTransform Trees="$MyDataSources" />` |
| 2 | `<Text>`<br>  `<sys:InlineData Param="Text" Name="ScratchData" Writable="true">`<br>    `<Greeting>Bye</Greeting>`<br>  `</sys:InlineData>`<br>  `<SetTextValueAction Param="MouseLeftButtonDown" Data="$ScratchData" NewValue="Ciao" />`<br>  `<SetTextValueAction Param="MouseRightButtonDown" Data="$ScratchData" NewValue="Au Revoir" />`<br>`</Text>` |

Table 6 (Row 2) illustrates that XAD allows binding actions to data values. For example, the following definition binds actions to the value of $ScratchData. Under the definition, the initial value of $ScratchData is "Bye." "MouseLeftButtonDown" is a parameter of type "sys:EventHandler." The action corresponding to the "MouseLeftButtonDown" parameter is invoked whenever the Text entity encounters a Left Mouse Button Down event. This event will cause the SetTextValueAction to be invoked, which will change the text value of the <Greeting> element to "Caio." Likewise, a Right Mouse Button Down event will result in the value of $ScratchData changing to "Au Revoir."

In yet another example, data binding allows an application to receive command line parameters. For example, the sample code in Table 7 allows specification of command line parameters. The sys:Main tag is the entry point for applications.

TABLE 7

Command Line Data Binding

| | |
|---|---|
| 1 | `<sys:TagDefinition Name="sys:Main" Type="Application">`<br>  `<sys:Param Name="TextData" Type="sys:Data" />`<br>  `<sys:Body>`<br>    `<Application>`<br>      `<Window>`<br>        `<FlowPanel>`<br>          `<Text Text="$TextData" />`<br>        `</ FlowPanel>`<br>      `</ Window>`<br>    `</ Application>`<br>  `</ sys:Body>`<br>`</ sys:TagDefinition>` |

The application defined in Table 7 accepts command line parameters such as "xad CommandLine.xad/TextData=Testing" where CommandLine.xad is the name of the application, TextData is the parameter name, and Testing is the value. In an embodiment, a plurality of parameters can be passed into XAD in the form of "xad ApplicationName/ParamName1=Value1/ParamName2=Value2 . . . /ParamNamen=Valuen". One skilled in the art will appreciate that while the exemplary embodiment above uses a string as an input value, command line parameters may alternatively or additionally include alphanumeric values, names of files, image or other resource locations, etc. Also, a command line parameter may be given a default value for use when no command line parameter value was specified for the parameter.

Data Source Tag

In an embodiment, external data is exposed to an XAD application by way of a DataSource tag. Further, the XmlFileDataSource tag may be used to establish a connection between an application and an XML file so that the latter may be used as a data source by the application. External data sources may be used in a fashion similar to inline data provided by sys:InlineData tags. External data sources, however, may be saved out to disk using XAD actions, and thus changes to data by other users can be consumed by the application if desired.

Derived Tag Definition

XAD allows the use of derived tag definitions to leverage abstraction and reuse of definitions. For example, in an application that requires a series of twelve point Verdana font headings, a user might place a definition such as "<Text FontFamily="Verdana" FontSize="12" Text="heading text here"/>" at each position where a heading is desired. However, if many hundreds or thousands of headings are needed, each one being potentially different, derived tag definitions allow for greater efficiency in specification. More specifically, a derived tag definition can be defined and an example is shown in Table 8.

TABLE 8

Derived Tag Definition Example

`<sys:TagDefinition Name="TitleText" Type="fwk:UIElement">`
  `<sys:Param Name="Text" Type="sys:StringData" />`
  `<sys:Body>`
    `<Text Text="$Text" FontFamily="Verdana" FontSize="12" />`
  `</sys:Body>`
`</sys:TagDefinition>`

The definition shown in Table 8 will cause XAD to create a new tag named TitleText of type fwk:UIElement. The Text parameter within the tag is bound to the value passed in for $Text, which can be passed in differently for each instantiation of the heading.

As another example, consider the following example shown in Table 9, wherein the first row is a sample snippet of XAD, the second row illustrates a sample derived tag definition to replace the snippet of XAD and the third row illustrates an instantiation call using the derived tag definition.

TABLE 9

Sample Snippet, Derived Tag Definition, Sample Instantiation

| | |
|---|---|
| 1 | `<StackPanel>`<br>  `<TextBlock FontWeight="Bold" Text="My Caption"/>`<br>  `<foo:Table FontFamily="Arial">`<br>    `<XmlFileDataSource Param="Table" File="MyTable.xml"/>`<br>  `</foo:Table>`<br>`<StackPanel>` |
| 2 | `<sys:TagDefinition Name=foo:TableWithCaption" Type="fwk:UIElement">`<br>  `<sys:Param Name="Caption" Type="sys:StringData" />`<br>  `<sys:Param Name="TableFile" Type="sys:StringData" />`<br>  `<sys:Body>`<br>    `<StackPanel>`<br>      `<TextBlock FontWeight="Bold"` |

TABLE 9-continued

Sample Snippet, Derived Tag Definition, Sample Instantiation

```
        Text="$Caption"/>
            <Table FontFamily="Arial">
                <XmlFileDataSource
      Param="Table" File="$TableFile"/>
            </Table>
        </StackPanel>
    </sys:Body>
</sys:TagDefinition>
3   <foo:TableWithCaption    Caption="Sales"
    TableFile="SalesTable.xml"/>
```

As is shown in Table 9, derived tags can increase the functionality and simplicity in calling or instantiating the same items multiple times.

Scope and New Scope Parameters

Scope parameters provide defined boundaries for certain sub-graphs of objects of varying lifetimes, in particular for delayed and/or repeated instantiation of those entities. Factories are the means of deferring and later invoking instantiation. Scope variables provide values that are parameters provided by the entity that invokes the instantiation. One example of use of scope variables is to allow for the receipt of different event properties, such as mouse button down events.

XAD uses new scope parameters to pass data between application components, between objects, and/or between combinations thereof. In an embodiment, new scope parameters may be used by a parent component to pass parameters to newly created child components. XAD thus allows users to leverage code reuse. In one embodiment, a list entity is constructed which includes references to the data in each list entry. The same parameter that defines what to do with a single list entry is applied to each new list entry, allowing arbitrarily large list of entries to be created using a single parameter or set of parameters. Further, parameter passing between parent and child objects may likewise be optimized. For example, a parent object can pass list indices to a child object, said list indices corresponding to list elements that were passed to the child, via new scope parameters.

Parameters that introduce a new scope have the "NewScope" attribute set to true. For example, the line "<sys:Param Name="..." NewScope="true".../>" is typically used to set the new attribute to true. New scope parameters may be used to introduce one or more variables within the scope. The variables are parameters that are declared implicitly. Variables are declared along with the declaration of the new scope parameter, as can be seen in the example provided in Table 10 (Row 1). As discussed above, new scope is introduced for any entity that is to be instantiated multiple times. Table 10 (Row 2) illustrates a definition of such a factory:

TABLE 10

New Scope Parameter

```
1   <sys:TagDefinition Name="fwk:Text" Type="fwk:UIElement">
        <sys:ParamGroupRef
    Ref="fwk:FrameworkElementParamGroup" />
            <sys:ParamGroupRef
    Ref="fwk:TextExtensionsParamGroup" />
        </ sys:TagDefinition>
2       <sys:TagDefinition        Name="FlowPanel"
    Type="fwk:UIElement">
            <sys:Choice>
                <sys:ParamGroup>
                    <sys:Param Name="Data" Type="sys:Data" ...
```

TABLE 10-continued

New Scope Parameter

```
    />
                <sys:Param        Name="RepeatedChild"
    Type="sys:UIElement" NewScope="true" ... >
                    <sys:ScopeVariable Name="DataContext"
    Type="sys:Data" ... />
                </ sys:Param>
            </ sys:ParamGroup>
            <sys:Param        Name="Children"
    Type="fwk:UIElement" DefaultParam="true" ... />
        </sys:Choice>
    </sys:TagDefinition>
```

In the above example (Table 10, Row 2), the scope introduced by the RepeatedChild parameter has a scope variable named DataContext. This variable is set to the item corresponding to the sub-view to be instantiated. The above definition would be applied as shown in Table 11 (Row 1), assuming List.xml contains the XML shown in Table 11 (Row 2).

TABLE 11

Example Use of Scope Variable

```
1   <Application.Resources>
    <XmlFileDataSource File="List.xml" Name="ListData" />
    </ Application.Resources>
    ...
    <FlowPanel Data="$ListData" FlowOrientation="Vertical" >
        <Text  Param="RepeatedChild"  Text="$DataContext
    /@Name" />
    </ FlowPanel>
2   <Employees>
        <Employee Name="Employee A" />
        <Employee Name="Employee B" />
        <Employee Name="Employee C" />
        <Employee Name="Employee D" />
        <Employee Name="Employee E" />
        <Employee Name="Employee F" />
        <Employee Name="Employee G" />
        <Employee Name="Employee H" />
    </ Employees>
```

In the example shown in Table 11, for each list item, the FlowPanel entity will create a corresponding Text entity. The resulting Flowpanel entity would display a list of the Employees A-H on the monitor. One skilled in the art will appreciate that each line corresponds to an instantiation of a Text entity. What varies from one instantiation to the next is the value of the "DataContext" scope variable. The resulting pattern is referred to as a repeater pattern. It is the basis for iteration over datasets in XAD. In an embodiment, repeater patterns may be nested for multidimensional iteration.

Attached Parameters

Attached parameters are parameters associated by a parent object with a child, that the child may not know how to process. For example, a "triangle" object that is a child of a parent "drawing" object may not specifically know how to deal with "position" coordinates, since position coordinates relate to general location within the drawing and not specifically to shaped such as triangles. Attached parameters allow parent objects to access data and/or functionality associated with a child object. XAD checks attached parameters for correct usage based on the definition of said parameters in the parent object. Table 12 (row 1) illustrates an exemplary tag definition.

TABLE 12

Attached Parameters Example

1   <sys:TagDefinition      Name="DockPanel"
    Type="fwk:UIElement">
        <sys:Param Name="Children" Type="fwk:UIElement"
    Max="Unbounded"
            <sys:AttachedParam      Name="Dock"
    Type="sys:Data"
                TargetType="fwk:Dock" />
            </sys:Param>
        </sys:TagDefinition>
2   <DockPanel>
        <Text DockPanel.Dock="Top" Text="Top of the View"
    />
        <Text DockPanel.Dock="Bottom" Text="Bottom of the
    View" />
    </DockPanel>

The XAD code definition in Table 12 (row 1) defines an entity called DockPanel, which includes an attached parameter called "Dock" which may be referred to as "DockPanel.Dock". Table 12 (row 2) illustrates exemplary XAD code using the DockPanel entity.

As shown in Table 12, DockPanel.Dock is specified as an attribute to each of the Text entities, even though DockPanel.Dock is not necessarily one of the parameters specified in the tag definitions for the Text entity. Since DockPanel.Dock is an attached parameter, it is used in conjunction with a Text entity, but is actually defined in the declaration of the DockPanel entity shown in Table 12 (row 1).

Resource Parameters

Another type of parameter is the resource parameter. Resource parameters provide a place to store objects that do not have a logical position in the object hierarchy. Resource parameters can be used to anchor sets of arbitrary entities under a given entity. Actions and state associated with resource parameters may be used throughout the application. An exemplary definition of resource parameters is shown in Table 13.

TABLE 13

Example Resource Parameter

<Application>
    <!-- Top level state for an application →
    <Application.Resources>
        <...DataSource Name="ViewState" ... />
        <...DataSource Name="Document" ... />
    </ Application.Resources>
    <!-- Top-level Actions for an application →
    <Application.Resources>
        <...Action Name="FileOpenCmd" ... />
        <...Action Name="FileSaveCmd" ... />
    </ Application.Resources>
    <!-- UI Elements bound to top-level state and Actions →
    ...
</ Application>

UI elements may be bound to state and/or actions via XAD's data binding capability, discussed above.

Structures

In XAD, a "structure" is a group of entities that may be passed as one name. Structures in XAD may also be nested. An example of structures and nested structures is shown in Table 14.

TABLE 14

Nested Structures

<sys:Signature Name="app:ActionsAndDataSignature"
    Type="sys:Object">
    <sys:OutParam Name="Actions"
Signature="app:ActionsSignature" />
    <sys:OutParam           Name="Preferences"
Signature="app:PreferencesSignature" >/
    <sys:OutParam Name="RecentDocuments" Type="sys:Data" />
</ sys:Signature>
<sys:Signature Name="app:ActionsSignature" Type="sys:Object">
    <sys:OutParam Name="Save" Type="sys:EventHandler" />
    <sys:OutParam Name="Print" Type="sys:EventHandler" />
</ sys:Signature>
<sys:Signature Name="app:PreferencesSignature"
    Type="sys:Object" >
    <sys:OutParam Name="User" Type="sys:Data" />
    <sys:OutParam Name="Enterprise" Type="sys:Data" />
</ sys:Signature>
<sys:TagDefinition Name="app:SomeAppPane"
    Type="fwk:UIElement" >
    <sys:Param             Name="ActionsAndData"
Signature="sys:ActionsAndDataSignature" />
    <sys:Body>
    ...
    </ sys:Body>
</sys:TagDefinition>

In this example, the $ActionsAndData.Actions.Print and $ActionsAndData.Actions.Save bindings would be valid for all parameters of type sys:EventHandler. Similarly, $ActionsAndData.RecentDocuments, $ActionsAndData.Preferences.User, and $ActionsAndData.Preferences.Enterprise would be valid for all parameters of type sys:Data. $ActionsAndData would be valid for all parameters of Signature app:ActionsAndDataSignature. $ActionsAndData.Actions would be valid for all parameters of Signature app:ActionsSignature. Finally, $ActionsAndData.Preferences would be valid for all parameters of Signature app:PreferencesSignatures.

Manifests

In an embodiment, XAD uses "Manifests" to bring together the parts of an application, such as an application description. A manifest is a specification capable of being processed by a computer that describes aspects of the application, e.g., which files are needed by the application, what dependencies exist between objects, and what user-environment-specific data is part of the application (such as user interface element text in the user's native language, icons, etc., in contrast to data which the application operates upon).

Built-in Tags

Built-in tags are tags that are pre-defined and provide significant capabilities to XAD developers. Conventionally built-in tags are prefixed with "sys:". For instance, these built-in tags may allow conditional operations, repeating operations, and the creation of objects. One such type of built-in tag is referred to as a "dynamic entity" tag, which may be used to change, within a data description, what types of objects are used. This allows real-time modification of the configuration of an object on the screen. For example, in response to a user selecting a given user interface element, the function and/or purpose of the element may be altered in real time. For example, one output window may be used to display output from arbitrarily many different application views based on receipt of a "cycle to the next application view" user command. The dynamic entity tag, in an embodiment, provides for dynamic entity instantiation by tag name as shown in the following Table 15:

TABLE 15

Example Dynamic Entity Usage

```
<sys:DynamicEntity tag= "$DateTag">
    Namespace="http://www.Microsoft.com/xaf/xcal ... ">
    ...
</sys:DynamicEntity>
```

In the example shown in Table 15, the built-in entity "Dynamic Entity" provides a developer the ability to dynamically define an entity. In this case, $DateTag resolves to a local name.

Another type of built-in tag called a "switch entity" tag allows applications to be dynamically reconfigured by way of conditional construction of an object or of multiple, related objects. While XAD is a declarative language, it is still expressive enough to allow conditional construction of entities. A single construct is provided to enable conditional construction: Switch. The switch entity tag can be parameterized by "cases" or "conditions" tags. Cases can be thought of as similar to a C# switch, while Conditions are similar to a set of C# if-else clauses. In an embodiment, the use of Cases and Conditions is mutually exclusive, meaning that a Switch cannot mix Cases and Conditions within its body. In addition, in this embodiment, Cases may only be used when a Switch specifies a value for its Data param, otherwise Conditions must be used.

Using Switch allows an author to conditionally return 1 or many entities as the result of evaluating the switch. Table 16 illustrates some sample XAD data (row 1), sample uses of conditional switching (rows 2 and 3).

TABLE 16

Example Resource Parameter

| | |
|---|---|
| 1 | `<sys:InlineData Name="Electronics">`<br>  `<Items>`<br>    `<Item Description="Toaster" Price="49.99"/>`<br>    `<Item Description="VCR" Price="199.99"/>`<br>    `<Item Description="DVD Player" Price="279.79"/>`<br>    `<Item Description="Receiver" Price="549.99"/>`<br>    `<Item Description="Sub-woofer" Price="350"/>`<br>  `</Items>`<br>`</sys:InlieData>` |
| 2 | `<sys:Switch>`<br>  `<sys:Condition Test="$Electronics/Item[1]/@Price > 50.00">`<br>    ...<br>  `</sys:Condition>`<br>`</sys:Switch>` |
| 3 | `<StackPanel Data="$Electronics">`<br>  `<sys:Switch Param="RepeatedChild">`<br>    `<Condition Test="./@Price > 500">`<br>      `<TextBlock Text="./@Description" FontFamily="Arial" FontWeight="Bold" Foreground="Red" />`<br>    `</Condition>`<br>    `<Condition Test="./@Price < 100">`<br>      `<TextBlock Text="./@Description" FontFamily="Georgia" FontWeight="Bold" Foreground="Green" />`<br>    `</Condition>`<br>    `<sys:Default>`<br>      `<TextBlock Param="Default" Text="./@Description" FontFamily="Courier New"/>`<br>    `</sys:Default>` |

TABLE 16-continued

Example Resource Parameter

```
    </sys:Switch>
</StackPanel>
```

As may be appreciated, row 2 of Table 16 shows the syntax, in an embodiment, to create entities based on values greater than 50.00 dollars. Row 3 of Table 16 furthers this example of showing the text block entities for other conditional tests. The resultant view would display all the elements items in row 1, i.e., "Toaster," "VCR," "DVD Player," "Receiver," and "Sub-woofer." However, "Toaster" would be in Georgia bold font and in green, where "Receiver" would be in Arial bold font and in red.

Switch together with dependency tracking and revalidation enables automatic implementation of dynamic reconfiguration. Dynamic reconfiguration is discussed in more detail below.

Framework Tags

XAD and XAF allow for another type of tag referred to as the framework tag (abbreviated "fwk"). A framework tag may be used to create an object that is part of an application. Framework tags may be used to reference actions, data sources, transformations, and association managers (each discussed below). In an embodiment, application debugging may also be performed via framework tags.

At the most simplistic level, UI connectors provide the ability to visualize XAF data and to respond to events that modify that data. Any one particular UI connector actually owns an "element tree," or set of visual elements that may be displayed, that the UI connector is presenting. Associated with each UI connector is code to translate data into visual elements and code to translate events into editing operations.

In an embodiment, the UI connectors simply expose properties and events of a client platform, such as the Windows® Presentation Foundation (WPF) elements. Moreover, a UI connector provides a specific form of data-binding, binding data from the XAF Data Layer to the WPF element. Different elements are designed to visualize different types of data. For example, an Image element visualizes bitmapped display data, a Text element visualizes string data, and a ListBox visualizes an ordered list of possibly heterogeneous data. Some elements, like ListBox and TextBox, also can visualize a 'selection' on that data. The concept of a selection is basically another data input.

In general, specific UI connectors are designed to work with a specific type of data to be visualized. If two elements use exactly the same mechanism to accept the input (or parameters) for what they visualize then a developer can write a single UI connector to handle both of them. The parameters are used to give the UI connector a factory object, which is used to create children as required. The UI connector typically provides a data context to the factory. The factory is normally a fragment of XAD, which is wrapped in an object by the XAD engine. Table 17 illustrates a set of UI connectors that may be provided.

TABLE 17

Sample Built-in UI connectors

| UI Connector | Base Element Class | Windows Client Platform Elements Supported |
|---|---|---|
| SimpleUIConnector | UIElement | Sub-classes of Shape |
| PanelUIConnector | Panel | DockPanel, FlowPanel, Canvas, GridPanel |
| DecoratorUIConnector | Decorator | Border/Box |
| TextUIConnector | Text | Text |
| WindowUIConnector | Window | Window |
| ContentControlUIConnector | ContentControl | Button, CheckBox, RadioButton, ListItem, ComboBoxItem |
| SelectorUIConnector | Selector | ListBox, ComboBox, RadioButtonList |
| HeaderedItemsControlUIConnector | HeaderedItemsControl | MenuItem |
| ItemsControlUIConnector | ItemsControl | Menu, ContextMenu |
| TabularPanelUIConnector | Panel | |
| HeaderedContentControlUIConnector | HeaderedContentControl | |

One type of framework tag, the association manager, may be used to associate an object with a data structure or element of a data structure. For example, a list association manager may be used to associate an object with an item in a list. The resulting list item will be dynamic, in that it will contain a reference the object and its associated data versus a static value.

In Operation

Figure 28:
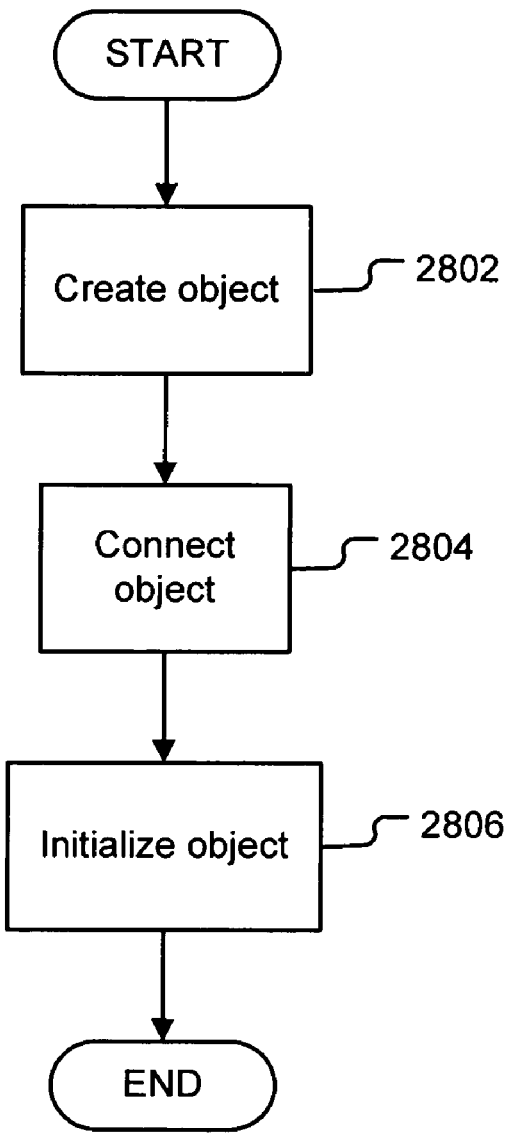
FIG. 28 is a flow diagram illustrating operational characteristics of one embodiment of the present invention in which a markup language is executed.

FIG. 28 illustrates the operational flow of the operations performed by a builder in accordance with one embodiment of the present invention in which an object is created and set up for use. The instantiation process 2800 is performed using an operation flow beginning with a create operation 2802 and concluding with a initialize operation 2806. In general, the flow 2800 may be performed by a single configuration service, or by a plurality of services.

Create operation 2802 creates an object. In one embodiment, create operation 2802 creates data structures necessary for the object. In another embodiment, create operation 2802 also allocates memory as needed for the data structures.

Once create operation 2802 has created an object, connect operation 2804 connects the object to other objects according to the relationship of that object to others. In one embodiment, a graph of connections between the created object and one or more preexisting objects is built. The create-connect-initialize sequence enables the XAD engine to support cyclic connections among a group of objects. In the case of data and transforms, such cycles are prohibited, and the XAD compiler performs some checking to prevent such cycles.

A wiring or connecting graph produced by connect operation 2804 defines interconnections and interrelationships between objects. In an embodiment, these connections will remain until altered by dynamic reconfiguration (discussed below), or until the object is erased. Which connections are necessary is determined by the engine as it executes the application markup code. In an embodiment, connect operation 2804 connects data provider objects to the application.

Initialize operation 2806 initializes the created objects. In an embodiment, initialization involves setting one or more nondeterministic values to zero, or other predefined value. In another embodiment, initialize operation 2806 calls constructors associated with objects. In yet another embodiment, initialize operation 2806 instructs created objects to initialize themselves. One skilled in the art will appreciate that initialize operation 2806 may also perform other operations typically associated with object initialization without departing from the scope of the invention. In an embodiment, initialize operation 2806 occurs conditionally based on whether a given object contains data to be initialized. In an embodiment, objects may be initialized with different values based on conditionals. For example, the following definition shown in Table 16 would cause XAD to display items in a list in red if they are priced above $500, and display items in green if priced below $100.

TABLE 16

Sample XAD code

<XmlFileDataSource Name="Items" File="Items.xml" />
<FlowPanel Data=$Items">
  <sys:Switch Param="RepeatedChild">
    <sys:Condition Test=./@Price > 500>
      <Text Text=./@Description Foreground="Red" />
    </ sys:Condition >
    < sys:Condition Test=./@Price < 100>
      <Text Text=./@Description Foreground="Green" />
    </ sys:Condition >
    <Text Param="DefaultEntity" Text=./@Description />
  </sys:SelectedEntity>
</FlowPanel>

In one embodiment, the engine performs the operations 2802, 2804, and 2806 using just-in-time compilation. In another embodiment, the application is precompiled. In yet another embodiment, a combination of pre-compilation and just-in-time compilation is used to achieve a balance of performance and flexibility.

Figure 29:
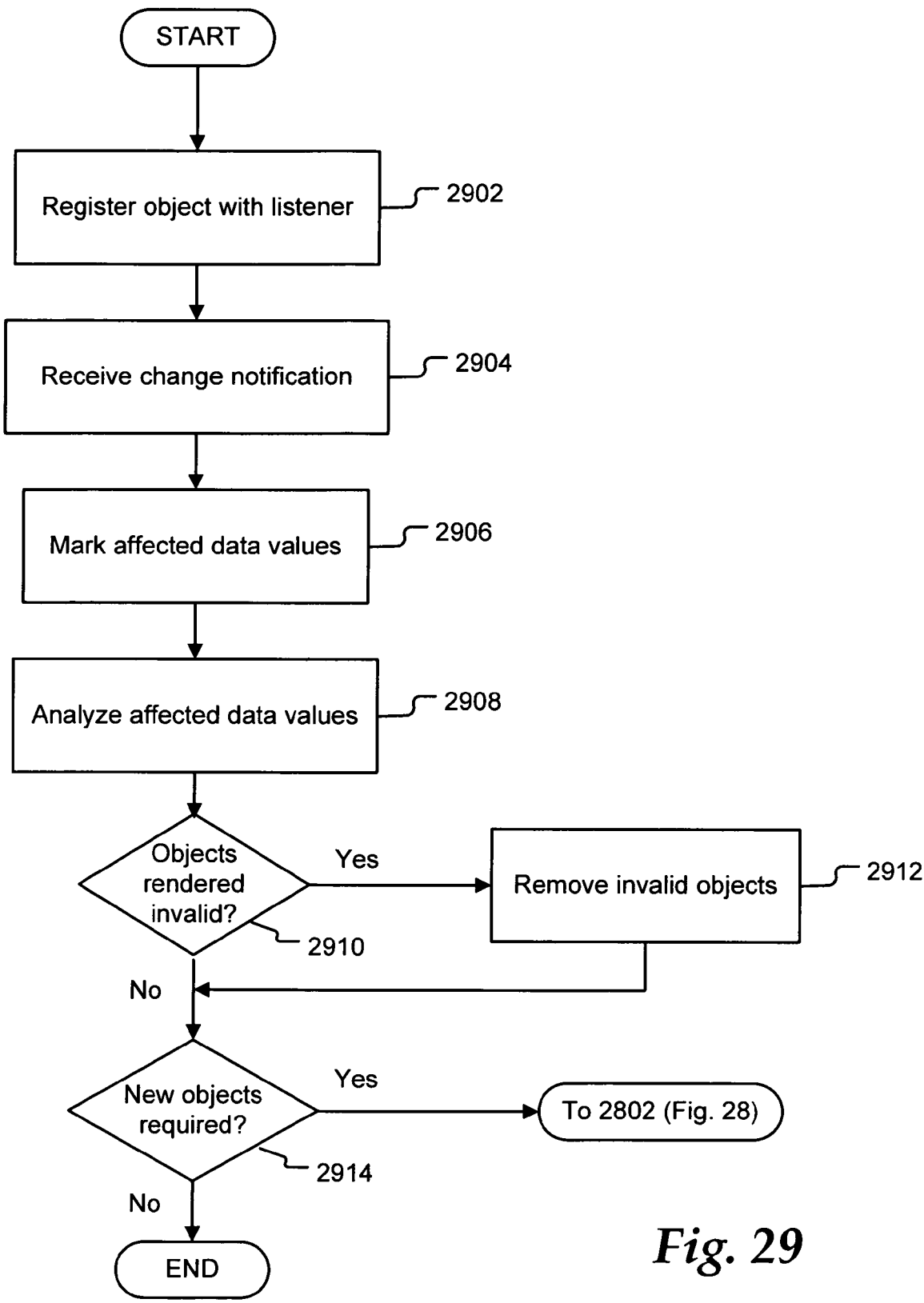
FIG. 29 is a flow diagram illustrating operational characteristics of one embodiment of the present invention in which an application is dynamically reconfigured.

XAD allows applications to be dynamically reconfigured. Dynamic reconfiguration may be triggered by a change in data flowing into an application, or modification of data existing with an application. FIG. 29 illustrates how an application may be dynamically reconfigured in one embodiment of XAD.

A listener is a computer agent, which monitors an application or group of applications for certain events. The XAD listener monitors certain registered objects' data within a XAD application for a change in value. Registration operation 2902 registers objects and their data with such a listener.

When a change in a data value occurs within a registered object, a change notification is received from the listener by receive operation 2904. Mark operation 2906 then identifies one or more data values that depend on the changed value, and marks them as affected by the change. Analyze operation 2908 analyzes the effects of the changed value on each of the marked data values. Based on the results of this analysis, determine operation 2910 determines whether any objects were rendered invalid by the changed value.

If one or more objects were rendered invalid by the change, flow branches YES to remove operation 2912, which removes the one or more now-invalid objects. Flow then branches to determine operation 2914. If determine operation 2910 determined that no objects were rendered invalid by the change, flow branches, flow branches NO to determine operation 2914.

Determine operation 2914 determines whether any new objects are required as a result of the changed value. If one or more new objects are required, flow branches YES to creation operation 2802 (FIG. 28), and object creation, connection and initialization proceeds as discussed above in conjunction with FIG. 28. If no new objects are determined to be required by determine operation 2914, flow branches NO to the end of the exemplary flow.

To simplify creation of new objects and deletion of invalid objects, XAD is capable of lifetime management of objects. A lifetime domain is a unit of reconfiguration in a XAD application. Objects whose life spans are tied to each other (for example, a first object may have no purpose without the existence of a second object, and the second object may have no purpose without the existence of the first object) are placed into the same lifetime domain. There can be many objects in a given lifetime domain. When the objects are no longer needed, all objects in a lifetime domain can be easily deleted by referencing the lifetime domain for deletion (versus potentially referencing thousands upon thousands of individual objects in a lifetime domain for deletion). One skilled in the art will appreciate that objects within a given lifetime domain need not be functionally related; rather, they need only share a creation time and a codependence such that they can be destroyed at the same time.

Figure 30:
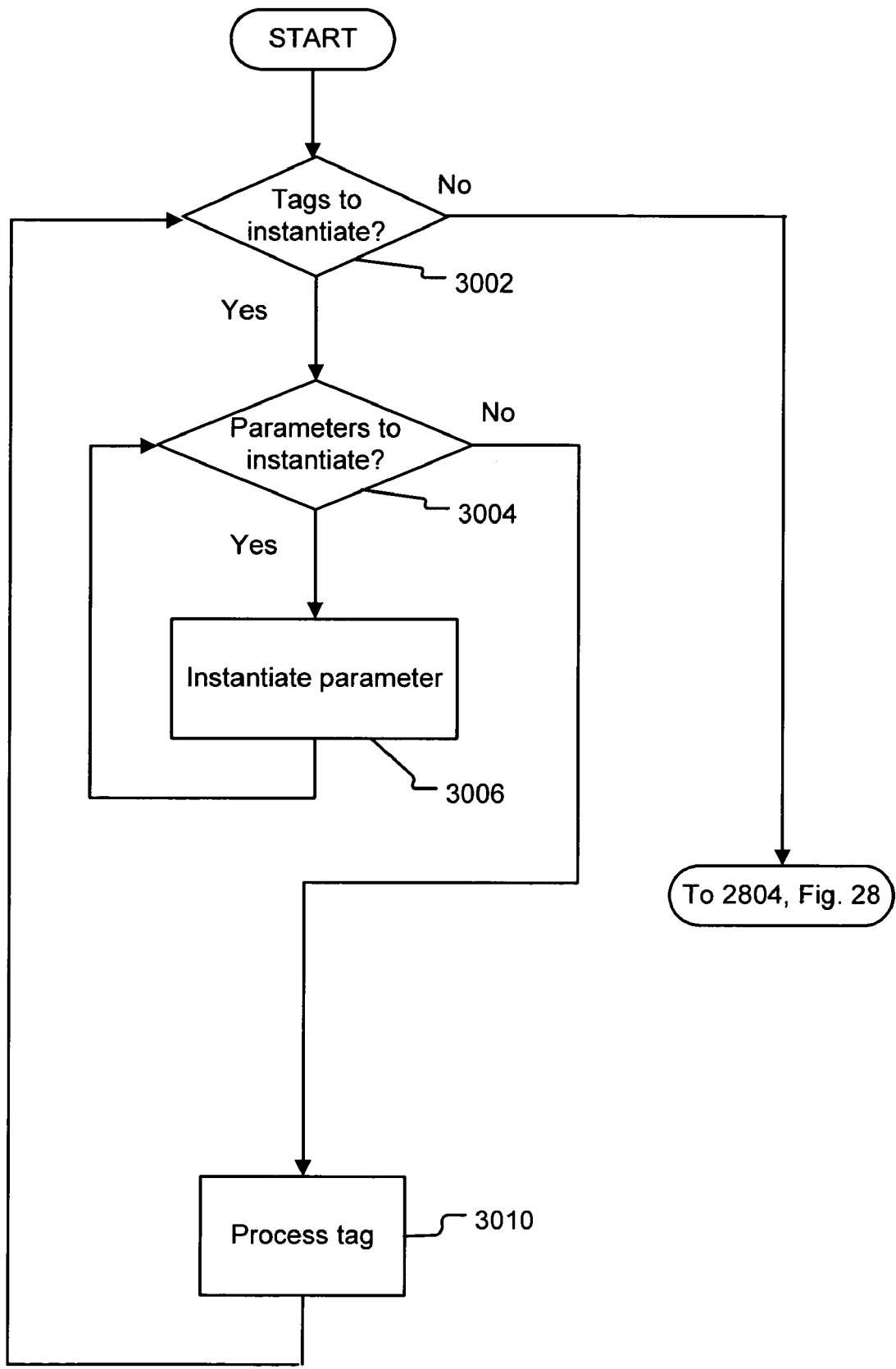
FIG. 30 illustrates the operational flow of the operations performed by the creation operation in an embodiment of the present invention.

In an embodiment, XAD can leverage conditionally created objects in conjunction with dynamic reconfiguration of applications. Objects of varying types can be therefore be created, depending on the nature of the data value change. FIG. 30 illustrates the operational flow of the operations performed by creation operation 2802 (FIG. 28) in accordance with one embodiment of the present invention. First, determine operation 3002 determines whether there are any tags to instantiate. If there are tags to instantiate, flow branches YES to determine operation 3004. If there are no tags to instantiate, or all tags have already been instantiated, flow branches NO to connect operation 2804 (FIG. 28).

Determine operation 3004 determines if a tag contains any parameters that must be instantiated. If no parameter tags are present, flow branches NO to operation 3008. If parameter tags are present, flow branches YES to instantiate operation 3006.

Instantiate operation 3006 instantiates the parameters found by determine operation 3004. As discussed above, parameters are used to describe how to create, connect, or configure a factory or object. As described earlier, parameters may include one or more properties of a factory or object, a reference to a piece of data, or a reference to another factory or object. Properties may be either static or dynamic.

Process operation 3010 processes a tag according to its data type. Several different kinds of tags exist, and thus several possible approaches are implemented by process operation 3010. A primitive tag (a tag that actually corresponds to an object) is processed by creating a new object. In an embodiment, all objects created correspond to entities.

Some tags define scope boundaries. Such tags cause process operation 3010 to create a "factory," which may be invoked at a later time for on-demand instantiation of entities. When a factory is processed, a new scope domain is created. Factories can be checked by entities for dependency information, which can be useful during dynamic reconfiguration.

Process operation 3010 processes a switch tag by creating a switch factory. This is a factory that supports branching of application control based on various user-specified conditions. The factory may be used to monitor various conditions which, when met, will trigger a branch in application flow. In an embodiment, just-in-time compilation is used to modify objects when necessitated by a tag being reprocessed as part of dynamic reconfiguration.

Process operation 3010 may also process other types of tags. For example, a binding tag triggers process operation 3010 to create a factory to indicate that a certain parameter value is actually a reference to some other entity. This is roughly analogous to a pointer in a procedural language. A dynamic entity tag allows late binding of an entity to be created. In one embodiment, the late binding is deferred until application runtime.

After process operation 3010 has processed a tag, flow returns to determine operation 3002.

In an embodiment, add-ins may be added to an XAD application. Add-ins are self-contained software packages which can extend the basic feature set of a given application without requiring the application to be upgraded. Add-ins allow new features or third-party extensions to be added incrementally as they become available, without requiring users to go through a potentially expensive upgrade cycle.

XAD add-ins are packaged in assemblies. In an embodiment, assemblies are loaded through static dependencies specified in the manifest (discussed above). In one embodiment, XAD applications communicate with add-ins via an extensibility protocol. An extensibility protocol may be defined in a separate assembly so that the protocol can be published and references by both the application and third parties developing the extension.

An extensibility protocol has two parts. The first part is the metadata schema. Metadata is data that describes data. In the context of XAD, metadata can be used to describe the features implemented by an add-in. The metadata may include tag names, parameters to be passed, human-readable text for the UI, etc. The extensible application defines the metadata schema (what to expect from the add-in), while the add-in provides the content. The second part of an extensibility protocol is the tag signature (discussed above). An add-in implements its features by defining tags. An application uses these tags to access the add-in features. The application defines the tag signatures (what type of entities the tags should result in, what parameters the tags should take, etc.), while the add-in provides the tag definitions (the tag name and the actual implementation). Tag signatures are therefore roughly analogous to interfaces, while tag definitions are roughly analogous to interface implementations.

In an embodiment, XAD supports a global metadata tree accessible via a Metadata tag. A metadata tree is a union of all metadata constituent files from all dynamically loaded assemblies. At runtime, the metadata tree is automatically updated whenever an assembly with metadata constituent files is loaded or unloaded. Proper change notifications are sent so the application can update itself dynamically (as discussed previously in conjunction with FIG. 29). The metadata tree allows an application to discover what add-ins are loaded, and to make use of the features the add-ins provide.

In an embodiment, an add-in defines tags for accessing the features the add-in implements. Since the add-ins may not be available at the time an application is written, it may not be possible for the application author to know and use the tags defined by an add-in. The author may only know, and thus may only statically define, the tag signatures. The actual tag names and eventual parameter values can be provided by the add-in using metadata. Since the metadata scheme is part of the application-defined extensibility protocol, metadata scheme information is accessible to the application. The application can therefore read the metadata, and dynamically instantiate an entity by tag name. XAD supports a DynanicEntity tag for this purpose.

Although the present invention has been described in language specific to structural features, methodological acts, and computer readable media containing such acts, it is to be understood that the present invention defined in the appended claims is not necessarily limited to the specific structure, acts, or media described. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

APPENDIX A

Contents

| | | |
|---|---|---|
| Abstract | | Error! Bookmark not defined. |
| Contents | | 89 |
| 1. | Introduction | 91 |
| 1.1 | XAF Tenets | 91 |
| 1.2 | XAD Goals | 91 |
| 1.3 | XAF Application Structure & Role of XAD | 92 |
| 1.4 | Spec Structure | 93 |
| 1.5 | Spec Conventions | 94 |
| 2. | Language Concepts | 95 |
| 2.1 | Hello World Sample | 95 |
| 2.2 | Case Sensitivity | 97 |
| 2.3 | Entity Tags | 98 |
| 2.4 | Basic Parameterization of Entities | 101 |
| | 2.4.1 Parameterization with Static Strings | 101 |
| | 2.4.2 Parameterization with Singular Entities | 102 |
| | 2.4.3 Parameterization with Sets of Entities | 104 |
| | 2.4.4 Resources | 106 |
| | 2.4.5 Default Parameters | 107 |
| | 2.4.6 Attached Parameters | 108 |
| | 2.4.7 Inline Data | 110 |
| 2.5 | Parameterization through Binding | 112 |
| | 2.5.1 Naming of Tags | 112 |
| | 2.5.2 Binding to Entities | 112 |
| | 2.5.3 Binding to Grouping Tags | 119 |
| | 2.5.4 Binding to the Formal Parameters of a Tag Definition | 119 |
| | 2.5.5 Using Binding to Enable Editing | 122 |
| 2.6 | Main Tag | 125 |
| | 2.6.1 Auto-populated Param values | 125 |
| | 2.6.2 Command line parameterization | 127 |
| 2.7 | Ignored Blocks | 128 |
| 2.8 | Out Parameters | 131 |
| 2.9 | Whitespace | 132 |
| 2.10 | Structures | 133 |
| | 2.10.1 Single-level structures | 134 |
| | 2.10.2 Nested structures | 136 |
| 2.11 | Styles | 139 |
| | 2.11.1 Styles for Defaulting Purposes | 140 |
| | 2.11.2 Styling of Avalon's Visual Tree | 144 |
| | 2.11.3 Styling and Visual Triggers | 144 |
| 2.12 | Scoped Parameters | 145 |
| | 2.12.1 Scope Variables | 145 |
| | 2.12.2 Repeater Patterns | 149 |
| | 2.12.3 Scope-Related Binding Restrictions | 152 |
| | 2.12.4 Nested Repeater Patterns | 152 |
| 2.13 | Parameter Inheritance | 157 |
| | 2.13.1 Limitations | 158 |
| 2.14 | Conditional Parameterization | 160 |
| | 2.14.1 Cases | 160 |
| | 2.14.2 Conditions | 161 |
| | 2.14.3 SwitchEntity | 162 |
| | 2.14.4 SwitchEntities | 163 |
| | 2.14.5 General | 165 |
| | 2.14.6 Selectors and Tag Definitions | 165 |
| 2.15 | Associations | 168 |
| 2.16 | Tag Documentation | 171 |
| 3. | Formal Language Specification | 171 |
| 3.1 | Boolean attributes | 172 |
| 3.2 | Qualified names | 172 |
| 3.3 | Keywords | 173 |
| | 3.3.1 <Xad> | 173 |

|  |  |  |  |
|---|---|---|---|
| | 3.3.2 | <Doc> | 173 |
| | 3.3.3 | <Description> | 174 |
| | 3.3.4 | <Type> | 174 |
| | 3.3.5 | <TagDefinition> | 175 |
| | 3.3.6 | <Signature> | 176 |
| | 3.3.7 | <ParamGroup> (under <Xad>) | 177 |
| | 3.3.8 | <Const> | 177 |
| | 3.3.9 | <Param> | 178 |
| | 3.3.10 | <OutParam> | 180 |
| | 3.3.11 | <ParamGroup> (under <Choice>) | 180 |
| | 3.3.12 | <ParamGroupRef> | 181 |
| | 3.3.13 | <Choice> | 181 |
| | 3.3.14 | <ParamDefaultValue> | 181 |
| | 3.3.15 | <ConstDefaultValue> | 182 |
| | 3.3.16 | <Entity> | 182 |
| | 3.3.17 | <Function> | 183 |
| | 3.3.18 | <Body> | 183 |
| | 3.3.19 | <ScopeVariable> | 183 |
| | 3.3.20 | <AttachedParam> | 184 |
| 3.4 | Built-in entities | | 186 |
| | 3.4.1 | <InlineData> | 186 |
| | 3.4.2 | <Binding> | 186 |
| | 3.4.3 | <XPath> | 187 |
| | 3.4.4 | <Mapping> | 187 |
| | 3.4.5 | <DynamicEntity> | 187 |
| | 3.4.6 | <AssociatedEntity> | 189 |
| | 3.4.7 | <AssociatedDataEntities> | 190 |
| | 3.4.8 | <SwitchEntity> | 190 |
| | 3.4.9 | <SwitchEntities> | 192 |
| | 3.4.10 | <Case> | 193 |
| | 3.4.11 | <Condition> | 193 |
| 3.5 | Entity builders | | 194 |
| 3.6 | Actions | | 197 |

4. Common Framework Entities — 200

5. Deployment Model — 200
- 5.1 XAD application ... 200
- 5.2 XAD assembly ... 201
- 5.3 Assembly manifest ... 203
  - 5.3.1 Manifest tags ... 204
  - 5.3.7 Sample manifest ... 209
- 5.4 Assembly dependencies ... 210
- 5.5 Assembly binding, loading and unloading ... 211
- 5.6 Packaging scenarios ... 213
  - 5.6.1 One-file applications ... 213
  - 5.6.2 Library of derived tags ... 214
  - 5.6.3 Library of primitive tags ... 217

6. Add-in Model — 220
- 6.1 What is an Add-in? ... 220
- 6.2 XAD add-in model ... 220
  - 6.2.1 Dynamic loading of assemblies ... 221
  - 6.2.3 Metadata-driven extensibility protocol ... 222
  - 6.2.4 Dynamic entity instantiation ... 222
- 6.3 Add-in scenario ... 223
  - 6.3.1 FileExtensionProtocol assembly ... 224
  - 6.3.2 File assembly ... 226
  - 6.3.3 SmartFilesAddIn assembly ... 228

7. Appendix A: Coding Conventions — 229
- 7.1 "sys" Prefix for System Namespace ... 230
- 7.2 Pascal Casing of Names ... 230
- 7.3 Signature Names must end in "Signature" ... 230
- 7.4 Names of "Set" Parameters must end in "s" ... 230
- 7.5 Names of "Singular" Entity Tags must not end in "s" ... 230
- 7.6 Names of Selector Tags must end in "Selector" ... 230
- 7.7 Param (if specified) must be an Entity's first Attribute ... 230
- 7.8 Name (if specified) must be an Entity's first Attribute after Param (if specified) 230

Introduction

XAD (XAF Application Definition) is a declarative language used to author XAF applications.

The UI composition aspects of XAD are the same as XAML wherever possible. The additional features supported by XAD are mostly oriented towards the data-binding features of the XAF platform.

While XAD could be represented using multiple formats, its primary representation is in Xml. This allows for a strong mesh with XAML. Another advantage of using Xml is that the XAD parser as well as XAD development tools can deal directly with XAF's native data representation (Xml).

XAD is "interpreted" in the sense that XAD developers are not required to perform any explicit compilation steps. This does not preclude some amount of behind the scenes "JIT-compiling" for performance reasons.

XAF Tenets

XAF is a platform for building "Office-class" applications with a greatly reduced time to market. Core tenets of XAF are:

- The use of Xml as a uniform data representation
- A highly componentized approach to building applications
- Powerful data transformation capabilities
- Rich, composable views that use Avalon as the underlying presentation layer

XAD Goals

Since XAD is used to author XAF applications, the goals for XAD build upon the core XAF tenets:

- The use of Xml as a uniform data representation for both external data & application state
- Seamless and dynamic data-binding to both Xml and non-Xml data sources (through an Xml representation of non-Xml data-sources)

- Declarative definition of complex data-flows
- Declarative definition of UI using either 1) XAML-like syntax with additional data-binding constructs 2) XAML itself
- Declarative rule-based definition of how data is transformed, displayed and interacted with
- Strong typing and a high degree of static checking
- High degree of extensibility with a minimal set of "built-in" keywords
- Progressive levels of abstraction
- Rich enough for the specification of "Office-class" applications in terms of
  - Breadth & depth
  - Performance
  - Quality

XAF Application Structure & Role of XAD

An XAF application is constructed using techniques that differ from traditional Windows application programming techniques.

Most existing Windows application development techniques rely on the developer writing code to control the application's flow of execution. Development tools may include visual designers with which dialogs and UI primitives are designed in a declarative fashion, but the developer is ultimately responsible for the execution flow. The developer has to write event-handlers and data structures to deal with application state. The developer is also responsible for managing the mapping between data structures and the visual elements representing them. All of this involves a large amount of imperative application code that is different from one application to the other (despite similar underlying patterns).

XAF takes a different approach to authoring applications. XAF declaratively models an application's data, User Interface, and the way the UI interacts with the data. The core design tenet is view-data separation. One may think of XAF applications as being predominantly declarative with bubbles of imperative code inserted as needed.

XAF applications are said to be data-centric; in addition to the application being centered around data, all application state is also treated as data. The developer's main concerns are the way that the data flows through the application, and the rules that govern how the application responds to that data. The actual infrastructure for dynamic data-binding is not a developer concern and is provided by XAF out-of-the-box.

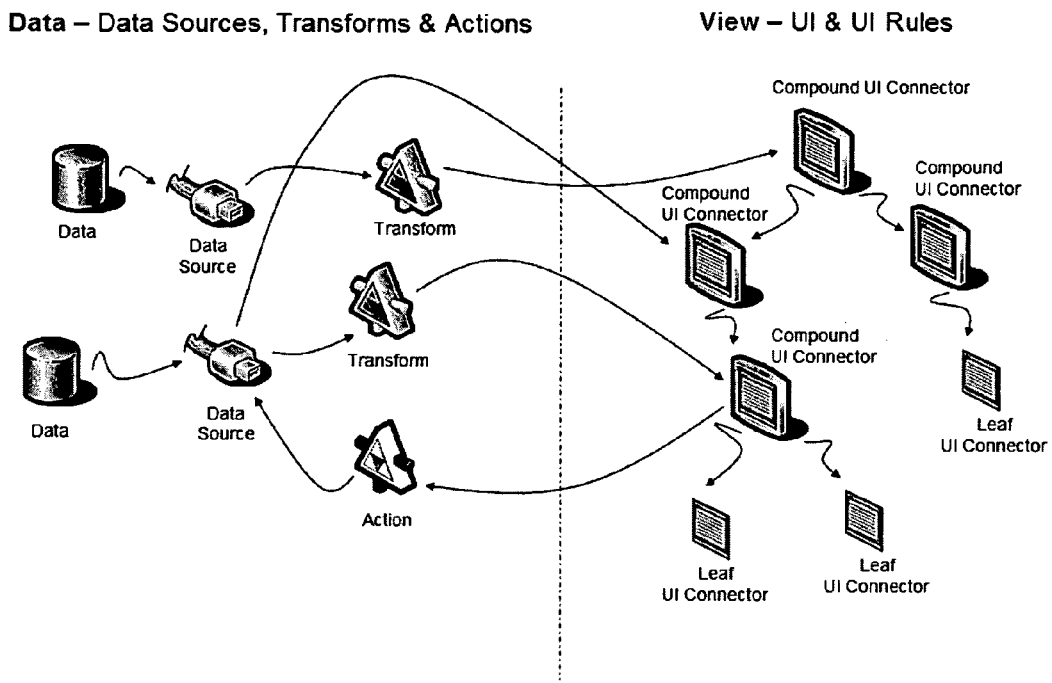

Important XAD exists to enable declarative authoring of the data-flows, bindings, and rules that characterize XAF applications.

*Spec Structure*

While some of the later sections in this spec can serve as a standalone reference for experienced XAD authors, generally speaking the sections build upon each other.

2. Language Concepts: An illustration of core language concepts and constructs through trivial code samples. While language keywords and common framework tags are used heavily in the samples, they are formally defined only in later sections.

3. Formal Language Specification: A formal definition of all language keywords (language keywords can be thought of as tags that are "built-into" the language). This section also includes a formal definition of XAD's extensibility mechanisms i.e. how third parties can define their own tags.

4. Common Framework Entities: A discussion of the most common tags provided by the standard XAD framework. These are tags that could have been built by third parties using XAD's extensibility mechanisms. The framework tags aid in the construction of applications using recommended design patterns and best practices.

5. Deployment Model: A formal definition and illustrative discussion of XAD's assembly-based deployment model

6. Add-in Model: An illustrative discussion of how the XAD deployment model can be leveraged as a declarative model for specifying add-ins

Appendix A: Coding Conventions: A list of recommended XAD coding conventions. The standard XAD framework follows these conventions. Third parties may choose to adopt some or all of these conventions.

Spec Conventions

The use of namespaces within XAD is entirely compliant with W3C's Xml Namespace Specification (http://www.w3.org/TR/REC-xml-names/). This spec uses certain uniform namespace conventions in all code samples.

```
xmlns:sys = "http://schemas.microsoft.com/2005/xad/system"
```

All tags with the "sys" prefix are tags that live in the "XAD System" namespace. Tags in the system namespace are built into the language and may be thought of as language reserved keywords.

```
xmlns = "http://schemas.microsoft.com/2005/xad/framework"
```

The default namespace for all code samples is the "XAD Standard Framework." Within this spec, all tags without a namespace prefix can be identified as belonging to the standard framework. In other cases a *fwk* namespace is provided and should be associated with a tag which belongs to the XAD Standard Framework.

All code samples are compliant with the coding conventions in Appendix A.

Language Concepts

This section illustrates core XAD language concepts and constructs through trivial code samples. Larger code samples with more integrated scenarios are provided in later sections. While language keywords and common framework tags are used heavily in the samples, they are formally defined only in later sections.

*Hello World Sample*

XAD code must always be well-formed Xml. The first tag of an XAD file is required to be <sys:Xad>. The file usually (but not necessarily) has a .xad extension.

> Important: Xad must always be well-formed Xml.

HelloWorld.xad:

```
<?xml version="1.0" encoding="UTF-8" ?>
<sys:Xad
    xmlns:sys = "http://schemas.microsoft.com/2005/xad/system"
    xmlns = "http://schemas.microsoft.com/2005/xad/framework"
>
    <sys:TagDefinition Name="sys:Main" Type="Application">
        <sys:Body>
            <Application>
                <Window>
                    <Text Text="Hello World" />
```

```
            </Window>
            </Application>
        </sys:Body>
    </sys:TagDefinition>
</sys:Xad>
```

After installation of the XAF SDK, "xad.exe HelloWorld.xad" would result in the execution of this simple application. There is no explicit compilation step for XAD code. The XAD is automatically verified (and potentially compiled, although this does not currently happen) upon first execution of a piece of XAD code. XAD that fails the verification step cannot be run until the necessary coding errors are fixed.

Below is a screenshot of what the HelloWorld.xad application looks like:

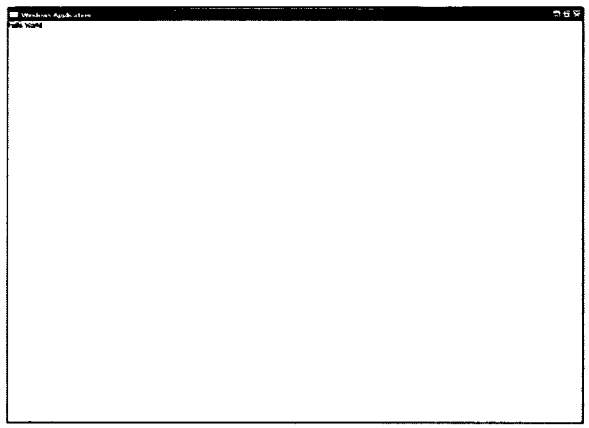

Discussion of the various language concepts will be done using small XAD samples that cater to the concept in question. The primary goal of listing a Hello World sample was to provide some sort of basic context with respect to what XAD looks like.

Case Sensitivity

Writing the following:

```
<Text>
```

Is not the same as writing the following:

```
<text>
```

Important XAD is case-sensitive.

Entity Tags

Not all tags in XAD are entity tags (there are 2 other kinds of tags known as "grouping tags" and "selector tags" – they are minor variations on entity tags and will be defined in later discussions). However, entity tags are the most common and important kind of XAD tag.

> 1) There is no way to differentiate between entity, grouping, and selector tags purely by name (tools and the definitions of the tags are the only deterministic means of differentiation). However, frameworks that use the naming conventions in Appendix A provide a simple means of differentiation. Grouping tags end in "s". Selector tags end in "Selector". All other tags outside of the System namespace are entity tags.

> Important An XAD entity tag quite simply maps to a CLR object at runtime. The only restriction on the CLR object is that it be an XAF entity.

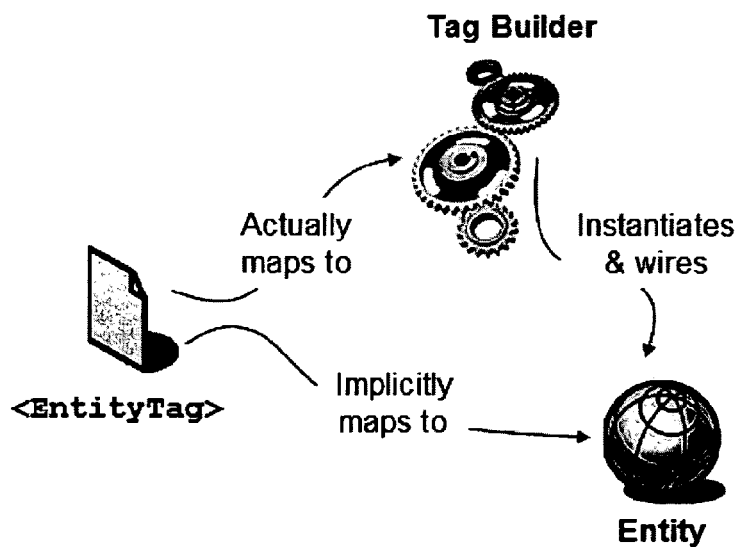

To be an XAF entity, a CLR object must:
- Derive from one of 2 base classes:
    - Microsoft.Xaf.Core.BaseTypes.EntityElement
    - Microsoft.Xaf.Core.BaseTypes.EntityComposite

- Adhere to certain protocols and contracts defined in: http://xafteam/xafenv/doc/Platform/Core Components/_Dev/DevIntroToEntityDomains.doc.

The Tag Builder class is a class responsible for the actual instantiation of the entity (factory pattern) as well as the parameterization of the entity. The Tag Builder is really an implementation detail of interest only to framework extenders.

In the Hello World sample there are 3 entity tags (Application, Window, and Text):

```xml
<?xml version="1.0" encoding="UTF-8" ?>
<sys:Xad
    xmlns:sys = "http://schemas.microsoft.com/2005/xad/system"
    xmlns = "http://schemas.microsoft.com/2005/xad/framework"
>
    <sys:TagDefinition Name="sys:Main" Type="Application">
        <sys:Body>
            <Application>
                <Window>
                    <Text Text="Hello World" />
                </Window>
            </Application>
        </sys:Body>
    </sys:TagDefinition>
</sys:Xad>
```

Each of these 3 entity tags results in the creation of an entity upon execution of the application.

- The Application entity is a root level entity that "orchestrates" the application and controls the topmost views.
- The Window is a UI entity responsible for the display of the application's frame.
- The Text is a UI entity responsible for the display of text (in this case "Hello World").

Entity tags are defined by declarations of the form, for instance the Text tag definition begins as follows:

```
<sys:TagDefinition Name="Text" ... > ... </sys:TagDefinition>
```

> Important Every tag definition contains enough information to eventually map every entity tag to an entity.

> Important Every entity tag has a corresponding tag definition.

Entity tags may be classified into various types. These types are an extensible set and really correspond to the CLR type of the entity associated with a tag. Some examples of types used heavily by the standard framework are sys:Data sys:EventHandler, fwk:UIElement and sys:Selector.

In general, the distinction between adding a tag to the Framework or System namespace is based on the following criteria:

1. Add to System if:
    a. The tag draws on internal engine interfaces
    b. Versions at the same rate as the core language
2. Add to Framework if:
    a. Does not draw on internal engine interfaces
    b. Does not version at the same rate as the core language > $TODO – provide examples of internal engine interfaces... I realize that getting information like Xad file and line number is done by accessing internal Xad interfaces, but which are the important ones?

An entity's type is declared in its definition, continuing with the Text tag its *Type* is specified in its tag definition as follows:

```
<sys:TagDefinition Name="Text" Type=""... >
    ...
</sys:TagDefinition>
```

> Important Every entity tag has a type.

Basic Parameterization of Entities

In the previous section we established that entity tags result in the creation of objects at runtime (more specifically XAF entities). However, for an object to be useful it requires some sort of meaningful parameterization.

This section covers the most basic forms of parameterization for XAD entities.

Parameterization with Static Strings

XAD allows many different ways of declaring the parameters for an entity. A common form is:

```
<sys:TagDefinition Name="Text" Type="fwk:UIElement">
    <sys:Param Name="FontFamily" Type="sys:Data"
    TargetType="fwk:String" .../>
    ...
</sys:TagDefinition>
```

This declaration indicates that the Text entity has a parameter named "Text" of type "Data" and more specifically "String Data."

An actual instance of the Text entity would look like:

```
<sys:Text FontFamily="Arial" .../>
```

Important Tag definition parameters correspond to an attribute within the actual instance of the tag that has the same name as the parameter.

Definition "Static value" implies that the value of the string is fixed for the lifetime of the application.

Definition "String parameter" implies that in the parameter declaration, the Type is "Data" and the Schema is some XSD Simple Type.

Important String parameters with a static value cannot begin with './' or '$'. In addition, a string parameter cannot be "." (the singleton DOT). The three of these representations are reserved for XAD Binding.

In a later section, when we introduce the <sys:InlineData> tag and will discuss how one can express static strings beginning with "./", "$" or entirely of ".".

Parameterization with Singular Entities

In the previous example we chose to specify the text for a Text UI element using a hard-coded or static string. It is possible instead to parameterize the Text element with an entity that yields a string. Consider a Random Word Connector entity that yields a random string:

```
<sys:TagDefinition Name="foo:RandomFontFamily" Type="sys:Data">
    ...
</sys:TagDefinition>
```

(The declaration of Random Font Family is listed primarily to highlight the fact that the Type attribute matches the corresponding Type attribute for Text's *FontFamily* parameter.)

The *FontFamily* parameterized with another entity would look like:

```
<Text>
    <foo:RandomFontFamily Param="Text"/>
</Text>
```

This may be read as "use the Random Font Family entity as the valid of the *FontFamily* parameter for the Text entity."

> Important The "Param" attribute is used to indicate what singular parameter a given entity corresponds to.

> Definition Singular parameter implies that the parameter takes at most one entity (as opposed to a set of entities). Parameterization of sets of entities is covered in the next section.

> Important "Param" is a reserved parameter name.

This simply implies that user-defined parameters cannot be named "Param". It is illegal to write the following:

```
... <sys:Param Name="Param" ... /> ...
```

To better understand parameterization of entities with other entities, consider the following example with an extra level in the entity hierarchy:

```
<Text>
```

```
    <foo:HighestValueTransform Param="Text">
        <XmlFileDataSource Param="List"
        File="ListOfNumbers.xml"/>
    </foo:HighestValueTransform>
</Text>
```

The Xml File Data Source entity is parameterized with the name of an Xml file that contains a list of numbers. The File Connector entity can be thought of as *yielding* a list of numbers. The Highest Value Transform is parameterized with a list (in this case provided by the Xml File Data Source).

The Highest Value Transform yields the list-item with the highest value. Then, the Text element is parameterized with the list-item yielded by the Highest Value Transform (as long as the list-item is of Type sys:Data and TargetType fwk:String, it can be consumed by Text).

The following diagram helps to illustrate the nested data flow which is occurring here:

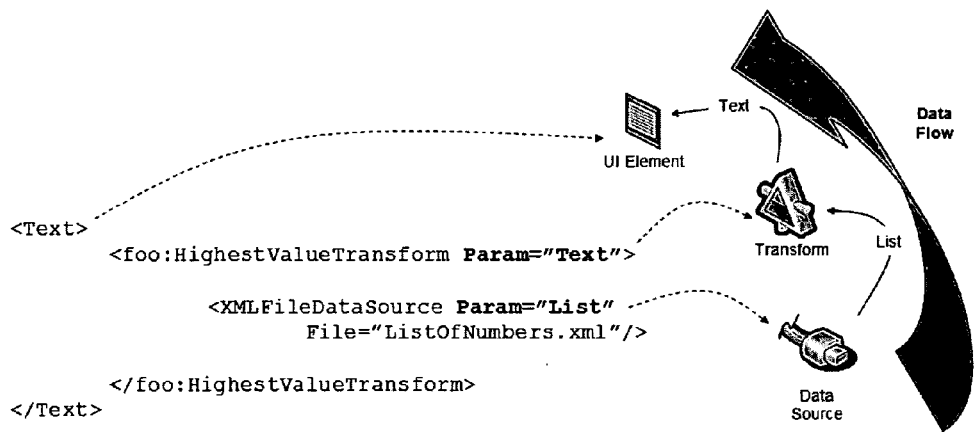

```
<Text>
    <foo:HighestValueTransform Param="Text">
        <XMLFileDataSource Param="List"
        File="ListOfNumbers.xml"/>
    </foo:HighestValueTransform>
</Text>
```

Another way to write this is without the use of *Param* attributes; often this is easier to understand:

```
<Text>
    <Text.Text>
        <foo:HighestValueTransform>
            <foo:HighestValueTransform.List>
                <XmlFileDataSource File="ListOfNumbers.xml"/>
            </foo:HighestValueTransform.List>
```

```
        </foo:HighestValueTransform>
    </Text.Text>
</Text>
```

As can be seen from the above Xad, use of the *Param* syntax allows Xad applications to be more concise. However, using this syntax is a matter of style, not functionality.

Parameterization with Sets of Entities

So far we have focused on singular parameterization. A singular parameter is a parameter that takes at most one entity. It is however possible to declare parameters that take more than one entity. Consider:

```
<sys:TagDefinition Name="FlowPanel" Type="fwk:UIElement">
    ...
    <sys:Param Name="Children" Type="fwk:UIElement"
    Max="Unbounded" />
    ...
</sys:TagDefinition>
```

As its name suggests, a FlowPanel element displays a flow of UI Elements. The explicit set of UI Elements to be "flowed" can be specified via a parameter named "Children".

A FlowPanel instance could be specified as:

```
<FlowPanel FlowOrientation="Vertical">
    <FlowPanel.Children>
        <Text Text="Chris Hackmann"/>
        <Text Text="Vlado Hristov"/>
        <Text Text="William Aitken"/>
    </FlowPanel.Children>
</FlowPanel>
```

The set of entities specified under the FlowPanel.Children grouping tag corresponds to the "Children" parameter of the FlowPanel.

The resultant view would look like:

Chris Hackmann
        Vlado Hristov

> Important For every parameter that supports sets of entities, there exists an implicit grouping tag with the same name as the parameter.

> Important A grouping tag lives in the same namespace as the entity that specifies the parameter corresponding to the grouping tag.

If only one sub UI Element was specified for a FlowPanel, it would still be valid to write:

```
<FlowPanel>
    <FlowPanel.Children>
        <Text Text="Chris Hackmann"/>
    </FlowPanel.Children>
</FlowPanel>
```

> Important A grouping tag may be used for a parameter that supports sets of entities even if only one entity is specified.

Note that it is valid to use "Param" for parameters that take sets (as long as only one entity is specified):

```
<FlowPanel>
    <Text Param="Children" Text="Line 1"/>
</FlowPanel>
```

The following is also valid:

```
<FlowPanel>
    <Text Param="Children" Text="Line 1"/>
    <Text Param="Children" Text="Line 2"/>
</FlowPanel>
```

It is also possible to write the following...

```
<FlowPanel>
    <FlowPanel.Children>
        <Text Text="Line 1"/>
        <Text Text="Line 2"/>
    </FlowPanel.Children>
```

```
    <XQueryTransform Param="FlowOrientation">
    ...
    </XQueryTransform>
    <FlowPanel.Children>
        <Text Text="Line 3"/>
    </FlowPanel.Children>
</FlowPanel>
```

... the use of the XQuery is valid because it is being used as the value for the FlowPanel's *FlowOrientation* parameter (denoted by Param="FlowOrientation"). Had the *Param="..."* been left out this would have been invalid Xad.

> Important The specification of a set of entities may be split into multiple grouping tags.

Resources

> Important Every entity (except sys:InlineData) has an implicit parameter called Resources that takes an unbounded set of arbitrary entities.

There is a special parameter named "Resources" that is implicitly supported on all entities. The sole exception is sys:InlineData, which does not support Resources. The Resources parameter is used to anchor sets of arbitrary entities under a given entity.

The Resources parameter is often used at the highest levels of an application as a "grab-bag" for Actions and state. The Actions and state are then used throughout the application, for instance:

```
<Application>

<!-- Top-level state for an application -->
    <Application.Resources>
        <...DataSource Name="ViewState" ... />
        <...DataSource Name="Document" ... />
    </ Application.Resources>

<!-- Top-level Actions for an application -->
    < Application.Resources>
        <...Action Name="FileOpenCmd" ... />
        <...Action Name="FileSaveCmd" ... />
    </ Application.Resources>

<!-- UI Elements bound to top-level state and Actions -->
    ...
```

```
</Application>
```

The way in which UI elements are bound to state and/or Actions will become apparent when we discuss XAD binding constructs. The "Name" attribute on the data-connectors and Actions will also be explained in the context of binding.

Default Parameters

So far we've covered 2 ways of specifying parameters in XAD: using the "Param" attribute and using grouping tags. However, the HelloWorld sample uses neither of these:

```
...
    <Application>
        <Window>
                <Text Text="Hello World"/>
        <Window>
    </Application>
...
```

The reason is that the Hello World sample is relying on "default parameters." It could be rewritten as follows:

```
...
    <Application>
        <Window Param="Children">
                <Text Text="Hello World"/>
        <Window>
    </Application>
...
```

The tag definition for the Application contains a line similar to the following:

```
...
    <sys:Param Name="Children" Type="fwk:UIElement"
    Max="Unbounded" Min="0" DefaultParam="true" .../>
...
```

2) The use of default parameters in the standard framework brings the XAD syntax for XAF UI Elements very close to the XAML syntax for Avalon Elements.

> Important Every entity may define one of its parameters as the default parameter. As a result, entities corresponding to a default parameter do not need to be qualified using either the "Param" attribute or a grouping tag.

Recall the FlowPanel example from above.:

```
<FlowPanel>
    <FlowPanel.Children>
        <Text Text="Line 1"/>
        <Text Text="Line 2"/>
    </FlowPanel.Children>
    <XQueryTransform Param="FlowOrientation">
    ...
    </XQueryTransform>
    <FlowPanel.Children>
        <Text Text="Line 3"/>
    </FlowPanel.Children>
</FlowPanel>
```

This can be rewritten without a grouping tag (i.e. FlowPanel.Children) because "Children" is specified as the default parameter for the FlowPanel entity:

```
<FlowPanel>
    <Text Text="Line 1"/>
    <Text Text="Line 2"/>
    <XQueryTransform Param="FlowOrientation">
    ...
    </XQueryTransform>
    <Text Text="Line 3"/>
</FlowPanel>
```

> Important A given instance of an entity may be parameterized with both default and non-default parameters.

Attached Parameters

So far we have established how an entity can declare a closed set of parameters. Now consider the following XAD snippet:

```
<DockPanel>
    <Text DockPanel.Dock="Top" Text="Top of the View" />
    <Text DockPanel.Dock="Bottom" Text="Bottom of the View" />
    <Text DockPanel.Dock="Left" Text="Left" Alignment="Center" />
    <Text DockPanel.Dock="Rght" Text="Right" Alignment="Center" />
</DockPanel>
```

The resultant view would look somewhat like the following:

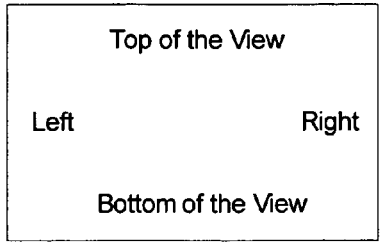

The Text entities are specified as the "Children" parameter of the DockPanel entity.

Recall: there is no need for a grouping tag because *Children* is the default parameter for the DockPanel entity.

The interesting thing to note is that "DockPanel.Dock" is specified as an attribute to each of the Text entities. However, "DockPanel.Dock" is not one of the parameters specified in the tag definition for the Text entity.

Recall: Until now an instance of a tag could only use attributes that were defined as parameters in its corresponding tag definition.

"DockPanel.Dock" is an example of an attached parameter. It is actually defined in the declaration of the DockPanel entity:

```
<sys:TagDefinition Name="DockPanel" Type="fwk:UIElement">
    ...
    <sys:Param Name="Children" Type="fwk:UIElement"
    Max="Unbounded" DefaultParam="true" ... >
        <sys:AttachedParam Name="Dock" Type="sys:Data"
        TargetType="fwk:Dock"/>
    </sys:Param>
    ...
</sys:TagDefinition>
```

This says that for each UI Element specified as a part of the *Children* parameter, it is possible to specify an attached parameter named *DockPanel.Dock*.

A technical restriction (by way of the Xad Engine) of attached parameters (which does not violate any known V1 scenarios) is the inability to specify non-singular attached parameters. For instance, it is illegal to write the following:

```
<sys:AttachedParam Name="Dock" Type="sys:Data"
    TargetType="fwk:Dock" Min="1" Max="Unbounded" />
```

Important The Xad engine does not support non-singular attached parameters.

Important The *Type* of AttachedParam must always be *sys:Data*.

(*TargetType* defines the underlying Managed Avalon type, which defines the Avalon type for the "Dock" attached param.)

The term attached parameter stems form the fact that the parameter is "sponsored" or "attached" by the parent of the entity (rather than the entity itself).

In addition, the DockPanel.Dock syntax is used to callout the nature of the parameter as an attached parameter. The first aspect, DockPanel defines the entity that sponsors the parameter. While the second, *Dock* defines the *Name* of attached parameter that is defined within DockPanel's tag definition.

Important The attached parameters on an entity are specified in the same way as a regular parameter, but they are "authorized" and managed by that entity's parent/containing entity.

Important The default value for an attached parameter is determined by the corresponding XAML element which XAD is exposing. As a result you do not see a default value specified above.

Inline Data

In the examples so far, we have either specified simple static strings via attributes or relied on data sources to bring more complex data into XAD.

The Inline Data entity is a System entity of type "sys:Data" that can be used to embed both simple and complex data directly into XAD.

Instead of writing the following XAD:

```
<foo:Tree>
    <XmlFileDataSource Param="Tree" File="Data.xml"/>
</foo:Tree>
```

It is possible to embedding the data from Data.xml directly into XAD:

```
<Tree>
    <sys:InlineData Param="Tree">
        <Employees>
            <Employee Name="Chris Hackmann"/>
            <Employee Name="Vlado Hristov"/>
            <Employee Name="William Aitken"/>
        </Employees>
    </sys:InlineData>
</Tree>
```

It is also possible to use the Inline Data entity to specify simple text values (though the attribute syntax is much more concise). For certain edge conditions such as strings that begin with "$" or ".", the Inline Data entity is the only way to specify the strings directly within XAD:

```
<Text>
    <sys:InlineData Param="Text">$500</sys:InlineData>
</Text>
```

The resultant view displays:

$500

1) (Follow up with TonyW) Need to explore the idea of easily escaping simple characters i.e. '$' and '.'. In the '$' case it seems a '$$" could be used. There doesn't seem to be any easy way to escape '.'

| | |
|---|---|
| Definition | <sys:InlineData> is an entity tag of type "sys:Data" and yields the simple or complex content written directly under it. |

Parameterization through Binding

Naming of Tags

> Important *Name* is a reserved parameter name.

This simply implies that user-defined parameters cannot be named *Name*. It is illegal to write the following:

```
... <sys:Param Name="Name" ... /> ...
```

> Important The *Name* attribute may be written on any entity, grouping or selector tag.

We have not yet discussed selector tags, but for now this statement implies that all entity and grouping tags can be named. This naming is purely for the purpose of enabling binding (a.k.a sharing of entities). For example:

```
<XmlFileDataSource Name="MyConnector" ...> ... </ XmlFileDataSource >
```

> Important Names must be unique within a scope. If none of the entities in the body of a tag definition introduces a scope, then the name must be unique within the body of the tag definition.

We have not yet introduced the notion of scopes, but for the sake of this discussion it is sufficient to think of certain parameters as introducing a new scope. This statement says that if there are no such "scope introducing" parameters within the body of a tag definition, then names have to be unique within the body of the tag definition.

If there are multiple scopes within a tag definition then the name uniqueness restrictions are relaxed. Names only have to be unique within a given scope. This should become clearer when discussing scoped parameters.

Binding to Entities

Consider 2 views against a common data source. In XAD terms this would involve 3 entities: 2 UI Element entities and a shared Data Source entity.

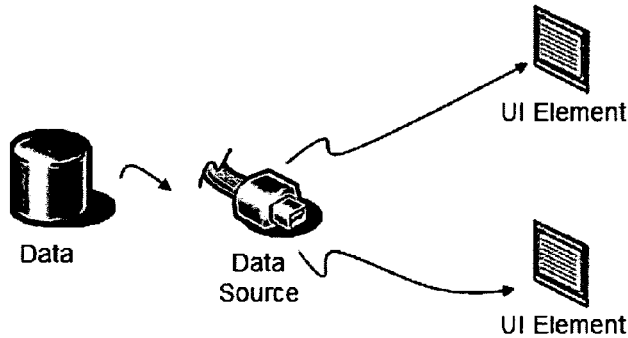

In our discussion so far, there has always been a one-to-one mapping between entities and the entities they are parameterized with. However, sharing of entities is an understandably common scenario. XAD has the necessary constructs to achieve this:

```
<sys:TagDefinition ...>
    ...
    <sys:Body>
        <FlowPanel>
            <XmlFileDataSource Param="Resources"
            Name="SharedDataSource" File="MyTable.xml"/>

<foo:Table Data="$SharedDataSource"/>

<foo:Tree Data="$SharedDataSource"/>
        </FlowPanel>
    </sys:Body>
    ...
</sys:TagDefinition>
```

Important Attributes of the form *SomeParam*="$*SomeName*" imply that the *SomeParam* parameter is bound to the entity named *SomeName*.

Important The type of a parameter and the type of the entity that a parameter is bound to must match.

This means that the following would be illegal:

```
    <BeepCommand Param="Resources" Name="BeepCmd"/>
...
    <Text Text="$BeepCmd"/>
...
```

The Beep Command entity is of type "sys:EventHandler" but the Text parameter is of type "sys:Data".

In the above example with the Table and Tree MyTable.xml has the form:

```
<TableData xmlns="MyData">
    <Row>
        <Column>...</Column>
        <Column>...</Column>
        ...
    </Row>
    <Row>
        <Column>...</Column>
        <Column>...</Column>
        ...
    </Row>
    ...
</TableData>
```

The Tree can consume any tree but the Table requires data with a tabular shape (which is the case for the data above).

Now consider what would happen if Table.xml contained the following instead:

```
<SearchResults xmlns="MyData">
    <Description>...</Description>
    <SearchTime>...</SearchTime>
    <TableData>
        <Row>
            <Column>...</Column>
            <Column>...</Column>
            ...
        </Row>
        <Row>
            <Column>...</Column>
            <Column>...</Column>
            ...
        </Row>
        ...
```

```
    </TableData>
</SearchResults>
```

The Table would end up getting bound to non-tabular data (the <SearchResults> tag).

To solve this mismatch, the Table's binding for its Table parameter would have to be re-written as:

```
xmlns:myd="MyData"
...
<Table Table="$SharedDataSource/myd:TableData">
...
```

The binding reads "bind the Table parameter of the Table to the myd:TableData element within the Xml tree returned by the entity named SharedDataSource."

It is important to note that $SharedDataSource binds to the root of the Xml file i.e. $SharedDataSource aliases <SearchResults ...>. Therefore the location $ShareDataSource/myd:TableData is akin to specifying myd:SearchResults/myd:TableData.

Further note the use of the namespace prefix on the location – this is very important.

Because the Xml file specifies a default namespace of xmlns="MyData" a binding location within Xad must use the same namespace when attempting to access data. In most cases Xad applications use the Xad Framework namespace as the default namespace.

Therefore if the binding was specified as:

```
...xmlns:myd="MyData"
...
<Table Table="$SharedDataSource/TableData">
...
```

And, the Framework namespace was the default namespace in the Xad application the binding would be interpreted as:

```
xmlns:myd="MyData"
...
<Table Table="$SharedDataSource/fwk:TableData">
```

...

Clearly this is not going to provide the desired data from the Xml file. Therefore the declaration of the xmlns:myd="MyData" namespace is very important. Failure to do this is often the cause of many frustrating application bugs.

> Important Bindings of the form $SomeName/SomeXPath imply binding to a location within the tree exposed by the data entity named *SomeName*. The location is specified by *SomeXPath*. *SomeXPath* must be a valid Relative Location.

> Definition A data entity is any entity of type "sys:Data."

The entities that can actually be bound to within the body of a given tag definition is limited by the notion of scopes. This will be covered in more depth when the notion of scoped parameters is introduced below.

Valid Relative Locations

The following Xml file (RelLocData.xml) is used in the below relative location examples:

```
<TableData xmlns="MyData">
    <Employees>
        <Employee ID="1">
            <Name>Stephen Danton</Name>
            <Office>36/2163</Office>
        </Employee>
        <Employee ID="2">
            <Name>Andy Wassyng</Name>
            <Office>36/2139</Office>
        </Employee>
    </Employees>
</TableData>
```

> 3) Be aware that relative locations are XPath expressions, which if used to denote a data entity must resolve to a value of sys:Data.

> 4) XPath is a highly complex language, the following examples touch on common Xad location expressions, and as a result this section is by no means an exhaustive reference.

> For further details on XPath please visit the XPath specification at:
> http://www.w3.org/TR/xpath

*Specifying a Text Element*

```
<?xml version="1.0" encoding="UTF-8" ?>
<sys:Xad
    xmlns:sys = "http://schemas.microsoft.com/2005/xad/system"
    xmlns     = "http://schemas.microsoft.com/2005/xad/framework"
    xmlns:myd = "MyData"
>
    ...
    <Text Text="$RelLocData/myd:Employees/myd:Employee/myd:Name" />
    ...
    <XmlFileDataSource Name="RelLocData" File="RelLocData.xml" />
</sys:Xad>
```

Yields the value: Stephen Danton

> 5) It is possible, but not necessary to rewrite this location as
> $RelLocData/myd:Employees/Employee/Name/text(). By default, the location
> obtains the text element of the element specified by the location.

*Some details to be aware of*

A key aspect to note is how a relative location is mapped to the underlying data source. Notice that $RelLocData does <u>not map to the Xml document in general</u>. Instead, it maps to the document's root: <TableData ...>. Another way to think about this is that $SomeBinding aliases the Xml root of the data it is bound to. It is for this reason that we can write...

```
... Text="$RelLocData/myd:Employees..." />
```

...as it is essentially the same as writing myd:TableData/myd:Employees....

Some other aspects to be aware of when using binding. When a data source does not have a root $SomeBinding binding directly to the text element of the data and exposes that as its value, for instance:

```
<sys:InlineData Name="UnrootedData">Where is my root?</sys:InlineData>
```

In this case specifying Text="$UnrootedData", sees $UnrootedData map directly to the string "Where is my root?"

A final scenario that should already be understood but is nice to explicitly call out is the root-only data source, for instance:

```
<sys:InlineData Name="RootOnlyData">
    <Root>I Root therefore I am</Root>
</sys:InlineData>
```

In this case $RootOnlyData maps to the tag <Root> and by default returns the first text element under the tag, namely the string "I Root therefore I am"

*Specifying an Attribute's Value*

```
<?xml version="1.0" encoding="UTF-8" ?>
<sys:Xad
    xmlns:sys = "http://schemas.microsoft.com/2005/xad/system"
    xmlns = "http://schemas.microsoft.com/2005/xad/framework"
    xmlns:myd = "MyData"
>
    ...
    <Text Text="$RelLocData/myd:Employees/myd:Employee[@ID='1']/@ID"
    />
    ...
    <XmlFileDataSource Name="RelLocData" File="RelLocData.xml" />
</sys:Xad>
```

Yields the value: 1

> 6) Attributes do not need namespace prefixes.

> 7) text() should not be used with attribute i.e. @ID/text() is not valid.

*Specifying a particular child*

```
<?xml version="1.0" encoding="UTF-8" ?>
<sys:Xad
    xmlns:sys = "http://schemas.microsoft.com/2005/xad/system"
    xmlns = "http://schemas.microsoft.com/2005/xad/framework"
    xmlns:myd = "MyData"
```

```
>
    ...
    <Text Text="$RelLocData/myd:Employees/myd:Employee[2] " />
    ...
    <XmlFileDataSource Name="RelLocData" File="RelLocData.xml" />
</sys:Xad>
```

Yields the value: Andy Wassyng (i.e. the second child of Employees).

$TODO Add to this list as time allows

Binding to Grouping Tags

In addition to being able to bind to entity tags it is possible to bind to grouping tags. For example:

```
...
    <Resources Name="MyDataSources">
        <XmlFileDataSource ... />
        <SQLDataSource ... />
        <XmlFileDataSource ... />
    </Resources>
...
    <MergeTreesTransform Trees="$MyDataSources" />
...
```

The Merge Trees Transform entity has a parameter called "Trees" that takes a set of entities of type "sys:Data". By binding to the Resources grouping tag, the Merge Trees Transform is being "bound" to the set of entities under the Resources grouping tag.

Important Binding to a grouping tag results in binding to the set of entities specified under the grouping tag.

Binding to the Formal Parameters of a Tag Definition

Even though this topic is being discussed in the context of binding, it is really about more than just binding of parameters. It shows how XAD can be used to easily create tags with progressive levels of abstraction (much like functions in traditional languages).

Consider the following snippet of XAD:

```
<FlowPanel>
```

```
    <Text FontWeight="Bold" Text="My Caption"/>
    <foo:Table FontFamily="Arial">
        <XmlFileDataSource Param="Table" File="MyTable.xml"/>
    </foo:Table>
</FlowPanel>
```

It is realistic to assume that one might want to refashion this snippet of XAD as an abstraction named "TableWithCaption." Much like with functions, users of the abstraction might want to re-parameterize some of the behavior. This could be achieved by creating a new entity tag named "TableWithCaption." The tag would take 2 parameters: "Caption" & "TableFile." An XAD author could achieve this through a purely declarative definition:

```
<sys:TagDefinition Name="foo:TableWithCaption" Type="fwk:UIElement">
    <sys:Param Name="Caption" Type="sys:Data"
        Schema="xsd:string"/>
    <sys:Param Name="TableFile" Type="sys:Data"
        Schema="xsd:string"/>

<sys:Body>
        <FlowPanel>
            <Text FontWeight="Bold" Text="$Caption"/>
            <Table FontFamily="Arial">
                <XmlFileDataSource Param="Table"
    File="$TableFile"/>
            </Table>
        </FlowPanel>
    </sys:Body>
</sys:TagDefinition>
```

Notice how formal parameters are referenced in exactly the same way that entities *within* the body of a tag definition are referenced.

> Important Within the body of a tag definition, formal parameters to the tag definition may be referenced by binding constructs of the form *SomeParam="$FormalParamName"*.

> Important For formal parameters of type "sys:Data" it is possible to write binding constructs of the form: *SomeParam="$FormalDataParamName/SomeXPath"*. *SomeXPath* must be a valid Relative Location.

> Important The type of a parameter and the type of the formal parameter that a parameter is bound to must match.

> Important The names of entities within the body of a tag definition and the names of formal parameters to a tag definition may not collide.

This is the equivalent of disallowing shadowing of formal parameters by local variables. It is illegal to write the following:

```
<sys:TagDefinition ...>
    ...
    <sys:Param Name="MyData" ... />
    <sys:Body>
        <sys:XmlFileDataSource Param="Resources" Name="MyData" ... />
        ...
    </sys:Body>
</sys:TagDefinition>
```

An actual instantiation of the TableWithCaption tag might be as follows:

```
<foo:TableWithCaption Caption="Sales" TableFile="SalesTable.xml"/>
```

A common scenario when creating abstractions such as TableWithCaption would be providing default values for some of the parameters. Tag definitions have a provision for specifying such default values. In this case, the Caption parameter is specified as optional and defaulted to the string "Results."

```
<sys:TagDefinition Name="foo:TableWithCaption" Type="fwk:UIElement">
    <sys:Param DefaultParam="true" Name="Caption"
    Type="sys:Data" Schema="xsd:string" Min="0"/>
    <sys:Param Name="TableFile" Type="sys:Data" Schema="xsd:string"/>

<sys:ParamDefaultValue Param="Caption" Value="Results"/>

<sys:Body>
        <FlowPanel>
            <Text FontWeight="Bold" Text="$Caption"/>
            <foo:Table FontFamily="Arial">
                <XmlFileDataSource Param="Table" File="$TableFile"/>
            </foo:Table>
        </FlowPanel>
    </sys:Body>
```

```
</sys:TagDefinition>
```

The instantiation of "TableWithCaption" would no longer require a *Caption*:

```
<foo:TableWithCaption TableFile="SalesTable.xml"/>
```

If the default were not a string, the declaration of the default would include an inline entity tag. For example:

```
<sys:ParamDefaultValue Param="DataFile">
    <XmlFileDataSource Param="Value" File="DefaultData.xml/>
</sys: ParamDefaultValue >
```

Using Binding to Enable Editing

Setting the *Writable* attribute on <sys:InlineData> makes the Inline Data entity writable.

> Important *Writable* is really a constant parameter and hence cannot be data bound and must be expressed using a static value.

The following example illustrates trivial usage of a writable Inline Data entity as a "scratchpad" within XAD:

```
<Text>
    <sys:InlineData Param="Text" Name="ScratchData"
    Writable="true">
        <Greeting>Bye</Greeting>
    </sys:InlineData>

<SetTextValueAction Param="MouseLeftButtonDown"
        Data="$ScratchData" NewValue="Ciao"/>

<SetTextValueAction Param="MouseRightButtonDown"
        Data="$ScratchData" NewValue="Au Revoir"/>

</Text>
```

When the Text is first displayed, the text displayed is the initial value of the Inline Data entity:

Bye

"MouseLeftButtonDown" is a parameter of type "sys:EventHandler". The action corresponding to the "MouseLeftButtonDown" parameter (denoted by Param="MouseLeftButtonDown") is invoked whenever the Text entity encounters a Left Mouse Down event.

In this case, the SetTextValueAction will be invoked and will change the text value of the <Greeting> element in the Inline Data entity. This is because the SetTextValueAction is bound to the Inline Data entity via the *Data* (denoted by Data="$ScratchPad") parameter. In summary, a Left Mouse Down event received byText will result in the Text displaying:

```
Ciao
```

Likewise a Right Mouse Down event will result in the Text displaying:
```
Au Revoir
```

Binding of Actions to writable data is a common way of achieving editability in XAD.

Consider a slightly different scenario involving insertion of new rows in a table:

```
...
<Application.Resources>
    <XmlFileDataSource Name="CDTable" File="CDs.xml"/>
    ...
</Application.Resources>
...
<foo:Table Table="$CDTable">
    <AppendSiblingTreeAction Param="MouseRightButtonDown"
    Sibling="$CDTable/CDs">
        <sys:InlineData Param="Tree">
            <CD>
                <Title>?</Title>
                <Artist>?</Artist>
                <Price>0.00</Price>
            </CD>
        </sys:InlineData>
    </AppendSiblingTreeAction >
</foo:Table>
...
```

If CDs.xml contains the following:

```
<CDs>
    <CD>
        <Title>Achtung Baby</Title>
        <Artist>U2</Artist>
        <Price>19.99</Price>
    </CD>
    <CD>
        <Title>Firestarter</Title>
        <Artist>Prodigy</Artist>
        <Price>21.99</Price>
    </CD>
</CDs>
```

Then the table initially displayed will look like:

| | | |
|---|---|---|
| Achtung Baby | U2 | 19.99 |
| Firestarter | Prodigy | 21.99 |

When the Table receives a Right Mouse Down event, the AppendSiblingTreeAction will be invoked and will append the value specified for its *Tree* attribute to the node provided by its *Sibling* param. After this has occurred the tree will like:

```
<CDs>
    <CD>
        <Title>Achtung Baby</Title>
        <Artist>U2</Artist>
        <Price>19.99</Price>
    </CD>
    <CD>
        <Title>Firestarter</Title>
        <Artist>Prodigy</Artist>
        <Price>21.99</Price>
    </CD>
    <CD>
        <Title>?</Title>
        <Artist>?</Artist>
        <Price>0.00</Price>
    </CD>
</CDs>
```

Because of the update to the tree, the table display will be automatically updated so that it looks as follows:

| | | |
|---|---|---|
| Achtung Baby | U2 | 19.99 |
| Firestarter | Prodigy | 21.99 |
| ? | ? | 0.00 |

Main Tag

As seen in the canonical Hello World example above, the entry point for a Xad application is analogous to the Main function in a C or C# application. When the Xad design time shell, Xad.exe, runs it looks for the "Main" TagDefinition i.e. the tag with Name="sys:Main" and uses that as the entry point for the application.

Continuing with similarities to popular imperative languages the sys:Main tag definition can be parameterized with command line values. Further, it exposes three pre-defined values that are automatically supplied with values upon execution of the application.

Auto-populated Params 3 names are reserved for sys:Main param tags, these are XadBaseDirectory, InitialWorkingDirectory, and Metadata Each of these is exposed and bound to in the same manner. In addition, each of them is read-only. Below we present an example of using XadBaseDirectory param.

XadBaseDirectory is commonly used in association with the XmlFileDataSource as the value of its *BaseUri* param, consider the following Xad...

```
<sys:TagDefinition Name="sys:Main" Type="fwk:Application">
    <sys:Param Name="XadBaseDirectory" Type="sys:Data" />
        <sys:Body>
            <Application>
                <!-- // Resources for the Application // -->
                <Application.Resources>

<!-- // Xml File Data Sources // -->
                    <XmlFileDataSource Name="Songs"
AccessMode="ReadWrite"                    BaseUri="$XadBaseDirectory"
File="Songs.xml" />
```

> ... additional Xad ...

... using $XadBaseDirectory as the value of *BaseUri* says that the file associated with the DataSource will be looked for in location of the file passed to Xad.exe; the design time shell for Xad applications. So if foo.xad is the application and it lives in C:\xaf\demos\personal\ then the XadBaseDirectory will equal C:\xaf\demos\personal and the file defined by *File* will be searched for within that directory path.

The following defines the auto-populated values of the 3 reserved params:
- XadBaseDirectory – String which denoted the Xad base directory of the application i.e. the directory from which the app was launched, not the location of where Xad.exe was launched
- InitialWorkingDirectory – String which denoted the initial working directory of the application i.e. the directory from which the app was launched, not the location of where Xad.exe was launched
- Metadata – [SMD3]Tree of merged metadata for all loaded assemblies currently associated with the application.

The following Xad application demonstrates the use of all three params...

```xml
<?xml version="1.0" encoding="utf-8" ?>
<sys:Xad xmlns="http://schemas.microsoft.com/2005/xad/framework"
    xmlns:sys="http://schemas.microsoft.com/2005/xad/system"
    >

<sys:TagDefinition Name="sys:Main" Type="Application">
        <sys:Param Name="XadBaseDirectory" Type="sys:Data" />
        <sys:Param Name="InitialWorkingDirectory" Type="sys:Data" />
        <sys:Param Name="Metadata" Type="sys:Data" />
        <sys:Body>
            <Application>
                <Window>
                    <DockPanel>
                        <Text DockPanel.Dock="Top"
                            Text="$XadBaseDirectory" />
                        <Text DockPanel.Dock="Top"
                            Text="$InitialWorkingDirectory" />
                        <XmlView Data="$Metadata" />
```

```
                </DockPanel>
            </Window>
        </Application>
    </sys:Body>
</sys:TagDefinition>
</sys:Xad>
```

Important Each of the auto-populated main params are read-only and therefore cannot be altered by the application at runtime.

Command line parameterization

Aside from the reserved auto-populated sys:Main params, an application can specify any number of params with other names as params of sys:Main. These params can be parameterized on the command line and can be used for all manner of app configuration. The following Xad provides and example of specifying a sys:Main param and then the command line which provides its value...

```
...
<sys:TagDefinition Name="sys:Main" Type="Application">
    <sys:Param Name="TextData" Type="sys:Data" />
    <sys:Body>
        <Application>
            <Window>
                <FlowPanel>
                    <Text Text="$TextData" />
                </FlowPanel>
            </Window>
        </Application>
    </sys:Body>
</sys:TagDefinition>
...
```

... Command line ...

xad CommandLine.xad /TextData=Testing

... more generally ...

xad <AppFile> [/<ParamName1>=<Value1>[ /<ParamName2>=<Value2>[ ...]]] [Switches]

... results in the following application...

(The value passed into the command line param, need not be simple text, it could be the name of a file, an image location, etc.)

*Ignored Blocks*

Recall that Xad is an Xml based language. More specifically, any Xad code must be valid Xml. This creates an interesting limitation when trying to develop an Xad application a "comment-out and code" approach. To be clear, Xml does not support nesting of comments, for instance the following Xml is illegal:

```xml
<!-- Comment out this section

<!-- An interior comment -->

<FlowPanel>
    ...
    </FlowPanel>
-->
```

Therefore, unlike imperative languages such as C++ or C#, commenting-of-comments is impossible in Xad without any special syntax to support such an operation, this feature comes in the form of the tag named sys:IgnoredBlock and is defined below.

An IgnoredBlock tag can live anywhere *under* the <sys:Xad> scope, so long as the remaining Xad is valid. Consider the following ...

```xml
<sys:Xad
    xmlns = " ..."
    xmlns:fwk = "..."
    xmlns:sys = "..."
>

<sys:TagDefinition Name="sys:Main" Type="fwk:Application">
        <Application>

</Application>
    </sys:TagDefinition>

</sys:Xad>
```

... an Xad comment tag cannot be wrapped around any of these elements, as all of them are essential for a valid Xad application.

The first occurrence of IgnoredBlock tag causes it and its children to be ignored by the Xad checker, consider the following valid Xad...

```
<sys:Xad
    xmlns = "..."
    xmlns:fwk = "..."
    xmlns:sys = "..."
>

<sys:TagDefinition Name="sys:Main" Type="fwk:Application">
        <Application>
            <FlowPanel>
                <Text Text="Testing" />
            </FlowPanel>
        </Application>
    </sys:TagDefinition>

</sys:Xad>
```

... adding the following IgnoredBlock tag ...

```
<sys:Xad
    xmlns = "..."
    xmlns:fwk = "..."
    xmlns:sys = "..."
>

<sys:TagDefinition Name="sys:Main" Type="fwk:Application">
        <Application>
            <FlowPanel>
                <sys:IgnoredBlock>
                    <Text Text="Blork" />
                </FlowPanel>
                </sys:IgnoredBlock>
        </Application>
    </sys:TagDefinition>

</sys:Xad>
```

... causes this to become invalid Xml and in this case invalid Xad. Therefore the Xad checker will report an error for invalid Xml, since Xad must be valid Xml before further checking can be performed.

Nesting <sys:IgnoredBlock> is allowed so long as nesting retains Xml validity...

```
<sys:IgnoredBlock>
    <sys:IgnoredBlock>
        <Text Text="Foo" />
    </sys:IgnoredBlock>
</sys:IgnoredBlock>
```

Consider the following Xad which shows an Xml comment outside <sys:IgnoredBlock>...

```
<!-- Comment
<sys:IgnoredBlock>
    <Text Text="Testing This Out" />
</sys:IgnoredBlock>
-->
```

...is treated as one large Xml comment i.e. the IgnoredBlock has no special functionality here is it just a string of characters inside an Xml comment.

Consider an Xml comment outside <sys:IgnoredBlock> which wraps an Xml comment...

```
<!-- Comment
<sys:IgnoredBlock>
    <Text Text="Ohh Yea!" />
    <!-- Some comment -->
</sys:IgnoredBlock>
-->
```

This is illegal. As noted above, Xad must always be valid Xml. Recall: by definition you cannot wrap Xml comments in comments.

Unlike Xml comments, <sys:IgnoredBlock> cannot be used to escape invalid Xml...

```
<sys:IgnoredBlock>
    <FP>
    <A>
    <B>
</sys:IgnoredBlock>
```

... the above Xad would return a checking error for invalid Xml: <FP>, <A> and <B> are without closing tags.

However, if we add Xml comments this is okay ...

```
<sys:IgnoredBlock>
    <!-- <FP>
    <A>
    <B> -->
</sys:IgnoredBlock>
```

> Important "Interior Ignores" or the ability to ignore attributes is not supported.

An IgnoredBlock tag *cannot* be used to comment out the internals of sys:InlineData, consider the following Xad...

```
<sys:InlineData Name="Foo" Writable="true">
    <ABC>
        <EFG></EFG>
        <sys:IgnoredBlock>
            <EFG></EFG>
        </sys:IgnoredBlock>
        <EFG></EFG>
        <EFG></EFG>
    </ABC>
</sys:InlineData>
```

... the above code gets interpreted as "inline data", <EFG></EFG> is not ignored, in fact <sys:IgnoredBlock> becomes the parent of <EFG>. Therefore, the inline data is actually defining data that is easier to see as...

```
<sys:InlineData Name="Foo" Writable="true">
    <ABC>
        <EFG></EFG>
        <sys:IgnoredBlock>
            <EFG></EFG>
        </sys:IgnoredBlock>
        <EFG></EFG>
        <EFG></EFG>
    </ABC>
</sys:InlineData>
```

*Out Parameters*

> $TODO This will be detailed in M3.

*Whitespace*

All data coming into an Xad application is treated "as is" – whether specified by data binding or statically defined by the Xad author. Therefore, Xad will not expose any UI component specific control for controlling whitespace. This means that, unlike Xaml, we do not expose an xml:space="Preserve | Default" at the UI element level – this is an area of non-alignment with Xad and Xaml.

Choosing not to support a "preserve whitespace" param on each UI element, Data Source, Transform, etc. allows us to appeal to the Office class application - this type of whitespace management is simply not realistic for an Office class app. Instead, we exposure a WhitespaceTransfrom (temporary name – MM3 feature) that allows an Xad author to define how whitespace is handled in a more global/data-driven fashion.

Consider the following scenarios...

Treat all whitespace as-is. Meaning if you have the following Xad...

```
<Text Text="Steve      "/>
```

... it appears as:

"Steve      "

Similarly with...

```
<Text Text="      Steve"/>
```

... it appears as:

"      Steve"

Similarly with...

```
<Text Text="   S t e v e    "/>
```

... it appears as:

"   S t e v e    "

Also...

<Text Text="$foo" />

Where $foo = " Steve "

(Repeat for all derivations of the values of $foo.)

> Important We recognize/support (as per System.Xml) xml:space="Preserve | Default" on Xml data which we read into a DataConnector and, in general read in all Xml data as per the System.Xml conventions.

> Important In MM3 we will add support for a WhitespaceTransform

*Structures*

The absence of structures within XAD does not preclude any application functionality. However, structures do simplify several authoring workflows for large XAD applications.

Consider an application that has 1 action (Save) and 3 pieces of state (Recent Documents, User Preferences and Enterprise Preferences) defined at the top-level. If the application has several panes (modeled as derived tags of type "fwk:UIElement"), the issues are that:

1. Each parameter has to be passed explicitly to each pane (aggregation of data parameters via XQuery can be used to reduce the number of data parameters but does not help for non-data parameters)
2. Adding an extra action (e.g. Print) requires the addition of a new parameter to each pane (note that modification of each pane's tag definition can be avoided if the panes were designed to share parameter groups; however all pane instances still need to be updated)
3. There is no mechanism to group parameters by nested categories (achieved in classic OO by classes whose properties are other classes; achieved in XAF via connector interfaces)

This scenario is illustrated by the below diagram for further clarification:

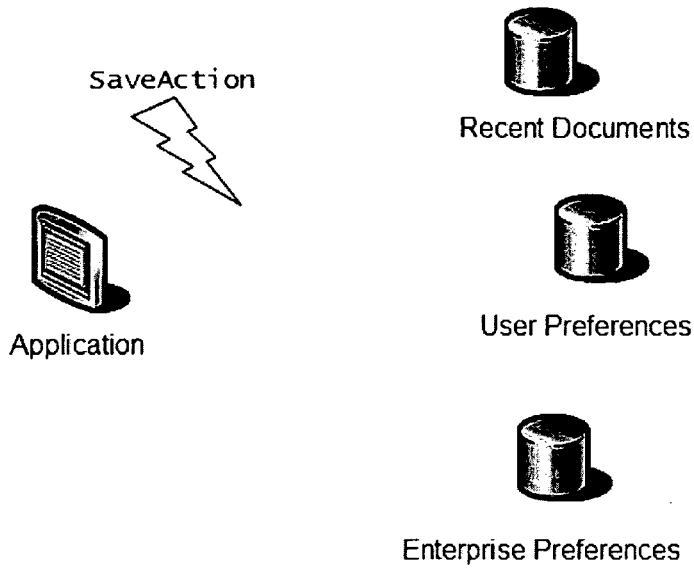

For the sake of illustration, we will first discuss "single-level structures" (to address the first two issues) and then generalize to "nested structures" (to address the third issue). Really there is only one collective feature which is "structures".

Single-level structures

The following XAD would be written to specify the signature for the structure:

```
<sys:Signature Name="app:ActionsAndDataSignature"
    Type="sys:Object">
    <sys:OutParam Name="SaveAction" Type="sys:EventHandler"/>
    <sys:OutParam Name="PrintAction" Type="sys:EventHandler"/>
    <sys:OutParam Name="RecentDocuments" Type="sys:Data"/>
    <sys:OutParam Name="UserPreferences" Type="sys:Data"/>
    <sys:OutParam Name="EnterprisePreferences" Type="sys:Data"/>
</sys:Signature>
```

Important Signatures suitable for structures must: (1) Have type equal to sys:Object, (2) contain only out parameters, (3) cannot include choices i.e. <sys:Choice> and (4) cannot have an OutParam named *Signature*.

A sample structure using the "app:ActionsAndDataSignature" signature would be:

```
<XmlFileDataSource Name="Preferences" ... />
<app:PrintAction Name="AppPrintAction" ... />

<sys:Structure Signature="app:ActionsAndDataSignature"
    Name="ActionsAndData"
                PrintAction="$MyPrintAction">
                UserPreferences="$Preferences/User"
                EnterprisePreferences="$Preferences/Enterprise"
    <app:MyAppSaveFilesAction Param="SaveAction" ... />
    <FileDataSource Param="RecentDocuments" ... />
</sys:Structure>
```

Important Structure parameters may be specified as all inline, all bound, or as a combination of inline and bound.

Important Parameters with signatures can only take values with the same signature – same type is not enough. The same is true for the default values of those parameters.

Important All structure parameters must have values assigned.

Structures can be used within tag definitions, an example of this is shown below:

```
<sys:TagDefinition Name="app:SomeAppPane" Type="fwk:UIElement">
    <sys:Param Name="ActionsAndData"
    Signature="app:ActionsAndDataSignature"/>
    <sys:Body>
        ...
    </sys:Body>
</sys:TagDefinition>
```

An instance of the pane would be:

```
<app:SomeAppPane ActionsAndData="$ActionsAndData"/>
```

Within the body, the following bindings would be valid for all parameters of type "sys:EventHandler":

- "$ActionsAndData.PrintAction"
- "$ActionsAndData.SaveAction"

Within the body, the following bindings would be valid for all parameters of type "sys:Data":

- "$ActionsAndData.RecentDocuments"
- "$ActionsAndData.UserPreferences"
- "$ActionsAndData.EnterprisePreferences"

Note that if for example, the user preferences were modeled by a data tree of the form:

```
<app:UserPreferences>
    <AutoSaveFrequency>10</AutoSaveFrequency>
    ...
</app:UserPreferences>"
```

Then it would be possible to bind to the Auto Save Frequency setting via:
"$ActionsAndData.UserPreferences/AutoSaveFrequency".

Within the body, the following bindings would be valid for all parameters of signature "app:ActionsAndDataSignature" (typically parameters to other derived tags that need to access the application's actions and preferences):

- "$ActionsAndData"

Nested structures

The same scenario can be solved using nested structures (simply a generalization of single-level structures):

```
<sys:Signature Name="app:ActionsAndDataSignature"
    Type="sys:Object">
    <sys:OutParam Name="Actions"
    Signature="app:ActionsSignature"/>
    <sys:OutParam Name="Preferences"
    Signature="app:PreferencesSignature"/>
    <sys:OutParam Name="RecentDocuments" Type="sys:Data"/>
</sys:Signature>
```

```
<sys:Signature Name="app:ActionsSignature" Type="sys:Object">
    <sys:OutParam Name="Save" Type="sys:EventHandler"/>
    <sys:OutParam Name="Print" Type="sys:EventHandler"/>
</sys:Signature>
```

```
<sys:Signature Name="app:PreferencesSignature" Type="sys:Object">
    <sys:OutParam Name="User" Type="sys:Data"/>
    <sys:OutParam Name="Enterprise" Type="sys:Data"/>
</sys:Signature>
```

```
<sys:TagDefinition Name="app:SomeAppPane" Type="fwk:UIElement">
    <sys:Param Name="ActionsAndData"
    Signature="sys:ActionsAndDataSignature"/>
    <sys:Body>
        ...
    </sys:Body>
</sys:TagDefinition>
```

Within the body, the following bindings would be valid for all parameters of type sys:EventHandler:
- "$ActionsAndData.Actions.Print"
- "$ActionsAndData.Actions.Save"

Within the body, the following bindings would be valid for all parameters of type sys:Data:
- "$ActionsAndData.RecentDocuments"
- "$ActionsAndData.Preferences.User"
- "$ActionsAndData.Preferences.Enterprise"

Within the body, the following bindings would be valid for all parameters of Signature app:ActionsAndDataSignature (typically parameters to other derived tags that need to access the application's actions and preferences):
- "$ActionsAndData"

Within the body, the following bindings would be valid for all parameters of Signature app:ActionsSignature (typically parameters to other derived tags that need to access *only* the application's actions):

- "$ActionsAndData.Actions"

Within the body, the following bindings would be valid for all parameters of Signature app:PreferencesSignature (typically parameters to other derived tags that need to access *only* the application's preferences):

- "$ActionsAndData.Preferences"

Styles

The main applications of Avalon styles are:

- Defaulting property values for specific elements
- Defaulting the appearance of the visual tree under specific elements
- Defaulting the input response for specific elements (visual triggers)
- Specifying how to display repeated children of a control These fall into 3 categories:

1. Aspects of styles that we will embrace in SDK1; we will additionally add value by generalizing the XAML model and making it applicable to XAD specific concepts (e.g. derived tags); the syntax will not necessarily be identical, but close enough to qualify as an area of alignment. E.g. Defaulting property values.
2. Aspects of styles that are challenging to embrace in a generalized way without substantial design; these are aspects that are valuable and we need to embrace somehow post-SDK1: E.g. Visual Trees and Visual Triggers.
3. Aspects of styles that are fragile as currently designed and unlikely to scale for purposes of authoring "Office-grade applications"; they are addressed by preferred XAD approaches. E.g. Displaying repeated children. In addition we might support the XAML approach for the sake of compatibility but these decisions will be made post-SDK1.

This document focuses on the areas that we will embrace in SDK1, namely defaulting of property values.

Styles for Defaulting Purposes

The XAD engine will process a special tag named <sys:Style> that is specified as a resource. It will allow the specification of default parameter values and will not be limited to UI entities. The following is an example of a default specification:

```
<DockPanel>
    ...
    <sys:Style Param="Resources">
        <TextBox Width="100%" Height="100%">
            <SolidBrush sys:Param="Background" Color="Red"/>
        </TextBox>
    </sys:Style>
</DockPanel>
```

This implies that until another default style is specified for TextBox, the XAD engine will do the following when creating a TextBox:

- Set its Width to 100% *only if* no explicit Width is specified
- Set its Height to 100% *only if* no explicit Height is specified
- Set its Background to a solid red brush *only if* no explicit Background is specified.

Important The scope of influence of a style is strictly hierarchical i.e. the style above is applicable only to entities that live beneath the DockPanel in the entity tree.

"Style information" will simply be stored along with the hierarchical environment that the XAD engine already preserves for linking. Lookup of styles will be a hash-lookup and will not require walking up a tree. We are different from Avalon here because we are leveraging the fact that there is a runtime artifact to XAD (delayed processing-scopes). Besides, an approach that involves walking the visual tree would strictly limit defaulting to UI entities.

Turning off a style can be achieved by specifying no parameters on the entity to be styled. The following would disable any previous styling for TextBox:

```
<DockPanel>
    ...
    <sys:Style Param="Resources">
        <TextBox/>
    </sys:Style>
</DockPanel>
```

Defaulting will be equally applicable to derived tags:

```
<Application>
    ...
    <sys:Style Param="Resources">
        <MyCustomTextBox Width="100%" Height="100%">
            <SolidBrush sys:Param="Background" Color="Red"/>
        </MyCustomTextBox>
    </sys:Style>
</Application>
```

An example of defaulting applied to non-UI entities is:

```
<Application>
    ...
    <sys:Style Param="Resources">
        <XmlFileDataSource AccessMode="ReadOnly"/>
    </sys:Style>
</Application>
```

This implies that if the AccessMode parameter for an XmlFileDataSource is not specified explicitly, then it is set to ReadOnly.

Note that required parameters have to be specified within XAD. It is not possible to rely on a required parameter being set by a style e.g. the *Path* parameter for XmlFileDataSource. This restriction exists to allow for composition. Relying on the presence of a style is fragile.

8) This is less relevant to UI Element tags since all UI Connector parameters are optional.

In addition, it will be possible to specify defaults at the level of a type:

```
<Application>
    ....
    <sys:Style Param="Resource">
        <UIElement Width="100%" Height="100%">
            <SolidBrush sys:Param="Background" Color="Red"/>
        </UIElement>
    </sys:Style>
</Application>
```

This implies that until another default style is specified for UIElement, the XAD engine will do the following when creating *any* UI Connector:

- If
    1. the Width parameter is supported
    2. and the Width parameter is not explicitly specified
    3. And a style specific to the UI Element in question (e.g. a TextBox specific style) is not specified, then the Width is set to 100%.
- Ditto for Height
- Ditto for Background 2) Should we require an exact type match or should we check for the "closest IsAssignableFrom" match in addition?

The type-checking for styles will need to be more lax than for regular XAD. Specifically:

- The parameters on "type-styles" (e.g. the "UIElement" example above) will not be checked as each UIElement can introduce its own parameters. If the type is a signature and hence prescribes certain parameters, those parameters will be type-checked (this is possible because we do not allow overriding of parameters in XAD).
- The values of attached parameters within styles will be checked i.e. DockPanel.Dock="Garbage"' will be disallowed. However, it will be possible to write any declared attached parameter on a style. For example it will be possible to write the following even though the style may be applied to a TextBox that is *not* the child of a DockPanel:

```
<sys:Style Param="Resource">
    <TextBox Width="100%" DockPanel.Dock="Top"/>
<sys:Style>
```

3) We will have to make the notion of attached parameters global. This will be required post-SDK1 for bubbled events in any case.

Like XAML, we will support binding to a specific style through an implicit system level parameter on all entities called "Style".

```
<DockPanel>
    <sys:Style Param="Resources" Name="MyTextStyle">
        <TextBox Width="100%" Height="100%">
            <SolidBrush sys:Param="Background" Color="Red"/>
        </TextBox>
    </sys:Style>

<TextBox sys:Style="$MyTextStyle"/>
</DockPanel >
```

The style does however need to be in scope. Note that the scope restriction is not really specific to styles but is a consequence of our scoped binding model. We can support global binding to specific types of entities such as Styles if the need arises, but for now we would like to see how far we can go with a scoped model.

Even though it has no practical application, note that for the sake of consistency it will be possible to write the following:

```
<TextBox>
    <sys:Style Param="Style">
        <TextBox Width="100%" Height="100%">
            <SolidBrush sys:Param="Background" Color="Red"/>
        </TextBox>
    </sys:Style>
</TextBox>
```

Binding to styles will be type-safe. Consequentially the following will result in an error:

```
<ListBox sys:Style="$MyTextStyle"/>
...
<sys:Style Param="Resources>
    <Text Name="MyTextStyle" .../>
</sys:Style>
```

In summary, we will be supporting Avalon's model for defaulting using styles and adding value in a few areas:

- Defaulting applies to all entities (not just UI entities)
- Defaulting applies to derived tags (not just primitive tags)

- Defaulting can be done at the level of types e.g. all UIElements (Avalon is very likely to support this eventually)

Defaulting at the level of types will not be implemented for SDK1.

Styling of Avalon's Visual Tree

The XAD design for this area will be done post-SDK1 along with the corresponding UI Connector design.

Styling and Visual Triggers

The XAD design for this area will be done post-SDK1 along with the corresponding UI Connector design.

Scoped Parameters

Some parameters introduce a new scope. Parameters that introduce a new scope have the "NewScope" attribute set to true:

```
<sys:Param Name="..." NewScope="true" .../>
```

Parameters may choose to introduce scopes for different reasons:

- To introduce scope variables
- To introduce a unit of delayed and/or repeated work
- All of the above The notions of scoped variables and delayed/repeated work will be defined in this section.

Entities associated with a scoped parameter live at a scope boundary. By virtue of the parameter they are associated with, they introduce a scope boundary. The following diagram illustrates how nested scope-introducing entities and grouping tags result in a tree of scopes:

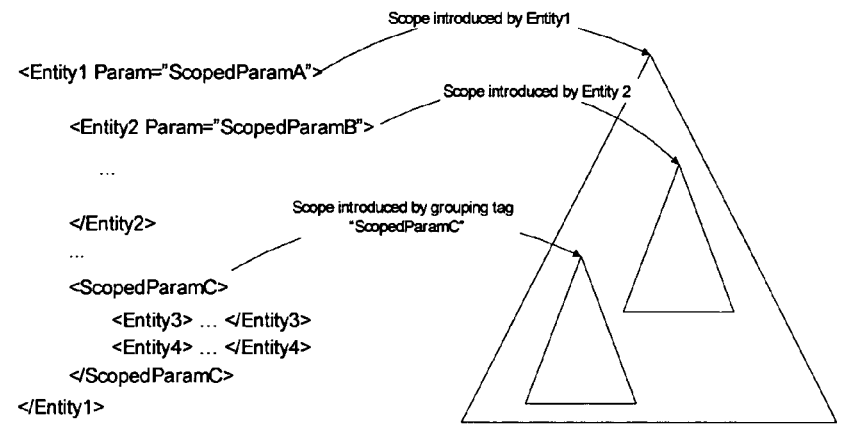

```
<Entity1 Param="ScopedParamA">
    <Entity2 Param="ScopedParamB">
        ...
    </Entity2>
    ...
    <ScopedParamC>
        <Entity3> ... </Entity3>
        <Entity4> ... </Entity4>
    </ScopedParamC>
</Entity1>
```

Scope Variables

One reason for a parameter to introduce a new scope is to introduce a set of variables within the scope. The variables are much like formal parameters except that they are declared implicitly. Binding to scoped variables is done in the same way that one binds to formal parameters.

Scoped variables are declared along with the declaration of the scope introducing parameter. For example, consider Text's tag definition:

```
<sys:TagDefinition Name="fwk:Text" Type="fwk:UIElement">
    <sys:ParamGroupRef Ref="fwk:FrameworkElementParamGroup" />
    <sys:ParamGroupRef Ref="fwk:TextExtensionsParamGroup" />
    ...
</sys:TagDefinition>
```

The sys:ParamGroupRef defines a reference to a sys:ParamGroup tag, this looks as follows:

```
<sys:ParamGroup Name="fwk:FrameworkElementParamGroup">
    <sys:Param Name="MouseLeftButtonDown"  Type="sys:EventHandler"
Category="fwk:EventCategory"  NewScope="true" Min="0">
        <sys:ScopeVariable Name="Position_X" Type="sys:Data"    />
    ...
    </sys:Param>
    ...
</sys:ParamGroup>
```

Notice the definition of the sys:Param named *MouseLeftButtonDown*. It specifies a *NewScope* and a sys:ScopeVariable named *Position_X*.

This indicates that whenever the *MouseLeftButtonDpwn* parameter is used it will:

1. Introduce a new scope
2. Expose a sys:ScopeVariable named *Position_X*

The point of the scoped variables is to enable scenarios such as the following:

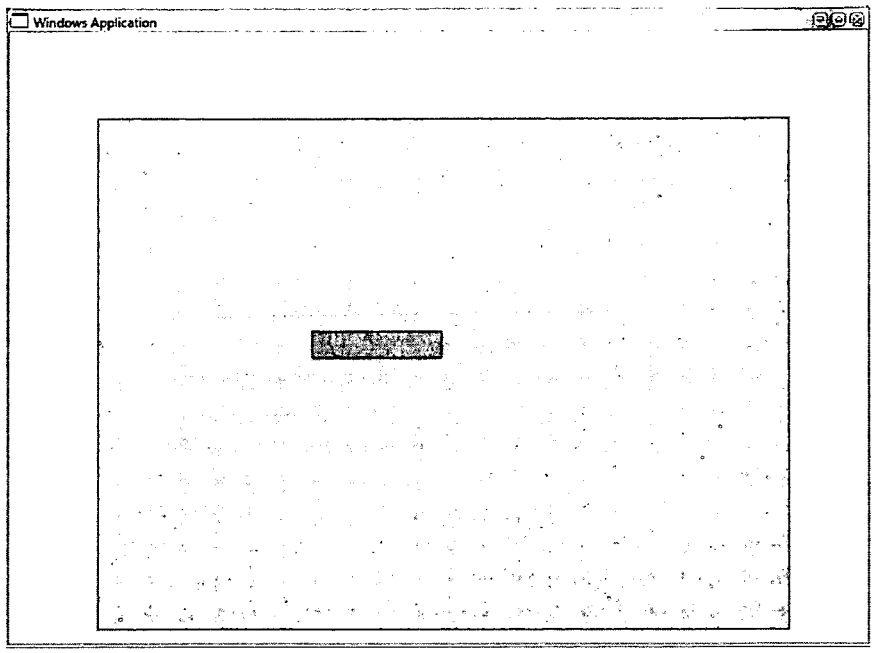

The Xad for this application follows:

```
<?xml version="1.0" encoding="UTF-8" ?>
<sys:Xad
    xmlns:sys = "http://schemas.microsoft.com/2005/xad/system"
    xmlns = "http://schemas.microsoft.com/2005/xad/framework"
    xmlns:fwk = "http://schemas.microsoft.com/2005/xad/framework"
>
    <sys:TagDefinition Name="sys:Main" Type="Application">
        <sys:Body>
            <Application>
                <Window Width="800" Height="600">
                    <DockPanel Width="640" Height="480">
                    Height="480" Margin="80" Background="Silver">
                        <Canvas.MouseLeftButtonDown>
                            <SequenceAction>
                                <SetTextValueAction Data="$ToolX"
                                NewValue="$Position_X" />
                                <SetTextValueAction Data="$ToolY"
                                NewValue="$Position_Y" />
                            </SequenceAction>
                        </Canvas.MouseLeftButtonDown>

<Rectangle RectangleTop="$ToolY"
                        RectangleLeft="$ToolX" Fill="Orange"
                            RectangleWidth="120"
                            RectangleHeight="25" Stroke="Gray"
                            StrokeThickness="1" />
```

```
                <Canvas.Resources>
                    <sys:InlineData Name="ToolX"
                    Writable="true">200</sys:InlineData>
                    <sys:InlineData Name="ToolY"
                    Writable="true">200</sys:InlineData>
                </Canvas.Resources>
            </Canvas>
          </DockPanel>
       </Window>
      </Application>
    </sys:Body>
  </sys:TagDefinition>
</sys:Xad>
```

As with all examples, you are encouraged to run this Xad in order to get a feel for the application's functionality.

Through the use of the scope variables associated with *MouseLeftButtonDown* we are able to update the position of the orange rectangle each time a left mouse down event occurs. Examining the event code further...

```
            <Canvas.MouseLeftButtonDown>
                <SequenceAction>
                    <SetTextValueAction Data="$ToolX"
                    NewValue="$Position_X" />
                    <SetTextValueAction Data="$ToolY"
                    NewValue="$Position_Y" />
                </SequenceAction>
            </Canvas.MouseLeftButtonDown>
```

... we see that the *MouseLeftButtonDown* parameter exposes two scope variables: *Position_X* and *Position_Y*. Binding to the value of those scope parameters is done in the same manner as all Xad binding.

Important: Entities within a scope cannot have the same name as a scope variable.

For example, the following would be illegal...

```
<Canvas>
    <SetTextValueAction Param="MouseLeftButtonDown"
    Name="Position_X" ... />
</Canvas>
```

... because *Position_X* is exposed by *MouseLeftButtonDown*.

Repeater Patterns

While repeater patterns are used by a variety of entity types their usage is best illustrated by Compound entities in the XAD standard framework. A data-driven compound entity is bound to a data-set and for each data-item in the data-set, it displays a sub-element.

So far we have used the FlowPanel entity in a number of our samples. The FlowPanel entity really has 2 modes:

- Prescriptive (the sub-entities to display are explicitly specified as the *Children* parameter)
- And, Data-driven (using a repeater pattern that will be defined in this section)

The definition of the FlowPanel entity is not centered solely around the *Children* parameter (as has been suggested in examples so far). Its tag definition looks more like the following:

```
<sys:TagDefinition Name="FlowPanel" Type="fwk:UIElement">
    <sys:Choice>
        <sys:ParamGroup>
            <sys:Param Name="Data" Type="sys:Data" ... />
            <sys:Param Name="RepeatedChild" Type="sys:UIElement"
                NewScope="true" ... >
                <sys:ScopeVariable Name="DataContext" Type="sys:Data" ... />
            </sys:Param>
            ...
        </sys:ParamGroup>
        <sys:Param Name="Children" Type="fwk:UIElement"
            DefaultParam="true" ... />
    </sys:Choice>
    ...
</sys:TagDefinition>
```

Instead of prescriptively specifying sub-entites, it is possible to specify a *Data* parameter as well as a *RepeatedChild* parameter. This puts the FlowPanel entity in a "data-driven" mode.

Take note that the FlowPanel tag definition uses the <sys:Choice> tag, these tag requires any implementation of the tag to choose between using the *Children* param (thereby defining a presecritive layout) or the <sys:ParamGroup> of *Data* and *RepeatedChild*.

> Important A ParamGroup defines a set of parameters that must be used in an all-or-nothing fashion. Looking to FlowPanel, if an author provides a value for *Data* they must also supply a value for *RepeatedChild*.

The RepeatedChild parameter is an entity that is instantiated multiple times for each item in the Data.

> Important Any entity that is to be instantiated multiple times has to live in a new scope.

The scope introduced by the *RepeatedChild* parameter has a scope variable named *DataContext*. This variable is set to the item corresponding to the sub-view to be instantiated.

The following snippet illustrates usage of the FlowPanel entity in a data-driven fashion:

```
...
    <Application.Resources>
        <XmlFileDataSource File="List.xml" Name="ListData"/>
    </Application.Resources>
...
    <FlowPanel Data="$ListData" FlowOrientation="Vertical">
        <Text Param="RepeatedChild" Text="$DataContext/@Name"/>
    </FlowPanel>
```

Assume List.xml to contain the following Xml:

```
<Employees>
    <Employee Name="Chris Hackmann"/>
    <Employee Name="Sid Jayadevan"/>
    <Employee Name="Troy Thomas"/>
    <Employee Name="Vlado Hristov"/>
    <Employee Name="William Aitken"/>
    <Employee Name="Stephen Danton"/>
    <Employee Name="Howard Campbell"/>
    <Employee Name="Ying Lin"/>
</Employees>
```

For each list-item the FlowPanel entity will create a Text entity. For the first Text entity, the value of the *DataContext* scope variable will be:

```
<Employee Name="Chris Hackmann"/>
```

The $DataContext/@Name binding will yield the Name attribute. When a Text is bound to an attribute it displays the value of the attribute which in this case is "Chris Hackmann."

The same is applicable for each list-item. If the view-port is large enough, the FlowPanel entity will display the following on the screen:

Each line corresponds to an instantiation of a Text entity. What varies from one instantiation to the other is the value of the "DataContext" scope variable. This pattern is referred to as a "repeater pattern." It is the basis for iteration over datasets in XAD.

The $DataContext/@Name binding can be rewritten as ./@Name because of a special shorthand notation: '.' (the singleton dot or period) which is reserved solely for the *DataContext* scope variable.

> Important The name *DataContext* is reserved for scope variables.

> Important If a scope variable is named *DataContext* it must be of type sys:Data.

> Important Occurrences of "$DataContext" in binding strings may be rewritten using the shorthand "."

Scope-Related Binding Restrictions

Scopes introduce certain binding restrictions. Bindings from an outer scope into an inner scope are disallowed. However as the diagram below illustrates binding from inner scopes to outer scopes are allowed.

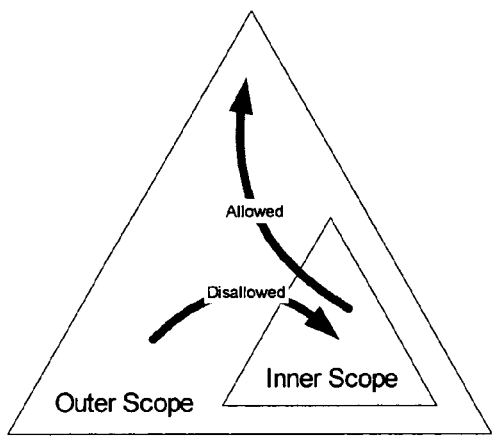

Bindings to tags in inner scopes are disallowed.

Nested Repeater Patterns

In the section on "repeater patterns" we illustrated how to achieve simple iteration over datasets. In this section we will consider a more complex scenario.

To begin consider the following simple dataset:

```
<PurchaseOrder Customer="Luis Figo">
    <Item Description="Toaster" Price="49.99"/>
    <Item Description="VCR" Price="199.99"/>
</PurchaseOrder>
```

Consider the following view of the simple dataset:

| Customer | Description | Price |
| --- | --- | --- |
| Luis Figo | Toaster | 49.99 |
| Luis Figo | VCR | 199.99 |

The view could easily be achieved with a Table entity but for the sake of illustration we will limit ourselves to the FlowPanel and Text entities:

```
...
<XmlFileDataSource Name="Order" File="PurchaseOrder.xml"/>
...
<FlowPanel>

<!-- The header row -->
    <FlowPanel FlowOrientation="Horizontal" FontWeight="Bold">
        <Text Text="Customer" Width="100" FontWeight="Bold"/>
        <Text Text="Description" Width="100" FontWeight="Bold"/>
        <Text Text="Price" Width="100" FontWeight="Bold"/>
    </FlowPanel <!-- The list of items -->
    <FlowPanel Data="$Order">

<!-- Display this horizontal FlowPanel for each
             item in the list -->
        <FlowPanel Param="RepeatedChild" FlowOrientation="Horizontal">

<!-- The customer is not dependent on iteration -->
            <Text Text="$Order/@Customer" Width="100"/>

<!-- Description and price depend on the list-item being
            iterated upon -->
            <Text Text="./@Description" Width="100"/>
            <Text Text="./@Price" Width="100"/>

</FlowPanel>

</FlowPanel>
```

```
</FlowPanel>
...
```

For those comfortable with imperative languages, just the iteration aspect could be modeled as roughly the following:

```
DisplayHeader();
foreach (Item item in purchaseOrder)
{
    DisplayTextsStackedHorizontally(
        purchaseOrder.Customer,
        item.Description,
        item.Price);
}
```

Now consider the following slightly more complex dataset:

```
<PurchaseOrders>
    <PurchaseOrder Customer="Luis Figo">
        <Item Description="Toaster" Price="49.99"/>
        <Item Description="VCR" Price="199.99"/>
    </PurchaseOrder>
    <PurchaseOrder Customer="Lilian Thuram">
        <Item Description="DVD Player" Price="279.79"/>
        <Item Description="Receiver" Price="549.99"/>
        <Item Description="Sub-woofer" Price="350.00"/>
    </PurchaseOrder>
</PurchaseOrders>
```

Consider the following view of this more complex dataset:

| Customer | Description | Price |
|---|---|---|
| Luis Figo | Toaster | 49.99 |
| Luis Figo | VCR | 199.99 |
| Lilian Thuram | DVD Player | 279.79 |
| Lilian Thuram | Receiver | 549.99 |
| Lilian Thuram | Sub-woofer | 350.00 |

The only real difference in this case is that there is one extra level of iteration.
Rather than iterating over a single Purchase Order, we will have to first iterate over a set of Purchase Orders. For each Purchase Order we will still do roughly the same thing. The major difference is that the customer column will now be a function of the "outer" iteration.

Again, for those comfortable with imperative code, the iteration model is roughly:

```
DisplayHeader();
Foreach (PurchaseOrder purchaseOrder in purchaseOrders)
{
    foreach (Item item in purchaseOrder)
    {
        DisplayTextsStackedHorizontally (
            purchaseOrder.Customer,
            item.Description,
            item.Price);
    }
}
```

In the same way that the imperative code simply adds an extra level of iteration, the XAD would do the same:

```
...
<XmlFileDataSource Name="Orders" File="PurchaseOrders.xml"/>
...
<FlowPanel>

<!-- The header row -->
    <FlowPanel FlowOrientation="Horizontal">
        <Text Text="Customer" Width="100" FontWeight="Bold"/>
        <Text Text="Description" Width="100" FontWeight="Bold"/>
        <Text Text="Price" Width="100" FontWeight="Bold"/>
    </FlowPanel <!-- List of Purchase Orders -->
    <FlowPanel Data="$Orders">

<!-- List of Items in a Purchase Order -->
        <FlowPanel Param="RepeatedChild" Data=".">

<!-- Binding in this Ex. allows us to rename
            DataContext as OrderDataContext -->
            <sys:Binding Param="Resources" Name="OrderDataContext"
            EntityName="DataContext" />
```

```
        <FlowPanel Param="RepeatedChild"
FlowOrientation="Horizontal">

<!-- OrderDataContext allows us to access outer scope -->

<Text Text="$OrderDataContext/@Customer" Width="100"/>
            <Text Text="./@Description" Width="100"/>
            <Text Text="./@Price" Width="100"/>
        </FlowPanel>

</FlowPanel>

</FlowPanel>

</FlowPanel>
...
```

Apart from the extra level of iteration, the other interesting illustration in this example is the use of a `<sys:Binding Name="OrderDataContext" ...>` entity to reference a scope variable from an outer scope. In reality, such a mechanism is useful only in the relatively rare case of referencing a scope variable that:

- Is in an outer scope, and
- Has the same name as a scope variable in the current scope or an enclosing scope

Parameter Inheritance

When creating a derived tag definition the parameters of an existing entity can be made available by way of the *BaseTag* attribute. For instance...

```
<sys:TagDefinition Name="SimpleText" BaseName="fwk:Text" ...>
    <sys:Body>
        <Text Foreground="Red" FontSize="50" />
    </sys:Body>
</sys:TagDefinition>
```

... allows an Xad author to specify the following:

```
<SimpleText Text="Foo" FontFamily="Verdana" />
```

Notice that *Text* and *FontFamily* are not called out as Param values within the tag definition. This is because these parameters are specified in the fwk:Text tag definition and are automatically passed down to the SimpleText tag definition as a result of specifying BaseName="fwk:Text".

> Important Assigning a value to the *BaseTag* parameter causes the parameters for the *BaseTag* value (e.g. fwk:Text) to be passed down to the tag definition.

In addition, values defined within the base tag's tag definition are automatically assigned to the SimpleText tag definition. For example, if *FontFamily* is given a default value of Arial that value will be passed down to the SimpleText tag definition.

Instance vs. Definition – param value precedence. When defining a tag, values can be statically supplied for attributes within the definition...

```
<sys:TagDefinition Name="SimpleText" BaseName="fwk:Text" ...>
    <sys:Body>
        <Text Foreground="Red" FontSize="50" />
    </sys:Body>
</sys:TagDefinition>
```

If these are not specified in the tag instance then they remain "as is", however if they are specified, the instance value takes precedence. Consider the following...

```
<SimpleText Foreground="Green" FontSize="25" Text="Hello World" />
```

... instances a SimpleText with green font of size 25. The value for *FontSize* in the tag instance overrides (or takes precedence) over the FontSize="50" declaration within the tag definition.

Specific parameters can be defined as disabled or none "overridable"; consider the following...

```
<sys:TagDefinition Name="SimpleText" BaseName="fwk:Text">
    <sys:Param="FontFamily" Type="sys:Data" Min="0" Max="0" />
    <sys:Body>
        <Text Foreground="Red" FontSize="50" FontFamily="Arial" />
    </sys:Body>
</sys:TagDefinition>
```

With an instance of...

```
<SimpleText FontFamily="Verdana" ... />
```

... defining *FontFamily* in the tag instance would result in a checking error (not a warning), as the definition defines the param to have a min of 0 but also a max of 0.

Note that the *FontFamily* param can still be set statically inside the tag definition, as shown above.

Specifying a *BaseTag* value that does not match the type of the top-most tag is illegal, for instance...

```
<sys:TagDefinition Name="SimpleText" BaseName="fwk:Border">
    <sys:Param="FontFamily" Type="sys:Data" Min="0" Max="0" />
    <sys:Body>
        <Text Foreground="Red" FontSize="50" FontFamily="Arial" />
    </sys:Body>
</sys:TagDefinition>
```

... the above specifies a value of fwk:Border for its *BaseTag* parameter, but defines Text (which is of type fwk:Text) as its top-most tag.

Limitations

Parameters can only be inherited by the top-most tag, for instance if we wrote...

```
<sys:TagDefinition Name="BorderText" BaseName="fwk:Border"...>
```

```
    <sys:Body>
        <Border>
            <Text Foreground="Red" FontSize="50" />
        </Border>
    </sys:Body>
</sys:TagDefinition>
```

... with an instance of ...

```
<BorderText BorderThickness="3" Margin="3" ... />
```

... the top-most tag is Border so all of its parameters are automatically exposed by the new BorderText tag and pertain to the Border tag within the tag definition.

Shared parameters are consumed by the top-most tag, for instance...

```
<BorderText BorderThickness="3" Margin="3" ... />
```

... although Border and Text both have a *Margin* parameter, setting *Margin* in the above instance *only* sets the Border's margin not the Text's margin.

In order to set values on the Text tag they need to be exposed via the sys:Param syntax and bound to inside the Text tag, the following demonstrates this...

```
<sys:TagDefinition Name="BorderText" BaseName="fwk:Border" ...>
    <sys:Param Name="Text_Text" Type="sys:Data" />
    <sys:Param Name="Text_Margin" Type="sys:Data" />
    <sys:Body>
        <Border>
            <Text Foreground="Red" FontSize="50"
Text="$Text_Text"                     Margin="$Text_Margin" />
        </Border>
    </sys:Body>
</sys:TagDefinition>
```

...with an instance of the tag looking as follows:

```
<BorderText BorderThickness="3" Margin="3" Text_Text="Hello World"
Text_Margin="5" ... />
```

Finally, Multiple Inheritance is not supported. For instance you cannot defined a tag definition and then use that tag definition as the BaseTag of another tag definition. For example, the following is illegal:

```
<sys:TagDefintion Name="SuperBorderText" BaseName="BorderText" ...>
...
</sys:TagDefinition>
```

Conditional Parameterization

While XAD is a declarative language, it is still expressive enough to allow conditional construction of entities.

Two manners of conditional construction are possible: SwtichEntity or SwitchEntities. Each of these may be parameterized by Cases or Conditions tags, but not both. Cases can be thought of as the moral equivalent of a C# switch, while Conditions are similar to a set of C# if-else clauses.

The use of Cases and Conditions is mutually exclusive, meaning that a Switch cannot mix Cases and Conditions within its body. In addition, Cases may only be used when a Switch specifies a value for its *Data* param, otherwise Conditions must be used.

SwitchEntity, SwitchEntities, Case and Condition all exist within the system namespace. By convention, they are prefixed with the sys: namespace i.e. sys:Case, sys:SwitchEntity, etc.

Consider the following data set for the examples below...

```
<sys:InlineData Name="Electronics">
    <Items>
        <Item Description="Toaster" Price="49.99"/>
        <Item Description="VCR" Price="199.99"/>
        <Item Description="DVD Player" Price="279.79"/>
        <Item Description="Receiver" Price="549.99"/>
        <Item Description="Sub-woofer" Price="350"/>
    </Items>
</sys:InlieData>
```

Cases

Cases are the simpler of the two options. They have a single param, *Value*. The value of *Value* must evaluate to an IString. Using Cases without specifying a Switch with a value for *Data* results in a design time checking error, consider the following illegal Xad...

```
...
<sys:SwitchEntity>
```

```
    <sys:Case Value="Test1">
        ...
    </sys:Case>
</sys:SwitchEntity>
...
```

... the following Xad illustrates the correct usage of Cases ...

```
...
<sys:SwitchEntity Data="$Electronics">
    <sys:Case Value="Test1">
        ...
    </sys:Case>
</sys:SwitchEntity>
...
```

Conditions

Conditions offer the Xad author a higher degree of control over the result of a Switch. Conditions expose a single param, *Test*. The value of *Test* is a location template, meaning it can be any valid xQuery. Conditions can only be used when the Switch does not specify a value for its *Data* param.

Using Conditions with a Switch that has specified a value for *Data* results in a design time checking error, consider the following illegal Xad...

```
...
<sys:SwitchEntity Data="$Electronics">
    <sys:Condition Value="$Electronics/Item[1]/@Price gt 50.00">
        ...
    </sys:Condition>
</sys:SwitchEntity>
...
```

... the following Xad illustrates the correct usage of Conditions ...

```
...
<sys:SwitchEntity>
    <sys:Condition Value="$Electronics/Item[1]/@Price gt 50.00">
        ...
    </sys:Condition>
</sys:SwitchEntity>
...
```

SwitchEntity

Using SwitchEntity allows an author to conditionally return a single item as the result of evaluate the switch.

Consider the following Xad which allows us to display each of the items in our data set...

```
...
<FlowPanel Data="$Electronics">
    <Text Param="RepeatedChild" Text="./@Description"
        FontFamily="Courier New"/>
</FlowPanel>
...
```

The resultant view would look like:

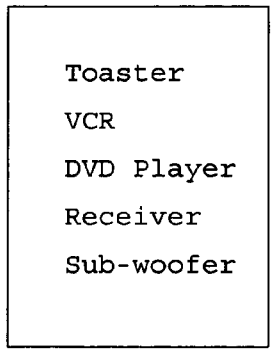

Now consider a scenario where we want to display prices above 500 in red with Georgia font and prices under 100 in green with Arial font. The XAD would now look like...

```
...
<FlowPanel Data="$Items">
    <sys:SwitchEntity Param="RepeatedChild">

<Condition Test="./@Price > 500">
            <Text Text="./@Description" FontFamily="Arial"
            FontWeight="Bold" Foreground="Red" />
        </Condition>

<Condition Test="./@Price < 100">
            <Text Text="./@Description" FontFamily="Georgia"
            FontWeight="Bold" Foreground="Green" />
```

```
        </Condition>

<sys:SwitchEntity.DefaultEntity>
        <Text Param="DefaultEntity" Text=./@Description
        FontFamily="Courier New"/>
    </sys:SwitchEntity.DefaultEntity>

</sys:SwitchEntity>
</FlowPanel>
...
```

The resultant view would be similar to the following ("Toaster" is displayed as green bold Arial and "Receiver" is displayed as red Bold Georgia):

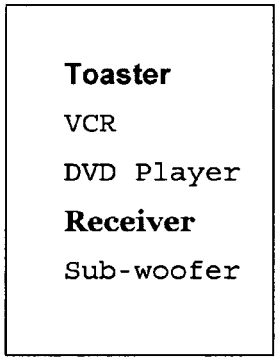

| Important | <sys:SwitchEntity> yields the entity under the first Case or Condition tag which matches the value of *Data*, in the Case instance, or evaluates to true, in the condition instance. Otherwise, it yields the entity specified as the "DefaultEntity" parameter. |

SwitchEntities

The SwitchEntities tag can be used to return multiple values. This can mean matching multiple Cases or Conditions or having a single condition return multiple values. In addition to the params exposed by SwitchEntity, SwitchEntities exposes a *MatchFirst* param. By default *MatchFirst* is false meaning that the SwitchEntities matches i.e. returns, the values of all matching Cases or Conditions.

In the case when MatchFirst is set to true SwitchEntities only returns the values of the Case or Condition which first matches. Consider the following Xad which specifies *MatchFirst* equal to false...

```
...
<FlowPanel>
    <TextBox Text="$Flipper" Width="100" Height="30" />
        <sys:SwitchEntities MatchFirst="False">
            <sys:Condition Test="$Flipper eq '1'">
                <Text Text="Only One" />
            </sys:Condition>
            <sys:Condition Test="$Flipper gt '1'">
                <Text Text="Only One" />
                <Text Text="More than one" />
            </sys:Condition>
            <sys:SwitchEntities.DefaultEntities>
                <Text Text="Deafult One" />
            </sys:SwitchEntities.DefaultEntities>
        </sys:SwitchEntities>

<FlowPanel.Resources>
            <sys:InlineData Name="Flipper"
            Writable="true">1</sys:InlineData>
        </FlowPanel.Resources>
</FlowPanel>
...
```

... depending on the value entered into the textbox this Xad will match one or more of the Conditions and display UI appropriately. If however *MatchFirst* is set to true only the first Condition which evaluates to true will have its value returned.

Important <sys:SwitchEntities> must be used under a Scope Parameter; it cannot be used in a non-scope context like SwitchEntity. Recall scope parameters are params declared with the NewScope attribute set to true i.e. NewScope="true". An example of a scope parameter is the RepeatedChild param of DockingPanel.

Important <sys:SwitchEntities> yields the set of entities under all selector tags that match. Otherwise it yields the entities specified as the "DefaultEntities" parameter.

Important If the "MatchFirst" attribute on <sys:SwitchEntities> is set to true then <sys:SwitchEntities> yields only the set of entities under the first Case/Condition tag that matches. Otherwise, it yields the entity/ies specified by the "DefaultEntities" parameter.

General

| Important | <sys:SwitchEntity/ies> can only have Case or Condition tags placed under it. The only entity tag can be placed directly under <sys:SwitchEntity/ies> is the "DefaultEntity/ies" parameter. |
|---|---|

| Important | If <sys:SwitchEntity/ies> is specified as the entity for a parameter of type T, then the Cases/Conditions under <sys:SwitchEntity/ies> must have entities of type T under them. If a "DefaultEntity/ies" parameter is specified, it must also be of type T. |
|---|---|

| Important | If <sys:SwitchEntity/ies> is specified as the entity for a non-optional parameter, then <sys:SwitchEntity/ies> <u>must</u> specify a "DefaultEntity" parameter. |
|---|---|

Using a 'Switch' in a non-scoped context

When used in non-scoped context without a proxy e.g. under *Resources*, a sys:SwitchEntity must specify a value for its Type param, consider the following...

```
<Application.Resources>
    <sys:SwitchEntity Type="sys:Data">
        <sys:Condition Test="$AppState = 'App12'">
            <XmlFileDataSource File="Foo.xml" />
        </sys:Condition>
    </sys:SwitchEntity>
</Application.Resources>
```

... a Type of sys:Data must be defined. Failure to define a Type on a SwitchEntity tag that is in a non-scoped context results in a design time checking error.

Nesting 'Switches'

SwitchEntity/ies can be nested in the following manner...

```
...
<sys:SwitchEntity>
    <sys:Condition Test="$AppState = 'Blork'">
        <sys:SwitchEntity>
            <sys:Condition Test="$AppState/Foo = 'Bar'">
                <Text Text="$AppState/Foo" />
            </sys:Condition>
        <sys:SwitchEntity>
    </sys:Condition>
</sys:SwitchEntity>
```

... this should be read as, "If $AppState = 'Blork' then test to see if $AppState/Foo = 'Bar' if it does display a Text element with the value of $AppState/Foo."

Conflicting Nested Attached Parameters

Consider the following Xad...

```
<sys:SwitchEntity DockPanel.Dock="Top" Param="Children">
    <sys:Condition Test="$NewDocument/*[1]/text() = 'A'">
        <sys:SwitchEntity Data="$NewDocument/*[2]">
            <sys:Case Value="B">
                <Text DockPanel.Dock="Bottom" Text="1: Blue"/>
            </sys:Case>
        </sys:SwitchEntity>
    </sys:Condition>
    <sys:SwitchEntity.DefaultEntity>
        <Text Text="0: Gray" />
    </sys:SwitchEntity.DefaultEntity>
</sys:SwitchEntity>
```

... the attached params (highlighted in yellow) conflict. The outer most param (specified on the sys:SwitchEntities tag) states that the return value of this switch should be docked to the Top of the parenting DockPanel. Conversely, matching the inner Case tag (highlighted in cyan) returns a Text element which specifies that the Text should be docked to the Bottom of the parenting DockPanel.

The result of such a conflict is as follows:

- Design-time checking warning, stating that the Switch defines an attached parameter which shadows an attached parameter specified on a possible return value
- At runtime the inner most definition "wins". Meaning, that should the inner Case match, then the Text will be docked to the Bottom of the DockPanel
- Finally, to ensure clarity, matching the default case as seen above, will result in a Text element that is docked to the Top of the DockPanel, as specified by the attached param on the Switch.

Selectors and Tag Definitions

In some cases, it is desirable to abstract a selector or collection of selectors into a tag definition, thereby allowing the selector to be reused in various areas.

Consider the following Xad:

```
<SpecialText TextValue="Applications" SelectorValue="Foo1" />
...
</SpecialText TextValue="list item" SelectorValue="Foo2" />
...
<sys:TagDefinition Name="SpecialText" Type="fwk:UIElement">
    <sys:Param Name="TextValue" Type="sys:Data" />
    <sys:Param Name="SelectorData" Type="sys:Data" />
    <sys:Body>
        <sys:SwitchEntity Type="fwk:UIElement">
            <sys:Condition Test="$SelectorData = 'Foo1'">
                <Text FontWeight="Bold" FontSize="12" />
            </sys:Condition>
            <sys:Condition Test="$SelectorData = 'Foo2'">
                <Text FontSize="10" />
            </sys:Condition>
            <Text Param="DefaultEntity" FontSize="10"
Foreground="Gray" />
        </sys:SwitchEntity>
    </sys:Body>
</sys:TagDefinition>
...
```

... produces the following application:

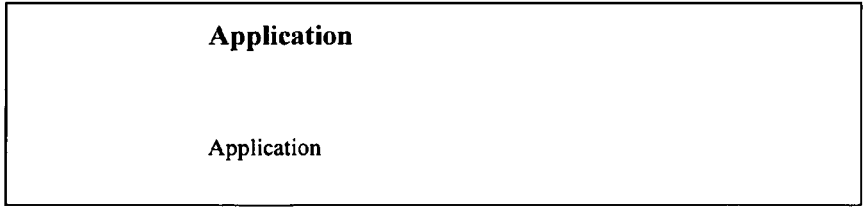

However, the following pattern is illegal...

```
<sys:SwitchEntity Type="fwk:UIElement">
    <MySpecialSelector Condition="Foo" />
</sys:SwitchEntity>

...

<sys:TagDefinition Name="SpecialText" Type="fwk:UIElement">
    <sys:Param Name="Condition" Type="sys:Data" />
```

```
<sys:Body>
    <sys:Condition Test="$Condition = 'Foo1'">
        <Text FontWeight="Bold" FontSize="12" />
    </sys:Condition>
</sys:Body>
</sys:TagDefinition>
...
```

> Important Xad does not allow an author to nest a Case of Condition directly under the `<sys:Body>` of a tag definition, rather a Case or Condition must, at a minimum, be parented by a `<sys:SelectedEntit(y | ies)>` tag.

Associations

XAD allows for the association of arbitrary entities with data. Consider the following Xml state that models the workspace settings for an application:

```
<WorkspaceSettings>
    <LayoutScheme>Mosaic</LayoutScheme>
    <ActiveDocumentIndex>D9</ActiveDocumentIndex>
    <OpenDocuments>
        <Document Filename="Santorini.xml" Iconic="true" ID="D4"/>
        <Document Filename="Mykonos.xml" Iconic="false" ID="D9"/>
        <Document Filename="Crete.xml" Iconic="false" ID="D17"/>
    </OpenDocuments>
</WorkspaceSettings>
```

Note that the "LayoutScheme" and "ActiveDocumentIndex" are not used in our illustration – they are simply there so that the structure of the state is similar to patterns often used in applications.

An MDI application would pass such a piece of state to various sub-systems within the application. Examples of sub-systems would be:

- The actual MDI workspace that displays the contents for each open document in a separate MDI child window
- A sidebar with thumbnail views of all the open documents
- A menu with commands such as "Save All Documents"

Each of these "sub-systems" would need to operate not only on the list of documents but also on the Data Sources associated with the documents. Ideally, the various sub-systems would share the same Data Source instances. In fact sharing is essential for scenarios such as dependent views. This sharing can be achieved through a class of entities called Association Mangers.

An Association Manager is an entity that creates and manages entities associated with data. For example List Association Manager creates and manages associations for each of the list-items in a list:

```
<ListAssociationManager Name="FileAssociations">
    List="$WorkspaceSettings/OpenDocuments">
    <XmlFileDataSource Param="RepeatedAssociation"
                       File="./@Filename"/>
</ListAssociationManager>
```

The XAD implies the following:

- This List Association Manager is managing associations for the <OpenDocuments> list.
- For each item in the list (i.e. each <Document>), a File Data Source will be created as the "associated entity".
- Each File Data Source will have its File parameter set to the Filename for the corresponding <Document>. The data context (".") is always the corresponding list-item (i.e. <Document>).
- As list-items (i.e. each <Document>) are added to or removed from the list, corresponding associated entities (i.e. File Data Sources) are added and removed. Note that the actual creation of entities is done on-demand.

Clients reference associations via <sys:AssociatedEntity>:

```
<DockPanel List="$WorkspaceSettings/OpenDocuments">
    <foo:OutlineView Param="RepeatedChild">
        <sys:AssociatedEntity Param="Tree" Data="."
            AssociationManager="$FileAssociations"/>
    </foo:OutlineView>
</DockPanel>
```

The XAD implies the following:

- For every <Document> in the <OpenDocuments> list, the Dock Panel displays an Outline View. (Outline View is a hypothetical UI Element that displays its Tree parameter in an outline format.)

- Each Outline View's Tree parameter is an associated entity.
- The associated entities are the File Data Sources that we associated with list-items (i.e. each <Document>).

An Association Manger may be modeled as a dynamic dictionary:

| Data (key) | Associated Entity (value) |
|---|---|
| <Document Filename="Santorini.xml" ... /> | 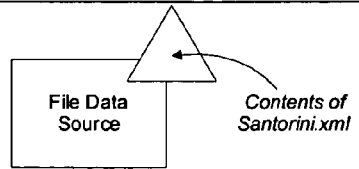 File Data Source — Contents of Santorini.xml |
| <Document Filename="Mykonos.xml" ... /> | 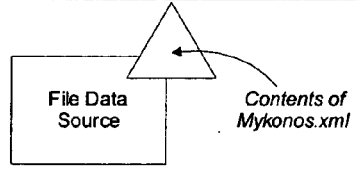 File Data Source — Contents of Mykonos.xml |
| <Document Filename="Crete.xml" ... /> | 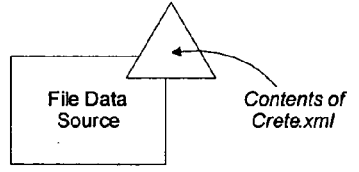 File Data Source — Contents of Crete.xml |

<sys:AssociatedEntity> may be thought of as an entity that proxies the values in an Association Manager; the value to be proxied is driven by the Data parameter for <sys:AssociatedEntity>.

Note that while the associated entities in the example were Data Sources, the type of an associated entity can be arbitrary e.g. Event Handler.

Important Assume that <sys:AssociatedEntity> yields an entity E given some data D and an association manager AM. E is the result of "AM.LookupAssociation(D)".

Important Failure to look up an associated entity results in a runtime error.

> Important <sys:AssociatedEntity> can only be used to reference entities whose type is proxy-able.

*Tag Documentation*

In overview form, XAF's approach to XAD tag documentation is to mimic the approach used by C# for reference documentation of managed APIs: the reference commentary will be incorporated into a XAD Tag's .xad code, and that commentary will be extracted and post-processed by tools that are similar in concept and design to the tools used in the MS-internal production of managed API reference material. Three additional specs cover XAD reference documentation:

- XAD Tags: Doc content and post processing scenarios
- XAD Tags: Doc markup and presentation
- XAD Tags: Doc production tools The content of these specs should be easily discerned based on their names.

The following formal language specification section includes mention of only the reference documentation markup tags that control the structure of the reference documentation. See the aforementioned doc markup and presentation spec for complete details on all of the documentation related tags.

Formal Language Specification

This section provides a formal declaration for many of the language constructs introduced more informally in the previous section. By "language constructs" we mean tags that live in the System namespace (http://schemas.microsoft.com/2005/xad/system).

As stated earlier, XAD code is written as well-formed Xml. The first tag of an XAD file is required to be <sys:Xad>. The file usually (but not necessarily) has a .xad extension. Packaging and deployment constructs while fundamental to the language are formally defined only in Section 5.

A partial XSD specification of the XAD language is available at
http://xafteam/xafenv/doc/Platform/Application%20Components/xad.xsd. The
specification is said to be "partial" primarily because XSD is not expressive enough
to capture many structural constraints.

Boolean attributes

All Boolean attributes on XAD System tags are optional. The default value is always
false. What this really means is that a Boolean attribute doesn't have to be specified
unless its value has to be true. In other words the absence of an attribute always
means that its value is false while its presence should mean that its value is true. For
reasons of consistency and readability, it is recommended that framework extenders
follow this convention when defining their own Boolean parameters.

Qualified names

XAD is an Xml-based language and uses Xml qualified names heavily. Qualified
names belong to a specific namespace to ensure uniqueness and to avoid conflicts
(see http://www.w3.org/TR/REC-xml-names/ for details). XAD language constructs
that use qualified names are:

- Type
- Tag definition
- Signature
- Public parameter group

For a given XAD application, every instance within each bucket of constructs listed
above must have a unique qualified name across the entire bucket. For example
there cannot be two types with the same name or two signatures with the same
name. However, items from different buckets may have the same name. For
example, a tag and a signature can have the same name or a parameter group and a
type can have the same name.

Keywords

<Xad>

| Description | Defines the root of a XAD file |
|---|---|
| Child Nodes | <Type>, <TagDefinition>, <Signature>, <ParamGroup> |

<Doc>

| Description | Documentation tag, which can be added to the root tag for the four key XAD language constructs, <Signature>, <TagDefinition>, <Type> and <ParamGroup>. The <Doc> tag permits structured markup of reference documentation. See the XAD Tags: doc markup and presentation spec for additional information. Note that the example below shous the four legal child tags of the <Doc> tag, and the related documentation tag, <description>, as used to document the Main tag's parameter. |
|---|---|
| Child Nodes | <summary>, <remarks>, <example>, <seealso> <br><br> The meaning and use of these tags is consistent with the meanings provided in the C# documentation markup reference material. These definitions link to that C# reference material on MSDN. |

Example:

```
<sys:Xad>
    <sys:TagDefinition Name="sys:Main" Type="fwk:Application">
        <sys:Doc>
            <summary>Defines the application entry point</summary>
            <remarks>Remarks block content.</remarks>
            <example>Example block content.</example>
            <seealso>Internal or external references.</seealso>
        </sys:Doc>

<sys:Param Name="File" Type="sys:Data" Min="0">
            <sys:Description>
                Optional name of file to open at startup
            </sys:Description>
        </sys:Param>

<sys:Body>
        ...
```

```
        <sys:Body>
    </sys:TagDefinitions>

...
</sys:Xad>
```

<Description>

| Description | Container tag to hold reference material on its parent. |
|---|---|
| Child Nodes | <Choice>, <ParamGroupRef>, <Param>, <OutParam>, <Const>, <Assembly>, <File>, <dependentAssembly> |

See the preceding example for a simple use of the <description> tag. See the XAD Tags: Doc markup and presentation spec for a more thorough treatment of the <description> tag's use.

<Type>

| Description | Defines a new type | |
|---|---|---|
| Attributes | | |
| Name | Type | Description |
| Name | QName | Required. The name of the type in XAD (Xml qualified name). If the namespace prefix is omitted the default namespace will be used. |
| ManagedType | String | Required. The fully qualified type name of a .NET managed type (see MSDN for details about fully qualified type names). |
| Proxy | String | Optional. Fully qualified type name of a .NET class, which can act like proxy for the specified managed type. Defining proxy enables dynamic instantiation of entities of this type. |
| Hierarchical | Boolean | Optional. Indicates if entities of this type are strictly organized in hierarchies where only one parent entity can own (have a reference to) a child entity. Default is false. |
| Internal | Boolean | Optional. Indicates if the type is internal for the assembly or visible for other assemblies. Default is false. |

| Child Nodes | <Doc> |

<TagDefinition>

| Description | Defines new XAD tag | |
|---|---|---|
| Attributes <br> Name | Type | Description |
| Name | QName | Required. The Xml qualified name of the tag being defined. If the namespace prefix is omitted the default namespace will be used. |
| Type | QName | Optional. Declares the entity type this tag will result in. The type must be defined by <Type> tag. This attribute can/must be omitted only if the "Signature" attribute is used to refer to external tag signature. No default value. |
| Max | Enum: 1, unbounded | Optional. Defines the maximum number of entities the tag can result in. The set of values may be extended in the future. Default is 1. |
| Signature | QName | Optional. Refers to public tag signature by name, which must be defined by <Signature> tag. This is alternative to specifying the tag signature inline. The tag definition must either specify its signature inline or refer to external signature but not both. If Signature attribute is present only Name and Checker attributes are allowed and no parameters. |
| Checker | String | Optional. Fully qualified type name of a .NET class (see MSDN for details about fully qualified type names), which implements custom algorithm for checking instances of this tag. Custom checkers compliment the built-in static checking in cases when tags have very specific rules. |
| Schema | QName | Optional. Applicable to data entities only. Qualified name of XSD type, which describes the schema of the data provided |

|  |  | by the entity. By default the schema is unknown. |
|---|---|---|
| Shape | ? | Optional. Applicable only to data entities. Describes the shape/pattern of the data provided by the entity (list, table, etc.). |
| Writable | Boolean | Optional. Applicable only to data entities. Indicates whether the data provided by the entity is read-only or writable. Default is false. |
| Internal | Boolean | Optional. Indicates if the tag definition is internal for the assembly or visible for other assemblies. Default is false. |
| Child Nodes | <Doc>, <Const>, <Param>, <OutParam>, <Choice>, <ParamGroupRef>, <ParamDefaultValue>, <ConstDefaultValue>, <Entity>, <Function>, <Body> | |

<Signature>

| Description | Defines new tag signature, which can be reused across multiple tag definitions. | |
|---|---|---|
| Attributes | | |
| Name | Type | Description |
| Name | QName | Required. The Xml qualified name of the signature. If the namespace prefix is omitted the default namespace will be used. |
| Type | QName | Required. Declares the entity type a tag with this signature must result in. The type must be defined by <Type> tag. |
| Max | Enum: 1, unbounded | Optional. Defines the maximum number of entities a tag with this signature can result in. The set of values may be extended in the future. Default is 1. |
| Schema | QName | Optional. Applicable only to data entities. Qualified name of XSD type, which describes the schema of the data provided by the entity. By default the schema is unknown. |

| Shape | ? | Optional. Applicable only to data entities. Describes the shape/pattern of the data provided by the entity (list, table, etc.). |
|---|---|---|
| Writable | Boolean | Optional. Applicable only to data entities. Indicates whether the data provided by the entity is read-only or writable. Default is false. |
| Internal | Boolean | Optional. Indicates if the signature is internal for the assembly or visible for other assemblies. Default is false. |
| Child Nodes | <Doc>, <Const>, <Param>, <OutParam>, <ParamGroupRef>, <Choice> | |

<ParamGroup> (under <Xad>)

| Description | Defines a public group of parameters, which can be reused across multiple signatures and tag definitions. | |
|---|---|---|
| Attributes <br> Name | Type | Description |
| Name | QName | Required. The Xml qualified name of the group. If the namespace prefix is omitted the default namespace will be used. |
| Internal | Boolean | Optional. Indicates if the parameter group is internal for the assembly or visible for other assemblies. Default is false. |
| Child Nodes | <Doc>, <Const>, <Param>, <OutParam>, <Choice>, <ParamGroupRef> | |

<Const>

| Description | Defines a constant data parameter | |
|---|---|---|
| Attributes <br> Name | Type | Description |
| Name | NCName | Required. The const name, which is a simple string without a namespace (non-qualified name). Const names must be unique within the set of parameters for one signature or tag definition. Other signatures and tag definitions can have parameters |

|  |  | with the same name. |
|---|---|---|
| Optional | Boolean | Optional. Indicates whether this const parameter is optional or required. Default is false. |
| Schema | QName | Optional. The name of simple value XSD type which defines the possible values this const parameter can take. Default is string. |
| Child Nodes | <Description> | |

<Param>

| Description | Defines in-parameter | |
|---|---|---|
| Attributes | | |
| Name | Type | Description |
| Name | NCName | Required. The parameter name, which is a simple string without a namespace (non-qualified name). Parameter names must be unique within a tag definition or signature. Other tag definitions or signatures can have parameters with the same name. A parameter name cannot be any of the following reserved names: "Name", "Param", "OutParam". |
| Type | QName | Required. Declares the type of entities, which this parameter can take. The type must be defined by <Type> tag. |
| Category | QName | Optional. Can be used for annotating parameters as being of specific category. This information is available at runtime and allows operations to be performed against all parameters of a given category. Only useful for primitive tags. Categories are public types, defined by <Type> tag. No default value. |
| Min | Enum: 0, 1 | Optional. Defines the minimum number of entities this parameter can take. 0 means the parameter is optional. The set of values may be extended in the future. Default is 1. |

| Max | Enum: 1, unbounded | Optional. Defines the maximum number of entities this parameter can take. The set of values may be extended in the future. Default is 1. |
|---|---|---|
| NewScope | Boolean | Optional. States whether this parameter will introduce a new scope boundary (see language concepts for details on scopes). Default is false. |
| TargetType | QName | Optional. Applicable to data parameters only. XAD type defined by <Type> tag. Indicates a type to which the data value of the parameter can be converted to. No default value. |
| Schema | QName | Optional. Applicable to data parameters only. The name of the XSD type that defines the schema for the data this parameter expects. By default the schema is unknown. |
| Shape | Enum: ? | Optional. Applicable to data parameters only. Declares the shape/pattern of the data this parameter expects. |
| Writable | Boolean | Optional. Applicable to data parameters only. Indicates if this parameter requires read-only or writable data. Default is false |
| Signature | QName | Optional. Refers to public tag signature by name, which must be defined by <Signature> tag. If Signature is specified it puts additional requirements on the parameter values to support the signature parameters. Enables struct-like access to the output parameters of the parameter value (ParameterValue.Field where Field is output parameter of ParameterValue). If Signature attribute is, Type, Max, Schema, Shape and Writable attributes cannot be specified. |
| DefaultParam | Boolean | Optional. Declares a default parameter (see language concepts for default parameters). Note that default parameter |

|  |  | is different from default value. Only one parameter can be declared as default. Default is false. |
|---|---|---|
| Child Nodes | <Description>, <ScopeVariable>, <AttachedParam> | |

<OutParam>

| Description | Defines out-parameter | |
|---|---|---|
| Attributes | | |
| Name | Type | Description |
| Name | NCName | Required. The parameter name is simple string without a namespace (non-qualified name). Parameter names must be unique within a tag definition or signature. Other tag definitions or signatures can have parameters with the same name. |
| Type | QName | Required. Declares the type of entities this out parameter will provide. The type must be declared by <Type> tag. |
| Max | Enum: 1, unbounded | Optional. Defines the maximum number of entities this parameter can provide. The set of values may be extended in the future. Default is 1. |
| Schema | QName | Optional. Applicable to data parameters only. The name of the XSD type that defines the schema for the data this parameter provides. By default the schema is unknown. |
| Shape | Enum: ? | Optional. Applicable to data parameters only. Declares the shape/pattern of the data this parameter provides. |
| Writable | Boolean | Optional. Applicable to data parameters only. Indicates if this parameter provides read-only or writable data. Default is false. |
| Child Nodes | <Description> | |

<ParamGroup> (under <Choice>)

| Description | Defines group of parameters as one of the alternatives |
|---|---|

|  | under choice tag. This tag is only useful if the choice alternative contains more than one parameter. | |
| --- | --- | --- |
| Attributes <br> Name | Type | Description |
| Child Nodes | <Description>, <Const>, <Param>, <OutParam>, <ParamGroupRef>, <Choice> | |

<ParamGroupRef>

| Description | Reference to a public parameter group. Has the effect of including the parameters from the group in the containing tag definition or signature. | |
| --- | --- | --- |
| Attributes <br> Name | Type | Description |
| Ref | QName | Required. The qualified name of the public parameter group to refer to. The public parameter group must be defined by a <ParamGroup> tag. |
| Child Nodes | <Description> | |

<Choice>

| Description | Defines mutually exclusive alternatives of parameters in a tag definition or signature. Every child node defines a separate alternative. Groups can be used for alternatives with more than one parameter. Choices can be nested. | |
| --- | --- | --- |
| Child Nodes | <Description>, <Const>, <Param>, <OutParam>, <ParamGroup>, <ParamGroupRef>, <Choice> | |

<ParamDefaultValue>

| Description | Defines a default value for an optional parameter. If the default is a static string it can be specified via the Value attribute. Otherwise a default entity tag should be specified. Default values for required parameters are illegal. | |
| --- | --- | --- |
| Attributes <br> Name | Type | Description |
| Param | NCName | Required. The name of an optional (min=0) in-parameter from the same tag definition. The parameter must be defined by |

|  |  | <Param> tag. |
|---|---|---|
| Value | String | Optional. Can be used only if the optional parameter has Type="sys:Data" and Schema="*XSD Simple Type*" |
| Child Nodes | any entity tag | |

<ConstDefaultValue>

| Description | Defines a default value for an optional const parameter. Default values for required const parameters are illegal. | |
|---|---|---|
| Attributes Name | Type | Description |
| Const | NCName | Required. The name of an optional const parameter from the same tag definition. The const must be defined by <Const> tag. |
| Value | String | Required. The default value of the const parameter. |
| Child Nodes | | |

<Entity>

| Description | Defines the entity class and/or the entity builder that a tag maps to. | |
|---|---|---|
| Attributes Name | Type | Description |
| ClassToCreate | String | Optional. Fully qualified type name of entity class to be created by the XAD runtime. If not specified, the BuilderClass attribute must be specified and the entity builder must create the entity. Can be omitted only if the BuilderClass attribute is specified. |
| BuilderClass | String | Optional. Fully qualified type name of the entity builder class. Entity builder have to be specified if the entity needs wiring and/or complex construction. Can be omitted only if the ClassToCreate attribute is specified. See Entity Builders for more details. |
| Specialization | String | Optional. Fully qualified type name of a type |

|  |  | to be passed as specialization parameter to the entity builder. Can only be specified if ClassToCreate is not specified. No default value. |
| --- | --- | --- |
| Child Nodes |  |  |

\<Function\>

| Description | Defines the function that can be used to model a command | |
| --- | --- | --- |
| Attributes Name | Type | Description |
| Name | String | Required. The name of a public function to use as a command implementation. The function can be implemented in any .NET language like C# and VB. The XAD runtime will map the parameters from XAD to C#/VB. |
| EntityClass | String | Required. Fully qualified type name of the entity class which contains the function. |
| Child Nodes |  |  |

\<Body\>

| Description | Contains the XAD to be abstracted away as another tag. The body must have at least one child node, which results in an entity. The type, cardinality and possibly other constraints of the entities under the body must match the type, cardinality and the constraints defined in the tag definition or the signature. |
| --- | --- |
| Child Nodes |  |

\<ScopeVariable\>

| Description | Defines a scope variable for a parameter that introduces a scope boundary. | |
| --- | --- | --- |
| Attributes Name | Type | Description |
| Name | NCName | Required. The variable name, which is |

|  |  | simple string without a namespace (non-qualified name). Scope variable names must be unique within the scope they are defined. |
|---|---|---|
| Type | QName | Required. Declares the type of entities this variable provides. The type must be declared by <Type> tag. |
| Max | Enum:<br>1,<br>unbounded | Optional. Defines the maximum number of entities this variable can provide. The set of values may be extended in the future. Default is 1. |
| Schema | QName | Optional. Applicable to data variables only. The name of the XSD type that defines the schema for the data this variable provides. By default the schema is unknown. |
| Shape | Enum:<br>? | Optional. Applicable to data variables only. Declares the shape/pattern of the data this variable provides. |
| Writable | Boolean | Optional. Applicable to data variables only. Indicates if this variable provides read-only or writable data. Default is false. |
| Child Nodes |  |  |

<AttachedParam>

| Description | Defines an attached parameter | |
|---|---|---|
| Attributes | | |
| Name | Type | Description |
| Name | NCName | Required. The parameter name, which is simple string without a namespace (non-qualified name). Parameter names must be unique within a tag definition or signature. Other tag definitions or signatures can have parameters with the same name. |
| Type | QName | Required. Declares the type of entities, which this parameter can take. The type must be declared by <Type> tag. |
| Min | Enum: | Optional. Defines the minimum number of entities this parameter can take. 0 means |

|  | 0, 1 | the parameter is optional. The set of values may be extended in the future. Default is 1. |
|---|---|---|
| Max | Enum: 1, unbounded | Optional. Defines the maximum number of entities this parameter can take. The set of values may be extended in the future. Default is 1. |
| TargetType | QName | Optional. Applicable to data parameters only. XAD type defined by <Type> tag. Indicates a type to which the data value of the parameter can be converted to. No default value. |
| Schema | QName | Optional. Applicable to data parameters only. The name of the XSD type that defines the schema for the data this parameter expects. By default the schema is unknown. |
| Shape | Enum: ? | Optional. Applicable to data parameters only. Declares the shape/pattern of the data this parameter expects. |
| Writable | Boolean | Optional. Applicable to data parameters only. Indicates if this parameter requires read-only or writable data. Default is false |
| Child Nodes | <ScopeVariable> | |

Built-in entities

<InlineData>

| Description | Defines Xml data literal in XAD and allows access to it by name. Simple (text), complex (tree) and mixed values are supported. |
|---|---|
| Type | Data |
| Const parameters | |

| Name | Type | Use | Description |
|---|---|---|---|
| Name | String | Optional | Name for bindings |
| Schema | QName | Optional | The name of the XSD type that defines the schema for the data. By default the schema is unknown. |
| Shape | Enum: ? | Optional | Declares the shape/pattern of the data. |
| Writable | Boolean | Optional | Indicates if the data is read-only or writable. Default is false |

<Binding>

| Description | Provides access to entities and parameters by name. Allows sharing of entities. A common usage is to rename or alias named entities (recall, naming is done via Name="...") to allow referencing from inner-scopes. For example, consider the following XAD:<br><br>```<br><DockPanel Data="$SomeData"><br>  <sys:Binding Name="OuterData"<br>  EntityName="DataContext" Param="Resources"/><br>  <DockPanel><br>      <Text Text="$OuterData/@Info" /><br>  </DockPanel><br></DockPanel><br>```<br><br>The above shows us renaming the *DataContext* scope variable of the DockPanel's *RepeatedChild* to OuterData. As a result we can reference the outer scope's *DataContext* |
|---|---|

|  | param by its new name OuterData. |
|---|---|
| Type | The type is defined by the target |

Const parameters

| Name | Type | Use | Description |
|---|---|---|---|
| Name | String | Optional | Name for bindings |
| TargetName | String | Required | Reference to the target of the binding. Can be one of the following:<br>• Name of an entity assigned by using the *Name* attribute;<br>• In parameter name;<br>• Scope variable |
| Path | String | Optional | Path to data which is relative to data specified by *TargetName* param. |

\<XPath\>

| Description | Formal representation of "inline" XPath syntax i.e. `<Blork Foo="{fn:concat ('foo','bar')}" />` |
|---|---|
| Type | Location Template |

| Name | Type | Use | Description |
|---|---|---|---|
| Name | String | Optional | Name for binding to XPath |
| Path | String | Optional | XPath expression |

\<Mapping[SMD4]\>

\<DynamicEntity\>

| Description | Provides dynamic entity instantiation by tag name. |
|---|---|
| Type | The type depends on the specified signature |

Const parameters

| Name | Type | Use | Description |
|---|---|---|---|
| Name | String | Optional | Name for bindings |
| Signature | QName | Required | Qualified name of the tag signature. While the tag name |

|  |  |  | can change the signature remains the same (different entities but the same entity type and parameters). |
|---|---|---|---|
| * | * | * | Any const parameters the dynamically instantiated entity may require |
| In parameters | | | |
| Name | Type | Cardinality | Description |
| Tag | QName | 1 | Specifies the name of the tag to be instantiated. The tag must be defined in dynamically loaded assembly. |
| Namespace | String | 1 | Specifies the namespace within which the value of the *Tag* parameter can be found. |
| * | * | * | Any in parameters the dynamically instantiated entity may require |

Take note that when *Namespace* is specified the value of *Tag* must be a localname i.e. the value of *Tag* cannot be "xcal:DatePicker", rather it must be "DatePicker". Consider the following Xad:

```
<sys:DynamicEntity Name="$DateTag"
    Namespace=http://www.microsoft.com/xaf/xcal ...>
    ...
</sys:DynamicEntity>
```

Important: $DateTag must resolve to a localname such as DatePicker.

Error Cases

TODO :: Ensure this is correct...

Error 1   Checking Errors associated with DyanmicEntity

Scenario: When attempting to load the dynamic entity a series of checking errors occur, these checking error are posted to the status board associated with the DynamicEntity.

<AssociatedEntity>

| Description | Provides access to entities associated with data. | | |
|---|---|---|---|
| Type | The type is unknown until runtime | | |
| Const parameters | | | |
| Name | Type | Use | Description |
| Association Manger | String | Required | Reference to the AssociationManager which is used to resolve the relationship between the *Data* parameter and associated entities. |
| Data | String | Require | Location of the data which is used as a reference to the associated entity. Consider the following Xml:<br><br>```
<Doc ID="1">
   <Uri>Foo.xml</Uri>
</Doc>
<Doc ID="2">
   <Uri>Blah.xml</Uri>
</Doc>
<Doc ID="3">
   <Uri>Blork.xml</Uri>
</Doc>
```<br><br>The *Data* parameter would specify Data="$Doc/Doc[@ID='1']" in order to provide a reference to the file named Foo.xml. |

Error Cases

Error 1 Invalid Association

Scenario: Using a list association manager the author passes in a data node which does not resolved to an association for that manager.

<AssociatedDataEntities>

| Description | Provides access to collection of similarly shaped data entities. |
|---|---|
| Type | The type is unknown until runtime |
| Const parameters | |

| Name | Type | Use | Description |
|---|---|---|---|
| Association Manager | String | Required | Reference to the AssociationManager which is used to resolve the relationship between the *Data* parameter and associated entities. |
| Data | String | Required | Location of the data which is used as a reference to the associated entities. Consider the following Xml:<br><br>```<br><Doc ID="1"><br>　<Uri>Foo.xml</Uri><br></Doc><br><Doc ID="2"><br>　<Uri>Blah.xml</Uri><br></Doc><br><Doc ID="3"><br>　<Uri>Blork.xml</Uri><br></Doc><br>```<br><br>The *Data* parameter would specify Data="$Doc/*" in order to provide a reference to all of the <Doc> elements in the Xml file. |

<SwitchEntity>

| Description | Takes a set of Cases or Conditions and evaluates them. Results in single entity from the first matching selector. |
|---|---|
| Type | Depends on the context or value of the *Type* param |
| In parameters | |

| Name | Type | Cardinality | Description |
|---|---|---|---|

| Choice | | | |
|---|---|---|---|
| ParamGroup | | | |
| Data | sys:Data | 1 | Relative Location to data value which will be switched on. Data must evaluate to IString |
| Case | sys:Case | 1..n | Set of one or more cases to be evaluated. Default Param |
| Condition | sys:Condition | 1..n | Set of one or more Conditions to be evaluated. Default Param |
| DefaultEntity | Any | 0..1 | Entity to return in case none of the Cases or Conditions match. |
| Type | Any | Depends | Required if the Switch is defined within a non-scoped context without proxy, otherwise it is optional. |
| Child Nodes | sys:Case, sys:Condition | | |

<SwitchEntities>

| Description | Takes a set of Cases or Conditions and evaluates them. Results in multiple entities from all matching selectors. | | |
|---|---|---|---|
| Type | Depends on the scope context of the SwitchEntities tag | | |
| Name | Type | Cardinality | Description |
| MatchFirst | Boolean | 0..1 | Defines the return method for the SwitchEntities tag. If set to false the Switch returns all Cases or Conditions which evaluate successfully. Otherwise, only the first Case or Condition which evaluates successfully is returned. Default is false. |
| *Choice* | | | |
| ParamGroup | | | |
| Data | IString | 1 | Relative Location to string value which will be switched on. Data must evaluate to IString |
| Case | sys:Case | 1..n | Set of one or more cases to be evaluated. Default Param. |
| Condition | sys:Condition | 1..n | Set of one or more Conditions to be evaluated. Default Param. |
| DataSelector | Selector | 1..unbounded | Set of one or more selectors to be evaluated. Default parameter. |
| DefaultEntities | Any | 0..1 | Entities to return in case none of the Cases of Conditions match. |
| Child Nodes | sys:Case, sys:Condition | | |

<Case>

| Description | Simple evaluator which can be used to conditionally define the return value of a SwitchEntity/ies construct | | |
|---|---|---|---|
| Type | Depends on the context or Type of the Swtich | | |
| Name | Type | Cardinality | Description |
| Value | IString | 1 | Specifies a string value which will be tested against |

<Condition>

| Description | Rich evaluator which can be used to conditionally define the return value of a SwitchEntity/ies construct | | |
|---|---|---|---|
| Type | Depends on the context or Type of the Swtich | | |
| Name | Type | Cardinality | Description |
| Test | sys:Data | 1 | Specifies an xPath expression which evaluates to true of false |

Entity builders

Entity builders are user-defined .NET classes for creating and/or wiring entities. Entity builders are used to implement primitive XAD tags. XAD language defines the requirements for writing entity builders since they are the point of interaction between the XAD runtime and the custom extensions of the language.

There are four ways to implement a primitive tag, which defines a new entity, depending on the entity construction and wiring:

| N: | Construction | Wiring | ClassTo-Create | Builder-Class | Description |
|---|---|---|---|---|---|
| 1 | Simple | No | Yes | No | Creating the entity is as simple as creating a new instance of a class. The constructor doesn't take any parameters the XAD runtime doesn't know about. The tag signature doesn't define any parameters and, therefore, the entity doesn't need wiring to parameters. |
| 2 | Simple | Yes | Yes | Yes | Creating the entity is as simple as creating a new instance of a class. The tag signature specifies in parameters and, therefore, the entity needs to be wired to them. Entity builder must be specified to implement the wiring. |
| 3 | Complex | No | No | Yes | Entity construction is complex in some way (using factory, passing constructor parameters, etc.). |

| | | | | | Entity builder must be specified to implement the construction. The tag signature doesn't specify parameters so no wiring needs to be implemented by the builder. |
| --- | --- | --- | --- | --- | --- |
| 4 | Complex | Yes | No | Yes | Entity construction is complex in some way (using factory, passing constructor parameters, etc.). The tag signature specifies in parameters. Entity builder must be specified to implement both the construction and the wiring of the entity. |

Note that in 3 out of 4 cases an entity builder class has to be specified. The XAD defines two interfaces for entity builders:

```
interface ICreateEntity
{
  IEntity Create(
      IEntityDomain parent,
      IConstantParameters constantParameters,
      IExposeOutputParameters parameterExposer );
} interface IWireEntity
{
  void Wire(
      IEntity entityToWire,
      IParameterDescription parameters,
      Collections.IDictionary bindableEntities );
}
```

Depending on the entity construction and wiring an entity builder can implement either one or both interfaces:

| N: | Construction | Wiring | ICreateEntity | IWireEntity |
| --- | --- | --- | --- | --- |

| 1 | Simple  | Yes | No  | Yes |
| 2 | Complex | No  | Yes | No  |
| 3 | Complex | Yes | Yes | Yes |

Requirements for entity builders:

- Stateless. Entity builders are not allowed to keep local state between two calls to Create and/or Wire methods. The XAD runtime may create object pool of entity builders for efficiency reasons. Therefore, there is no guarantee of the order and the number of calls to the builder methods.
- No play-time behavior. Entity builders can do two things – create and wire entities. Nothing else is allowed. Entity builders are not allowed to use any other interfaces of the entities they create or wire.

The following example shows a tag definition of a primitive tag and implementation of the corresponding entity builder:

```
<sys:TagDefinition Name="Text" Type="fwk:UIElement">
    <sys:Const Name="AllowEdits" Schema="xsd:boolean"
        Optional="true"/>
    <sys:Param Name="Data" Type="Data" Schema="xsd:string"/>
    <sys:ConstDefaultValue Const="AllowEdits" Value="true"/>
    <sys:Entity BuilderClass="...TextBuilder..."/>
</sys:TagDefinition>
```

```
public class TextBuilder : ICreateEntity, IWireEntity
{
    IEntity Create(
        IEntityDomain parent,
        IConstantParameters constantParameters,
        IExposeOutputParameters parameterExposer )
    {
        string allowEdit =
            constantParameters.GetConstantParameter("AllowEdits");

return new Text( parent,
            Convert.ToBoolean( allowEdit ) );
    } void IWireEntity.Wire(
        IEntity entityToWire,
```

```
        IParameterDescription parameters,
        Collections.IDictionary bindableEntities )
    {
        Text text = ( Text )entityToWire;

text.Data = parameters.GetParameter( "data" );
    }
}
```

Here is an example of simplified version of the same tag. Since the entity doesn't need access to const parameters and doesn't have any special constructor parameters the entity builder doesn't need to implement the entity construction, only the wiring:

```
<sys:TagDefinition Name="Text" Type="fwk:UIElement">
    <sys:Param Name="Data" Type="Data" Schema="xsd:string"/>
    <sys:Entity
        ClassToCreate="...Text..."
        BuilderClass="...TextBuilder..."
    />
</sys:TagDefinition>
```

```
public class TextBuilder : IWireEntity
{
    void IWireEntity.Wire(
        IEntity entityToWire,
        IParameterDescription parameters,
        Collections.IDictionary bindableEntities )
    {
        Text text = ( Text )entityToWire;

text.Data = parameters.GetParameter( "data" );
    }
}
```

*Actions*

In general, Actions are entities, which implement the entity type "fwk:EventHandler".

```
<sys:Type Name="Command" Interface="...ICommand..."/>
```

```
public interface ICommand
{
  bool Execute();
```

```
}
```

A command can be implemented like any other entity – by implementing an entity class and writing a tag definition. However, Actions are recognized as one of the most common entities and XAD supports an alternative simpler way of implementing them. XAD allows Actions to be implemented as functions instead of entities. Behind the scenes the XAD runtime maps XAD parameters to C# parameters and invokes the function.

Functions used as command implementations have to meet the following requirements:

- Defined as methods of an entity class. The entity class provides access to the entity domain services. More than one command functions can be implemented on the same entity class. However, this is simply convenience of packaging and doesn't imply any interaction between the Actions.
- Stateless. The XAD runtime makes decisions at runtime how to manage instances of command entities. For example it is possible that new instance of the entity class is created for each command invocation. Actions are not allowed to keep state from one invocation to another. All information they need to know about the application must be passed as parameters.
- No ref and out parameters. Actions implemented as functions cannot have output parameters. Ref parameters are not supported by XAD in general so command functions cannot use them either. The Actions make changes to the application state by writing to writable data, passed as in parameters.

Command functions take entities as parameters. Often, the parameters will be data entities. XAD facilitates the access to data entities by allowing strongly typed access. In addition to using the generic data entity type ICRange command authors have the option of using strongly typed accessors as parameter types.

```
class MyActions : EntityElement
{
    ...
```

```
    // Use generic data entity type
    bool GetFileNameGeneric( IRange CurrentDirectory, IRange
        FileName )
    {...};

// Use strongly typed accessors
    bool GetFileNameTyped( string CurrentDirectory, IUpdateString
        FileName )
    {...};
}
```

Note that instead of using an out or ref parameter for the file name an update accessor is used.

It is an error to specify an accessor, which is not supported by the data entity.

In addition to the command function a corresponding tag definition must be written. The parameter names in the tag definition must match exactly the parameter names in the command function. The XAD runtime is matching the parameters by name therefore it is an error to have non-matching parameter names. The parameter order is irrelevant.

```
<sys:TagDefinition Name="GetFileNameCommand"
Type="sys:EventHandler">
    <sys:Param Name="CurrentDirectory" Type="sys:Data"/>
    <sys:Param Name="FileName" Type="sys:Data"/>
    <sys:Function Name="GetFileNameTyped"
        EntityClass="...MyActions..."/>
</sys:TagDefinition>
```

Optional parameters (Min="0") are allowed. Default values for optional parameters can be specified in the tag definition. If no default value is specified the XAD runtime will pass null and the client code must be prepared to handle it. It is an error to define value type optional parameter without default value.

Set parameters (Max="ubounded") are allowed. Set parameters must be typed in the function as ICollection. Generics may be used in the future to specialize the collection with the type of the items.

4) What interface should the custom checkers implement?

5) How do we deal with conflicts between parameter names and attached parameter names?

6) Do we want to support out parameters on dynamically instantiated entities?

7) Are we going to use generics in some way so the entity passed to Wire is strongly typed? How about the parameter values?

Common Framework Entities

9) This section has been moved to another document. The link to this document is http://xafteam/xafenv/doc/Platform/Application%20Components/XAD%20-%20SDK1%20Tag%20Definitions.doc

Deployment Model

*XAD application*

XAD applications consist of various related pieces. The XAD packaging and deployment model defines the rules for grouping those pieces together and defining the relationships between them for the purpose of:

- Identifying all parts of an application (the constituents of an application)
- Verifying an application's integrity
- Running an application in both interpreted and compiled mode
- Deploying an application
- Versioning XAD uses an assembly-based packaging and deployment model, which follows the Microsoft deployment strategy (see Fusion, http://fusion for details). Fusion deals with problems like versioning, side-by-side installation, "DLL hell", administration, policies, etc. so it is beneficial to leverage its deployment model and services.

The various application pieces are grouped into larger packages, called assemblies. Assemblies are combined to form applications:

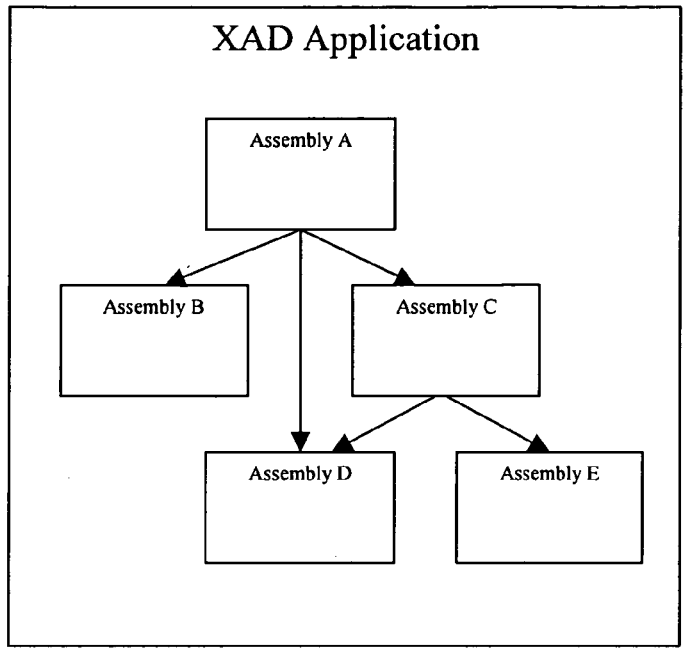

Every XAD application has an entry point – the tag from which the application processing starts. The requirements for the application entry point are:

- The tag must be defined in the root assembly.
- The local name of the tag must be Main. The namespace must be http://schemas.microsoft.com/2005/xad/system
- If the tag takes parameters, they must be of simple data types (string, Integer, Boolean, etc) so they can be passed from the command line.

*XAD assembly*

XAD assembly is the smallest unit of deployment. It is fusion assembly with XAD semantics.

An XAD assembly consists of two parts:

- Manifest (see 5.3)
- Constituent files

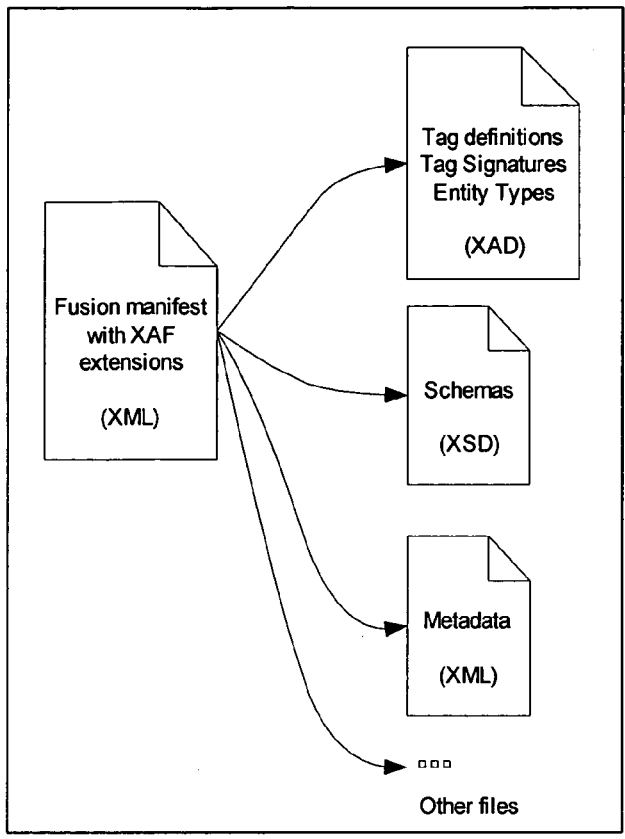

The assembly constituent files (listed in the manifest) contain the actual XAD code (tag definitions, entity types, signatures, etc.) and any other information, which is part of the application (data schemas, metadata, resources, etc.). Once an XAD or schema file is listed as constituent in the manifest its content becomes available for:

- All XAD files in the assembly
- All XAD files in the dependent XAD assemblies

Types, signatures, parameter groups and tag definitions can be defined as "internal" in which case they are not visible outside their assembly.

XAD files don't refer to other XAD or schema files. The dependencies (using tags, types, etc. from other files) are handled on assembly level, not on file level.

However, other languages used in an XAD application may support file references. XSD for example supports include and import directives. The files being included or imported don't automatically become part of the assembly. They have to be listed explicitly as constituent files.

8) What do we do about intellectual property (IP) protection? Compiled assemblies might be the answer.

All constituent files must be located in the same folder where the manifest is located or in subfolder(s) (arbitrary deep nesting levels of subfolders are supported).

There are two formats for XAD assemblies:

- Non-PE multi-file assembly.

PE stands for "portable executable". This format is convenient during development. There is no single file containing the entire assembly. The constituent files are used as they are created by the XAD author and saved on disk. The XAD runtime discovers them by reading the manifest. Any changes to a constituent file reflect immediately on the assembly as the file is saved. No compilation step is required to use the assembly in XAD application.

- .NET assembly.

This is a compiled form of XAD assembly, convenient for deployment. The compilation provides better performance. The XAD assembly is stored in binary format and can be signed with a strong name so it can be deployed in the GAC (Global Assembly Cache) just like other .NET assemblies. It is yet to be determined what the exact format of a compiled XAD assembly is (TBD post SDK1). It is a required though that compiled XAD assemblies will allow errors to be correlated back to the original XAD source for the reason of error handling and generating meaningful Watson dumps.

*Assembly manifest*

XAD assembly manifest is Fusion manifest and can be consumed by Fusion. It fully describes an XAD assembly. The manifest is a Xml file with ".manifest" extension. The latest Fusion manifest schema can be found at
http://teamweb/manifest/Shared%20Documents/Latest%20Manifest%20schema.htm
Manifests can be created manually using a text editor or created by a development tool. At development time the manifest plays the role of a project file – it records all parts of the assembly and its dependencies. At runtime the manifest plays the role of a catalog used by the XAD runtime to find and load all parts of the application. The XAD runtime doesn't understand the entire Fusion manifest schema – it recognizes certain sections of it and ignores the rest.

The manifest sections recognized by XAD are:

- Assembly identity
- Description
- Dependencies on other assemblies
- List of constituent files The Fusion manifest schema target namespace is "urn:schemas-microsoft-com:asm.v2". The schema is extensible – elements and attributes from other namespaces can be added. XAD adds just a few attributes as extensions defined in the http://schemas.microsoft.com/2005/xad/assembly namespace. XAD doesn't extend the manifest schema with elements.

The following reference describes the Fusion manifest Xml elements and attributes, recognized by XAD as well as the attributes added by XAD.

Manifest tags

| i) | *<assembly>* |
|---|---|
| Description | The root tag for each assembly manifest |
| Child Nodes | <assemblyIdentity>, <description>, <dependency>, <file> |

| ii) <assemblyIdentity> | | |
|---|---|---|
| Description | Defines an assembly identity or references dependency assembly. | |
| Attributes Name | Type | Description |
| name | String | Required. The assembly name. XAD assembly name must be the same as its manifest file name (without the .manifest extension). |
| version | a.b.c.d | Required. Four-part assembly version. Each segment is in the range of 0-65535 |
| publicKeyToken | String 16 hex digits | Optional. A 16-character hexadecimal string representing the last 8 bytes of the SHA-1 hash of the public key under which the assembly is signed. |
| culture | String | Optional. The culture for which the assembly is targeted. |
| type | String | Optional. Indicates the assembly type. XAD recognizes two types of assemblies – xad assemblies (type="xad") and .NET assemblies (any other value for the type). type="xad" must be specified when referencing XAD assembly as dependency. The type is ignored by the XAD in all other cases. The "xad" value is reserved by XAD and is not part of the Fusion manifest schema. According to Fusion assemblies are generally typed as "win32". |

9) What is our usage of "culture" attribute? In .NET it is intended for satellite assemblies only. How do we handle localized resources?

10) Issues with our current usage of type attribute:
- It is documented as "for backward compatibility" and may be removed in the future.
- There is no way to globally reserve the value "xad"
- The type only makes sense when specified on dependencies Should we define our own extension attribute on the dependentAssembly element instead?

| | |
|---|---|
| *iii)* | *<dependency>* |
| Description | Defines a dependency.<br><br>For XAD this is a redundant level of indirection/nesting but it is required by Fusion. |
| Child Nodes | <dependentAssembly> |

| | |
|---|---|
| *iv)* | *<dependentAssembly>* |
| Description | Defines a dependency on another assembly |
| Child Nodes | <assemblyIdentity>, <description> |

| v) | <file> | |
|---|---|---|
| Description | Describes an assembly constituent file | |
| Attributes | | |
| Name | Type | Description |
| name | String | Required. The name of the file, including the extension. Can specify a file path relative to the folder containing the manifest. It is an error to specify absolute path or path, which points outside the manifest folder. |
| type | Enum: xad, schema, metadata | Optional. Any file type can be specified. However, XAD runtime will only recognize "xad", "schema" and "metadata". Files of other types will be deployed and available for the assembly/application but they will not be processed by XAD.<br>The type attribute and its values are XAD extension of the Fusion manifest schema. type attribute is defined in the http://schemas.microsoft.com/2005/xad/assembly namespace |
| Child Nodes | <Description> | |

11) What is the future of behavior map files?

Sample manifest

```xml
<?xml version="1.0" encoding="utf-8" ?>
<assembly
    xmlns="urn:schemas-microsoft-com:asm.v2"
    xmlns:xa="http://schemas.microsoft.com/2005/xad/assembly"
>

<assemblyIdentity name="Demo" version="1.0.0.0"/>

<dependency>
        <dependentAssembly>
            <assemblyIdentity name="Microsoft.XAF.XAD.Framework"
                version="1.0.0.0" type="xad"/>
        </dependentAssembly>
    </dependency>

<dependency>
        <dependentAssembly>
            <assemblyIdentity name="DemoEntityBuidlers"
                version="1.0.0.0"/>
        </dependentAssembly>
    </dependency>

<file name="DemoTags.xad" xa:type="xad"/>
    <file name="DemoDataSchema.xsd" xa:type="schema"/>

</assembly>
```

This sample manifest describes an assembly with name "Demo" and version "1.0.0.0".

The "Demo" assembly depends on two other assemblies:
- "Microsoft.XAF.XAD.Framework" – XAD assembly (type = "xad")
- "DemoEntityBuidlers" - .NET assembly (no type specified)

The "Demo" assembly has two constituent files:
- DemoTags.xad – XAD file, which could eventually contain tag definitions, signatures, entity types and public parameter groups.

- DemoDataSchema.xsd – schema file

*Assembly dependencies*

By establishing a dependency on another assembly, an XAD assembly can use its non-internal:

- Entity types
- Signatures
- Tag definitions
- Parameter groups
- Schemas

A dependency on another XAD assembly is established by including its identity in the list of dependency assemblies in the manifest and specifying the attribute type="xad". No file or path information needs to be specified. Assembly identities will be resolved at runtime and the corresponding assemblies will be loaded. (see "Assembly binding, loading and unloading").

XAD assemblies can also depend on .NET assemblies. A dependency on .NET assembly is established in exactly the same way as dependency on XAD assembly except that the type attribute is not specified or has a different value. Dependency on .NET assembly must be established every time a .NET type is referenced by XAD assembly in:

- Entity type definition
- Entity reference in primitive tag definition
- Entity builder reference in primitive tag definition
- Command class reference in primitive tag definition
- Metadata

```
<!--    This entity type definition refers to the managed type
        MyType.  The manifest must include a dependency on
        MyAssembly
-->
<sys:Type Name="MyEntityType" Type="...MyAssembly.MyType..."/>

...

<!--    Specify dependency on the MyAssembly .NET assembly because
        of the reference to the MyType defined in MyAssembly
```

```
-->
<dependency>
    <dependentAssembly>
        <assemblyIdentity name="DemoEntityBuidlers"
            version="1.0.0.0"/>
    </dependentAssembly>
</dependency>
```

Here are the rules that apply to XAD assembly dependencies:

- One assembly can depend on many assemblies (A can depend on B, C, D, etc.)
- Many assemblies can dependent on the same assembly (B, C, D, etc. can depend on A)
- Assembly dependencies are non transitive (If A depends on B and B depends on C, A doesn't depend on C. A must explicitly reference C if necessary.)
- Circular dependencies are not supported (If A depends on B and B depends on C, C cannot depend on A)

*Assembly binding, loading and unloading*

Binding is the process of resolving an assembly identity to its physical location. Assembly identities don't contain location information like path and file. The Fusion defines assembly binding algorithm used by the .NET runtime. Long-term XAD will use the binding algorithm as service provided by Fusion. Short-term it implements a Childrenet of it.

It is required that all non-strongly named assemblies (without public key token) must exist under the application folder. The application folder is the folder, which contains the manifest of the root/main assembly.

Given an assembly identity the XAD runtime finds an assembly using the following algorithm:

1. If the assembly is not of type "XAD" assume it is .NET assembly and delegate the loading to the .NET framework.
2. For XAD assemblies check the application folder for manifest file with the assembly name and load it.

3. If not found, check the application folder for a subfolder with the assembly name. If found, check for manifest file with the assembly name and load it.
4. If not found and this is a debug build repeat step 2 and 3 for each folder specified in the environment variable XADPATH. This is development-time facility only. Paths in XADPATH are semicolon separated.

Once found, the assembly and all its dependencies are loaded by the XAD runtime. The process is recursive – it is repeated for the dependencies. The content of each dependency is made available for the dependent assembly. It is important to note that the content of the assemblies is not made globally available for all assemblies, only for their immediate dependents.

Schemas are exception from this rule. Upon loading an assembly with schema constituent files the schemas are loaded and added to the global schema collection, making them available for all assemblies. This, however, is a limitation of the current implementation and should not be considered as requirement. It will most likely change in the future.

There are two ways to load an assembly:

> Through static dependency in another assembly's manifest.
> Programmatically.
> > Through LoadAssemblyCommand.
> > Through low-level public API.

Starting from the root assembly (the application assembly) and going to its dependencies, the dependencies of its dependencies, etc. an arbitrary deep graph of statically dependent assemblies is formed. The XAD runtime loads all these assemblies at application startup. The developers can also load assemblies, which are not specified as static dependencies. The main scenario targeted by the feature of programmatically loaded assemblies is the support for Add-ins (see Add-in Model for more details).

The application assembly (the root) and all programmatically loaded assemblies form the set of top-level assemblies. Only top-level assemblies contribute to the application metadata. Only top-level assemblies with the exception of the root assembly can be programmatically unloaded. An assembly cannot be unloaded if it is loaded as static dependency even if it was also programmatically loaded later as top-level assembly. Unloading such an assembly will only result in removing it from the top-level assemblies but not from the statically loaded assemblies.

*Packaging scenarios*

One-file applications

"Hello world" is an example of simple one-file application. One-file applications have a single XAD file, which contains all the information necessary for running the application. At the very minimum the file must contain a tag definition for the main tag – the application entry point. There is no need to create an assembly or assembly manifest.

```
<!-- HelloWorld.xad -->

<sys:Xad
    xmlns:sys = "http://schemas.microsoft.com/2005/xad/system"
    xmlns = "http://schemas.microsoft.com/2005/xad/framework"
>

<sys:TagDefinition Name="sys:Main" Type="fwk:Application">
        <sys:Body>

<Application>
                <Window>
                    <Text Text="Hello World"/>
                <Window>
            </Application>

</sys:Body>
    </sys:TagDefinition>

</sys:Xad>
```

The requirements for one-file applications are:

- Depend on the standard framework only. The standard framework is available by default and it doesn't have to be specified as dependency in the assembly manifests. If an application is using tags, types and signatures from the standard framework only then it doesn't need to specify any dependencies in its manifest (no dependencies section in the manifest).

- Have all tags in a single file. If there is only one file the application doesn't need the constituent files section of the manifest. As soon as there is more than one file regardless of its type the application needs a manifest to describe the constituent files.

If these requirements are met the application doesn't need assembly manifest at all because all important sections would be empty. It is a one-file application.

Library of derived tags

XAD allows XAD authors to extend the language by defining their own tags. The easiest way to do it is to define derived tags because they are implemented by XAD and don't require low level programming skills. An XAD author would eventually come up with a set of reusable custom tags and would want to share them across many assemblies and applications. This can be done by packaging the tags in a separate assembly, which can then be references by other assemblies.

In the example below there are two reusable derived tags, defined in MyTags.xad file and packaged in MyLibrary assembly. MyLibrary assembly is referenced by MyApplication assembly, which is using the tags provided by the library.

```
<!-- MyTags.xad -->

<sys:Xad  xmlns="http://schemas.microsoft.com/xaf/ xad/standard"
        xmlns:sys="http://schemas.microsoft.com/xaf/ xad/system"
        xmlns:my="myNamespace">

<sys:TagDefinition Name="my:TextWithLabel" Type="">
        <sys:Param Name="Label" Type="Data"/>
        <sys:Param Name="Text" Type="Data"/>
        <sys:Body>
            <FlowPanel>
                <Lable Data="$Label"/>
                <Text Data="$Text"/>
            </FlowPanel>
        </sys:Body>
    </sys:TagDefinition>

<sys:TagDefinition Name="my:Hyperlink" Type="">
        <sys:Param Name="Url" Type="Data"/>
```

```xml
        <sys:Body>
            <Label Data="$Url" OnLeftButtonUp="$OnClickCmd">
                <Resources>
                    <StartProcessCommand Name="OnClickCmd"
                        CommandLine="$Url"/>
                </Resources>
            </Label>
        </sys:Body>
    </sys:TagDefinition>

</sys:Xad>
```

```xml
<!-- MyLibrary assembly manifest - MyLibrary.manifest -->

<assembly
    xmlns="urn:schemas-microsoft-com:asm.v2"
    xmlns:xa="http://schemas.microsoft.com/2005/xad/assembly"
>

<assemblyIdentity name="MyLibrary" version="1.0.0.0"/>

<dependency>
        <dependentAssembly>
            <assemblyIdentity name="Microsoft.XAF.XAD.Framework"
                version="1.0.0.0" type="xad"/>
        </dependentAssembly>
    </dependency>

<file name="MyTags.xad" xa:type="xad"/>

</assembly>
```

```xml
<!-- MyApplication.xad -->

<sys:Xad xmlns="http://schemas.microsoft.com/xaf/xad/standard"
    xmlns:sys="http://schemas.microsoft.com/xaf/xad/system"
    xmlns:my="myNamespace">

<sys:TagDefinition Name="sys:Main" Type="fwk:Application">
        <sys:Body>
            <Application>
                <Frame>
                    <FlowPanel>
                        <Label Data="My favorites:"/>
```

```
                <my:Hyperlink Url="www.microsoft.com"/>
                <my:Hyperlink Url="www.yahoo.com"/>
                <my:Hyperlink Url="www.google.com"/>
            </FlowPanel>
          </Frame>
        </Application>
      </sys:Body>
   </sys:TagDefinition>

</sys:Xad>
<!-- MyApplication assembly manifest - MyApplication.manifest
    file -->

<assembly
    xmlns="urn:schemas-microsoft-com:asm.v2"
    xmlns:xa="http://schemas.microsoft.com/2005/xad/assembly"
>

<assemblyIdentity name="MyApplication" version="1.0.0.0"/>

<dependency>
        <dependentAssembly>
            <assemblyIdentity name="Microsoft.XAF.XAD.Framework"
                version="1.0.0.0" type="xad"/>
        </dependentAssembly>
    </dependency>

<dependency>
        <dependentAssembly>
            <assemblyIdentity name="MyLibrary" version="1.0.0.0"
                type="xad"/>
        </dependentAssembly>
    </dependency>

<file name="MyApplication.xad" xa:type="xad"/>

</assembly>
```

Here is how it works:

- MyTags.xad file defines two tags – TextWithLabel and Hyperlink.
- MyTags.xad file is listed as constituent file in MyLibrary manifest. That makes all the tags in the file available for the MyLibrary assembly clients.

- MyApplication assembly references MyLibrary assembly and, therefore, has access to all tags defined in MyLibrary.
- MyApplication file uses the Hyperlink tag, defined in MyLibrary assembly.

Library of primitive tags

XAD can be extended by defining custom primitive or derived tags. While derived tags are easier to define because they are implemented using XAD, the primitive tags can provide richer functionality because they are implemented using low level programming languages like VB and C#. Those languages provide full access to the OS and machine resources. Component, tool and platform developers can define primitive tags, which then can be reused by XAD authors in many XAD applications. Packaging primitive tags is almost identical to the packaging derived tags (see the example above). There are two main differences:

- The tag definition contains reference to the entity builder class instead of XAD body
- The manifest of the assembly containing the primitive tag must specify additional dependency on the .NET assembly containing the entity builders Entity builders are .NET components, which know how to create and wire entities corresponding to primitive tags (see language concepts for more details on entity builders).

The example below implements the Hyperlink as primitive tag:

```
<!-- MyTags.xad -->

<sys:Xad xmlns:sys="http://schemas.microsoft.com/xaf/ xad/system"
      xmlns:my="myNamespace">

<sys:TagDefinition Name="my:Hyperlink" Type="">
      <sys:Param Name="Url" Type="Data"/>
      <sys:Entity BuilderClass="MyAssembly.HyperlinkEntityBuilder
               MyAssembly Version=1.0.0.0 Culture=neutral" />
   </sys:TagDefinition>

</sys:Xad>
<!-- MyLibrary assembly manifest - MyLibrary.manifest file -->
```

```xml
<assembly
    xmlns="urn:schemas-microsoft-com:asm.v2"
    xmlns:xa="http://schemas.microsoft.com/2005/xad/assembly"
>

<assemblyIdentity name="MyLibrary" version="1.0.0.0"/>

<dependency>
        <dependentAssembly>
            <assemblyIdentity name="Microsoft.XAF.XAD.Framework"
                version="1.0.0.0" type="xad"/>
        </dependentAssembly>
    </dependency>

<!--Dependency on the .NET assembly implementing the entity
        builder -->
    <dependency>
        <dependentAssembly>
            <assemblyIdentity name="MyAssembly" version="1.0.0.0"
                type="xad"/>
        </dependentAssembly>
    </dependency>

<file name="MyTags.xad" xa:type="xad"/>

</assembly>
```

The client code is identical with the code using Hyperlink as derived tag. The client assembly is neither exposed to the implementation details of the tags from other assemblies nor to their dependencies.

```xml
<!-- MyApplication.xad -->

<sys:Xad xmlns="http://schemas.microsoft.com/xaf/ xad/standard"
       xmlns:sys="http://schemas.microsoft.com/xaf/ xad/system"
       xmlns:my="myNamespace">

<sys:TagDefinition Name="sys:Main" Type="fwk:Application">
        <sys:Body>
            <Application>
                <Frame>
                    <FlowPanel>
                        <Label Data="My favorites:"/>
```

```xml
                    <my:Hyperlink Url="www.microsoft.com"/>
                    <my:Hyperlink Url="www.yahoo.com"/>
                    <my:Hyperlink Url="www.google.com"/>
                </FlowPanel>
            </Frame>
        </Application>
    </sys:Body>
</sys:TagDefinition>

</sys:Xad>

<!-- MyApplication assembly manifest - MyApplication.manifest -->

<assembly
    xmlns="urn:schemas-microsoft-com:asm.v2"
    xmlns:xa="http://schemas.microsoft.com/2005/xad/assembly"
>

<assemblyIdentity name="MyApplication" version="1.0.0.0"/>

<dependency>
        <dependentAssembly>
            <assemblyIdentity name="Microsoft.XAF.XAD.Framework"
                version="1.0.0.0" type="xad"/>
        </dependentAssembly>
    </dependency>

<dependency>
        <dependentAssembly>
            <assemblyIdentity name="MyLibrary" version="1.0.0.0"
                type="xad"/>
        </dependentAssembly>
    </dependency>

<file name="MyApplication.xad" xa:type="xad"/>

</assembly>
```

Add-in Model

*What is an Add-in?*

Add-ins (also known as Add-ons or Plug-ins) are self contained software packages, which extend the basic feature set of a given software application without requiring the application to be upgraded. Add-ins allow new features or third-party extensions to be added incrementally as they become available without having to wait and go through an expensive upgrade cycle.

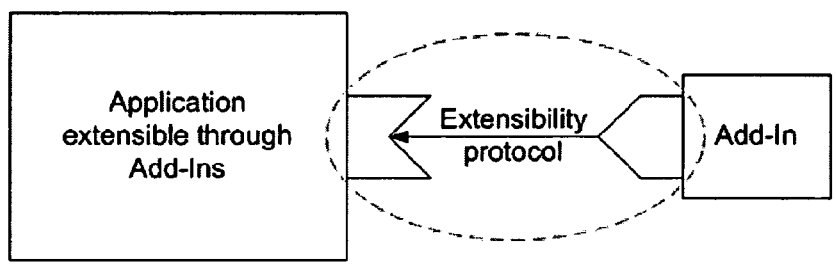

There are 4 important requirements for add-in architectures to work:

- Extensibility protocol(s) must be defined and published
- The application being extended must correctly implement the extensibility protocol(s)
- The add-ins must correctly implement the extensibility protocol(s)
- The application must support discovery and loading of add-ins

*XAD add-in model*

XAD add-in model is based on the following key concepts:

- Dynamic loading of assemblies
- Metadata-driven extensibility protocol
- Dynamic entity instantiation

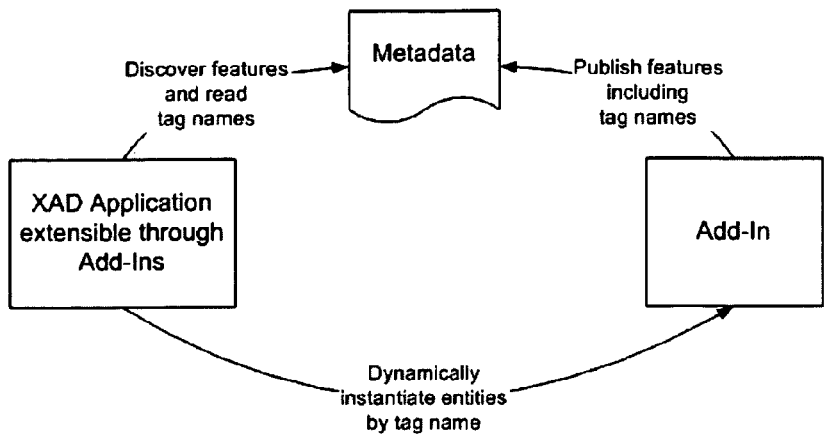

Dynamic loading of assemblies

Add-ins are packaged in assemblies. This is no surprise since all parts of an XAD application are packaged in assemblies. Normally assemblies are loaded through static dependencies specified in the assembly manifest (see assembly dependencies). The XAD runtime automatically loads all static dependencies.

Assemblies can also be loaded dynamically. In this case the assembly is not listed as static dependency in any manifest. Instead, the application can use the system-defined command <loadAssembly> to load an assembly by specifying its manifest path. The path is just piece of data and could be obtained from user input, application state, configuration files, etc. Once the assembly is loaded the metadata is updated and its entities become available for dynamic instantiation.

| vi) *<LoadAssembly>* | | |
|---|---|---|
| Description | System-defined XAD tag for loading assemblies at runtime | |
| Parameters | | |
| Name | Type | Description |
| ManifestLocation | String | Required. The manifest path of the assembly to be loaded |

Metadata-driven extensibility protocol

Extensible XAD applications define their extensibility protocol in a separate assembly so it can be published and referenced by both the application and the third-parties writing extensions. The extensibility protocol has two parts:

- Metadata schema: The term "metadata" in general means "data about data". In the context of this specification metadata is used as description of the features, implemented by an add-in. The metadata may include tag names, parameters to be passed, human-readable text for the UI, etc. The extensible application defines the metadata schema (what to expect from add-ins). The add-ins provide the content.

- Tag signatures: An add-in implements its features by defining XAD tags. An application uses these tags to access the add-ins features. The application defines the tag signatures (what type of entities should the tags result in and what parameters they take) while the add-in provides the tag definitions (the tag name and the actual implementation). Signatures can be compared to interfaces while tag definitions can be compared to interface implementations.

XAD supports a global metadata tree, accessible through a system-defined tag: <u><Metadata></u>. The metadata tree is union of all metadata constituent files from all dynamically loaded assemblies (see <u>file type</u> for details on constituents). At runtime the metadata tree is automatically updated every time an assembly with metadata constituent file(s) is loaded or unloaded. Proper change notifications are sent so the application can update itself dynamically. Using the metadata tree the application can discover what add-ins are loaded and use the features they provide.

Dynamic entity instantiation

Normally, the XAD author writes XAD tags directly in the XAD code. By using an XAD tag the author statically declares what entity to be created by the XAD runtime.

Add-ins define tags for accessing the features they implement. Since the add-ins are not available at the time the application is written it is not possible for the XAD author to know and use the tags defined by the add-ins. The author only knows and statically defines the tag signatures. The actual tag names and eventually parameter values are provided by the add-in through metadata. The application knows exactly what the metadata schema is because it is part of the application-defined extensibility protocol. It reads the metadata and dynamically instantiates entities by tag name. XAD supports system-defined tag for dynamic entity instantiation by tag name: <DynamicEntity>. Only entities of type with proxy can be dynamically instantiated. Entities can be dynamically instantiated only if they are defined in:

- Dynamically loaded assembly
- Static dependency assembly of the assembly, which is using the DynamicEntity tag

*Add-in scenario*

The following scenario describes a file application, which can be extended through add-ins to support new types of files. The idea of the application is that it can open and show a file of any type as long as it has add-in, which support the file type. The example has 3 parts:

- FileExtensionProtocol assembly

Defines the extension protocol for the File application. The extension protocol consists of the metadata schema and the signature for the individual file tags. It is defined in a separate assembly so both the application and the various add-ins can reference it.

- File assembly.

The assembly for the File application code.

- SmartFilesAddIn assembly.

Add-in assembly provided by an imaginary company Smarts.com.

FileExtensionProtocol assembly

```xml
<!-- FileExtensionProtocol.manifest -->

<assembly
    xmlns="urn:schemas-microsoft-com:asm.v2"
    xmlns:xa="http://schemas.microsoft.com/2005/xad/assembly"
>

<assemblyIdentity name="FileExtensionProtocol"
        version="1.0.0.0"/>

<dependency>
        <dependentAssembly>
            <assemblyIdentity name="Microsoft.XAF.XAD.Framework"
                version="1.0.0.0" type="xad"/>
        </dependentAssembly>
    </dependency>

<file name="FileMetadataSchema.xsd" xa:type="schema"/>
    <file name="FileTagSignature.xad" xa:type="xad"/>

</assembly>
```

```xml
<!-- FileMetadataSchema.xsd -->

<xsd:schema
    targetNamespace="FileApplication"
    elementFormDefault="qualified"
    xmlns="FileAddInsSchema"
    xmlns:xsd="http://www.w3.org/2001/XmlSchema"
>

<xsd:element name="Files">
        <xsd:complexType>
            <xsd:sequence>
                <xsd:element name="File" maxOccurs="unbounded">
                    <xsd:complexType>
                        <xsd:attribute name="FileExtension"
                            type="xsd:string" use="required"/>
                        <xsd:attribute name="Tag"
                            type="xsd:QName" use="required"/>
                    </xsd:complexType>
                </xsd:element>
```

```
        </xsd:sequence>
      </xsd:complexType>
   </xsd:element>

</xsd:schema>
```

```
<!-- FileTagSignature.xad -->

<sys:Xad
    xmlns="http://schemas.microsoft.com/xaf/ xad/standard"
    xmlns:sys="http://schemas.microsoft.com/xaf/xad/system"
    xmlns:fv="FileApplication"
>

<sys:Signature Name="fv:FileSignature" Type="">
        <sys:Param Name="FilePath" Type="Data"/>
    </sys:Signature>

</sys:Xad>
```

File assembly

```xml
<!-- File.manifest -->

<assembly
    xmlns="urn:schemas-microsoft-com:asm.v2"
    xmlns:xa="http://schemas.microsoft.com/2005/xad/assembly"
>

<assemblyIdentity name="File" version="1.0.0.0" />

<!-- Dependency on the standard framework -->
    <dependency>
        <dependentAssembly>
            <assemblyIdentity name="Microsoft.XAF.XAD.Framework"
                version="1.0.0.0" type="xad"/>
        </dependentAssembly>
    </dependency>

<!-- Dependency on the assembly defining the add-in protocol-->
    <dependency>
        <dependentAssembly>
            <assemblyIdentity name="FileExtensionProtocol"
                version="1.0.0.0" type="xad"/>
        </dependentAssembly>
    </dependency>

<file name="File.xad" xa:type="xad"/>

</assembly>
```

```xml
<!-- File.xad -->

<sys:Xad
    xmlns="http://schemas.microsoft.com/xaf/ xad/standard"
    xmlns:sys="http://schemas.microsoft.com/xaf/xad/system"
    xmlns:fv="FileApplication"
>

<sys:TagDefinition Name="sys:Main" Type="fwk:Application">
        <sys:Body>
            <!—
```

```
            The application implementation goes here. At some point
            it uses fv:File tag to dynamically instantiate
            file  by tag name obtained from the metadata.
            Wrapping dynamicEntity tag within fv:File tag is
            done simply to demonstrate how it's used but is not a
            requirement.
            -->
        </sys:Body>
    </sys:TagDefinition>

<sys:TagDefinition Name="fv:File>
        <sys:Param Name="FileTag" Type="Data"/>
        <sys:Param Name="FilePath" Type="Data"/>
        <sys:Body>
            <sys:dynamicEntity
                    Tag="$FileTag"
                    Signature="fv:FileSignature"
                    FilePath="$FilePath"/>
        </sys:Body>
    </sys:TagDefinition>

</sys:Xad>
```

SmartFilesAddIn assembly

```
<!-- SmartFilesAddIn.manifest -->

<assembly
    xmlns="urn:schemas-microsoft-com:asm.v2"
    xmlns:xa="http://schemas.microsoft.com/2005/xad/assembly"
>

<assemblyIdentity name="SmartFilesAddIn" version="1.0.0.0" />

<!-- Dependency on the standard framework -->
    <dependency>
        <dependentAssembly>
            <assemblyIdentity name="Microsoft.XAF.XAD.Framework"
                version="1.0.0.0" type="xad"/>
        </dependentAssembly>
    </dependency>

<!-- Dependency on the assembly defining the add-in protocol-->
    <dependency>
        <dependentAssembly>
            <assemblyIdentity name="FileExtensionProtocol"
                version="1.0.0.0" type="xad"/>
        </dependentAssembly>
    </dependency>

<!-- .NET implementation of the file primitive tags -->
    <dependency>
        <dependentAssembly>
            <assemblyIdentity name="SmartFilesImpl"
                version="1.0.0.0"/>
        </dependentAssembly>
    </dependency>

<file name="SmartFiles.xml" xa:type="metadata"/>
    <file name="SmartFileTags.xad" xa:type="xad"/>

</assembly>
```

```
<!-- SmartFiles.xml -->

<fv:Files xmlns:fv="FileApplication"
          xmlns:sv="http://Smarts.com/AddIns">
```

```
        <fv:File FileExtension="TXT"
            Name="sv:Text"/>
        <fv:File FileExtension="Xml"
            Name="sv:Xml"/>

</fv:File>
```

```
<!-- SmartFileTags.xad -->

<sys:Xad
    xmlns="http://schemas.microsoft.com/xaf/ xad/standard"
    xmlns:sys="http://schemas.microsoft.com/xaf/xad/system"
    xmlns:fv="FileApplication"
    xmlns:sv="http://Smarts.com/AddIns"
>

<sys:TagDefinition Name="sv:Text"
        Signature="fv:FileSignature">
        <sys:Entity BuilderClass="..."/>
    </sys:TagDefinition>

<sys:TagDefinition Name="sv:Xml"
        Signature="fv:FileSignature">
        <sys:Entity BuilderClass="..."/>
    </sys:TagDefinition>

</sys:Xad>
```

Appendix A: Coding Conventions

The following is a list of recommended XAD coding conventions. The standard XAD framework follows all of these conventions. Third parties may choose to adopt some or all of these conventions.

These conventions are enforced by XADCop. XADCop is an XAD-specific checker similar in spirit to FxCop in the .Net Framework.

12)  $TODO: Link to XADCop documentation once available

"sys" Prefix for System Namespace

13) $TODO

Pascal Casing of Names

14) $TODO

Signature Names must end in "Signature"

15) $TODO

Names of "Set" Parameters must end in "s"

16) $TODO

Names of "Singular" Entity Tags must not end in "s"

17) $TODO

Names of Selector Tags must end in "Selector"

18) $TODO

Param (if specified) must be an Entity's first Attribute

19) $TODO

Name (if specified) must be an Entity's first Attribute after Param (if specified)

What is claimed is:

1. A system for configuring a software application for performing at least one function, the system comprising:
   at least one memory storage comprising:
      an application description engine operative to:
         determine a structure of a graph of connected components having the components of the graph of connected components inter-connected to form the graph of connected components based at least one data event received by the application, and
         configure a portion of the graph of connected components for providing a first function of the application, and the software application operative to:
         invoke a process by the portion of the graph of connected components in response to a receipt of a data event at the first portion of the graph of connected components from the software application, and
         reconfigure the portion of the graph of connected components for performing a second function of the application in response to the invoked process by the portion of the graph of connected components; and
   at least one processing unit coupled to the at least one memory storage.

2. The system of claim 1, wherein the application description engine is further operative to:
   connect each of the components of the graph of connected components to other of the components of the graph of connected components via a common interface for allowing data to pass between components of different types via the common interface, and
   instantiate the graph of connected components, including any connections between connected components in the graph of connected components, in order to enable the graph of connected components to perform the first function of the application when executed.

3. The system of claim 2, wherein the application description engine is further operative to:
   instantiate the graph of connected components in response to at least one application description, received from the software application, that describe the first function, and
   interpret the at least one application description for determining which of the components of the graph of connected components should be connected for forming the graph of connected components.

4. The system of claim 3, wherein the application description engine is further operative to:
   receive via the at least one application description at least one declarative rule for composing and structuring the graph of connected components, and
   instantiate the graph of connected components according to the at least one declarative rule received via the at least one application description.

5. The system of claim 3, wherein the application description engine is further operative to: instantiate the graph of connected components in response to the at least one application description structured according to the Extensible Markup Language that describes the first function; and wherein the application description engine is further operative to structure data for passing to at least one of the components of the graph of connected components according to the Extensible Markup Language.

6. The system of claim 2, wherein the application description engine is further operative to: retrieve components comprising the graph of connected components from a component library containing the components comprising the graph of connected components prior to instantiation of the graph of connected components.

7. The system of claim 6, wherein the application description engine is further operative to retrieve components comprising the graph of connected components from the component library containing the components comprising the graph of connected components wherein the components from the component library include user interface connectors, action components, data connectors, accessor components, transformer components, and interface components.

8. The system of claim 6, wherein the application description engine is further operative to:
   retrieve at least one user interface (UI) connector that:
      receives at least one UI event,
      receives standard format data representations corresponding to any changed data, and
      connects with a UI to provide the changed data to the UI, and
   translate the at least one UI event into the data event.

9. The system of claim 8, wherein the application description engine is further operative to retrieve at least one action component connected to the at least one UI connector that receives and transform the data event into a standard format action.

10. The system of claim 9, wherein the application description engine is further operative to retrieve at least one data connector connected to both the at least one action component and the at least one UI connector that receives the standard format action and connects to a data store to complete the standard format action on the data and sends the standard format data representation to the at least one UI connector.

11. The system of claim 10, wherein the application description engine is further operative to retrieve at least one transformer that manipulates the standard format data representation into a UI-customized format.

12. The system of claim 11, wherein the application description engine is further operative to retrieve at least one accessor component that manipulates the standard format action into a standard format data-customized action.

13. The system of claim 6, wherein the application description engine is further operative to retrieve a third party component that implements an interface between at least two other components for enabling communication between the at least two other components.

14. The system of claim 13, wherein the application description engine is further operative to implement an interface between the at least two other components for enabling communication between the at least two other components including implementing the interface according to at least one declarative rules for implementing the interface provided to the application description engine by the third party component.

15. The system of claim 1, wherein the application description engine is further operative to:
   determine which of the components of the graph of connected components should be grouped together as the first portion of the graph of connected components within the graph of connected components where the first portion of the graph of connected components is required for performing the first function of the application in response the at least one data event received by the application, and
   configure the first portion of the graph of connected components within the graph of connected components as a component domain for performing a function of the application in response to the one or more data events received by the application.

16. The system of claim 15, wherein the software application is further operative to:
invoke a process by the component domain associated with the data event in response to invoking the process by the portion of the graph of connected components,
read a data associated with the data event responsible for invoking the process by the component domain, and
request any data representing any required reconfiguration of the component domain; and wherein the application description engine is further operative to reconfigure the component domain for performing the second function of the application in a second processing phase in the component domain.

17. The system of claim 15, wherein the components configured together as the component domain for performing the function of the application in response to the at least one data event received by the application act as a unit of application execution for a lifetime spanning from a time the component domain is configured to a time the component domain is reconfigured in response to the at least one data event requiring reconfiguration of the component domain.

18. The system of claim 1, wherein the software application is further operative to:
read a data associated with the data event responsible for invoking the process by the portion of the graph of connected components in a first processing phase,
request any data representing any required reconfiguration of the graph of connected components, and
reconfigure the graph of connected components for performing the second function of the application in a second processing phase.

19. A system for configuring a software application for performing at least one function, the system comprising:
at least one memory storage comprising:
an application description engine operative to:
connect each of a plurality of components to at least one other component of the plurality of components via a common interface for allowing data to pass between components of different types via the common interface,
instantiate a graph of connected components comprised of the plurality of components, including any connections between connected components in the graph of connected components, to enable the graph of connected components to perform a first function of the application when executed, and
reconfigure the graph of connected components to enable the graph of connected components to perform a second function of the application in response to an invoked process by at least one of the plurality of components; and
at least one processing unit coupled to the at least one memory storage.

20. A system for configuring a software application for performing at least one function, the system comprising:
at least one memory storage comprising:
an application description engine operative to:
connect each of a plurality of components to at least one other component of the plurality of components via a common interface for creating the software application and for allowing data to pass between components of different types via the common interface,
instantiate a graph of connected components comprised of the plurality of components, including any connections between connected components in the graph of connected components, to enable the graph of connected components to perform a first function of the software application when executed, and
reconfigure the graph of connected components for performing a second function of the software application in response to an invoked process by at least one of the plurality of components, and
the software application operative to invoke a process by at least one second component of the plurality of components in response to receiving a data event by at least one first component of the plurality of components; and
at least one processing unit coupled to the at least one memory storage.

* * * * *